US007860807B2

(12) United States Patent
Kaneko et al.

(10) Patent No.: US 7,860,807 B2
(45) Date of Patent: Dec. 28, 2010

(54) WEB PAGE CREATION SUPPORTING SYSTEM, WEB PAGE CREATION SUPPORTING APPARATUS, WEB PAGE CREATION SUPPORTING METHOD, COMPUTER PROGRAM, AND RECORD MEDIUM

(75) Inventors: Shinji Kaneko, Chiba (JP); Hideo Neishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 2103 days.

(21) Appl. No.: 10/149,314

(22) PCT Filed: Oct. 10, 2001

(86) PCT No.: PCT/JP01/08904

§ 371 (c)(1),
(2), (4) Date: Jun. 7, 2002

(87) PCT Pub. No.: WO02/31666

PCT Pub. Date: Apr. 18, 2002

(65) Prior Publication Data

US 2002/0184359 A1 Dec. 5, 2002

(30) Foreign Application Priority Data

Oct. 10, 2000 (JP) ............................ 2000-375309
Apr. 27, 2001 (JP) ............................ 2001-133273

(51) Int. Cl.
*G06F 17/00* (2006.01)

(52) U.S. Cl. ..................................................... 705/400

(58) Field of Classification Search ....................... None
See application file for complete search history.

(56) References Cited

U.S. PATENT DOCUMENTS 5,727,156 A * 3/1998 Herr-Hoyman et al. ..... 709/219
5,945,989 A * 8/1999 Freishtat et al. ............. 715/760
6,163,878 A * 12/2000 Kohl .......................... 717/100
6,209,007 B1 * 3/2001 Kelley et al. ................ 715/513
6,247,032 B1 * 6/2001 Bernardo et al. ............ 715/530

(Continued)

FOREIGN PATENT DOCUMENTS

JP 10-301923 11/1998

(Continued)

OTHER PUBLICATIONS

"Nettaxi Introduces New Website Builder Tool; Nettaxi Site Builder Allows Citizens to Create Their Own Web Pages Faster and Easier!", Business Wire, Sep. 29, 1999.*

*Primary Examiner*—Rutao Wu
(74) *Attorney, Agent, or Firm*—Finnegan, Henderson, Farabow, Garrett & Dunner, L.L.P.

(57) ABSTRACT

A Web page creation support system includes a customer terminal unit (300), a Web page creation support server (100) which is accessible from the customer terminal unit (300) via a network, and a creator terminal unit (400) for performing a Web page creation job. The Web page creation support server (100) controls Web page information of the customer terminal unit (300) in relation to template information. The server can cause the creator terminal unit (400) to create the Web page information in response to a creation request from the customer terminal unit (300) in accordance with the template information, thereby providing an environment in which Web page creation can be easily carried out on the network.

36 Claims, 96 Drawing Sheets

U.S. PATENT DOCUMENTS 6,263,352 B1 * 7/2001 Cohen ........................ 715/513
6,304,886 B1 * 10/2001 Bernardo et al. ............ 715/530
6,397,197 B1 * 5/2002 Gindlesperger .............. 705/37
6,573,910 B1 * 6/2003 Duke et al. ................. 715/740
6,684,369 B1 * 1/2004 Bernardo et al. ............ 715/513
6,771,291 B1 * 8/2004 DiStefano, III ............. 715/762
7,000,180 B2 * 2/2006 Balthaser ................. 715/500.1
7,032,030 B1 * 4/2006 Codignotto ................. 709/246
7,062,527 B1 * 6/2006 Tyrrell, III .................. 709/201
2001/0039529 A1 * 11/2001 Hoffman ..................... 705/37
2002/0004755 A1 * 1/2002 Balthaser ..................... 705/26
2002/0023046 A1 * 2/2002 Callahan et al. ............... 705/37

FOREIGN PATENT DOCUMENTS

JP 11-15767 1/1999
JP 2000-67038 3/2000
JP 2000-148859 5/2000

* cited by examiner

CUSTOMER DB

| NO. | DESCRIPTION | ITEM NAME (DEFINED NAME) |
|---|---|---|
| 1 | CUSTOMER ID | CUSTOMER_ID |
| 2 | USER NAME | USER_NAME |
| 3 | USER PASSWORD | USER_PASSWD |
| 4 | LAST NAME | LAST_NAME |
| 5 | LAST NAME KANA | LAST_NAME_KANA |
| 6 | FIRST NAME | FIRST_NAME |
| 7 | FIRST NAME KANA | FIRST_NAME_KANA |
| 8 | BIRTH DATE | BIRTHDAY |
| 9 | TELEPHONE NUMBER - HOME | TEL |
| 10 | TELEPHONE NUMBER - COMPANY | TEL_COMPANY |
| 11 | TELEPHONE NUMBER - RESERVED | TEL_RESERVE |
| 12 | FAX NUMBER - HOME | FAX |
| 13 | FAX NUMBER - COMPANY | FAX_COMPANY |
| 14 | FAX NUMBER - RESERVED | FAX_RESERVE |
| 15 | E-MAIL ADDRESS | EMAIL |
| 16 | E-MAIL ADDRESS - RESERVED | EMAIL_RESERVE |
| 17 | HOME POSTAL CODE | ZIP_CODE |
| 18 | HOME PREFECTURE | PREFECTURE |
| 19 | HOME CITY | CITY |
| 20 | HOME STREET ADDRESS | STREET_ADDRESS |
| 21 | COMPANY POSTAL CODE | COMPANY_ZIP_CODE |
| 22 | COMPANY NAME | COMPANY_NAME |
| 23 | COMPANY NAME KANA | COMPANY_NAME_KANA |
| 24 | COMPANY DEPARTMENT | DEPARTMENT |
| 25 | COMPANY PREFECTURE | COMPANY_PREFECTURE |
| 26 | COMPANY CITY | COMPANY_CITY |
| 27 | COMPANY STREET ADDRESS | COMPANY_STREET_ADDRESS |
| 28 | JOB TITLE | JOB_TITLE |
| 29 | JOB DESCRIPTION | JOB_DESCRIPTION |
| 30 | INDUSTRY | INDUSTRY |
| 31 | REGISTRATION DATE | DATE_REGISTRATION |
| 32 | UPDATE DATE | DATE_UPDATE |
| 33 | LAST LOGIN DATE | DATE_LAST_LOGIN |
| 34 | ACCOUNT ID | ACCOUNT_ID |
| 35 | NOTE | NOTE |
| 36 | DATA OWNER | OWNER |
| 37 | SERVICE VALID FLAG | IS_SERVICE_VALID |
| 38 | RESERVED | RESERVE |

CREATOR DB

| NO. | DESCRIPTION | ITEM NAME (DEFINED NAME) |
|---|---|---|
| 1 | CREATOR ID | CUSTOMER_ID |
| 2 | USER NAME | USER_NAME |
| 3 | USER PASSWORD | USER_PASSWD |
| 4 | LAST NAME | LAST_NAME |
| 5 | LAST NAME KANA | LAST_NAME_KANA |
| 6 | FIRST NAME | FIRST_NAME |
| 7 | FIRST NAME KANA | FIRST_NAME_KANA |
| 8 | POSTAL CODE | ZIP_CODE |
| 9 | PREFECTURE | PREFECTURE |
| 10 | CITY | CITY |
| 11 | STREET ADDRESS | STREET_ADDRESS |
| 12 | TELEPHONE NUMBER | TEL |
| 13 | FAX NUMBER | FAX |
| 14 | E-MAIL ADDRESS | EMAIL |
| 15 | SEX | SEX |
| 16 | BIRTH DATE | BIRTHDAY |
| 17 | ACADEMIC BACKGROUND | ACADEMIC_BACKGRD |
| 18 | CAREER TERM | CAREER_TERM |
| 19 | CAREER COMPANY | CAREER_COMPANY |
| 20 | CAREER OBLIGATION | CAREER_OBLIGATION |
| 21 | WORK TERM | WORK_TERM |
| 22 | WORK PROJECT NAME | WORK_PJ_NEME |
| 23 | WORK URL | WORK_URL |
| 24 | OS | OS |
| 25 | SELF PR | PR |

PLEASE CHECK NECESSARY ITEMS
AMONG HOSTING/EC SERVICES.

| HOSTING SERVICES | EC |
|---|---|
| ☐ AUTHENTICATION<br>☑ CGI (QUESTIONNAIRE, RESERVATION, INQUIRY)<br>☐ DOMAIN REGISTRATION<br>☐ DOMAIN CONTROL<br>☐ RENTAL SERVER | ☑ SHOPPING BASKET<br>☐ DISTRIBUTION<br>☐ COLLECTION OF CHARGE |

| RESET | SAVE CHANGES AND GO TO NEXT | SAVE CHANGES AND EXIT |

INTEREFACE OF EC-ENABLED PRODUCT INFORMATION PAGE AND FLOW THEREOF

FIG. 24

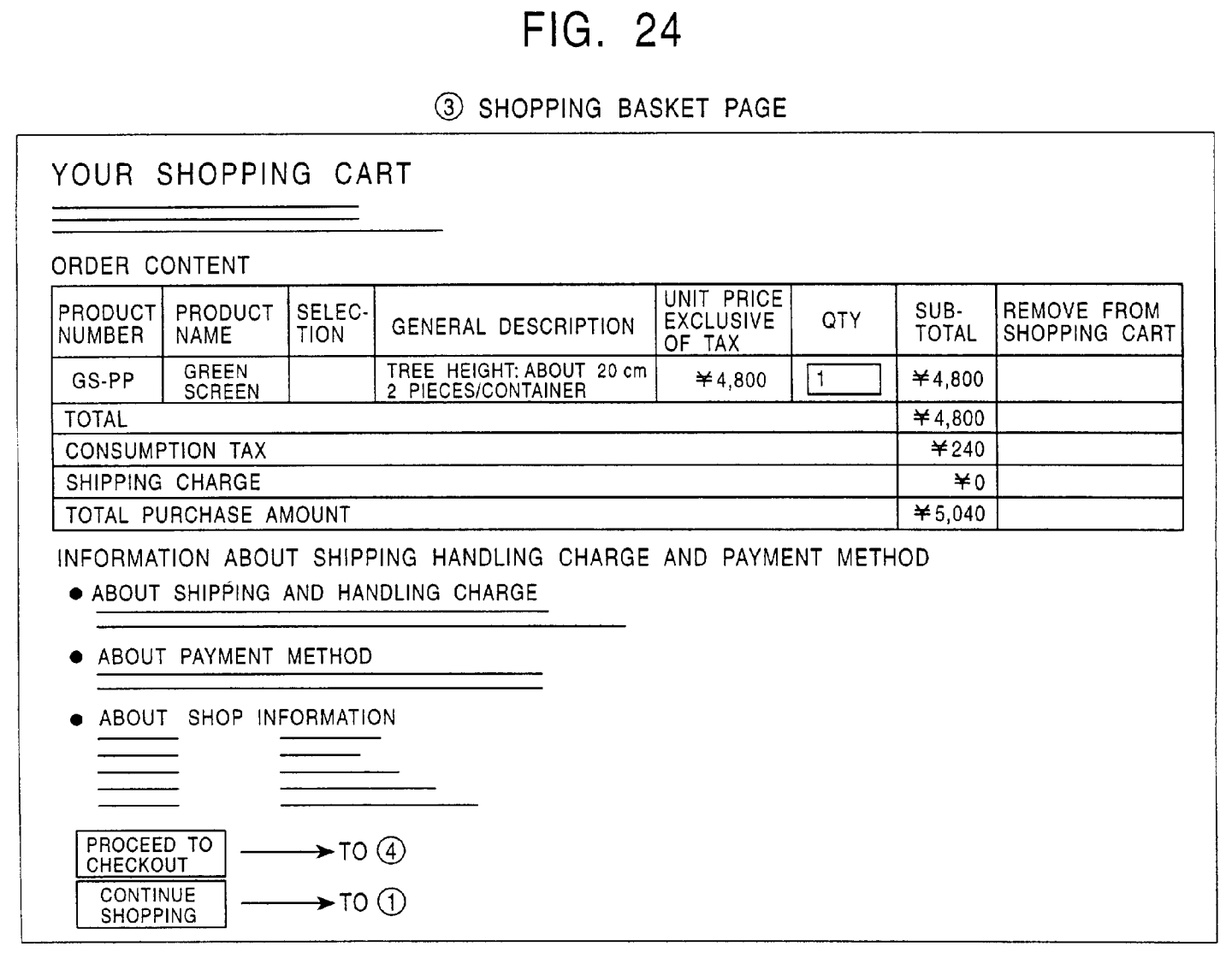

③ SHOPPING BASKET PAGE

YOUR SHOPPING CART

ORDER CONTENT

| PRODUCT NUMBER | PRODUCT NAME | SELECTION | GENERAL DESCRIPTION | UNIT PRICE EXCLUSIVE OF TAX | QTY | SUB-TOTAL | REMOVE FROM SHOPPING CART |
|---|---|---|---|---|---|---|---|
| GS-PP | GREEN SCREEN | | TREE HEIGHT: ABOUT 20 cm 2 PIECES/CONTAINER | ¥4,800 | 1 | ¥4,800 | |
| TOTAL | | | | | | ¥4,800 | |
| CONSUMPTION TAX | | | | | | ¥240 | |
| SHIPPING CHARGE | | | | | | ¥0 | |
| TOTAL PURCHASE AMOUNT | | | | | | ¥5,040 | |

INFORMATION ABOUT SHIPPING HANDLING CHARGE AND PAYMENT METHOD

- ABOUT SHIPPING AND HANDLING CHARGE
- ABOUT PAYMENT METHOD
- ABOUT SHOP INFORMATION

PROCEED TO CHECKOUT → TO ④

CONTINUE SHOPPING → TO ①

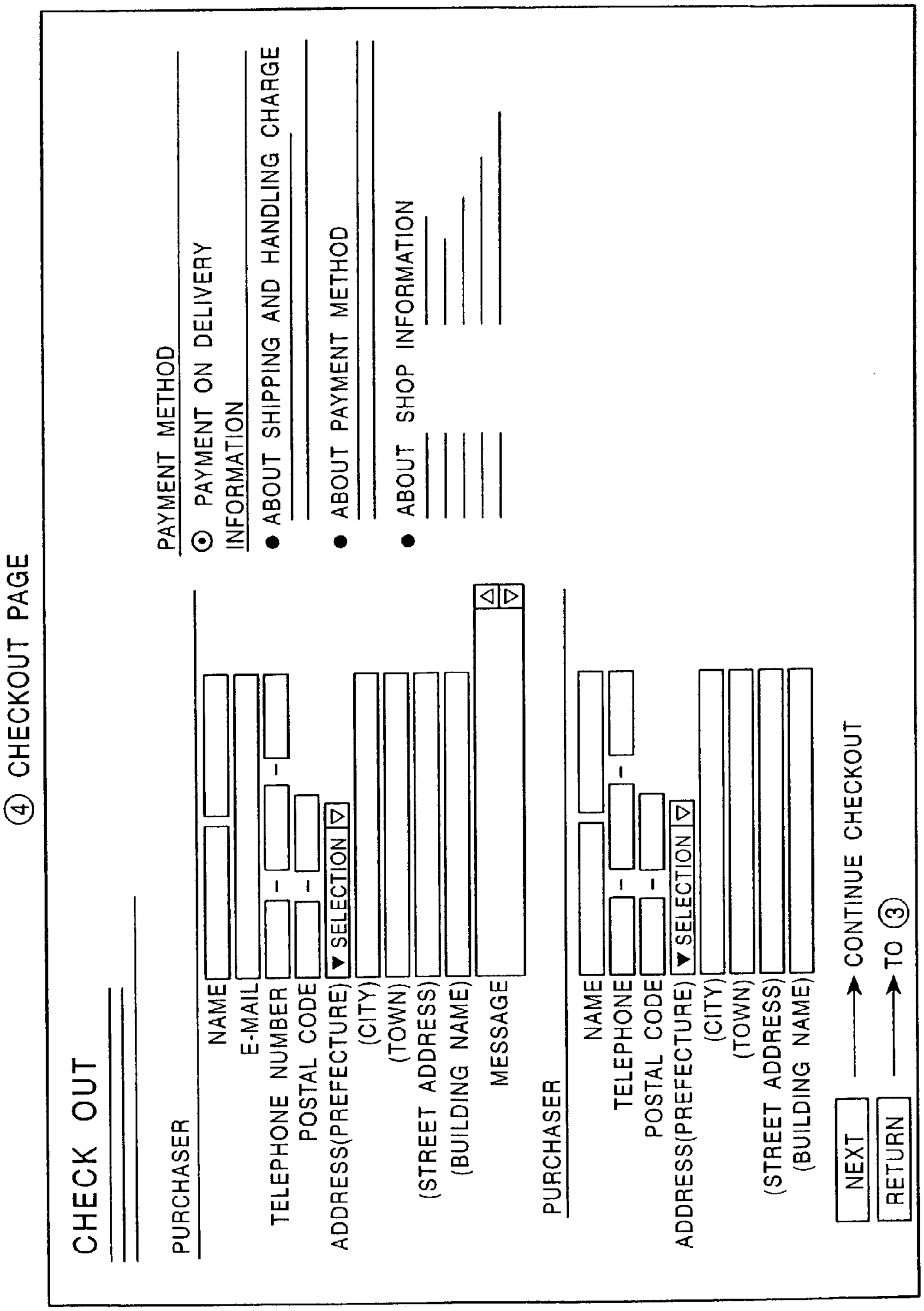

FIG. 25

④ CHECKOUT PAGE

CHECK OUT

PURCHASER

- NAME
- E-MAIL
- TELEPHONE NUMBER
- POSTAL CODE
- ADDRESS(PREFECTURE) ▼SELECTION
  - (CITY)
  - (TOWN)
  - (STREET ADDRESS)
  - (BUILDING NAME)
- MESSAGE

PURCHASER

- NAME
- TELEPHONE
- POSTAL CODE
- ADDRESS(PREFECTURE) ▼SELECTION
  - (CITY)
  - (TOWN)
  - (STREET ADDRESS)
  - (BUILDING NAME)

PAYMENT METHOD
⊙ PAYMENT ON DELIVERY
INFORMATION
● ABOUT SHIPPING AND HANDLING CHARGE

● ABOUT PAYMENT METHOD

● ABOUT SHOP INFORMATION

NEXT ⟶ CONTINUE CHECKOUT
RETURN ⟶ TO ③

PREVIEW IMAGE (2)

TOP SCREEN

| COMPANY LOGO | EXIST |
| TITLE CREATION | NOT_EXIST |
| IMAGE | EXIST |
| TEXT | EXIST |

~1801

PREVIEW

| LOGO_EXIST.gif | |
| TITLE_NOT_EXIST.gif | IMAGE_EXIST.gif |
| | TEXT_EXIST.gif |

~1802

PREVIEW IMAGE (3)

PRODUCT INFORMATION SCREEN

| | |
|---|---|
| IMAGE | EXIST |
| TEXT | EXIST |
| NUMBER OF PRODUCTS | 4 |

~1901

PREVIEW

| IMAGE_EXIST. gif | TEXT_EXIST. gif |
|---|---|
| IMAGE_EXIST. gif | TEXT_EXIST. gif |
| IMAGE_NOT_EXIST. gif | TEXT_EXIST. gif |
| IMAGE_NOT_EXIST. gif | TEXT_EXIST. gif |

Figure 30:
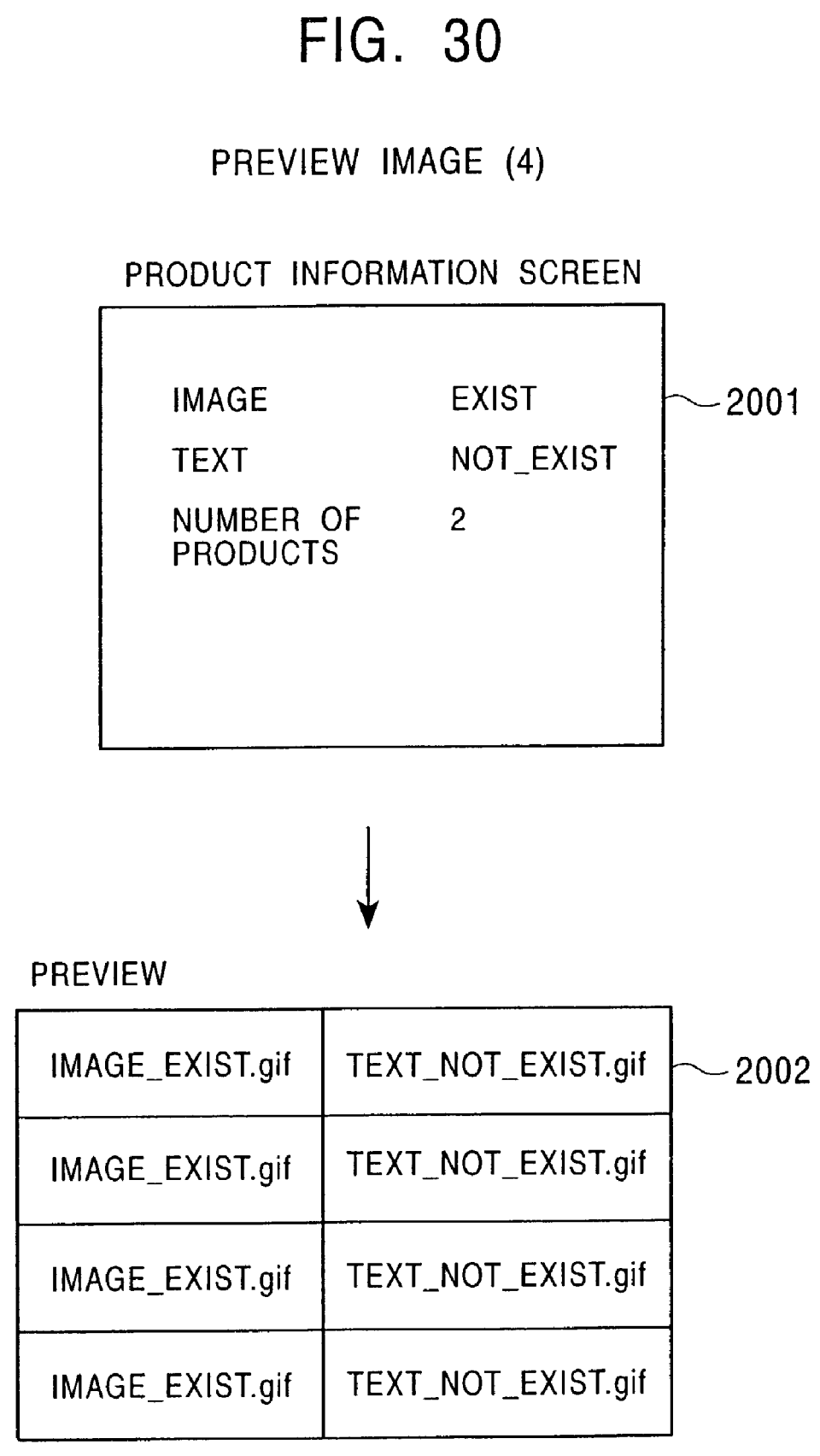

PREVIEW IMAGE (4)

PRODUCT INFORMATION SCREEN

| | | |
|---|---|---|
| IMAGE | EXIST | 2001 |
| TEXT | NOT_EXIST | |
| NUMBER OF PRODUCTS | 2 | |

↓

PREVIEW

| | | |
|---|---|---|
| IMAGE_EXIST.gif | TEXT_NOT_EXIST.gif | 2002 |
| IMAGE_EXIST.gif | TEXT_NOT_EXIST.gif | |
| IMAGE_EXIST.gif | TEXT_NOT_EXIST.gif | |
| IMAGE_EXIST.gif | TEXT_NOT_EXIST.gif | |

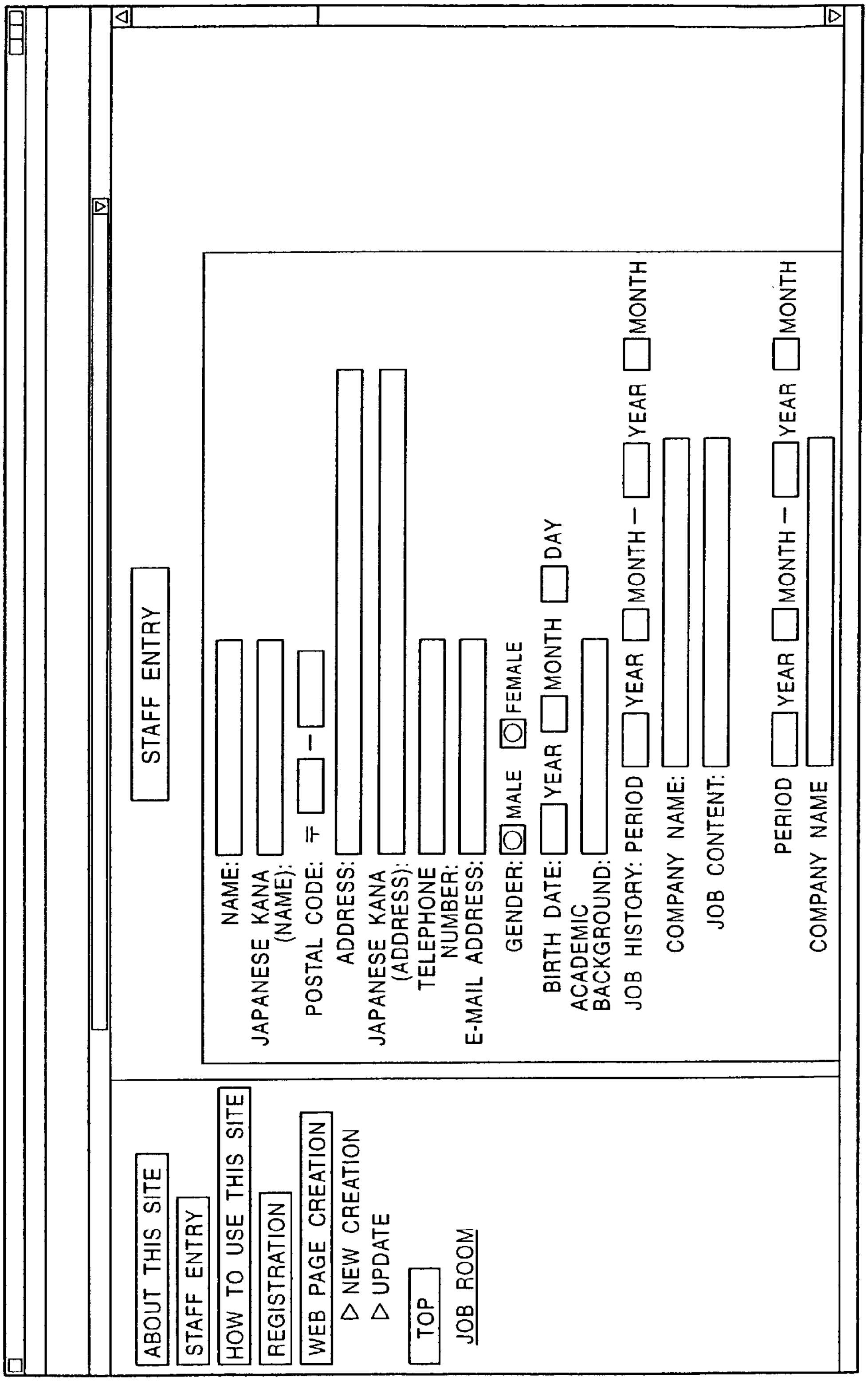

FIG. 40

STAFF ENTRY

NAME:
JAPANESE KANA (NAME):
POSTAL CODE: 〒 □ - □
ADDRESS:
JAPANESE KANA (ADDRESS):
TELEPHONE NUMBER:
E-MAIL ADDRESS:
GENDER: ○ MALE ○ FEMALE
BIRTH DATE: □ YEAR □ MONTH □ DAY
ACADEMIC BACKGROUND:
JOB HISTORY: PERIOD □ YEAR □ MONTH → □ YEAR □ MONTH
COMPANY NAME:
JOB CONTENT:
PERIOD □ YEAR □ MONTH → □ YEAR □ MONTH
COMPANY NAME

ABOUT THIS SITE
STAFF ENTRY
HOW TO USE THIS SITE
REGISTRATION
WEB PAGE CREATION
▷ NEW CREATION
▷ UPDATE
TOP
JOB ROOM

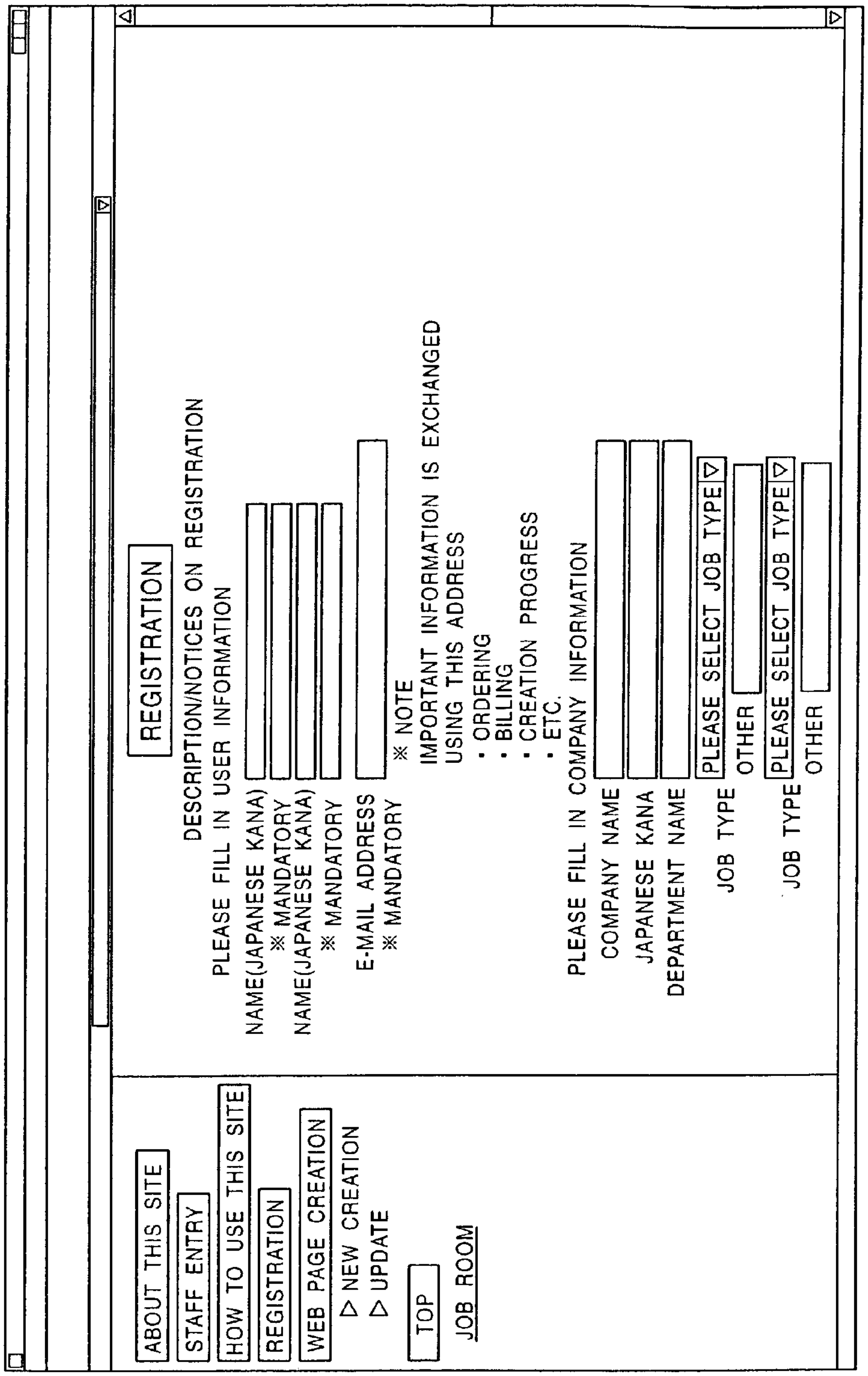

FIG. 44

REGISTRATION

DESCRIPTION/NOTICES ON REGISTRATION
PLEASE FILL IN USER INFORMATION
NAME(JAPANESE KANA)
 ※ MANDATORY
NAME(JAPANESE KANA)
 ※ MANDATORY
E-MAIL ADDRESS
 ※ MANDATORY
※ NOTE
IMPORTANT INFORMATION IS EXCHANGED
USING THIS ADDRESS
 · ORDERING
 · BILLING
 · CREATION PROGRESS
 · ETC.
PLEASE FILL IN COMPANY INFORMATION
COMPANY NAME
JAPANESE KANA
DEPARTMENT NAME
JOB TYPE  PLEASE SELECT JOB TYPE ▽
          OTHER
JOB TYPE  PLEASE SELECT JOB TYPE ▽
          OTHER

ABOUT THIS SITE
STAFF ENTRY
HOW TO USE THIS SITE
REGISTRATION
WEB PAGE CREATION
 ▷ NEW CREATION
 ▷ UPDATE
TOP
JOB ROOM

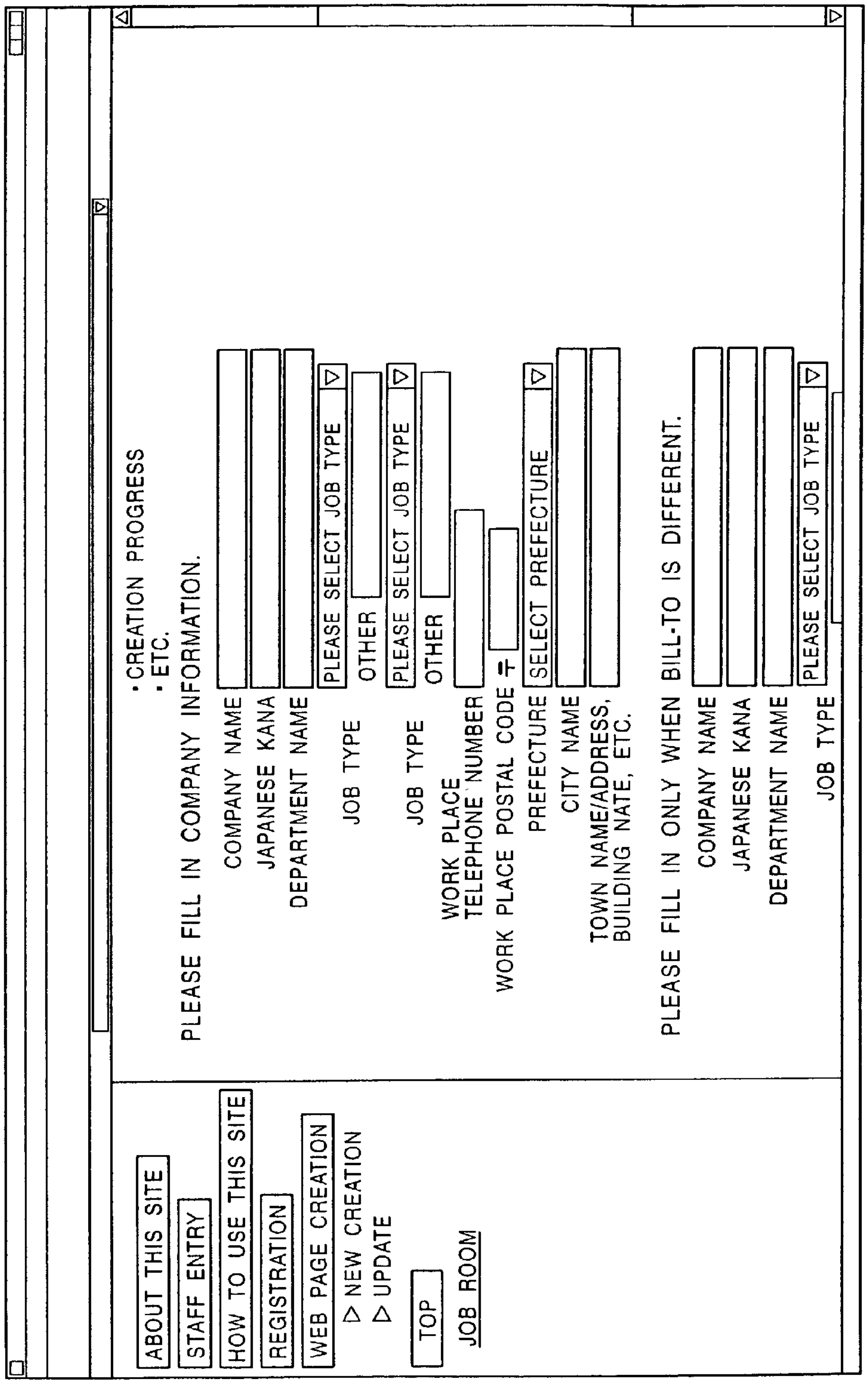

FIG. 45

PLEASE FILL IN COMPANY INFORMATION.

- CREATION PROGRESS
- ETC.

COMPANY NAME [ ] [ ] [ ]
JAPANESE KANA
DEPARTMENT NAME
JOB TYPE [PLEASE SELECT JOB TYPE ▷]
OTHER [ ]
JOB TYPE [PLEASE SELECT JOB TYPE ▷]
OTHER [ ]
WORK PLACE TELEPHONE NUMBER
WORK PLACE POSTAL CODE 〒
PREFECTURE [SELECT PREFECTURE ▷]
CITY NAME
TOWN NAME/ADDRESS, BUILDING NATE, ETC.

PLEASE FILL IN ONLY WHEN BILL-TO IS DIFFERENT.

COMPANY NAME
JAPANESE KANA
DEPARTMENT NAME
JOB TYPE [PLEASE SELECT JOB TYPE ▷]

- ABOUT THIS SITE
- STAFF ENTRY
- HOW TO USE THIS SITE
- REGISTRATION
- WEB PAGE CREATION
  ▷ NEW CREATION
  ▷ UPDATE
- TOP
- JOB ROOM

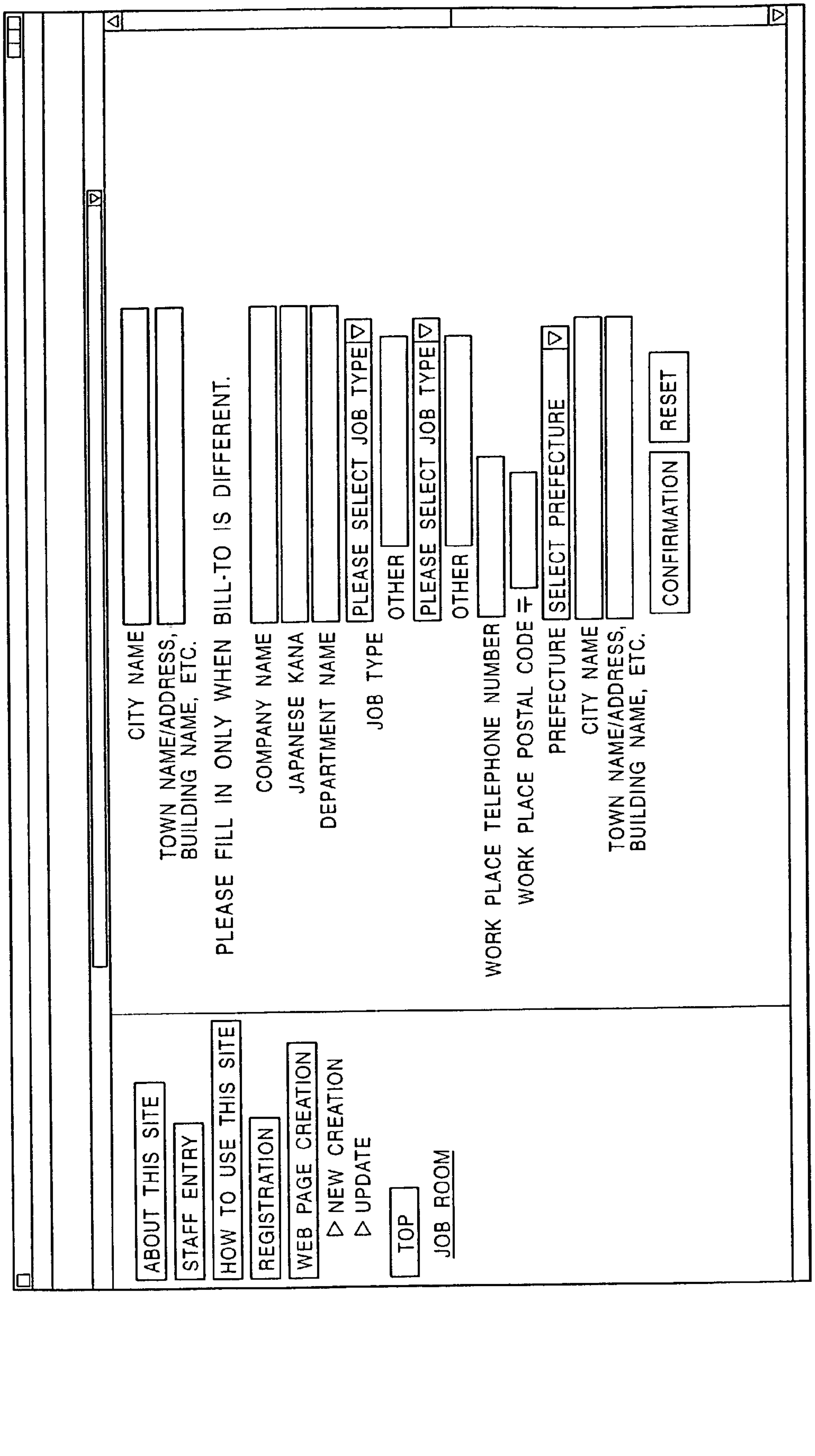

FIG. 46

ABOUT THIS SITE
STAFF ENTRY
HOW TO USE THIS SITE
REGISTRATION
WEB PAGE CREATION
△ NEW CREATION
△ UPDATE
TOP
JOB ROOM

CITY NAME [ ] [ ]
TOWN NAME/ADDRESS, BUILDING NAME, ETC.

PLEASE FILL IN ONLY WHEN BILL-TO IS DIFFERENT.

COMPANY NAME [ ]
JAPANESE KANA [ ]
DEPARTMENT NAME [ ]
JOB TYPE [PLEASE SELECT JOB TYPE ▽]
OTHER [ ]
[PLEASE SELECT JOB TYPE ▽]
OTHER [ ]
WORK PLACE TELEPHONE NUMBER [ ]
WORK PLACE POSTAL CODE 〒 [ ]
PREFECTURE [SELECT PREFECTURE ▽]
CITY NAME [ ] [ ]
TOWN NAME/ADDRESS, BUILDING NAME, ETC.

[CONFIRMATION] [RESET]

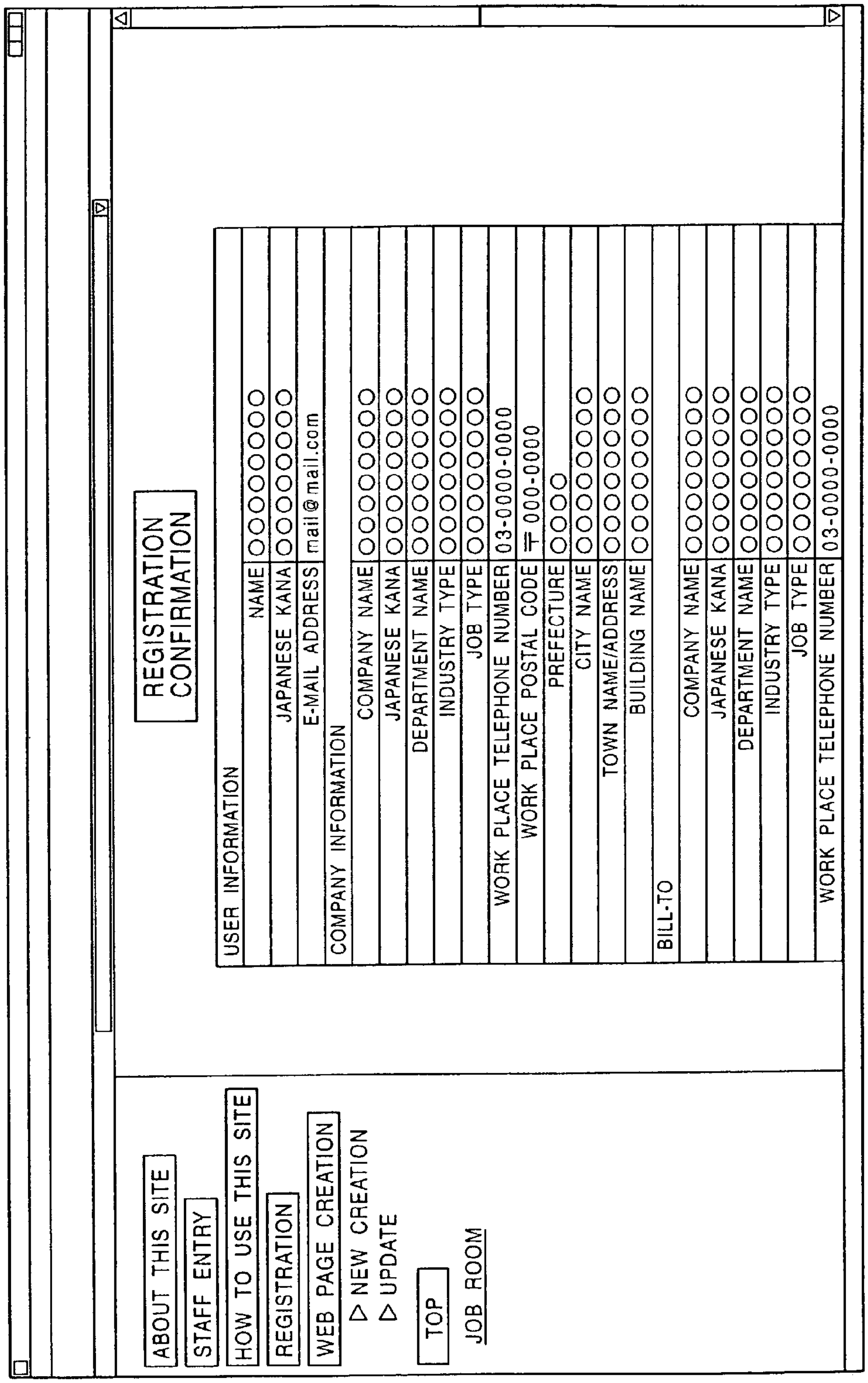

FIG. 47

| REGISTRATION CONFIRMATION | | |
|---|---|---|
| USER INFORMATION | | |
| | NAME | OOOOOOOO OOOOOOOO |
| | JAPANESE KANA | OOOOOOOO OOOOOOOO |
| | E-MAIL ADDRESS | mail@mail.com |
| COMPANY INFORMATION | | |
| | COMPANY NAME | OOOOOOOO OOOOOOOO |
| | JAPANESE KANA | OOOOOOOO OOOOOOOO |
| | DEPARTMENT NAME | OOOOOOOO OOOOOOOO |
| | INDUSTRY TYPE | OOOOOOOO OOOOOOOO |
| | JOB TYPE | OOOOOOOO OOOOOOOO |
| | WORK PLACE TELEPHONE NUMBER | 03-0000-0000 |
| | WORK PLACE POSTAL CODE | 〒000-0000 |
| | PREFECTURE | OOOO |
| | CITY NAME | OOOOOOOO OOOOOOOO |
| | TOWN NAME/ADDRESS | OOOOOOOO OOOOOOOO |
| | BUILDING NAME | OOOOOOOO OOOOOOOO |
| BILL-TO | | |
| | COMPANY NAME | OOOOOOOO OOOOOOOO |
| | JAPANESE KANA | OOOOOOOO OOOOOOOO |
| | DEPARTMENT NAME | OOOOOOOO OOOOOOOO |
| | INDUSTRY TYPE | OOOOOOOO OOOOOOOO |
| | JOB TYPE | OOOOOOOO OOOOOOOO |
| | WORK PLACE TELEPHONE NUMBER | 03-0000-0000 |

ABOUT THIS SITE
STAFF ENTRY
HOW TO USE THIS SITE
REGISTRATION
WEB PAGE CREATION
△ NEW CREATION
△ UPDATE
TOP
JOB ROOM

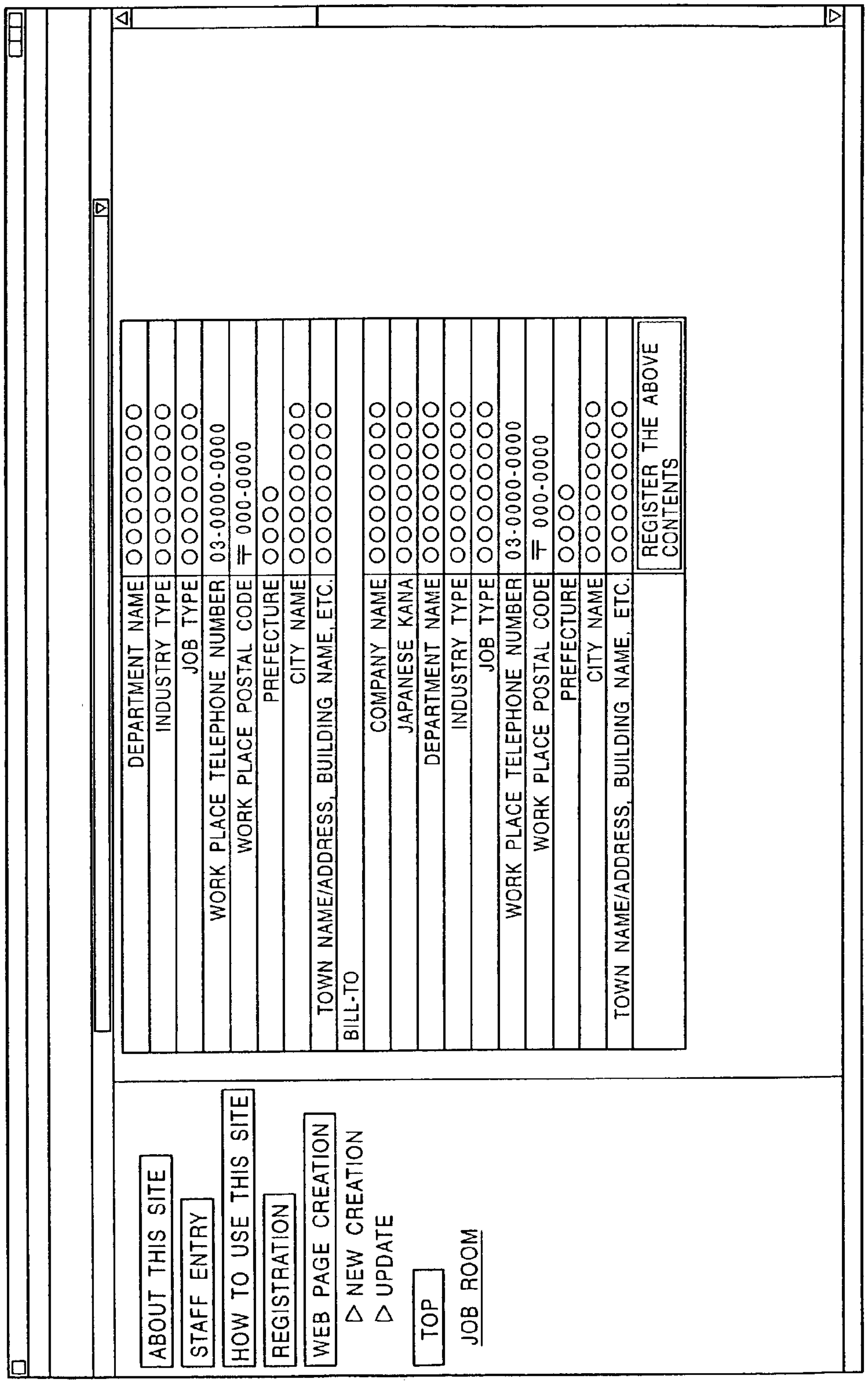

FIG. 48

| | |
|---|---|
| DEPARTMENT NAME | OOOOOOO |
| INDUSTRY TYPE | OOOOOOO |
| JOB TYPE | OOOOOOO |
| WORK PLACE TELEPHONE NUMBER | 03-0000-0000 |
| WORK PLACE POSTAL CODE | 〒000-0000 |
| PREFECTURE | OOOO |
| CITY NAME | OOOOOOO |
| TOWN NAME/ADDRESS, BUILDING NAME, ETC. | OOOOOOO |
| BILL-TO | |
| COMPANY NAME | OOOOOOO |
| JAPANESE KANA | OOOOOOO |
| DEPARTMENT NAME | OOOOOOO |
| INDUSTRY TYPE | OOOOOOO |
| JOB TYPE | OOOOOOO |
| WORK PLACE TELEPHONE NUMBER | 03-0000-0000 |
| WORK PLACE POSTAL CODE | 〒000-0000 |
| PREFECTURE | OOOO |
| CITY NAME | OOOOOOO |
| TOWN NAME/ADDRESS, BUILDING NAME, ETC. | OOOOOOO |
| REGISTER THE ABOVE CONTENTS | |

ABOUT THIS SITE
STAFF ENTRY
HOW TO USE THIS SITE
REGISTRATION
WEB PAGE CREATION
△ NEW CREATION
△ UPDATE
TOP
JOB ROOM

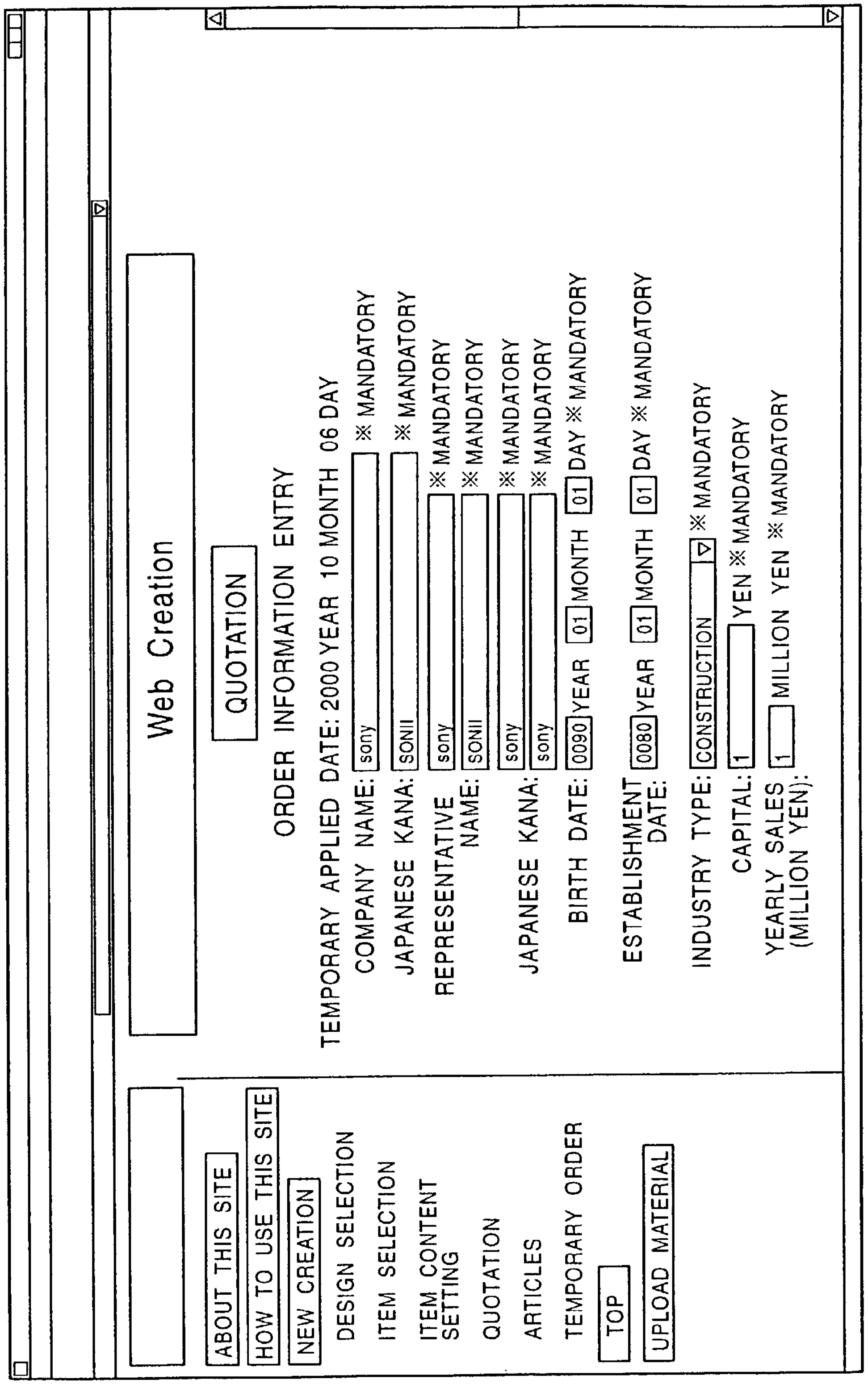

FIG. 59

Web Creation

[ QUOTATION ]

ORDER INFORMATION ENTRY

TEMPORARY APPLIED DATE: 2000 YEAR 10 MONTH 06 DAY

- COMPANY NAME: [sony] ※MANDATORY
- JAPANESE KANA: [SONII] ※MANDATORY
- REPRESENTATIVE NAME: [sony] ※MANDATORY
- JAPANESE KANA: [SONII] ※MANDATORY
- BIRTH DATE: [0090] YEAR [01] MONTH [01] DAY ※MANDATORY
- ESTABLISHMENT DATE: [0080] YEAR [01] MONTH [01] DAY ※MANDATORY
- INDUSTRY TYPE: [CONSTRUCTION ▽] ※MANDATORY
- CAPITAL: [1] YEN ※MANDATORY
- YEARLY SALES (MILLION YEN): [1] MILLION YEN ※MANDATORY Sidebar:
- ABOUT THIS SITE
- HOW TO USE THIS SITE
- NEW CREATION
- DESIGN SELECTION
- ITEM SELECTION
- ITEM CONTENT SETTING
- QUOTATION
- ARTICLES
- TEMPORARY ORDER
- [TOP]
- [UPLOAD MATERIAL]

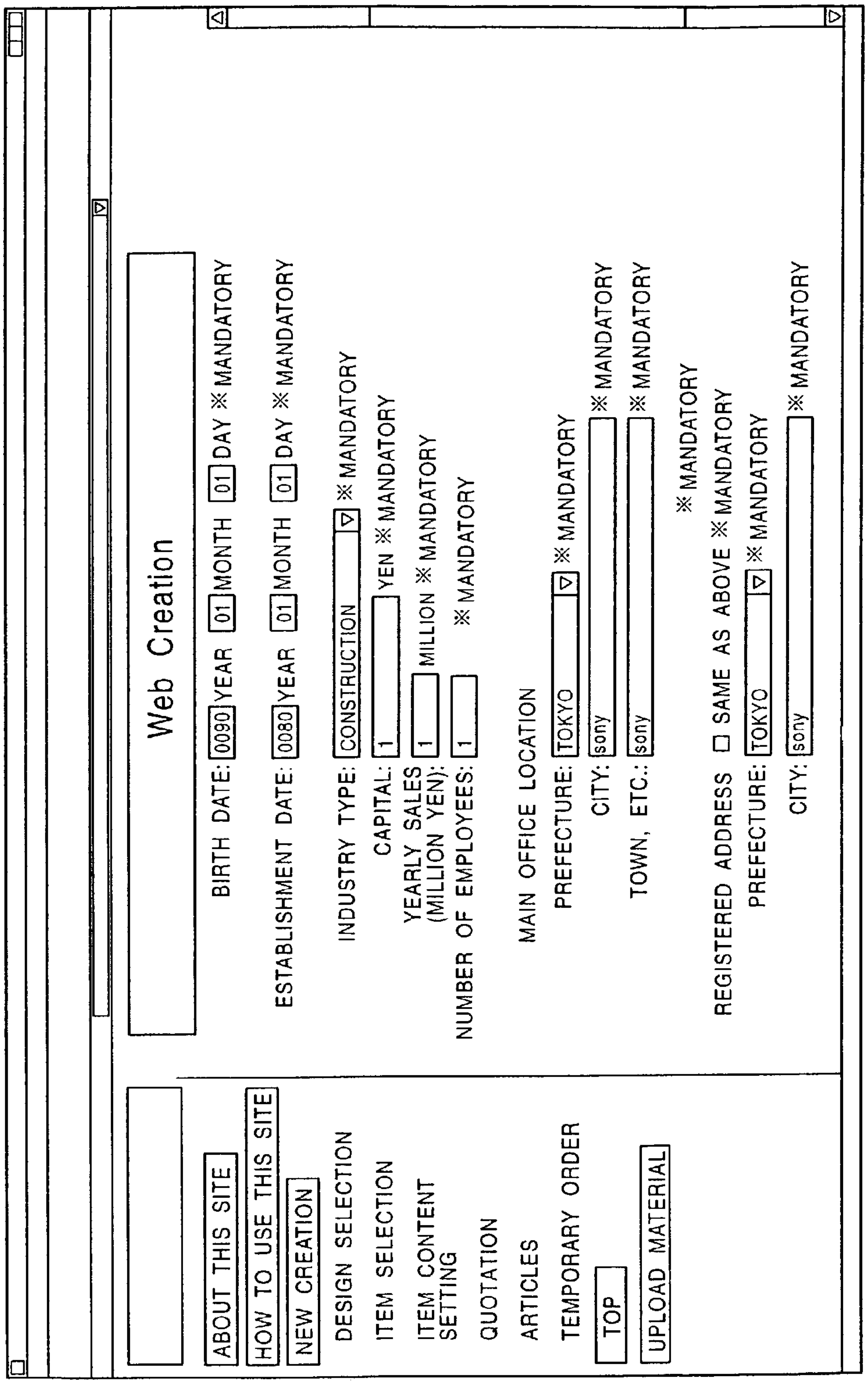

FIG. 60

Web Creation

BIRTH DATE: [0090] YEAR [01] MONTH [01] DAY ※MANDATORY
ESTABLISHMENT DATE: [0080] YEAR [01] MONTH [01] DAY ※MANDATORY
INDUSTRY TYPE: [CONSTRUCTION ▽] ※MANDATORY
CAPITAL: [1] YEN ※MANDATORY
YEARLY SALES (MILLION YEN): [1] MILLION ※MANDATORY
NUMBER OF EMPLOYEES: [1] ※MANDATORY
MAIN OFFICE LOCATION
PREFECTURE: [TOKYO ▽] ※MANDATORY
CITY: [sony] ※MANDATORY
TOWN, ETC.: [sony] ※MANDATORY
REGISTERED ADDRESS ☐ SAME AS ABOVE ※MANDATORY
PREFECTURE: [TOKYO ▽] ※MANDATORY
CITY: [sony] ※MANDATORY ABOUT THIS SITE
HOW TO USE THIS SITE
NEW CREATION
DESIGN SELECTION
ITEM SELECTION
ITEM CONTENT SETTING
QUOTATION
ARTICLES
TEMPORARY ORDER
TOP
UPLOAD MATERIAL

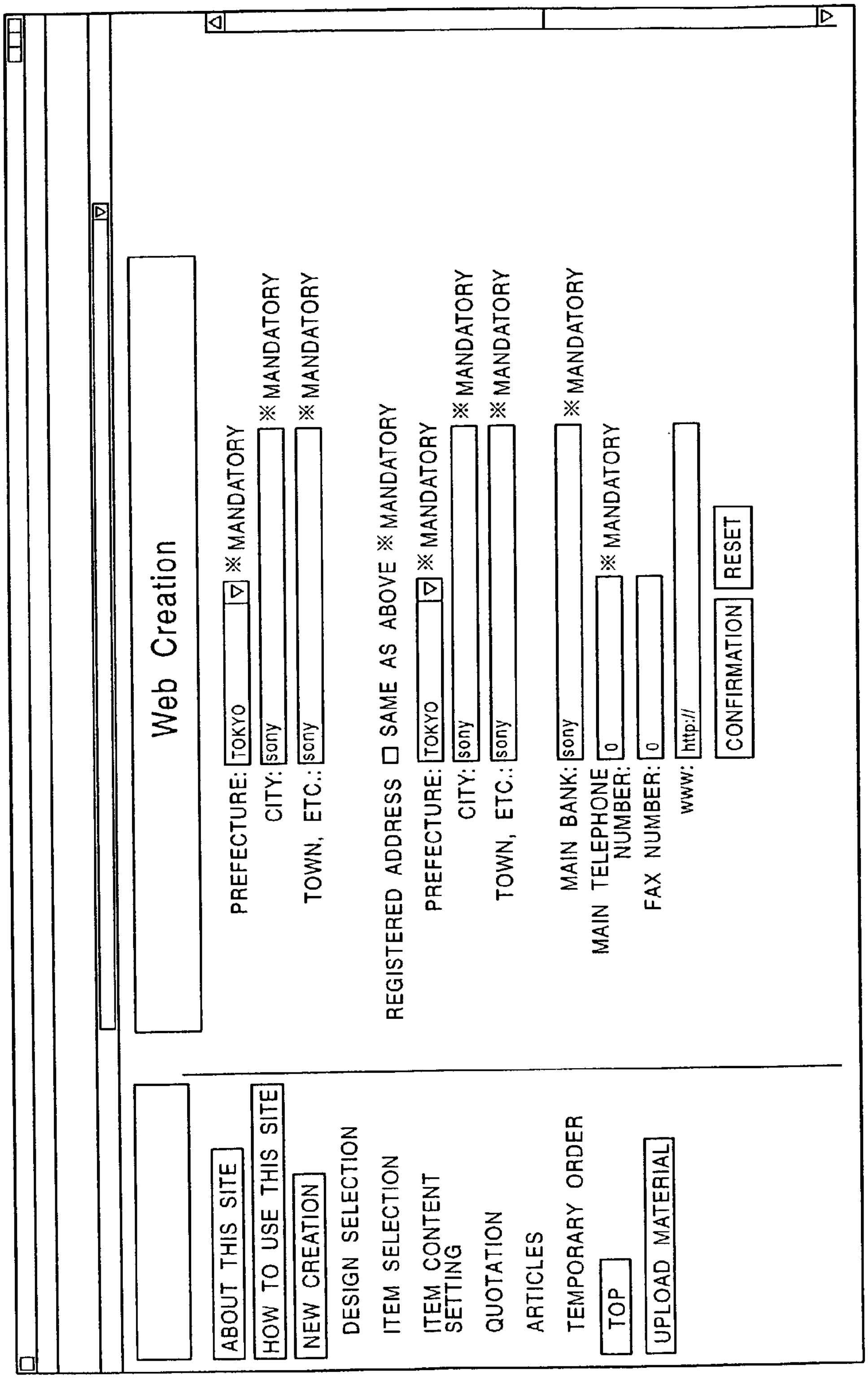

FIG. 61

Web Creation

PREFECTURE: [TOKYO ▽] ※MANDATORY
CITY: [sony] ※MANDATORY
TOWN, ETC.: [sony] ※MANDATORY REGISTERED ADDRESS ☐ SAME AS ABOVE ※MANDATORY
PREFECTURE: [TOKYO ▽] ※MANDATORY
CITY: [sony] ※MANDATORY
TOWN, ETC.: [sony] ※MANDATORY MAIN BANK: [sony] ※MANDATORY
MAIN TELEPHONE NUMBER: [0]
FAX NUMBER: [0]
www: [http://]

[CONFIRMATION] [RESET]

---

- ABOUT THIS SITE
- HOW TO USE THIS SITE
- NEW CREATION
- DESIGN SELECTION
- ITEM SELECTION
- ITEM CONTENT SETTING
- QUOTATION
- ARTICLES
- TEMPORARY ORDER

[TOP]
[UPLOAD MATERIAL]

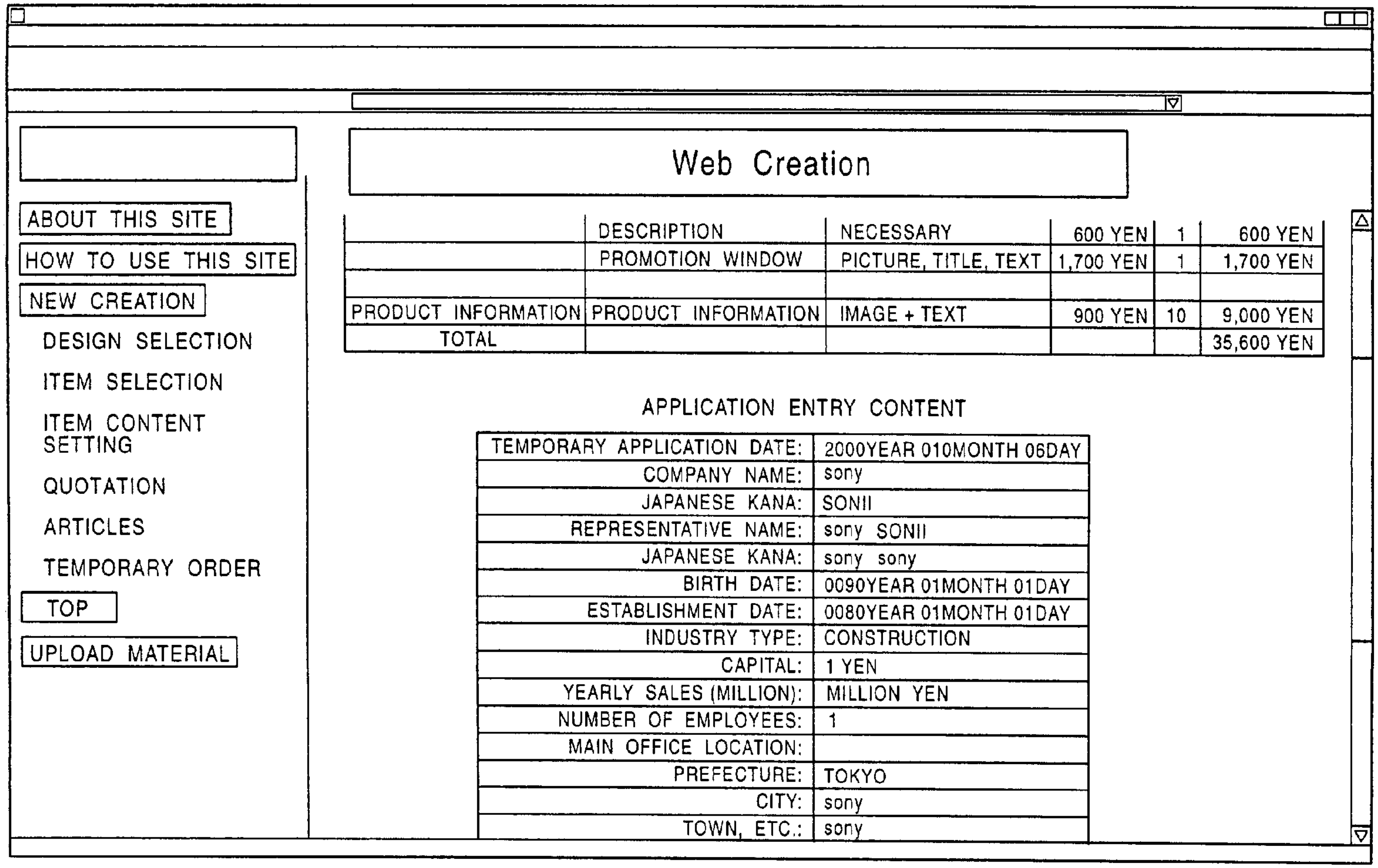

FIG. 64

Web Creation

| DESCRIPTION | NECESSARY | | | |
|---|---|---|---|---|
| PROMOTION WINDOW | PICTURE, TITLE, TEXT | 600 YEN | 1 | 600 YEN |
| PRODUCT INFORMATION | PRODUCT INFORMATION | IMAGE + TEXT | 1,700 YEN | 1 | 1,700 YEN |
| | | 900 YEN | 10 | 9,000 YEN |
| TOTAL | | | | 35,600 YEN |

APPLICATION ENTRY CONTENT

| TEMPORARY APPLICATION DATE: | 2000YEAR 010MONTH 06DAY |
|---|---|
| COMPANY NAME: | sony |
| JAPANESE KANA: | SONII |
| REPRESENTATIVE NAME: | sony SONII |
| JAPANESE KANA: | sony sony |
| BIRTH DATE: | 0090YEAR 01MONTH 01DAY |
| ESTABLISHMENT DATE: | 0080YEAR 01MONTH 01DAY |
| INDUSTRY TYPE: | CONSTRUCTION |
| CAPITAL: | 1 YEN |
| YEARLY SALES (MILLION): | MILLION YEN |
| NUMBER OF EMPLOYEES: | 1 |
| MAIN OFFICE LOCATION: | |
| PREFECTURE: | TOKYO |
| CITY: | sony |
| TOWN, ETC.: | sony |

Sidebar menu:
- ABOUT THIS SITE
- HOW TO USE THIS SITE
- NEW CREATION
- DESIGN SELECTION
- ITEM SELECTION
- ITEM CONTENT SETTING
- QUOTATION
- ARTICLES
- TEMPORARY ORDER
- TOP
- UPLOAD MATERIAL

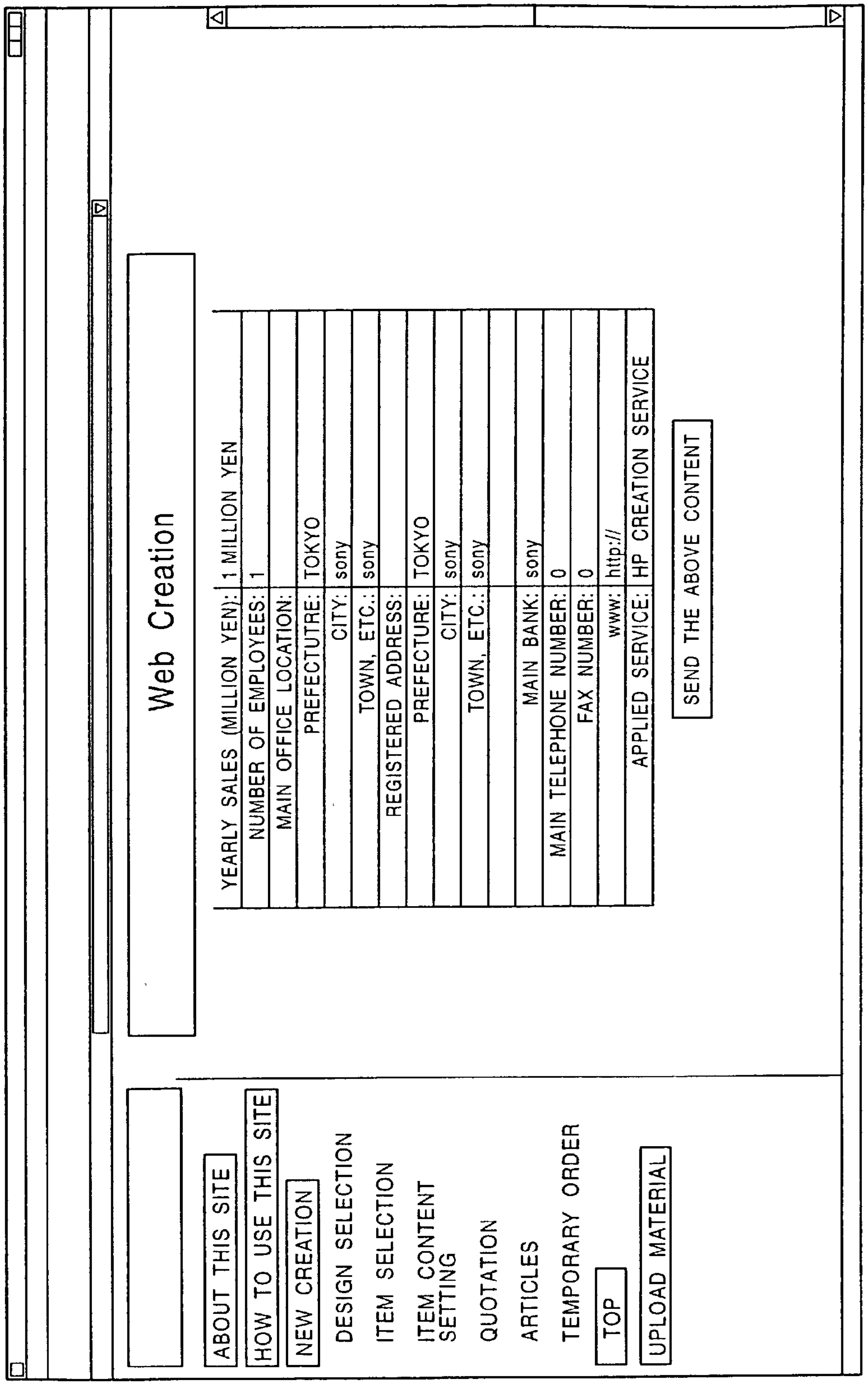

FIG. 65

Web Creation

YEARLY SALES (MILLION YEN): 1 MILLION YEN
NUMBER OF EMPLOYEES: 1
MAIN OFFICE LOCATION:
PREFECTUTRE: TOKYO
CITY: sony
TOWN, ETC.: sony
REGISTERED ADDRESS:
PREFECTURE: TOKYO
CITY: sony
TOWN, ETC.: sony
MAIN BANK: sony
MAIN TELEPHONE NUMBER: 0
FAX NUMBER: 0
www: http://
APPLIED SERVICE: HP CREATION SERVICE

SEND THE ABOVE CONTENT

ABOUT THIS SITE
HOW TO USE THIS SITE
NEW CREATION
DESIGN SELECTION
ITEM SELECTION
ITEM CONTENT SETTING
QUOTATION
ARTICLES
TEMPORARY ORDER
TOP
UPLOAD MATERIAL

FIG. 67

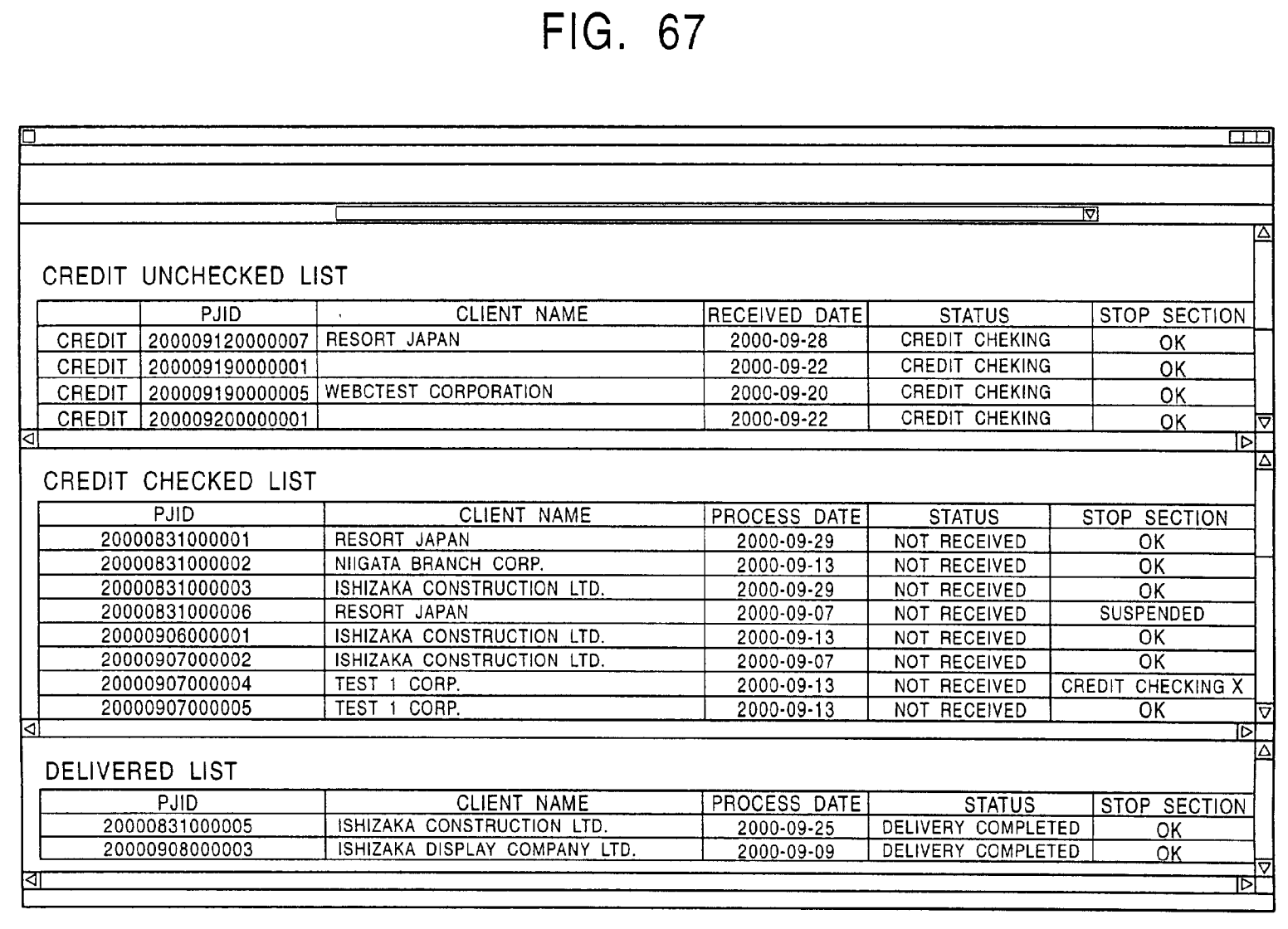

CREDIT UNCHECKED LIST

| | PJID | CLIENT NAME | RECEIVED DATE | STATUS | STOP SECTION |
|---|---|---|---|---|---|
| CREDIT | 200009120000007 | RESORT JAPAN | 2000-09-28 | CREDIT CHEKING | OK |
| CREDIT | 200009190000001 | | 2000-09-22 | CREDIT CHEKING | OK |
| CREDIT | 200009190000005 | WEBCTEST CORPORATION | 2000-09-20 | CREDIT CHEKING | OK |
| CREDIT | 200009200000001 | | 2000-09-22 | CREDIT CHEKING | OK |

CREDIT CHECKED LIST

| PJID | CLIENT NAME | PROCESS DATE | STATUS | STOP SECTION |
|---|---|---|---|---|
| 20000831000001 | RESORT JAPAN | 2000-09-29 | NOT RECEIVED | OK |
| 20000831000002 | NIIGATA BRANCH CORP. | 2000-09-13 | NOT RECEIVED | OK |
| 20000831000003 | ISHIZAKA CONSTRUCTION LTD. | 2000-09-29 | NOT RECEIVED | OK |
| 20000831000006 | RESORT JAPAN | 2000-09-07 | NOT RECEIVED | SUSPENDED |
| 20000906000001 | ISHIZAKA CONSTRUCTION LTD. | 2000-09-13 | NOT RECEIVED | OK |
| 20000907000002 | ISHIZAKA CONSTRUCTION LTD. | 2000-09-07 | NOT RECEIVED | OK |
| 20000907000004 | TEST 1 CORP. | 2000-09-13 | NOT RECEIVED | CREDIT CHECKING X |
| 20000907000005 | TEST 1 CORP. | 2000-09-13 | NOT RECEIVED | OK |

DELIVERED LIST

| PJID | CLIENT NAME | PROCESS DATE | STATUS | STOP SECTION |
|---|---|---|---|---|
| 20000831000005 | ISHIZAKA CONSTRUCTION LTD. | 2000-09-25 | DELIVERY COMPLETED | OK |
| 20000908000003 | ISHIZAKA DISPLAY COMPANY LTD. | 2000-09-09 | DELIVERY COMPLETED | OK |

FIG. 68

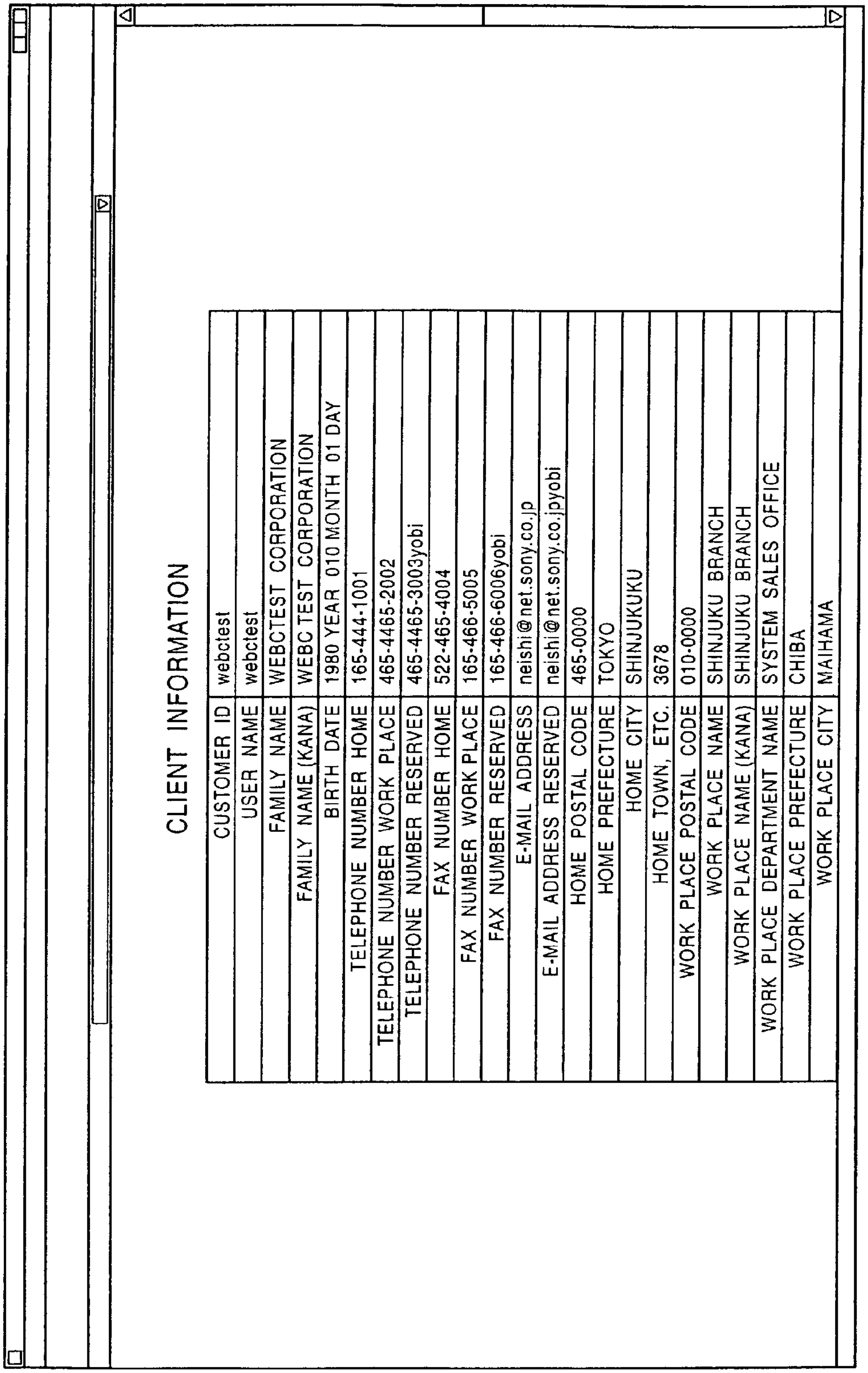

CLIENT INFORMATION

| | |
|---|---|
| CUSTOMER ID | webctest |
| USER NAME | webctest |
| FAMILY NAME | WEBCTEST CORPORATION |
| FAMILY NAME (KANA) | WEBC TEST CORPORATION |
| BIRTH DATE | 1980 YEAR 010 MONTH 01 DAY |
| TELEPHONE NUMBER HOME | 165-444-1001 |
| TELEPHONE NUMBER WORK PLACE | 465-4465-2002 |
| TELEPHONE NUMBER RESERVED | 465-4465-3003yobi |
| FAX NUMBER HOME | 522-465-4004 |
| FAX NUMBER WORK PLACE | 165-466-5005 |
| FAX NUMBER RESERVED | 165-466-6006yobi |
| E-MAIL ADDRESS | neishi@net.sony.co.jp |
| E-MAIL ADDRESS RESERVED | neishi@net.sony.co.jpyobi |
| HOME POSTAL CODE | 465-0000 |
| HOME PREFECTURE | TOKYO |
| HOME CITY | SHINJUKUKU |
| HOME TOWN, ETC. | 3678 |
| WORK PLACE POSTAL CODE | 010-0000 |
| WORK PLACE NAME | SHINJUKU BRANCH |
| WORK PLACE NAME (KANA) | SHINJUKU BRANCH |
| WORK PLACE DEPARTMENT NAME | SYSTEM SALES OFFICE |
| WORK PLACE PREFECTURE | CHIBA |
| WORK PLACE CITY | MAIHAMA |

FIG. 69

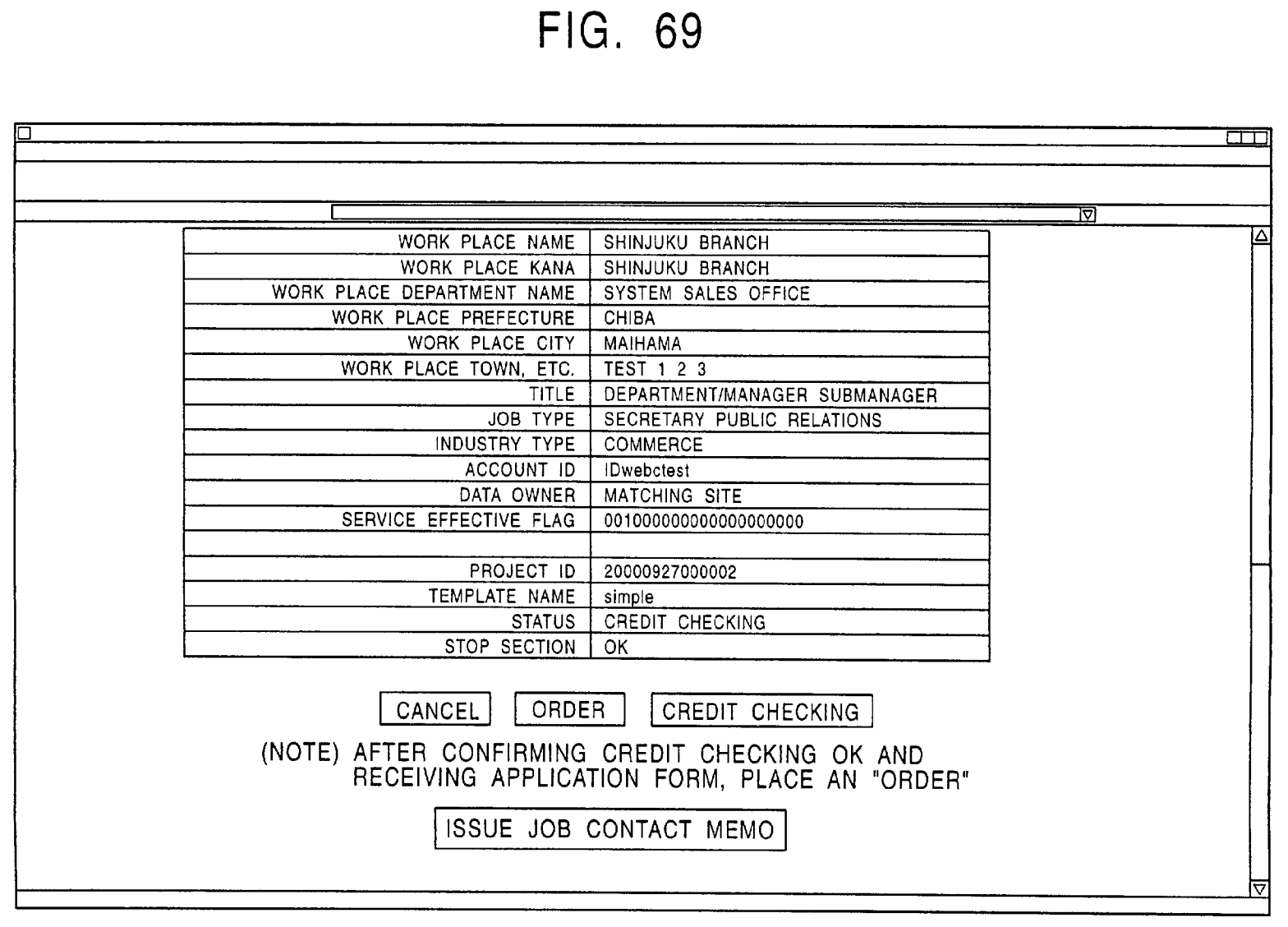

| WORK PLACE NAME | SHINJUKU BRANCH |
|---|---|
| WORK PLACE KANA | SHINJUKU BRANCH |
| WORK PLACE DEPARTMENT NAME | SYSTEM SALES OFFICE |
| WORK PLACE PREFECTURE | CHIBA |
| WORK PLACE CITY | MAIHAMA |
| WORK PLACE TOWN, ETC. | TEST 1 2 3 |
| TITLE | DEPARTMENT/MANAGER SUBMANAGER |
| JOB TYPE | SECRETARY PUBLIC RELATIONS |
| INDUSTRY TYPE | COMMERCE |
| ACCOUNT ID | IDwebctest |
| DATA OWNER | MATCHING SITE |
| SERVICE EFFECTIVE FLAG | 001000000000000000000 |
| PROJECT ID | 20000927000002 |
| TEMPLATE NAME | simple |
| STATUS | CREDIT CHECKING |
| STOP SECTION | OK |

[CANCEL]  [ORDER]  [CREDIT CHECKING]

(NOTE) AFTER CONFIRMING CREDIT CHECKING OK AND RECEIVING APPLICATION FORM, PLACE AN "ORDER"

[ISSUE JOB CONTACT MEMO]

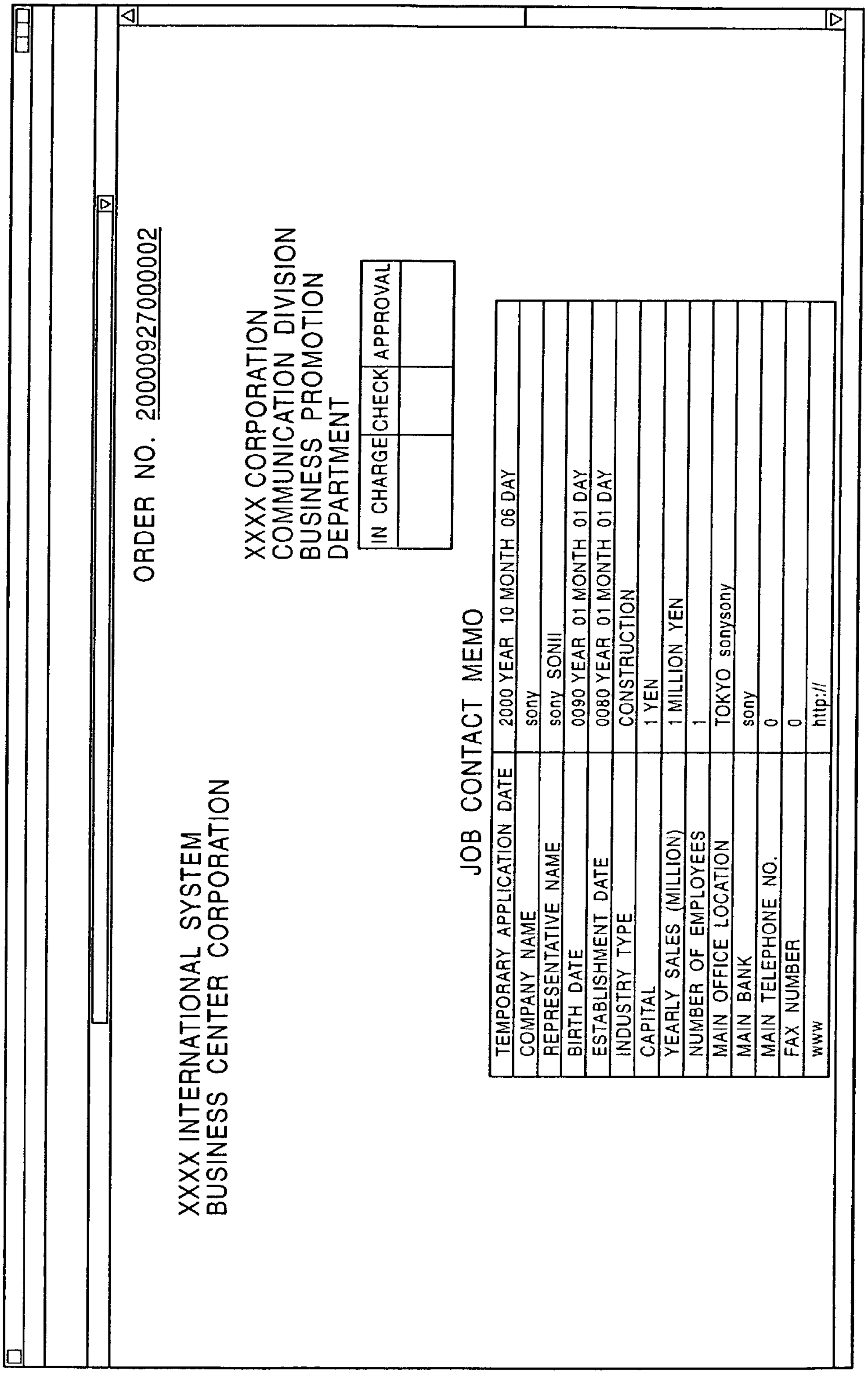

FIG. 70

XXXX INTERNATIONAL SYSTEM
BUSINESS CENTER CORPORATION

ORDER NO. 2000927000002

XXXX CORPORATION
COMMUNICATION DIVISION
BUSINESS PROMOTION
DEPARTMENT

| IN CHARGE | CHECK | APPROVAL |
|---|---|---|
|  |  |  |

JOB CONTACT MEMO

| TEMPORARY APPLICATION DATE | 2000 YEAR 10 MONTH 06 DAY |
|---|---|
| COMPANY NAME | sony |
| REPRESENTATIVE NAME | sony SONII |
| BIRTH DATE | 0090 YEAR 01 MONTH 01 DAY |
| ESTABLISHMENT DATE | 0080 YEAR 01 MONTH 01 DAY |
| INDUSTRY TYPE | CONSTRUCTION |
| CAPITAL | 1 YEN |
| YEARLY SALES (MILLION) | 1 MILLION YEN |
| NUMBER OF EMPLOYEES | 1 |
| MAIN OFFICE LOCATION | TOKYO sonysony |
| MAIN BANK | sony |
| MAIN TELEPHONE NO. | 0 |
| FAX NUMBER | 0 |
| www | http:// |

| INDUSTRY TYPE | CONSTRUCTION |
|---|---|
| CAPITAL | 1 YEN |
| YEARLY SALES (MILLION) | 1 MILLION YEN |
| NUMBER OF EMPLOYEES | 1 |
| MAIN OFFICE LOCATION | TOKYOsonysony |
| MAIN BANK | sony |
| MAIN TELEPHONE NO. | 0 |
| FAX NUMBER | 0 |
| WWW | http:// |

| APPLIED SERVICE | ■ HP CREATION SERVICE   □ HP CREATION + UPDATE SERVICE |
|---|---|
| TOTAL AMOUNT | 55,600 YEN |

SALES COMMENT

AUDIT COMMENT

OK   NG   NEED CONSULTATION

| IN CHARGE | CHECK | APPROVAL |
|---|---|---|
|  |  |  |

UPLOAD MATERIAL

PLEASE ENTER USER ID/PASSWORD/PROJECT ID

ID:
PASSWORD:
PROJECT ID:

LOGIN

ABOUT THIS SITE
STAFF ENTRY
HOW TO USE THIS SITE
WEB PAGE CREATION
△ NEW CREATION
△ UPDATE
TOP

FIG. 74

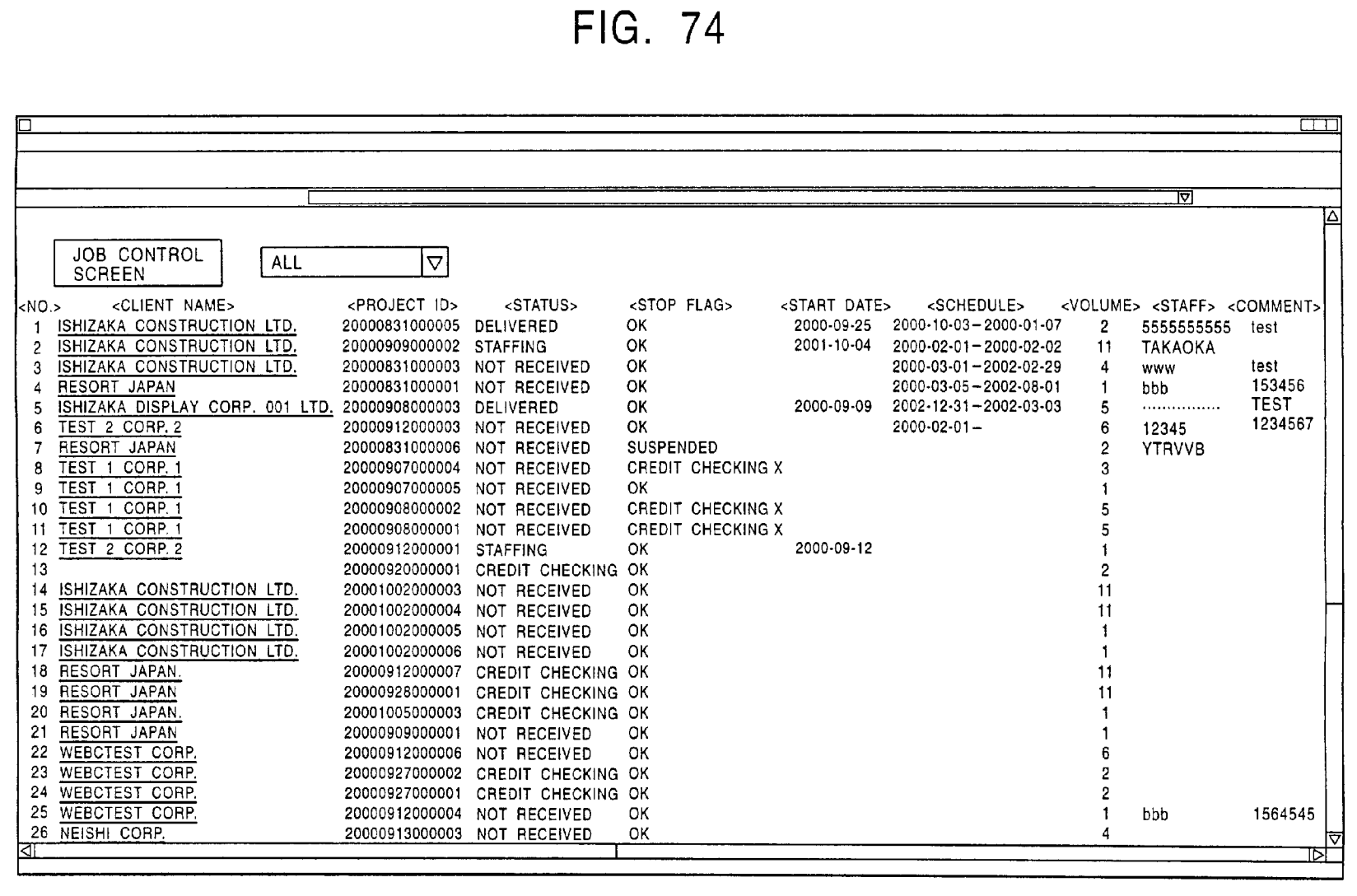

JOB CONTROL SCREEN

ALL

| <NO.> | <CLIENT NAME> | <PROJECT ID> | <STATUS> | <STOP FLAG> | <START DATE> | <SCHEDULE> | <VOLUME> | <STAFF> | <COMMENT> |
|---|---|---|---|---|---|---|---|---|---|
| 1 | ISHIZAKA CONSTRUCTION LTD. | 20000831000005 | DELIVERED | OK | 2000-09-25 | 2000-10-03 – 2000-01-07 | 2 | 5555555555 | test |
| 2 | ISHIZAKA CONSTRUCTION LTD. | 20000909000002 | STAFFING | OK | 2001-10-04 | 2000-02-01 – 2000-02-02 | 11 | TAKAOKA | |
| 3 | ISHIZAKA CONSTRUCTION LTD. | 20000831000003 | NOT RECEIVED | OK | | 2000-03-01 – 2002-02-29 | 4 | www | test |
| 4 | RESORT JAPAN | 20000831000001 | NOT RECEIVED | OK | | 2000-03-05 – 2002-08-01 | 1 | bbb | 153456 |
| 5 | ISHIZAKA DISPLAY CORP. 001 LTD. | 20000908000003 | DELIVERED | OK | 2000-09-09 | 2002-12-31 – 2002-03-03 | 5 | ............... | TEST |
| 6 | TEST 2 CORP. 2 | 20000912000003 | NOT RECEIVED | OK | | 2000-02-01 – | 6 | 12345 | 1234567 |
| 7 | RESORT JAPAN | 20000831000006 | NOT RECEIVED | SUSPENDED | | | 2 | YTRVVB | |
| 8 | TEST 1 CORP. 1 | 20000907000004 | NOT RECEIVED | CREDIT CHECKING X | | | 3 | | |
| 9 | TEST 1 CORP. 1 | 20000907000005 | NOT RECEIVED | OK | | | 1 | | |
| 10 | TEST 1 CORP. 1 | 20000908000002 | NOT RECEIVED | CREDIT CHECKING X | | | 5 | | |
| 11 | TEST 1 CORP. 1 | 20000908000001 | NOT RECEIVED | CREDIT CHECKING X | | | 5 | | |
| 12 | TEST 2 CORP. 2 | 20000912000001 | STAFFING | OK | 2000-09-12 | | 1 | | |
| 13 | | 20000920000001 | CREDIT CHECKING | OK | | | 2 | | |
| 14 | ISHIZAKA CONSTRUCTION LTD. | 20001002000003 | NOT RECEIVED | OK | | | 11 | | |
| 15 | ISHIZAKA CONSTRUCTION LTD. | 20001002000004 | NOT RECEIVED | OK | | | 11 | | |
| 16 | ISHIZAKA CONSTRUCTION LTD. | 20001002000005 | NOT RECEIVED | OK | | | 1 | | |
| 17 | ISHIZAKA CONSTRUCTION LTD. | 20001002000006 | NOT RECEIVED | OK | | | 1 | | |
| 18 | RESORT JAPAN. | 20000912000007 | CREDIT CHECKING | OK | | | 11 | | |
| 19 | RESORT JAPAN | 20000928000001 | CREDIT CHECKING | OK | | | 11 | | |
| 20 | RESORT JAPAN. | 20001005000003 | CREDIT CHECKING | OK | | | 1 | | |
| 21 | RESORT JAPAN | 20000909000001 | NOT RECEIVED | OK | | | 1 | | |
| 22 | WEBCTEST CORP. | 20000912000006 | NOT RECEIVED | OK | | | 6 | | |
| 23 | WEBCTEST CORP. | 20000927000002 | CREDIT CHECKING | OK | | | 2 | | |
| 24 | WEBCTEST CORP. | 20000927000001 | CREDIT CHECKING | OK | | | 2 | | |
| 25 | WEBCTEST CORP. | 20000912000004 | NOT RECEIVED | OK | | | 1 | bbb | 1564545 |
| 26 | NEISHI CORP. | 20000913000003 | NOT RECEIVED | OK | | | 4 | | |

FIG. 75

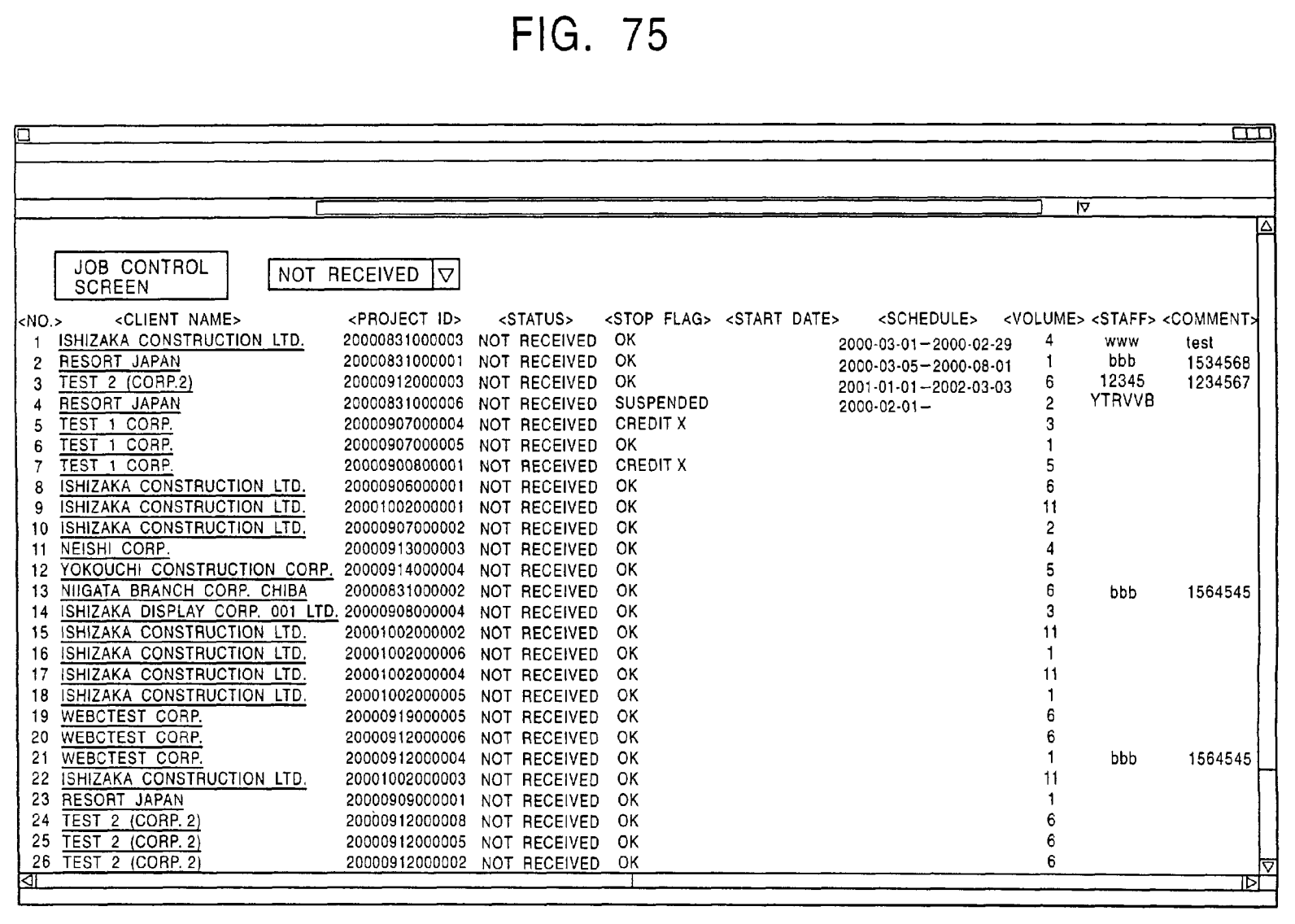

JOB CONTROL SCREEN

NOT RECEIVED ▽

| <NO.> | <CLIENT NAME> | <PROJECT ID> | <STATUS> | <STOP FLAG> | <START DATE> | <SCHEDULE> | <VOLUME> | <STAFF> | <COMMENT> |
|---|---|---|---|---|---|---|---|---|---|
| 1 | ISHIZAKA CONSTRUCTION LTD. | 20000831000003 | NOT RECEIVED | OK | | 2000-03-01−2000-02-29 | 4 | www | test |
| 2 | RESORT JAPAN | 20000831000001 | NOT RECEIVED | OK | | 2000-03-05−2000-08-01 | 1 | bbb | 1534568 |
| 3 | TEST 2 (CORP.2) | 20000912000003 | NOT RECEIVED | OK | | 2001-01-01−2002-03-03 | 6 | 12345 | 1234567 |
| 4 | RESORT JAPAN | 20000831000006 | NOT RECEIVED | SUSPENDED | | 2000-02-01− | 2 | YTRVVB | |
| 5 | TEST 1 CORP. | 20000907000004 | NOT RECEIVED | CREDIT X | | | 3 | | |
| 6 | TEST 1 CORP. | 20000907000005 | NOT RECEIVED | OK | | | 1 | | |
| 7 | TEST 1 CORP. | 20000900800001 | NOT RECEIVED | CREDIT X | | | 5 | | |
| 8 | ISHIZAKA CONSTRUCTION LTD. | 20000906000001 | NOT RECEIVED | OK | | | 6 | | |
| 9 | ISHIZAKA CONSTRUCTION LTD. | 20001002000001 | NOT RECEIVED | OK | | | 11 | | |
| 10 | ISHIZAKA CONSTRUCTION LTD. | 20000907000002 | NOT RECEIVED | OK | | | 2 | | |
| 11 | NEISHI CORP. | 20000913000003 | NOT RECEIVED | OK | | | 4 | | |
| 12 | YOKOUCHI CONSTRUCTION CORP. | 20000914000004 | NOT RECEIVED | OK | | | 5 | | |
| 13 | NIIGATA BRANCH CORP. CHIBA | 20000831000002 | NOT RECEIVED | OK | | | 6 | bbb | 1564545 |
| 14 | ISHIZAKA DISPLAY CORP. 001 LTD. | 20000908000004 | NOT RECEIVED | OK | | | 3 | | |
| 15 | ISHIZAKA CONSTRUCTION LTD. | 20001002000002 | NOT RECEIVED | OK | | | 11 | | |
| 16 | ISHIZAKA CONSTRUCTION LTD. | 20001002000006 | NOT RECEIVED | OK | | | 1 | | |
| 17 | ISHIZAKA CONSTRUCTION LTD. | 20001002000004 | NOT RECEIVED | OK | | | 11 | | |
| 18 | ISHIZAKA CONSTRUCTION LTD. | 20001002000005 | NOT RECEIVED | OK | | | 1 | | |
| 19 | WEBCTEST CORP. | 20000919000005 | NOT RECEIVED | OK | | | 6 | | |
| 20 | WEBCTEST CORP. | 20000912000006 | NOT RECEIVED | OK | | | 6 | | |
| 21 | WEBCTEST CORP. | 20000912000004 | NOT RECEIVED | OK | | | 1 | bbb | 1564545 |
| 22 | ISHIZAKA CONSTRUCTION LTD. | 20001002000003 | NOT RECEIVED | OK | | | 11 | | |
| 23 | RESORT JAPAN | 20000909000001 | NOT RECEIVED | OK | | | 1 | | |
| 24 | TEST 2 (CORP. 2) | 20000912000008 | NOT RECEIVED | OK | | | 6 | | |
| 25 | TEST 2 (CORP. 2) | 20000912000005 | NOT RECEIVED | OK | | | 6 | | |
| 26 | TEST 2 (CORP. 2) | 20000912000002 | NOT RECEIVED | OK | | | 6 | | |

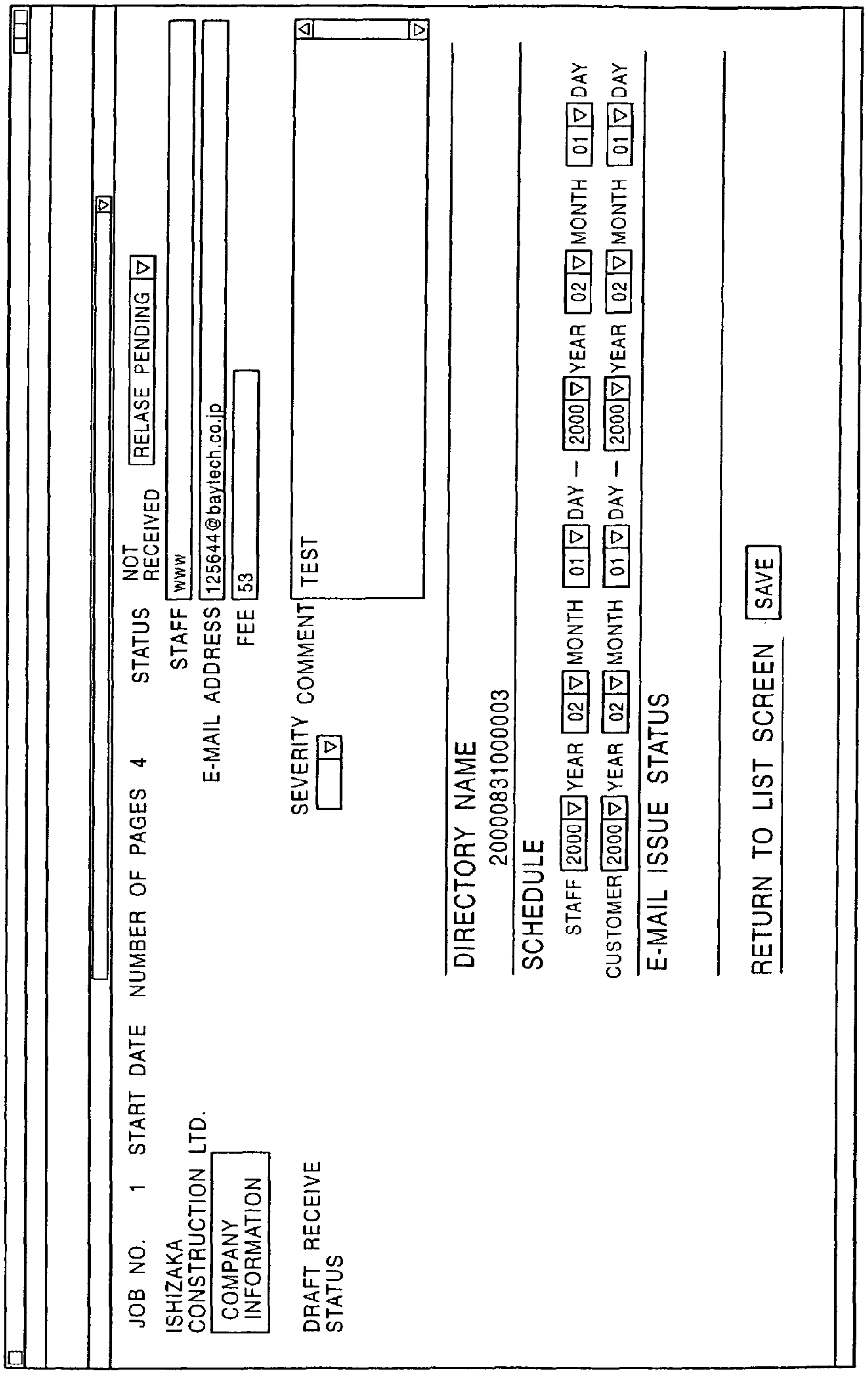

FIG. 76

| JOB NO. 1 START DATE NUMBER OF PAGES 4 STATUS NOT RECEIVED [RELASE PENDING ▷] |

ISHIZAKA CONSTRUCTION LTD.
[COMPANY INFORMATION]
STAFF [www]
E-MAIL ADDRESS [125644@baytech.co.jp]
FEE [53]

DRAFT RECEIVE STATUS
SEVERITY COMMENT [TEST]
[▷]

DIRECTORY NAME
20000831000003

SCHEDULE
STAFF [2000 ▷] YEAR [02 ▷] MONTH [01 ▷] DAY – [2000 ▷] YEAR [02 ▷] MONTH [01 ▷] DAY
CUSTOMER [2000 ▷] YEAR [02 ▷] MONTH [01 ▷] DAY – [2000 ▷] YEAR [02 ▷] MONTH [01 ▷] DAY

E-MAIL ISSUE STATUS

RETURN TO LIST SCREEN [SAVE]

FIG. 80

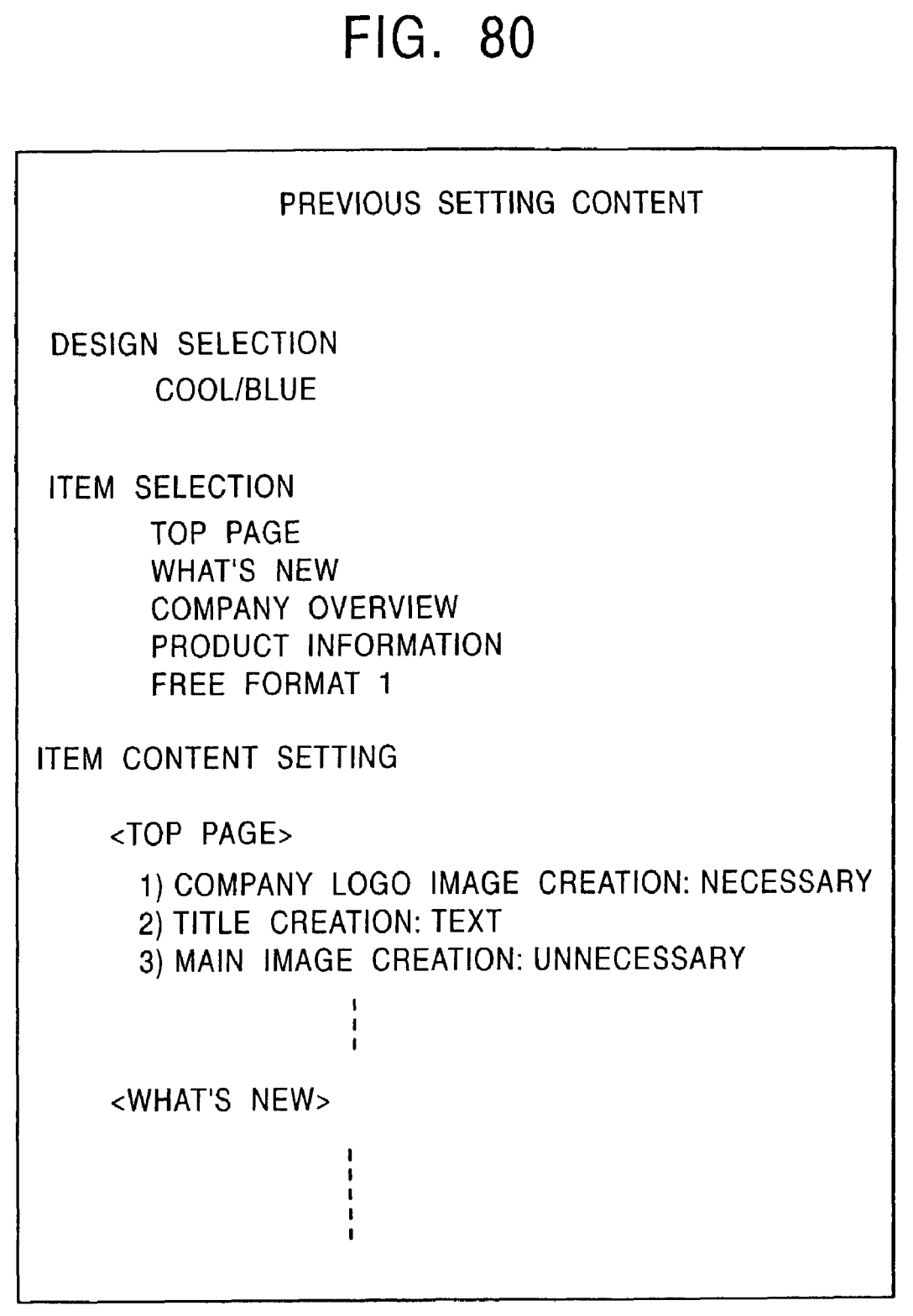

PREVIOUS SETTING CONTENT

DESIGN SELECTION

COOL/BLUE

ITEM SELECTION

TOP PAGE
WHAT'S NEW
COMPANY OVERVIEW
PRODUCT INFORMATION
FREE FORMAT 1

ITEM CONTENT SETTING

<TOP PAGE>

1) COMPANY LOGO IMAGE CREATION: NECESSARY
2) TITLE CREATION: TEXT
3) MAIN IMAGE CREATION: UNNECESSARY

⋮

<WHAT'S NEW>

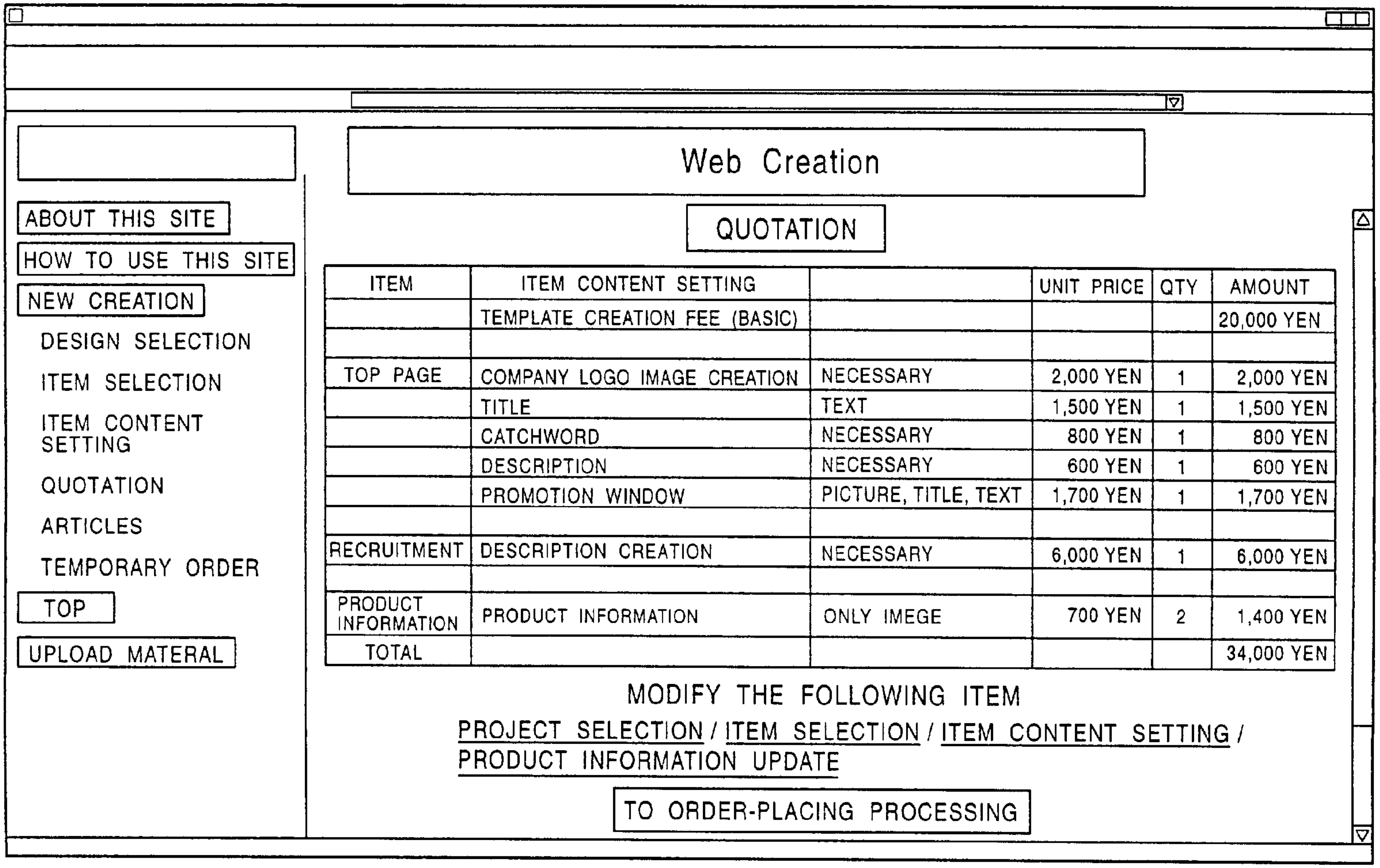

| ITEM | ITEM CONTENT SETTING | | UNIT PRICE | QTY | AMOUNT |
|---|---|---|---|---|---|
| | TEMPLATE CREATION FEE (BASIC) | | | | 20,000 YEN |
| | | | | | |
| TOP PAGE | COMPANY LOGO IMAGE CREATION | NECESSARY | 2,000 YEN | 1 | 2,000 YEN |
| | TITLE | TEXT | 1,500 YEN | 1 | 1,500 YEN |
| | CATCHWORD | NECESSARY | 800 YEN | 1 | 800 YEN |
| | DESCRIPTION | NECESSARY | 600 YEN | 1 | 600 YEN |
| | PROMOTION WINDOW | PICTURE, TITLE, TEXT | 1,700 YEN | 1 | 1,700 YEN |
| | | | | | |
| RECRUITMENT | DESCRIPTION CREATION | NECESSARY | 6,000 YEN | 1 | 6,000 YEN |
| | | | | | |
| PRODUCT INFORMATION | PRODUCT INFORMATION | ONLY IMEGE | 700 YEN | 2 | 1,400 YEN |
| TOTAL | | | | | 34,000 YEN |

WEB PAGE CREATION SUPPORTING SYSTEM, WEB PAGE CREATION SUPPORTING APPARATUS, WEB PAGE CREATION SUPPORTING METHOD, COMPUTER PROGRAM, AND RECORD MEDIUM

TECHNICAL FIELD

The present invention relates to a Web page creation support system and so forth that can support the work of an individual or business enterprise on a network such as the Internet to set up a Web page and to update the content of the page.

BACKGROUND ART

In recent years, with the explosive increase in the number of people using the Internet, demands originating from business enterprises or individuals are increasing rapidly for setting up Web pages, and linking them to the WWW (World Wide Web) to disseminate and collect various information.

However, in order to set up Web pages, in addition to having specialized knowledge of Internet-related technology such as hypertext, it is necessary to create Web page content, that is, the information included on a Web page, and perform various additional operations such as designing Web pages, and as a result, every user accessible to the Internet cannot always set up Web pages as desired.

Also, various kinds of Web page creation support software for creating Web pages visually without the need to be aware of the technical aspects such as a structure of hypertext are widely used. However, in order to use Web page creation support software, some knowledge of computers and the Internet, etc. is required, thus every Internet user cannot yet freely use Web page creation support software.

Furthermore, even for an individual who knows how to create Web pages, or a business enterprise employing such a person, it is often difficult to assign the personnel exclusively to creating Web pages, which is not the aim of enterprise activity from the point of human cost vs. its effect.

Under these situations, in recent years, so-called Web page creation contract business which creates Web pages on behalf of individuals or business enterprises that want to set up Web pages in accordance with their taste and requests have been in the limelight.

However, Web page creation is complicated even in the case of using a Web page creation contractor as described above. This means that the Web page creation requester (hereinafter, referred to as a customer) and a Web page creator (hereinafter, referred to as a creator) communicate directly or indirectly via telephone or e-mail, and the work proceeds such that the creator creates Web pages stepwise in accordance with the customer's demands.

In doing so, in order to create high-quality Web pages, it is necessary to carry out a process in which a customer and creator talk each other, and the creator creates Web pages, and then the customer gives back the feedback. Besides, this process needs to be repeated for several times until the both sides are content. Consequently, it takes a lot of time for the Web pages to be completed, thus the creation administrative cost is added to the creation cost, which is the minimum cost needed for creating Web pages. This becomes the factor boosting up the final cost for creating Web pages.

Also, sales activities are indispensable if a Web page creation contractor is to carry on business continuously, but the sales depend on human power. Specifically, a sales personnel (often in charge of a creator as well) needs to communicate customers directly or indirectly, and to receive Web page creation orders from customers continuously, thus the cost required for these sales activities is added as sales cost to the creation cost of Web pages, and thus becomes the factor boosting up the final cost additionally for creating Web pages.

The present invention is made in order to overcome the above-described and other problems of the conventional technology.

In this regard, in this specification, a "customer" merely represents an individual person or business enterprise representing a requester of Web page creation. Similarly, in this specification, a "creator" merely represents an individual person or business enterprise representing a creator of Web pages. Particularly, in this specification, when using a term "customer terminal unit" or "creator terminal unit", in conjunction with the elements constituting the present invention, the term represents a terminal unit such as a computer capable of network connection and having functions as a client of the Web page creation support unit which is used by a "customer" or "creator".

DISCLOSURE OF INVENTION

According to a first aspect of the present invention, there is provided a Web page creation support system including: a customer terminal unit; a Web page creation support unit which is accessible from the customer terminal unit via a network; and a creator terminal unit which performs a Web page creation job, wherein the Web page creation support unit controls Web page information of the customer terminal unit in connection with template information, and causes the creator terminal unit to perform creation of the Web page information in response to the request from the customer terminal unit.

In this manner, according to the present invention, Web page information is controlled in connection with template information, thus creation of Web page information can be easily performed on the network in accordance with the template information.

Here, "customer terminal unit" is defined as a client having authenticated qualifications to use a Web page creation support service among the clients accessing the Web page creation support unit via a network. Therefore, in general, it is a computer having the functions as a client, namely, communications function and browsing function. However, it also includes household electric appliances and mobile terminal devices.

A "network" is the communications network capable of bilateral communications of information such as the Internet being connected via public line network and the like, or intranet being connected via LAN and the like, and it does not matter whether the network is wired or wireless.

A "Web page creation support unit" is a computer system constituting a WWW server providing a customer terminal unit and other clients with Web page creation support services.

A "Web page information" is information (contents) such as text, image, voice, video that is defined by HTML (Hypertext Markup Language) and other languages available on the Web, and stored on the Web server so as to be accessible by a client via a network using browsing software such as a browser.

A "creator terminal unit" is connected to the Web page creation support unit via a network, and is provided as a sub-server providing a service which actually creates the Web page requested from the customer terminal unit and delivers the Web page to the customer terminal unit via the Web page creation support unit. Therefore, in general, it is a computer having functions as a communication function, an HTML editing function for creating a Web page, a creating and editing function of various kinds of image files and so on.

"Web page information update" means a change, an addition or a deletion of the entire or a part of the Web page information which is controlled by the Web page creation support unit.

"Template information" is the information that determines the style of a Web page, and the template information includes, for example, design information to determine frame design of a Web page, item information about page items to display as Web pages, and item contents information that is specific contents to be displayed on each page item.

The Web page information is preferably controlled corresponding to a job number which is assigned to each previous creation job of the Web page information.

In this regard, a Web page can be created by embedding materials selected by the customer terminal unit directly into the template information, so that the system may be configured without the creator terminal unit.

The Web page creation support unit may be configured such that quotation information indicating a Web page creation cost is generated in accordance with the template information which is created by the customer terminal unit. With this arrangement, it is possible for the customer terminal unit to know the necessary cost of the Web page creation in advance, and to create the Web pages within the budget, thus a subsequent conflict in terms of budget can be prevented.

The Web page creation support unit may be formed such that a job control part which controls a series of job regarding the creation of the Web page information in response to the Web page information creation request from the customer terminal unit may be established for each order, and the progress status of each Web page creation job can be controlled via a job control part. With this arrangement, the Web page creation project is controlled via the job control part, which is a virtual control space, and the progress status of the creation job can be more precisely controlled.

Here, a "job" is a process regarding the Web page which is created by the creator terminal unit in receipt of the request from the client, and is controlled in the Web page creation support unit. The "job" is also called as a project in this specification.

The "job control part" is also called as a "job room" in this specification, and is a virtual control space built corresponding to each project in the Web page creation support unit.

The customer terminal unit is preferably configured to upload and/or download information regarding the Web page information creation via the job control part. Also, the creator terminal unit is preferably configured to upload and/or download information regarding the Web page information update via the job control part.

Further, the progress status of creation job is preferably configured to be reported to the customer terminal unit and/or the creator terminal unit by E-mail.

Also, according to another aspect of the present invention, the Web page creation support unit stores template information of a Web page and sample image information corresponding to the template information, and sends the template information and the sample image information, which is selected by the customer terminal unit, to the customer terminal unit. At the same time, the customer terminal unit selects a desired template information from the template information selection screen which prompts selection of the template information stored in the Web page creation support unit, and receives, from the Web page creation support unit, the sample image information corresponding to the selected desired template information, thus display of the preview screen can be possible based on the sample image information.

Here, the template information includes information which forms the preview screen to be displayed on the customer terminal unit using the sample image information corresponding to the template information.

Furthermore, according to another aspect of the present invention, the Web page creation support unit stores the template information of Web pages, performs quotation processing of a Web page creation cost based on the template information selected by the customer terminal unit, and sends the quotation information which is generated by the quotation processing. At the same time, the customer terminal unit selects a desired template information from the template information selection screen which prompts selection of the template information stored in the Web page creation support unit, and receives the quotation information from the Web page creation support unit, thus the received quotation information can be displayed.

Further, according to another aspect of the present invention, the Web page creation support unit registers the customer information sent from the customer terminal unit and at the same time controls the information. When temporarily order-receiving a Web page creation request from the customer terminal unit, the Web page creation support unit performs credit checking of the customer information on the credit unit, and actually receives the order of the Web page creation request in accordance with the credit checking result of the credit inquiry. At this time, when receiving a credit inquiry from the Web page creation support unit, the credit unit performs credit checking, and informs the Web page creation support unit of the credit checking result of the credit checking.

Furthermore, according to another aspect of the present invention, the Web page creation support unit stores information about creators, has a function to select the creator terminal unit suited to the order condition imposed from the customer terminal unit for the Web page creation, and can allow a different creator terminal unit to perform the Web page creation according to the order condition.

Further, according to another aspect of the present invention, when receiving the order of a Web page creation request from the customer terminal unit, the Web page creation support unit establishes a job control part which controls the progress status of each Web page creation job in the customer terminal unit, the creator terminal unit, and the Web page creation support unit. By this means, the customer terminal unit uploads and/or downloads the information regarding the Web page creation to/from the job control part, and the creator terminal unit uploads and/or downloads the information regarding the Web page creation to/from the job control part.

Furthermore, according to another aspect of the present invention, in the Web page creation support unit, by controlling the progress status of each Web page creation job in the customer terminal unit, the creator terminal unit and the Web page creation support unit, the message corresponding to the status change of the Web page creation job is informed to the customer terminal unit and/or the creator terminal unit.

Further, according to another aspect of the present invention, the Web page creation support unit stores the Web page information created by the order receiving from the customer terminal unit in connection with the template information, and controls the Web page update based on the updated template information by the update request from the customer terminal unit to the creator terminal unit.

Furthermore, according to another aspect of the present invention, the Web page creation support unit stores the Web page template information, and by controlling the Web page creation in accordance with the template information for the creator terminal unit on the basis of the order-receiving from the customer terminal unit, the Web page is guided to option providing unit regarding the Web page in response to the request of the customer terminal unit. By this means, the Web page creation support unit can provide option services regarding the Web page to the customer terminal unit.

In this regard, the function configuration of the component parts of the present invention defined here are applied to the component parts of another invention unless otherwise mentioned.

Further, according to another aspect of the present invention, there is provided a Web page creation support unit which controls Web page information of a customer terminal unit accessible via a network in connection with template information, and allows a creator terminal unit to perform a Web page creation job in accordance with the creation request from the customer terminal unit.

Furthermore, according to another aspect of the present invention, there is provided a computer program and a recording medium which stores the computer program in order to function a computer as the Web page creation support server described above.

Further, according to another aspect of the present invention, there is provided a Web page creation support method in which a Web page creation support unit stores Web page information of a customer terminal unit accessible via a network in connection with template information, and allows a creator terminal unit to perform a Web page creation job in accordance with a creation request from the customer terminal unit.

BRIEF DESCRIPTION OF THE DRAWINGS

FIG. 10 is a block diagram illustrating the configuration of the customer information database on the Web page creation support server in a Web page creation support system according to an embodiment of the present invention.

FIG. 12 is a block diagram illustrating the configuration of the creator information database on the Web page creation support server in a Web page creation support system according to an embodiment of the present invention.

FIG. 24 is an illustration showing the screen structure example of the option service selection in a Web page creation support system according to an embodiment of the present invention.

FIG. 25 is an illustration showing the screen structure example of the option service selection in a Web page creation support system according to an embodiment of the present invention.

FIG. 30 is an illustration showing a preview image by the preview screen processing in a Web page creation support system according to an embodiment of the present invention.

FIG. 40 is an illustration showing a browser display screen of the site providing a Web page creation support service according to an embodiment of the present invention.

FIG. 44 is an illustration showing a browser display screen of the site providing a Web page creation support service according to an embodiment of the present invention.

FIG. 45 is an illustration showing a browser display screen of the site providing a Web page creation support service according to an embodiment of the present invention.

FIG. 46 is an illustration showing a browser display screen of the site providing a Web page creation support service according to an embodiment of the present invention.

FIG. 47 is an illustration showing a browser display screen of the site providing a Web page creation support service according to an embodiment of the present invention.

FIG. 48 is an illustration showing a browser display screen of the site providing a Web page creation support service according to an embodiment of the present invention.

FIG. 59 is an illustration showing a browser display screen of the site providing a Web page creation support service according to an embodiment of the present invention.

FIG. 60 is an illustration showing a browser display screen of the site providing a Web page creation support service according to an embodiment of the present invention.

FIG. 61 is an illustration showing a browser display screen of the site providing a Web page creation support service according to an embodiment of the present invention.

FIG. 64 is an illustration showing a browser display screen of the site providing a Web page creation support service according to an embodiment of the present invention.

FIG. 65 is an illustration showing a browser display screen of the site providing a Web page creation support service according to an embodiment of the present invention.

FIG. 67 is an illustration showing a browser display screen of the site providing a Web page creation support service according to an embodiment of the present invention.

FIG. 68 is an illustration showing a browser display screen of the site providing a Web page creation support service according to an embodiment of the present invention.

FIG. 69 is an illustration showing a browser display screen of the site providing a Web page creation support service according to an embodiment of the present invention.

FIG. 70 is an illustration showing a browser display screen of the site providing a Web page creation support service according to an embodiment of the present invention.

FIG. 74 is an illustration showing a browser display screen of the site providing a Web page creation support service according to an embodiment of the present invention.

FIG. 75 is an illustration showing a browser display screen of the site providing a Web page creation support service according to an embodiment of the present invention.

FIG. 76 is an illustration showing a browser display screen of the site providing a Web page creation support service according to an embodiment of the present invention.

FIG. 80 is an illustration showing a browser display screen of the site providing a Web page creation support service according to an embodiment of the present invention.

FIG. 96 is an illustration showing a browser display screen of the site providing a Web page creation support service according to an embodiment of the present invention.

BEST MODE FOR CARRYING OUT THE INVENTION

Some preferred embodiments of a Web page creation system and so forth according to the present invention will be further illustrated below with reference to the accompanying drawings.

(1) Configuration of the Web Page Creation Support System

(1-1) Overall System Configuration

First, with reference to FIG. 1, the overall configuration of the Web page creation system according to an embodiment of the present invention will be described.

Figure 1:
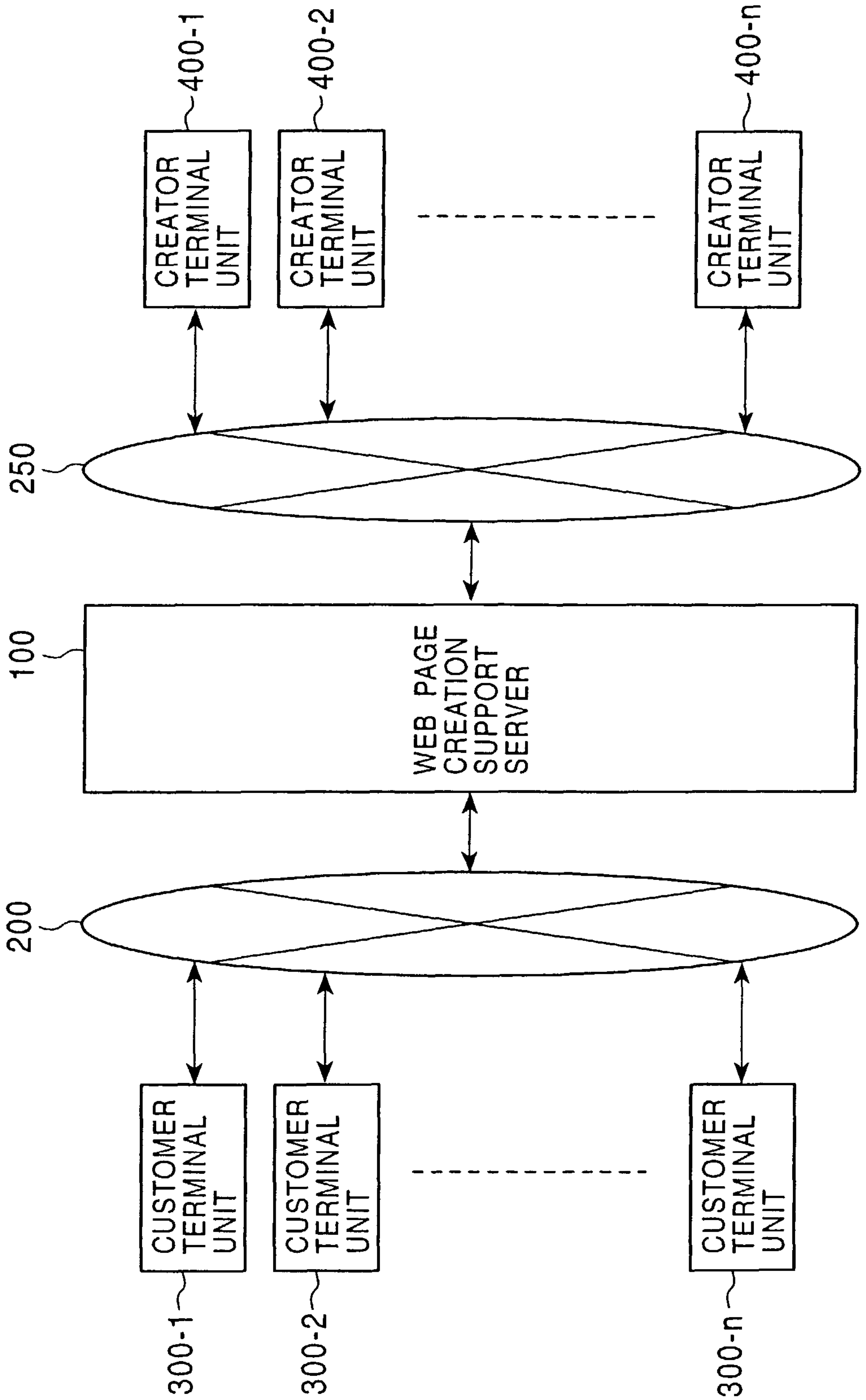
FIG. 1 is a block diagram illustrating the configuration of a Web page creation support system according to an embodiment of the present invention.

As shown in FIG. 1, the Web page creation support system mainly consists of the Web page creation support server 100, a plurality of customer terminal units 300 (300-1, 300-2, . . . , 300-*n*) connected to the Web page creation support server 100 via a network 200, and a plurality of creator terminal units 400 (400-1, 400-2, . . . , 400-*n*) connected to the Web page creation support server 100 via a network 250.

Here, a "Web page", which is the object of the service by the Web page creation support system according to an embodiment of the present invention, is information (contents) such as text, image, voice, video defined by HTML (Hypertext Markup Language) and other languages available on the Web, and stored on the Web server so as to be accessible by a client via a network using browsing software such as a browser.

The "Web page creation support server" 100 is a computer system constituting a WWW (World Wide Web) server (or referred to as Web server, HTTP (Hypertext Transfer Protocol) server and so on) which makes it possible for Web page creation support services via a network 200 to be provided to the customer terminal unit 300 and other clients.

A "Web page creation support service" provided by the "Web page creation support server" 100 is a service to create Web pages in accordance with the tastes and budget of the customer terminal units 300 or update previously created Web pages, and deliver in response to the request from the clients specialized as customer terminal units 300 through the site operated on the Web page creation support server on the Web.

Here, a "Web page" is called as a WWW page or a home page, and is the information (Web contents) stored on a Web server and can be browsed using Web page browsing software such as a browser from a client accessing via Web. Updating a Web page means an addition, a change or a deletion of the entire or a part of a Web page which has been previously created.

"Network" 200 and 250 are communications networks capable of bilateral communication of information, such as the Internet connected via public line network and the like, or intranet connected via LAN and the like, and the connection being either wired or wireless.

A "customer terminal unit" 300 is a special concept in this specification. The customer terminal unit 300 is defined as a client among the clients accessing the Web page creation support server 100 via a network 200 having authorization to use the Web page creation support service. Therefore, in general, it is a computer having the functions of a client, namely, a communication function and a browsing function. However, it is needless to say that the customer terminal unit of course includes household electric appliances and mobile terminal devices and further mobile telephone terminals so on.

A "creator terminal unit" 400 is also a special concept in this specification. A creator terminal unit 400 is defined as a sub-server connected to a Web page creation support server 100 via a network 250, which actually creates the Web pages requested by the customer terminal unit 300, and provides services to deliver them to the customer terminal unit 300 via the Web page creation support server 100. Therefore, in general, it is a computer system having the functions such as a communication function, and an HTML editing function to create Web pages, and creating and editing function of various kinds of image files.

(1-2) Web Page Creation Support Server 100

Figure 2:
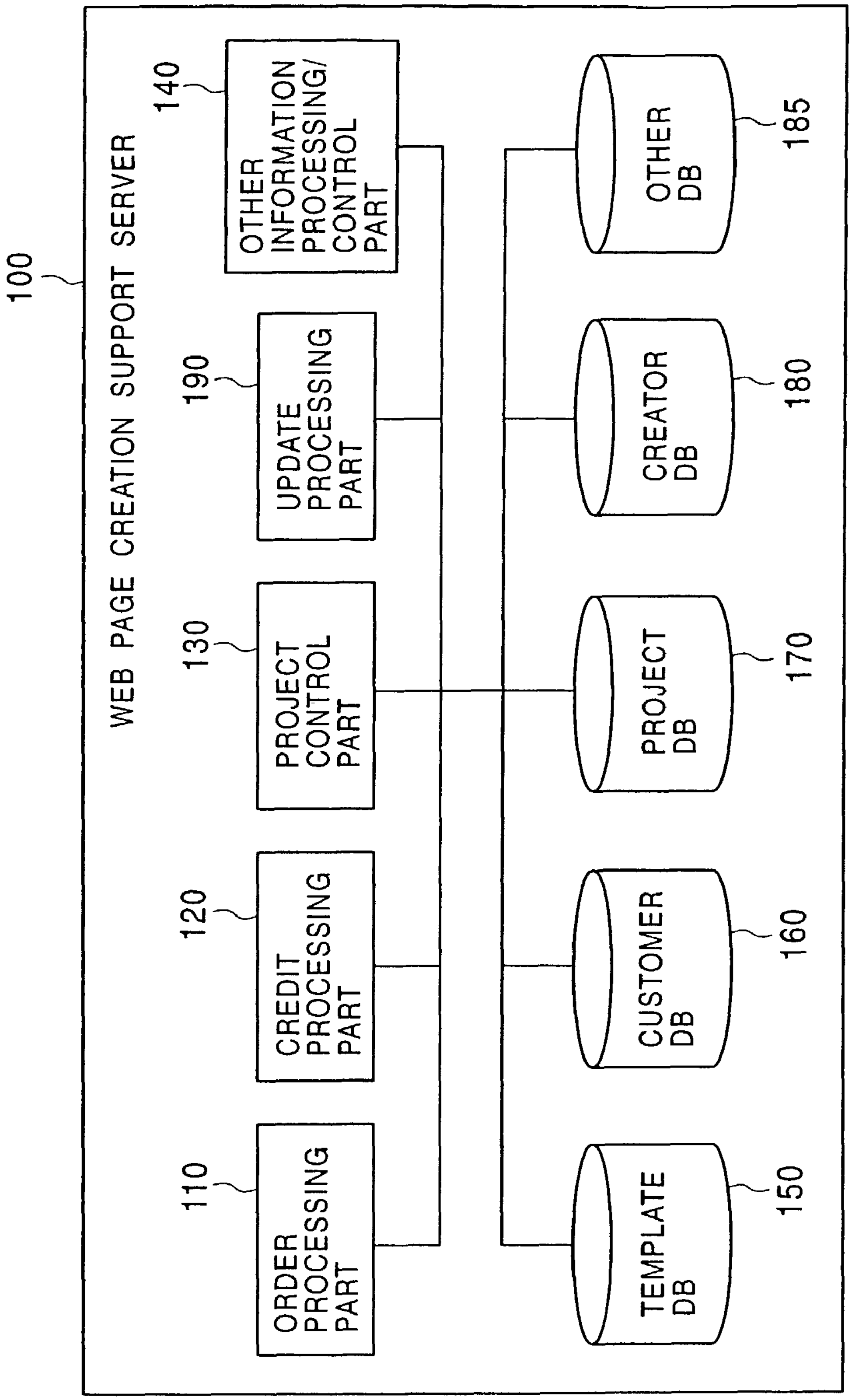
FIG. 2 is a block diagram illustrating the configuration of the Web page creation support server in a Web page creation support system according to an embodiment of the present invention.

Next, the configuration of the Web page creation support server 100 will be described with reference to FIG. 2.

As described before, the Web page creation support server 100 is a computer system constituting the WWW server capable of providing the Web page creation support service to the customer terminal unit 300 and other clients via a network 200. The server includes an order processing part 110, a credit processing part 120, a project control part 130, an update processing part 190, an other information processing part 140, a template information database 150, a customer information database 160, a project information database 170, a creator information database 180, and an other database 185.

(1-2-1) Order Processing Part 110

Figure 3:
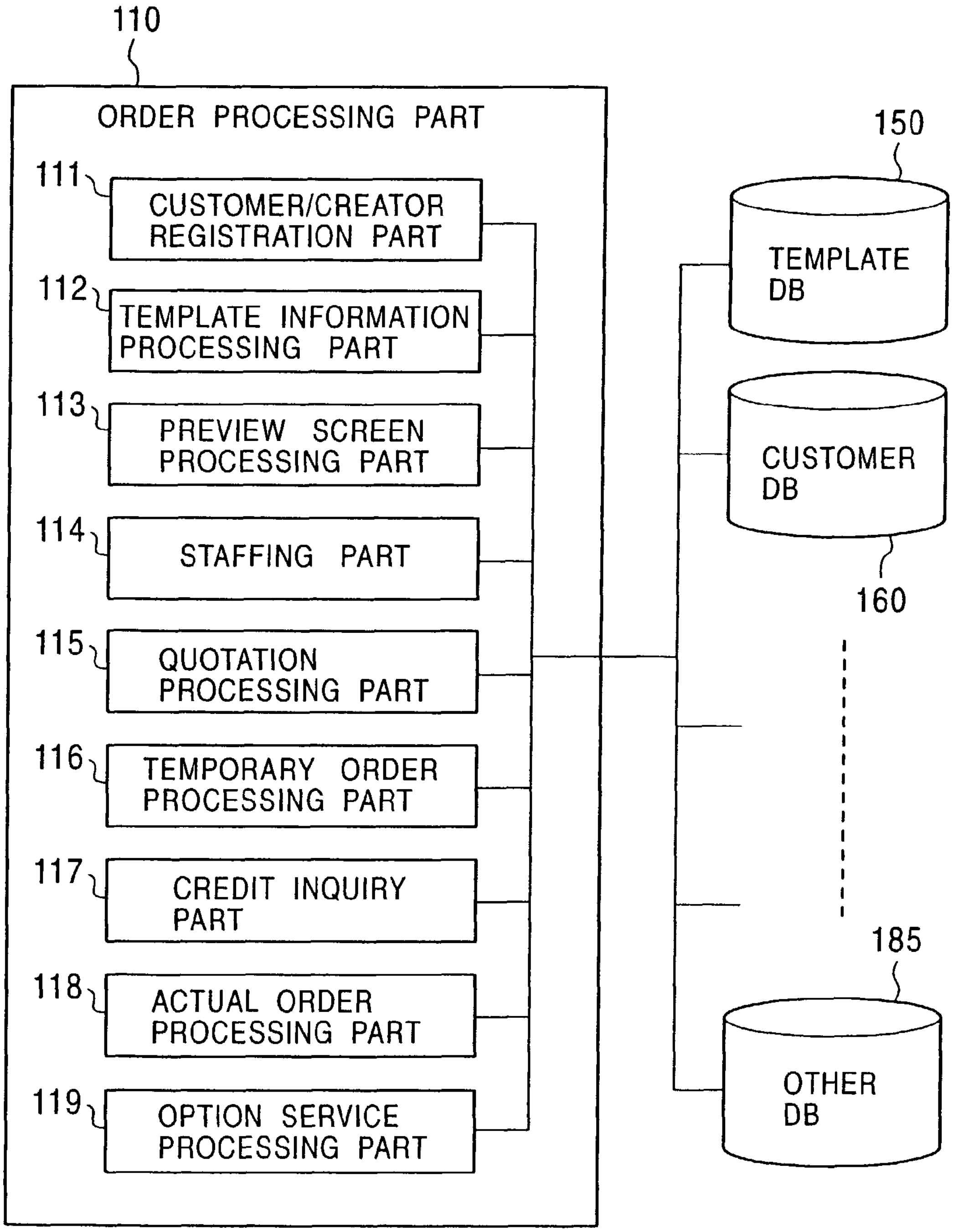
FIG. 3 is a block diagram illustrating the configuration of the order processing part of the Web page creation support server in a Web page creation support system according to an embodiment of the present invention.

The order processing part 110 has a function for receiving a Web page creation request from the customer terminal unit 300. As shown in FIG. 3, the order processing part 110 includes a customer/creator terminal unit registration part 111, a template information processing part 112, a preview screen processing part 113, a staffing part 114, a quotation processing part 115, a temporary order receiving part 116, a credit inquiry part 117, an actual order receiving part 118, and an option service processing part 119.

The customer/creator registration part 111 registers and manages various information, in the customer information database 160, about the customer terminal unit 300 that has accessed the Web page creation support server 100. The customer information managed here includes the primary customer information, which is simple information such as an e-mail address, that is required for the customer terminal unit 300 to view the preview screen of the Web page images described below and permit the preliminary quotation, and the secondary customer information, which is more detailed information such as an address and a name, that is requested from the customer terminal unit 300 for performing the credit processing.

Also, the customer/creator registration part 111 registers and manages, in the creator information database 180, various information about the creator terminal unit 400 as creator information in accordance with the request from the customer terminal unit 300 that has accessed the Web page creation support server 100.

The template information processing part 112 manages the template information stored in the template information database 150. The template information database 150 stores the template information of the Web pages that can be selected by the customer terminal unit 300. The template information mentioned in this specification is the information used to determine the style of a Web page, and the template information contains, for example, the design information to determine the frame design of a Web page, the item information about the page items to be displayed on a Web page, and the item contents information, which is the specific contents to be placed on each page item, and so on.

In this regard, in the Web page creation support system, etc. according to the present embodiment, by using the template information, it is possible to simplify ordering a Web creation request and update request on the network and to realize efficient control of a Web page creation project described below.

The preview screen processing part 113 has a function to form an image based on the template information selected by the customer terminal unit 300 into a preview screen which can be easily grasped visually in order to display the image on the display part of the customer terminal unit 300.

The staffing part 114 includes a matching engine enabling the customer terminal unit 300 to select a creator terminal unit 400 that is in accordance with his/her own taste, for example, a cool atmosphere and classic atmosphere. The customer terminal unit 300 resisters ordering requirements such as his/her preferences in the Web page creation support server 100, and the staffing part 114 extracts a creator terminal unit 400 meeting with the ordering requirements of the customer terminal unit 300 from the creator information registered beforehand in the creator information database 180, and presents them to the customer terminal unit 300.

If a plurality of creator terminal units 400 is extracted, it is possible for the customer terminal unit 300 to select the creator terminal unit 400 matching with his/her own taste from the presented creator terminal units 400. At that time, in order to enable the customer terminal unit 300 to easily select the creator terminal unit 400 who matches with his/her own taste, the staffing part 114 may be formed such that the Web pages previously created by the creator terminal unit 400 are linked for reference. In this regard, the staffing part 114 can be omitted.

The quotation part 115 performs quotation of the cost for creating Web pages based on the ordering requirements sent by the customer terminal unit 300 to the Web page creation support server 100, and displays this information on the display of the customer terminal unit 300. The customer terminal unit 300 can select the Web page creation which gives maximum effect within his/her budget with reference to the displayed quotations.

The temporary ordering part 116 receives temporarily the order of a Web page creation request made to the Web page creation support server 100 after the customer terminal unit 300 has confirmed the preview screen presented from the preview screen processing part 113 and the quotation presented from the quotation processing part 115.

Figure 5:
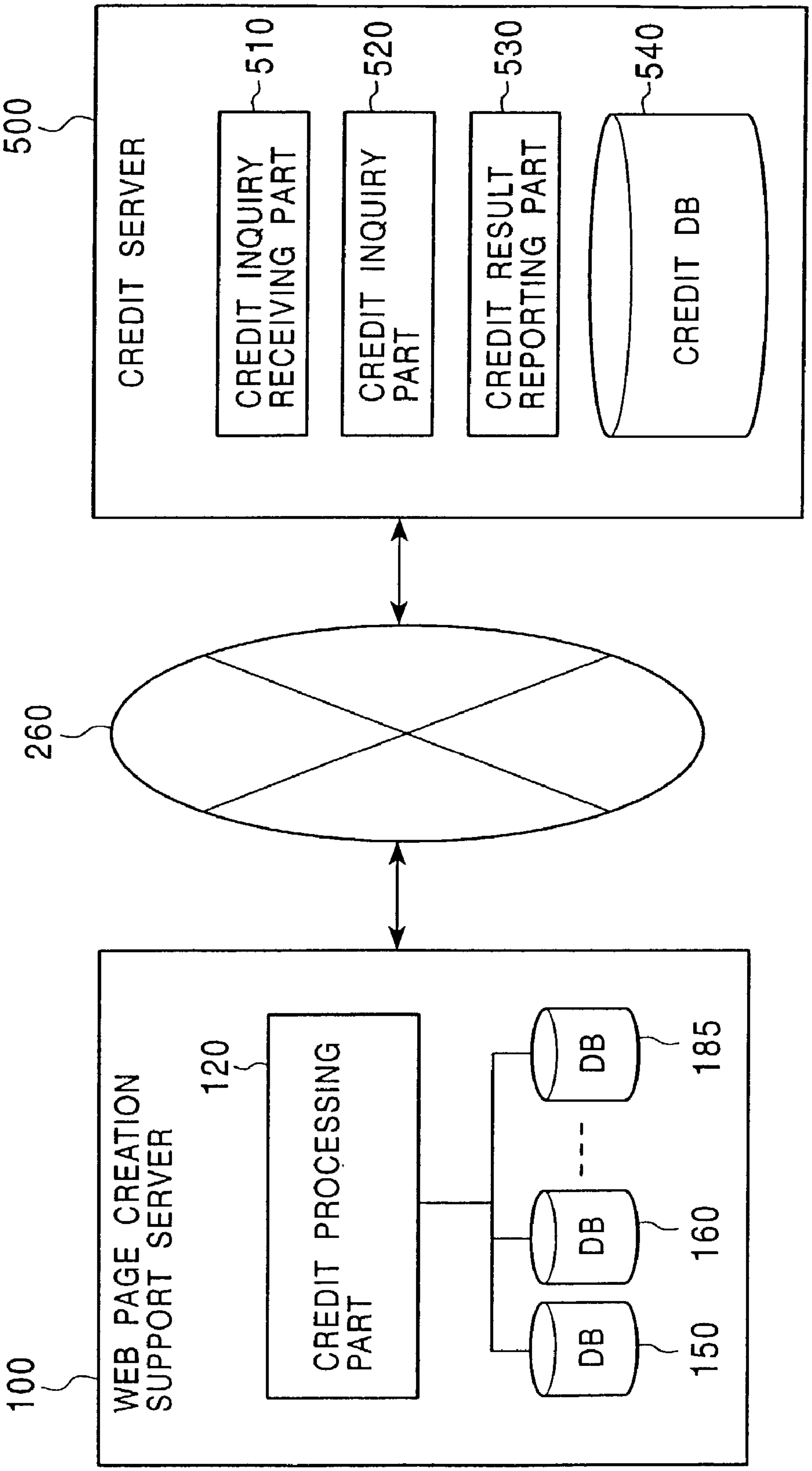
FIG. 5 is a block diagram illustrating the configuration of the credit processing part and the credit server of the Web page creation support server in a Web page creation support system according to an embodiment of the present invention.

The credit inquiry part 117 directs, as shown in FIG. 5 in detail, credit inquiry to the credit processing part 120 and further to the credit server 500, and based on the result, determines whether or not to proceed with the Web page creation job of the customer terminal unit 300 which has temporarily ordered by the temporary ordering part 116.

If the result of the credit inquiry is affirmative, the actual ordering part 118 actually proceeds with the Web page creation job, and when the Web pages are delivered, it is determined that the cost for that service can be collected, thus the actual order of the Web page creation request from the customer terminal unit 300 placing an order is received, and the processing proceeds to the Web page creation job, which will be described later.

Figure 4:
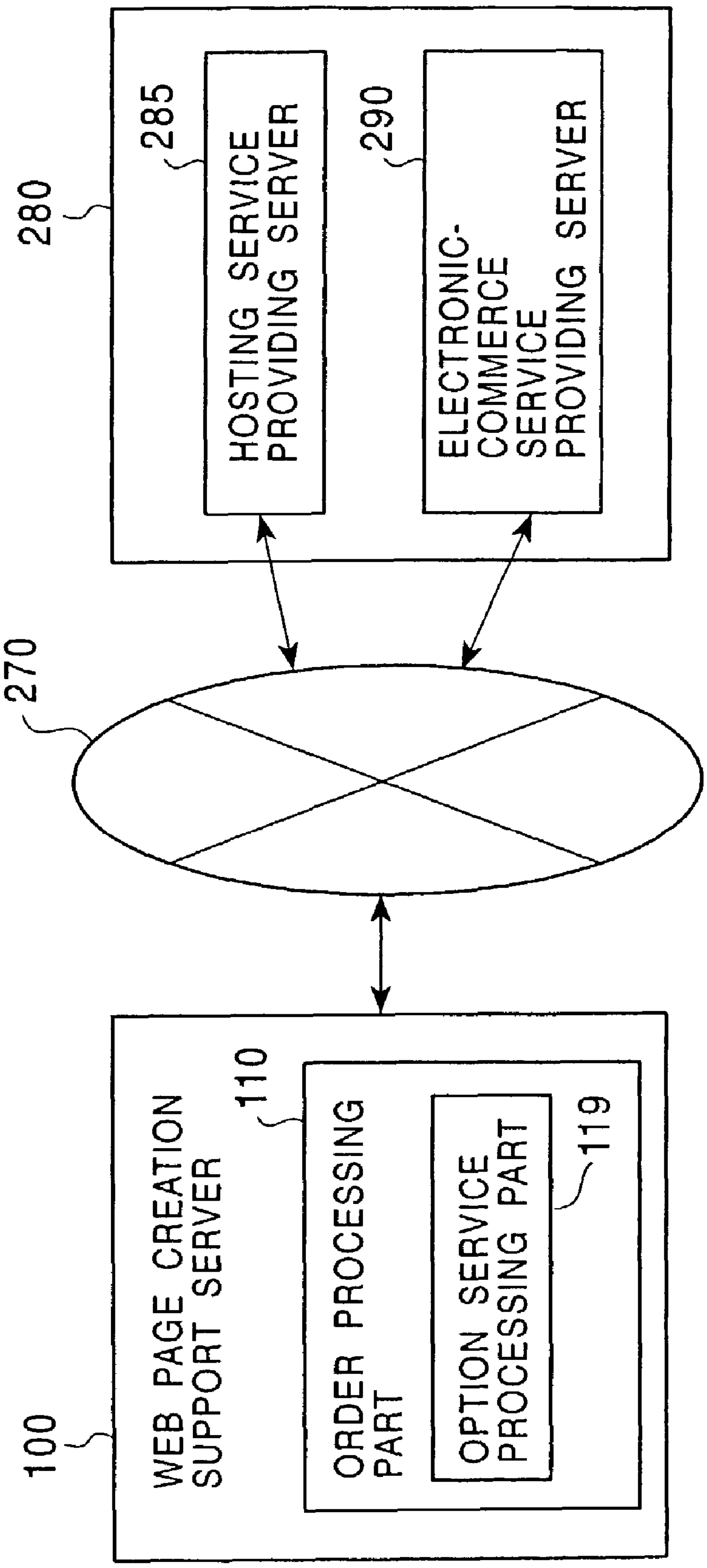
FIG. 4 is a block diagram illustrating the configuration of the option service processing part of the Web page creation support server and the option service providing server in a Web page creation support system according to an embodiment of the present invention.

The option service processing part 119 provides services other than the Web page creation and update services in response to the request of the customer terminal unit 300. For option services, as shown in FIG. 4, there are services provided by the option service server 280, for example, a hosting service provided by a hosting service providing server 285 and an electronic-commerce service provided by an electronic-commerce service providing server 290. In this regard, in this specification, the option services are not limited to the hosting service and the electronic commerce, and include all the services available via a network like the Internet, for example, services such as obtaining a domain, and so on. In this regard, in this specification, the "hosting service" includes all the services to support the server operations to provide the Internet services such as providing a file server or a mail server on the Internet. Further, the "electronic-commerce service" includes all the services to support distribution of products and services using the Internet, such as a shopping basket service, a distribution service, a charge collection service, and so on.

In the case where the customer terminal unit 300 requests to create or update a Web page and, at the same time, obtains a domain of the Web page or needs space for storing the Web page, the necessary services can be received by accessing the hosting service providing server 285 in the option service providing server 280 via a network 270 through the intermediation of the option service processing part 119. Also, in the case where, the customer terminal unit 300 requests to create or update a Web page and, at the same time, a shopping basket service, a distribution service, charge collection service, and so on are necessary in order to sell the products displayed on that Web page, the necessary services can be received by accessing the electronic-commerce service providing server 290 in the option service providing server 280 via a network 270 through the intermediation of the option service processing part 119.

In this regard, in the example shown in FIG. 4, the Web page creation support server 100 and the option service server 280, that is, the hosting service providing server 285 and the electronic-commerce service providing server 290 are configured to be different servers. However, it is needless to say that the option services can be configured as one function of the Web page creation support server 100.

In this regard, in the example illustrated in the figure, the order processing part 110 includes the customer/creator registration part 111, the template information processing part 112, the preview screen processing part preview screen processing part 113, the staffing part, the quotation processing part 115, the temporary ordering part 116, the credit inquiry part 117, the actual ordering part 118, and the option service processing part 119, however, each processing part can be configured as a standalone part or as a combination of some parts to form another processing part. Furthermore, it is needless to say that the parts can also be arranged independently from the Web page creation support server 100.

(1-2-2) Credit Processing Part 120

Next, the credit processing part 120 will be described with reference to FIG. 5. The credit processing part 120 of the Web page creation support server 100 is connected to the credit server 500 via a network such as the Internet 260 and so on.

The credit server 500 consists of the processing parts including the credit inquiry receiving part 510, the credit inquiry part 520, and the credit result reporting part 530, and the credit database 540 storing the credit information.

When the credit inquiry receiving part 510 of the credit server 500 receives a credit inquiry on a customer from the credit processing part 120 of the Web page creation support server 100 via the Internet 260, the credit inquiry part 520 accesses the credit database 540, and performs credit research on the paying capacity of the customer. The result is reported to the credit processing part 120 of the Web page creation support server 100 by the credit result reporting part 530 via the Internet.

As described previously, the Web page creation support server 100 decides whether or not to actually proceed the Web page creation job for the customer from which temporary order is received based on the credit result obtained via the credit processing part 120. If the decision is affirmative, actual order processing is performed in the actual order processing part.

In this regard, in the example illustrated in the figure, the credit server 500 is configured separately from the Web page creation support server 100, but it is needless to say that they can also be deployed on the same server. Also, in the above example, the credit database 540 is located on the credit server 500, but it is needless to say that it too can be configured as a separate database server.

(1-2-3) Project Control Part 130

Figure 6:
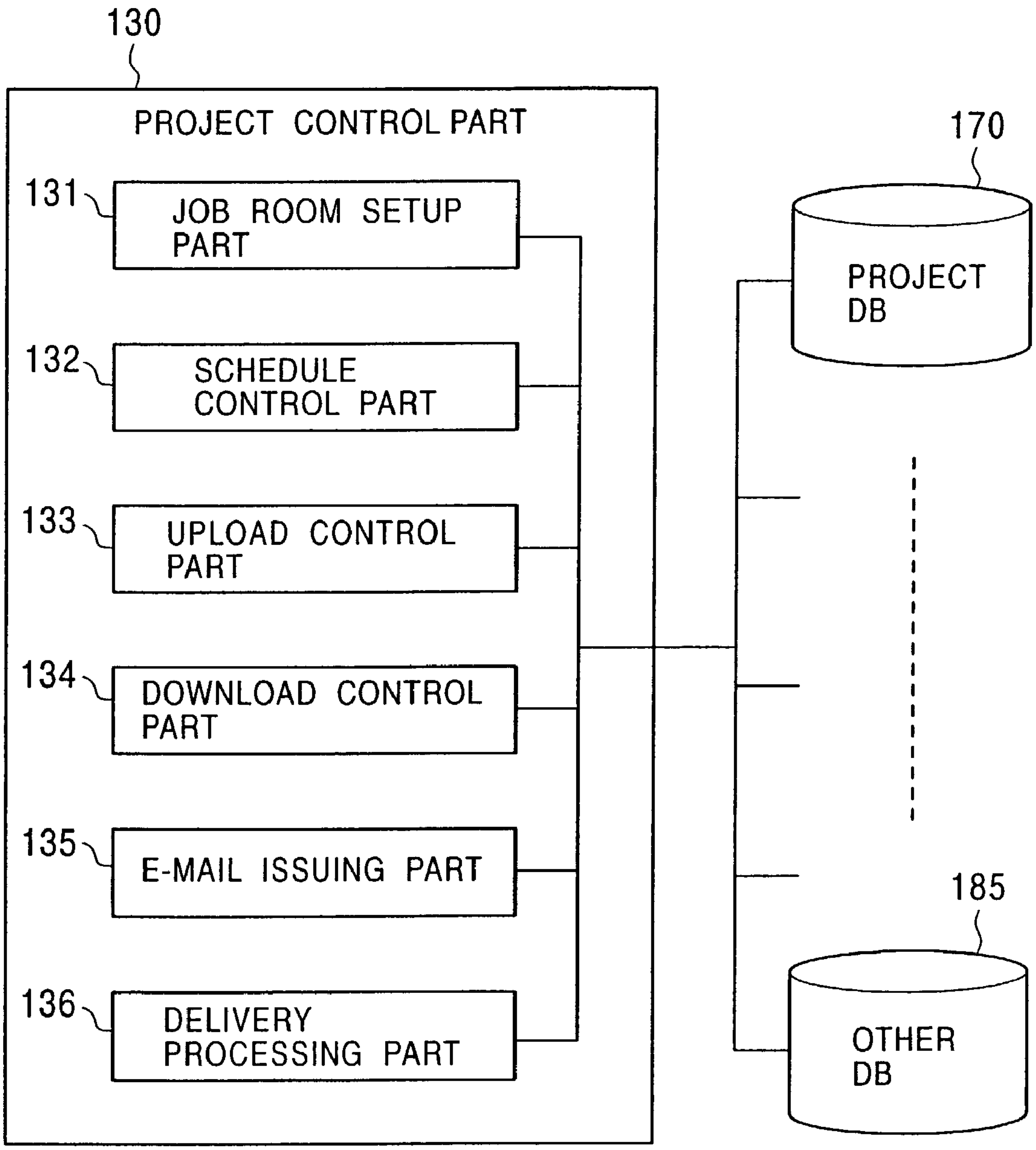
FIG. 6 is a block diagram illustrating the configuration of the project control part of the Web page creation support server in a Web page creation support system according to an embodiment of the present invention.

Then, the project control part 130 will be described with reference to FIG. 6. The project control part 130 mainly includes a job room setup part 131, a schedule control part 132, an upload control part 133, a download control part 134, an e-mail issuing part 135, and a delivery processing part 136.

Before describing each function of the project control part 130, special concepts such as a "project" and a "job room" and so on in this specification will be described.

In this specification, "project" is a series of the Web page creation processes under the control of the Web page creation support server 100 performed upon receipt of the Web page creation request (actual order processing) from the customer terminal unit 300. In general, a project starts when the customer terminal unit 300 makes a Web page creation request (actual order) to the Web page creation support server 100, and proceeds with the exchange of information about the contents between the customer terminal unit 300 and the creator terminal unit 400 via the job room set up by the project control part 130, and then the task is completed by the delivery from the Web page creation support server 100 to the customer terminal unit 300 the Web pages by the creator terminal unit 400. Projects are controlled such that a specific job room is assigned to each request and controlled specifically.

Also, a "job room" is a virtual control space built in the Web page creation support server 100 corresponding to each project. As is described later, for each job room, specific identification number (account) and specific entrance privileges are set. A job room is a virtual control space to be built for each project unit (or ordering unit), but, as described later with reference to FIG. 31, the same one job room can be built so as to be recognized by the customer terminal unit 300 as a customer-specific job room, and for an administrator of the Web page creation support server 100, it is recognized as an administrator-specific job room and for a creator terminal unit 400 terminal unit, it is recognized as a creator-specific job room.

Once a job room is established, the customer terminal unit 300 accesses the job room to upload necessary information to create Web pages, and the creator terminal unit 400 can access the job room to download the necessary information to create Web pages. The creator terminal unit 400 can upload the Web page draft to the job room. The customer terminal unit 300 can access the job room to know the progress status of the Web page creation job, or check the Web page draft uploaded by the creator terminal unit 400. Also, the administrator of the Web page creation support server 100 can access this job room to get the progress status for taking the necessary actions.

Next, each function of the job room control part 130 will be specifically described.

The "job room set up part" 131 builds a specific job room virtually in the Web page creation project upon receipt of the order request from the customer terminal unit 300, as will be described later. A specific account is assigned to the job room, and ID and password for entering the job room is set up. The ID and password that have been set up can be configured such that the e-mail issuing part 135 automatically notifies the customer terminal unit 300, creator terminal unit 400, or administrator of the Web page creation support server 100.

The "schedule control part" 133 controls the schedule of the Web page creation job which proceeds per each job room. For example, it ensures that the creator terminal unit 400 delivers the Web page draft by the delivery request date requested by the customer terminal unit 300. It is also possible to supervise the jobs out of the scheduled progress such as late delivery from the creator terminal unit 400, and if necessary, the part can be configured to automatically issue a delivery urging mail from the e-mail issuing part 135 to the creator terminal unit 400 causing the delay in delivery.

The "upload control part" 133 is a part of the control parts controlling the status change of the project, and controls the status in which files and so on are uploaded to the Web room. The object of upload includes the information (raw material) necessary for creating Web pages such as the Web contents uploaded from the customer terminal unit 300 and others, and the contents draft uploaded form the creator terminal unit 400 and so on.

When the status is changed by uploading, the schedule control part 132 is informed of the change, and the schedule control part 132 updates the status of the Web page creation job that has been changed by uploading. For example, if predetermined information is uploaded from the customer terminal unit 300, it is possible to configure the system to issue, from the e-mail issuing part 135, an e-mail urging the creator terminal unit 400 to download the information. On the contrary, if a draft is uploaded from the creator terminal unit 400, it is possible to configure the system to issue, from the e-mail issuing part 135, an e-mail urging the customer terminal unit 300 to check the draft.

The "download control part" 134 is a part of the control parts controlling the status change of the project, which controls the status in which the uploaded files and so on are downloaded from the Web room. The object of download includes the information (raw material) necessary for creating Web pages such as the Web contents uploaded from the customer terminal unit 300 and others, and the contents draft uploaded form the creator terminal unit 400 and so on. In addition, the object of download includes the files of raw materials for the Web contents which is copyright free and located in the Web room so as to be downloaded.

When downloading is executed, the schedule control part 132 is informed, and the schedule control part 132 updates the status of the Web page creation job that has been changed by the downloading. Also, if necessary, it is possible to configure the system to automatically issue, from the e-mail issuing part 135, an e-mail with its content corresponding to the download action to the customer terminal unit 300 or the creator terminal unit 400.

The "e-mail issuing part" 135 has a function to send an e-mail with the necessary contents to a predetermined destination when a preset action occurs in the course of the Web page creation job. The timing of the issue of an e-mail can be set for any time by configuring the Web page creation support system.

For e-mails to the customer terminal unit 300, there are, for example, the job room set-up notice informing the customer of the entrance-ID to the job room and its password, the upload request prompting uploading Web contents, the schedule notice notifying the schedule for Web page creation job, the confirmation request with a request for the confirmation of Web page draft, the delivery notice notifying delivery of Web draft, receipt confirmation of uploading the other files, and so on.

For e-mails to the creator terminal unit 400, there are, for example, the loading status inquiry for checking the loading status before making a request for Web page creation, placing an actual order requesting a Web page creation job, the download request prompting downloading by notifying the uploading from the customer terminal unit 300, the schedule notice notifying the schedule of a Web page creation job, the reminder for urging delivery, the modification request to direct modification of a draft, receipt confirmation of uploading the other files, and so on.

The delivery processing part 136 has a function to make the final delivery of the Web pages created by the creator terminal unit 400 to the customer terminal unit 300. The delivery processing part 136 can be configured to have a function to notify the schedule control part 132 that a series of Web page creation job has completed, and a function to as a job room closing part to close the job room upon the completion of the delivery processing.

The delivery method of the completed Web pages can be one of various types depending on the configuration of the Web page creation support system and the level of knowledge of the customer terminal unit 300 of the Internet and computers. For example, for a customer terminal unit 300 who knows how to download a completed Web page and deploy it on the Web server by himself/herself, the delivery processing can be replaced by issuing an e-mail notifying the completion of the Web page and recommending downloading. On the other hand, for a customer terminal unit 300 having insufficient knowledge and skill of the Internet and computers, and who cannot, therefore, set up Web pages by himself/herself, it is possible to close the delivery processing at the point when the Web pages are deployed on the specified Web server to be made available for browsing.

In this regard, in the above description, the structure of the project control part 130 has been described in connection with the project in which the customer terminal unit 300 requests the Web page creation support server 100 to create a new Web page. However, as described later, when the customer terminal unit 300 requests the Web page creation support server 100 to update a previously existent Web page, the progress of the project is controlled by the project control part 130 in the same manner.

(1-2-4) Update Processing Part 190

Figure 7:
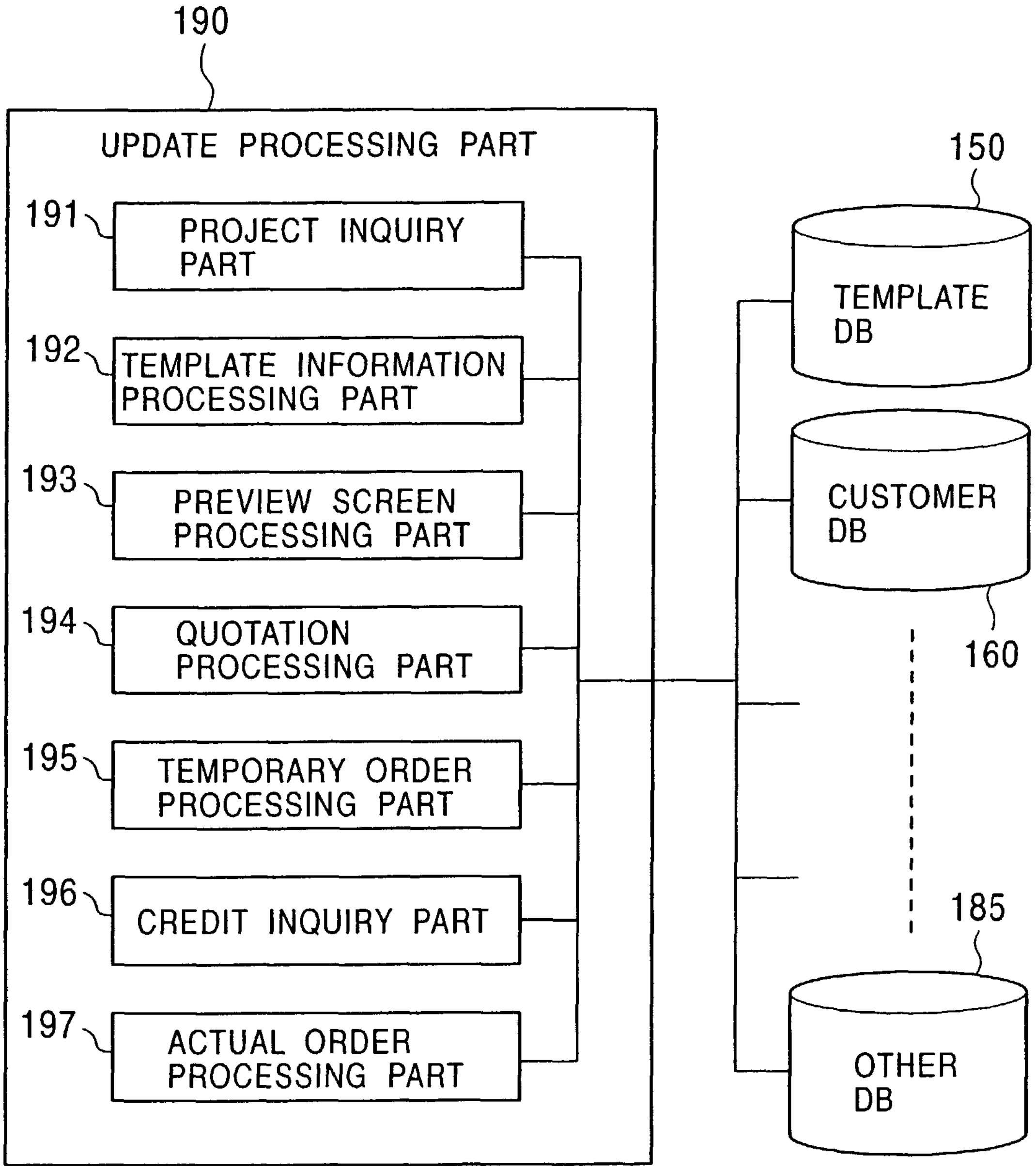
FIG. 7 is a block diagram illustrating the configuration of the update processing part of the Web page creation support server in a Web page creation support system according to an embodiment of the present invention.

Next, an update processing part 190 will be described with reference to FIG. 7. The order processing part 110 receives a new Web creation request from the customer terminal unit 300. On the other hand, the update processing part 190 updates a previously created Web page, that means, adds, changes, or deletes the Web page information. As shown in FIG. 7, the update processing part 190 consists of a project inquiry part 191, a template information processing part 192, a preview screen processing part 193, a quotation processing part 194, a temporary order processing part 195, a credit inquiry part 196, and an actual order processing part 197.

As already described, when creating a new Web page, the project control part 130 assigns a specific job room to each request individually, and performs a specific project control. This project will be completed when the creator terminal unit 400 performs the delivery to the customer terminal unit 300 via the Web page creation support server 100. Each project is controlled with a specific identification number assigned for each customer terminal unit 300. When a customer terminal unit 300 who wants to update a Web page logs in a predetermined top page and has been authenticated, the project inquiry part 191 inquires the project which is wanted to be updated from the delivered projects stored in the project database 170 shown in FIG. 11.

The template information processing part 192 controls the template information which is recorded in the template information database 150. In the template information database 150, the template information of the Web pages which can be selected by the customer terminal unit 300 is recorded. The template information described in this specification is the information for determining appearance of a Web page. The template information includes, for example, design information to determine the frame design of the Web page, item information regarding the page items to be displayed on the Web page, and item content information which is a specific content to be placed on each page item.

In this regard, in the update processing of Web page information, the template information in accordance with the delivered Web page information is read from the template information database 150, and is presented to the customer terminal unit 300. The customer terminal unit 300 can perform the change work, such as addition, a change, and a deletion of Web page information based on the presented template information. Thus in the Web page creation support system, etc. according to the present embodiment, by using the template information, a Web page can be easily updated on the network.

The preview screen processing part 193 has a function to form the image of the template information content which has been selected and changed by the customer terminal unit 300 to a preview screen which can be easily grasped visually to display on the display unit of the customer terminal unit 300. The customer terminal unit 300 can confirm whether a Web page is updated as he/she desires by referring to the preview screen before proceeding to the update work of the actual Web page.

The quotation processing part 194 quotes the cost to update a Web page based on the change condition of the Web page information which the customer terminal unit 300 has sent to the Web page creation support server 100, and displays the result on the display of the customer terminal unit 300. The customer terminal unit 300 can select the update job which has the maximum effect within his/her own budget with reference to the displayed quotation.

After the customer terminal unit 300 confirms the preview screen presented by the preview screen processing part 193 and the quotation presented by the quotation processing part 194, the temporary order processing part 195 receives temporarily the order of the Web page update performed on the Web page creation support server 100.

As shown in FIG. 5, the credit inquiry part 196 performs credit inquiry on the credit processing part 120 and then the credit server 500, and based on the result, determines whether or not the Web page update job should be actually proceeded regarding the customer terminal unit 300 which has been temporarily order-received in the temporary order processing part 195.

When the result of the credit inquiry is affirmative, the actual order processing part 197 determines that if the Web page update job actually progresses and the Web page is delivered, the cost of the service can be collected. Then the Web page update request from the customer terminal unit 300 who has placed the order is actually received, and the Web page update job described later with reference to FIG. 31 progresses.

In this regard, the update processing part 190 in the figure is not provided with the option service processing part, however, in the same manner as in the order processing part 110, the option service processing part which provides the services other than the Web page creation and update services may be provided in accordance with the request from the customer terminal unit 300.

(1-2-5) Other Information Processing/Control Part 140

The Web page creation support server 100 can be configured to include the other information processing/control part 140 in addition to the above-mentioned order processing part 110, credit processing part 120, and project control part 130. The other information processing part 140 can perform various appendant processing and data administration accompanying Web page creation job.

Figure 8:
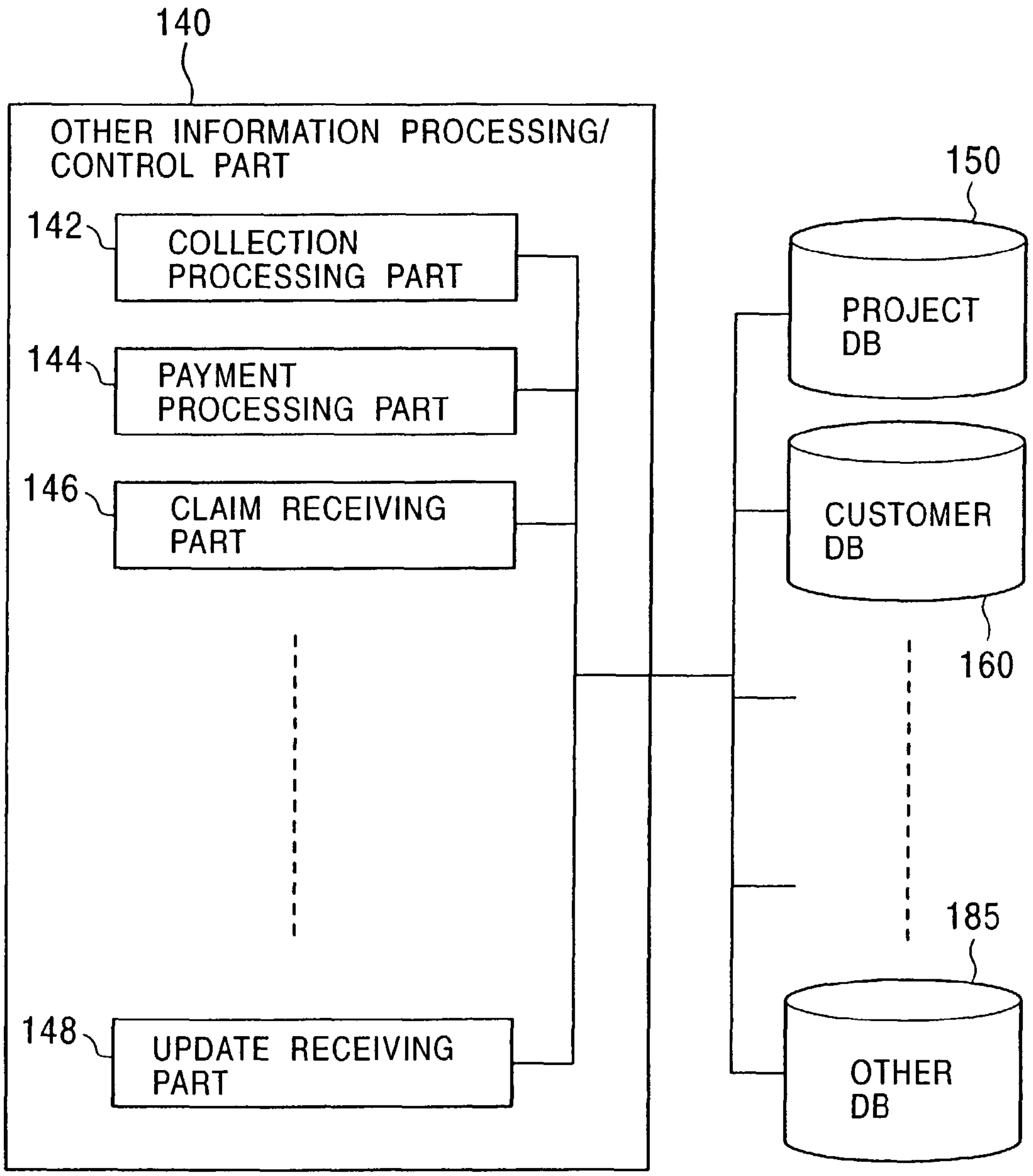
FIG. 8 is a block diagram illustrating the configuration of the other information processing/control part of the Web page creation support server in a Web page creation support system according to an embodiment of the present invention.

FIG. 8 shows an example of the other information processing/control part 140. The information processing/control part 140 shown in the figure includes the collection processing part 142, the payment processing part 144, the claim receiving part 146, and the update receiving part 148.

For example, the collection processing part 142 issues invoices to the customer terminal unit 300 upon the delivery of Web pages, and performs collection processing. The payment processing part 144 performs the accounting processing for paying the creator terminal unit 400 for creating Web pages. The claim receiving part receives claims from the customer terminal unit 300. The update receiving part 148 can perform update receiving and so on when the customer terminal unit 300 wants to update Web pages. The above example is only one example, and the other information processing/control part 140 can include various information processing and information control operations depending on the configuration of the Web page creation support system.

In this regard, according to the embodiment, the information processing/control part of the Web page creation support server 100 consists of the order processing part 110, the credit processing part 120, the project control part 130, and the other information processing/control part 140, but these processing parts can be configured individually or combined arbitrarily on a separate server. Or rather, it is needless to say that each function element included in each processing part can be configured by individually or combined arbitrarily as well.

(1-2-6) Template Information Database 150

Next, with reference to FIG. 9, the data structure of the template information database 150 will be described. The template information database 150 is the database related to the Web page contents with which the customer terminal unit 300 can have an outline image of a Web page to be created or updated using the Web page creation support system according to the present embodiment.

In general, for creating Web pages, it is necessary to determine the design information about the page frame design to decide overall image of Web pages, the item information about page items to decide what kind of Web pages are to be interlinked with each other, the item contents information to decide what contents are placed on each Web page. The template information database 150 provides the customer terminal unit 300 who is inexperienced in creating Web pages with raw material and reference material in order to determine this information.

Figure 9:
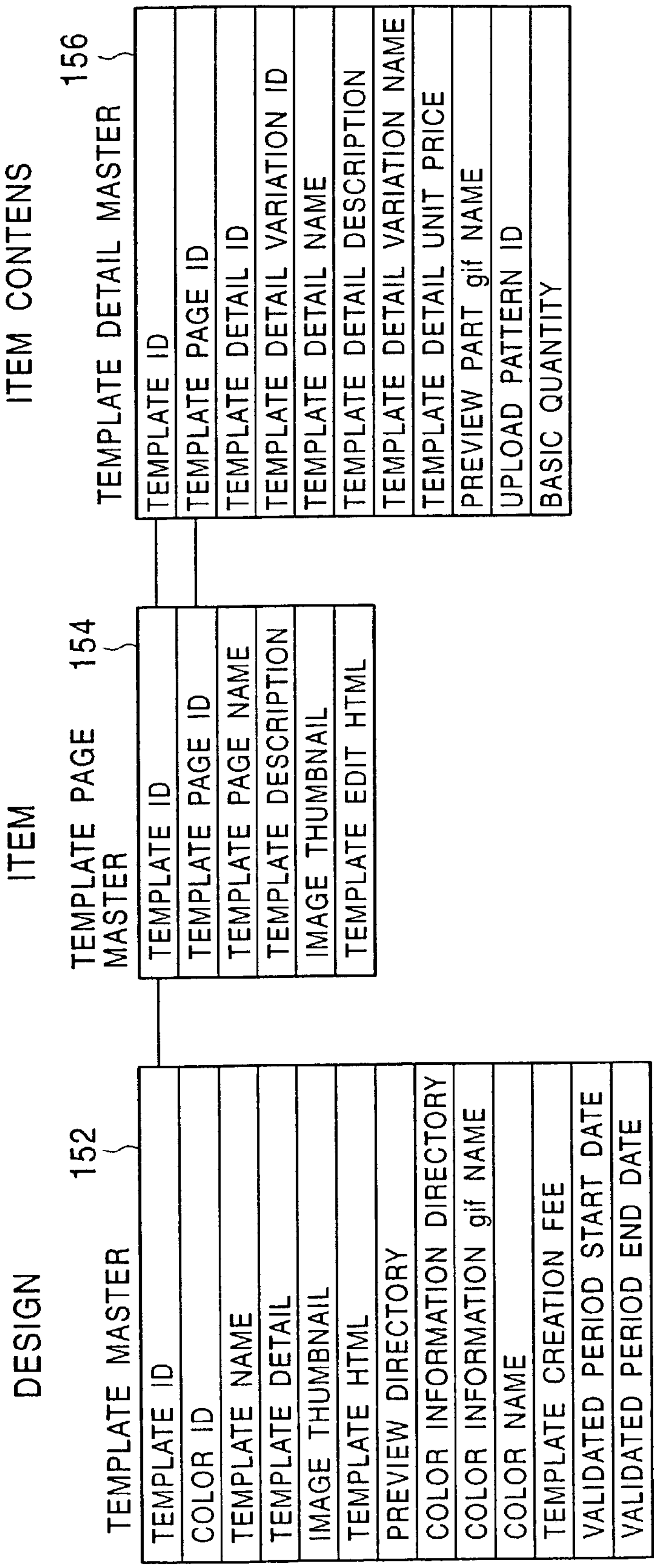
FIG. 9 is a block diagram illustrating the configuration of the template information database on the Web page creation support server in a Web page creation support system according to an embodiment of the present invention.

In FIG. 9, an example of the template information database 150 is shown. As shown in the figure, the template information database 150 includes the template master template master 152 related to the design information, the template page master 154 related to the page items, and the template detail master 156 related to item contents.

The template master 152 includes various information to determine the frame design of a Web page, for example, data such as the template ID, the color ID, and so on about the taste and color tone to decide overall image of a Web page, and, in addition, data on the template creation fee and so on for creating the frame. Also, the template master 152 includes thumbnail image information to facilitate selection by the customer terminal unit 300.

The template master 152 determines the taste to decide the overall image of a Web page. The customer terminal unit 300 can select as a general taste, based on the information stored in the template master 152, the overall image of a Web page, for example, "cool atmosphere", "warm atmosphere", "pastel atmosphere", and "heavy metallic atmosphere". In addition, the customer terminal unit 300 can select a color tone to express the selected taste frame.

When selecting, the customer terminal unit 300 can select the most preferable frame by referring to the thumbnail image stored in the template master 152, and by displaying the preview screen. The data of these designs is linked with the data of template creation fee so that the customer terminal unit 300 can get quotation of the cost of creating Web pages satisfying customer's preferences.

The template page master 154 stores the page item information on how the Web pages are interlinked with each other using the template frame selected based on the template master 152. In the example shown in the figure, the page item information is described as template page name, and the customer terminal unit 300 can select the page items to express using the template frame based on this data. For a template page, it is possible to configure the selection, for example, top page, company overview page, recruiting staff page, and product information page. Also in this case, by displaying thumbnail images and preview screens, the customer terminal unit 300 can select the composition of Web pages using more specific images.

The template detail master 156 stores information about specific item contents to be placed on page items selected based on the template page master 154. To understand the structure of the template detail master 156 more specifically, description will be given in relation to a specific example of the template page items selected in the template page master 154. For example, when the top page is selected as the template page, the item contents placed on this top page are determined based on the template detail master 156.

Taking top page for an example, it is determined whether to insert the company logo into the top page; whether to insert the title (for example, company name) into the top page; whether to insert the main image (for example, the image or photograph for appealing the company); whether to insert a catchword (for example, a catchword for appealing the company).

The template detail master 156 stores the information about the unit price of each detail related to each item contents information, thereby making it possible for the customer terminal unit 300 to get a quotation of the cost of creating Web pages containing the desired item contents.

(1-2-7) Customer Information Database 160

Next, with reference to FIG. 10, the structure of the customer information database 160 will be described. In the customer information database 160, various information on the customer terminal unit 300 is registered and managed. The information registered includes, as shown in FIG. 10, personal or corporate identification information such as customer ID, user name, password, name, home address, telephone number, FAX number, e-mail address, and company address.

The customer information controlled here includes the primary customer information requested to be registered in order to display, to the customer terminal unit 300, the preview screen of Web page images described below and to permit temporary quotation, and the secondary customer information requested from the customer terminal unit 300 in order to perform credit processing.

Registering the primary customer information in the customer information database 160 is carried out before the customer terminal unit 300 accesses the Web page creation support server 100 to refer to the preview screen, and to receive the quotation service of Web page creation. The contents of the primary customer information registered here includes necessary minimum of items, for example, name and e-mail address.

Registering the secondary customer information in the customer information database 160 is carried out after receiving temporary order. Since this secondary customer information is necessary for executing the credit processing before receiving the actual order, if the customer terminal unit 300 belongs to an enterprise, the information includes, in addition to the primary customer information, the information needed for credit inquiry such as the location of the main office, capital amount, and corresponding bank.

The customer information database 160 obtained in such a way is utilized while being linked with other databases and processing systems in various situations of the Web page creation support system according to the present embodiment.

(1-2-8) Project Information Database 170

Next, with reference to FIG. 11, the structure of the project information database 170 will be described. The project information database 170 is a database to control each Web page creation job placed from the customer terminal unit 300 for every order placement. As already described, after the Web page creation support server 100 receives the actual order for a Web page creation from the customer terminal unit 300, a job room, which is a virtual control space for every order placement, is set up. The project information database 170 is a database to control the progress of the Web page creation via this job room.

Figure 11:
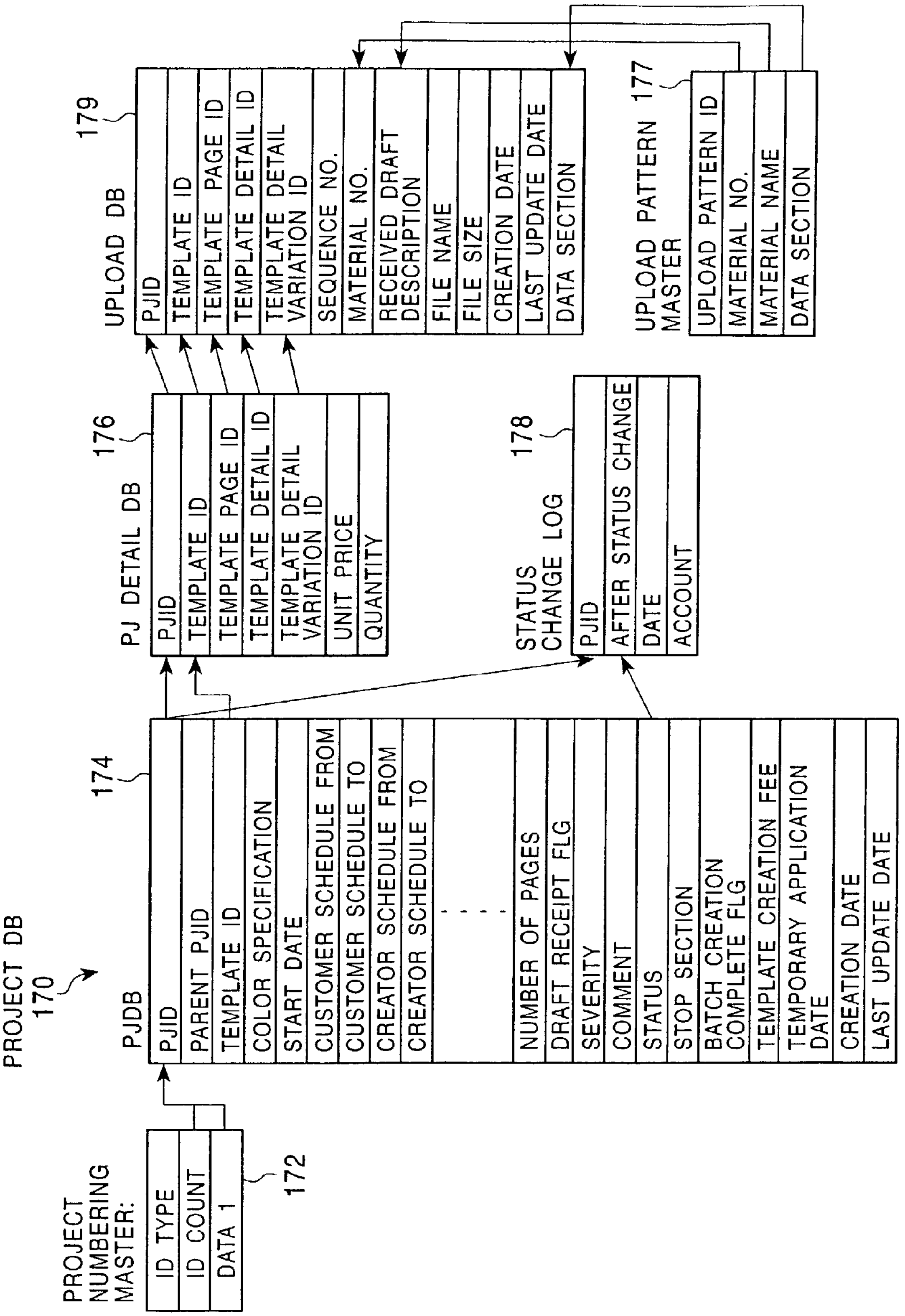
FIG. 11 is a block diagram illustrating the configuration of the project information database on the Web page creation support server in a Web page creation support system according to an embodiment of the present invention.

As shown in FIG. 11, the project information database 170 includes the project numbering database 172, the PJ (schedule information database) database 174, the project detail database 176, and the status change log 178.

The project numbering database 172 is a database to automatically set up the project number in order to set up a job room in response to the order placement when a Web page creation job is actually received from the customer terminal unit 300. The project number assigned here is also maintained after the Web page creation job has been completed and the delivery has been performed. As described below, when updating a delivered Web page, this project number is referenced as well.

The schedule information database 174 is the nucleus of this project information database 174, and is the basic database to control the progress status of the Web page creation for every job room. Therefore, the schedule information database 174 includes various information necessary for the project control such as the template information selected by the customer terminal unit 300, project start date, customer schedule, creator schedule, the status corresponding to the progress of the Web page creation, the upload information from the customer terminal unit 300, the download information of the Web contents by the creator terminal unit 400, and the upload information of the Web page draft by the creator terminal unit 400.

The project detail database 176 controls the details of the template information of the Web page selected by the customer terminal unit 300. Therefore, the project detail database 176 contains and manages the information related the template information such as the template ID corresponding to the project ID, template page ID, template detail ID, template detail variation ID, quotation unit price, quantity.

The upload pattern master 177 is a database which automatically assigns a material number to each of the materials (for example, image data such as a logo, a picture, etc., and text data such as a catchword, etc.) that have been uploaded from the customer terminal unit 300 to the Web page creation support server 100 corresponding to the template information, and controls them. This upload pattern master 177 performs controlling by having references to upload pattern ID which is assigned to each template detail master 156 shown in FIG. 9 and a specific material No. assigned to each raw material, a raw material name, and a data section.

An upload database 179 controls the physical files of each type of the materials (for example, image data such as a logo, a picture, etc., and text data such as a catchword, etc.) that have been uploaded from the customer terminal unit 300 to the Web page creation support server 100 by the specific material No. assigned to each raw material at uploading time in the project which is currently under construction. With the upload database 179, the upload pattern master 177 can identify the physical file of the material corresponding to a material No. With the upload pattern master 177 and the upload database 179, the control is performed such that a physical file of the material to be inserted into the item content, which is identified by the template detail master 156, is specified.

The status change log 178 is a database to record and manage the history in a log when the status of the job room is changed in the course of the Web page creation job. The actions of the status change includes, for example, uploading the information about Web contents from the customer terminal unit 300, and uploading a Web page draft by the creator terminal unit 400.

(1-2-9) Creator Information Database 180

Next, with reference to FIG. 12, the structure of the creator information database 180 will be described. The creator information database 180 stores and manages various information about creator terminal units 400 who actually create Web pages. Once a creator 400 performs creator registration in the creator information database 180 as one of the staff of the Web page creation support system according to the present embodiment, then he/she can contract to work on various aspects of the projects requested from the Web page creation support system.

The information registered in the creator information database 180 is, as shown in FIG. 12, the creator ID, user name, password, name, home address, telephone number, FAX number, e-mail address, and in addition, work history of an operator who handles the creator terminal unit 400, and using software and so on.

The creator information database 180 obtained in this way is utilized and is linked with other databases and computer systems in various situations of the Web page creation support system according to the present embodiment.

(1-2-10) Other Databases 185

Moreover, a Web page creation support server 100 can have the other databases 185. The other databases 185 can have several variations depending on the configuration of the Web page creation support system. For example, a database can control the Web page URLs actually created at the site operated by the Web page creation support server 100, or store and control the maintenance history of the created Web pages.

(1-3) Customer Terminal Unit 300

As already described, a "customer terminal unit" 300 is a special concept in this specification. The customer terminal unit 300 is defined as a client having authorization to receive a web page creation support service by accessing the Web page creation support server 100 via a network 200. Therefore, in general, it is a computer having the functions as a client, namely, communications function and browsing function. However, it also includes household electric appliances and mobile terminal devices.

The clients who can access a Web page creation site operated by the Web page creation support server 100 according to the present embodiment are potential customer terminal units 300. Among the clients that have accessed a Web page creation site, the clients who have registered in the customer information database 160 can receive, as a customer terminal unit 300, the Web page creation support service according to the present embodiment.

(1-4) Creator Terminal Unit 400

As already described, a "creator terminal unit" 400 is also a special concept in this specification. A creator terminal unit 400 is defined as a sub-server connected with a Web page creation support server 100 via a network 250, which actually creates Web pages requested from the customer terminal unit 300, and provides services to deliver them to the customer terminal unit 300 via the Web page creation support server 100. Therefore, in general, it is a computer having the functions such as communications function, HTML editing function to create Web pages, and creating and editing function for various image files.

As in the case of customer terminal unit 300, the clients who can access a Web page creation site operated by the Web page creation support server 100 according to the present embodiment are potential creator terminal units 400. Among the clients that have accessed a Web page creation site, the clients who are permitted to register as a creator terminal unit 400 in the creator information database 180 can be managed thereafter, in the Web page creation support server 100, as a member of the staff who provides services of the Web page creation support system according to the present embodiment.

(1-5) Credit Server 500

As shown in FIG. 5, the credit server 500 is a computer system capable of performing credit processing in linkage with the credit processing part 120 of the Web page creation support server 100 via a network 260. The credit server 500 includes the processing part comprising the credit inquiry receiving part 510, credit inquiry part 520, credit result reporting part 530, and so on, and the credit database 540 in which credit information is stored.

The credit inquiry receiving part 510 of the credit server 500 receives credit inquiry of a specific customer terminal unit 300 from the credit processing part 120 of the Web page creation support server 100 via the Internet 260. Then the credit inquiry part 520 accesses the credit database 540 to execute credit searches of the ability of the customer terminal unit 300 to pay. The result is reported from the credit result reporting part 530 to the credit processing part 120 of the Web page creation support server 100 via the Internet 260.

As described already, the Web page creation support server 100 decides whether or not to actually proceed with Web page creation job of the customer terminal unit 300 from which temporary order is received on the basis of the credit result obtained via the credit processing part 120. If the credit result is affirmative, actual order processing is usually performed for the temporary order in the actual ordering part 118 of the order processing part 110. If the credit result is negative, further study is carried out to determine whether or not to receive order of a Web page creation request from the customer terminal unit 300, and if the final judgement is negative, a notice of rejection is sent to the customer terminal unit 300.

In this regard, in the example illustrated in the figure, the credit server 500 is configured separately from the Web page creation support server 100, but it is needless to say that they can, of course, be deployed on the same server. Also, in the above example, the credit database 540 is located on the credit server 500, but it is needless to say that the credit database 540 can be configured as a separate database server as well.

(1-6) Option Service Providing Server 280

As shown in FIG. 4, the option service providing server is a computer machine having communications function to provide various necessary option services in order to operate Web pages on the Internet in cooperation with the option service processing part 119 of the order processing part 110 of the Web page creation support server 100.

The option services, as shown in FIG. 4, includes, for example, the hosting service provided by the hosting service providing server 285 and the electronic-commerce service provided by the electronic-commerce service providing server 290. Here, the hosting service includes various services supporting the operations of the server for providing the Internet services such as a file server and a mail server on the Internet. Also, the electronic-commerce service includes various services supporting the distribution of products and services using the Internet such as a shopping basket service, a distribution service, and a charge collection service.

In the case where, the customer terminal unit 300 requests to create or update a Web page and, at the same time, obtains a domain of the Web page or needs space for storing the Web page, the necessary services can be received by being guided and accessing the hosting service providing server 285 via a network 270 through the intermediation of the option service processing part 119. Also, in the case where, the customer terminal unit 300 requests to create or update a Web page and, at the same time, shopping basket service, distribution service, charge collection service, and so on are necessary in order to sell the products displayed on that Web page, the necessary services can be received by being guided and accessing the electronic-commerce service providing server 290 via a network 270 through the intermediation of the option service processing part 119.

In this regard, in the example shown in FIG. 4, the Web page creation support server 100 and the option service server 280 are configured to be different servers. However, it is needless to say that the Web page creation support server 100 and the option service providing server 280 can be configured to share all functions or a part of the functions of the same machine.

(2) Process Flow of Web Page Creation Support Service

Next, description will be given, with reference to the accompanying drawings, of the process flow of the above-created Web page creation support system comprising the Web page creation support server 100, network 200, customer terminal unit 300, creator terminal unit 400, credit server 500 and so on.

(2-1) General Process Flow of Web Page Creation Support Service

Figure 13:
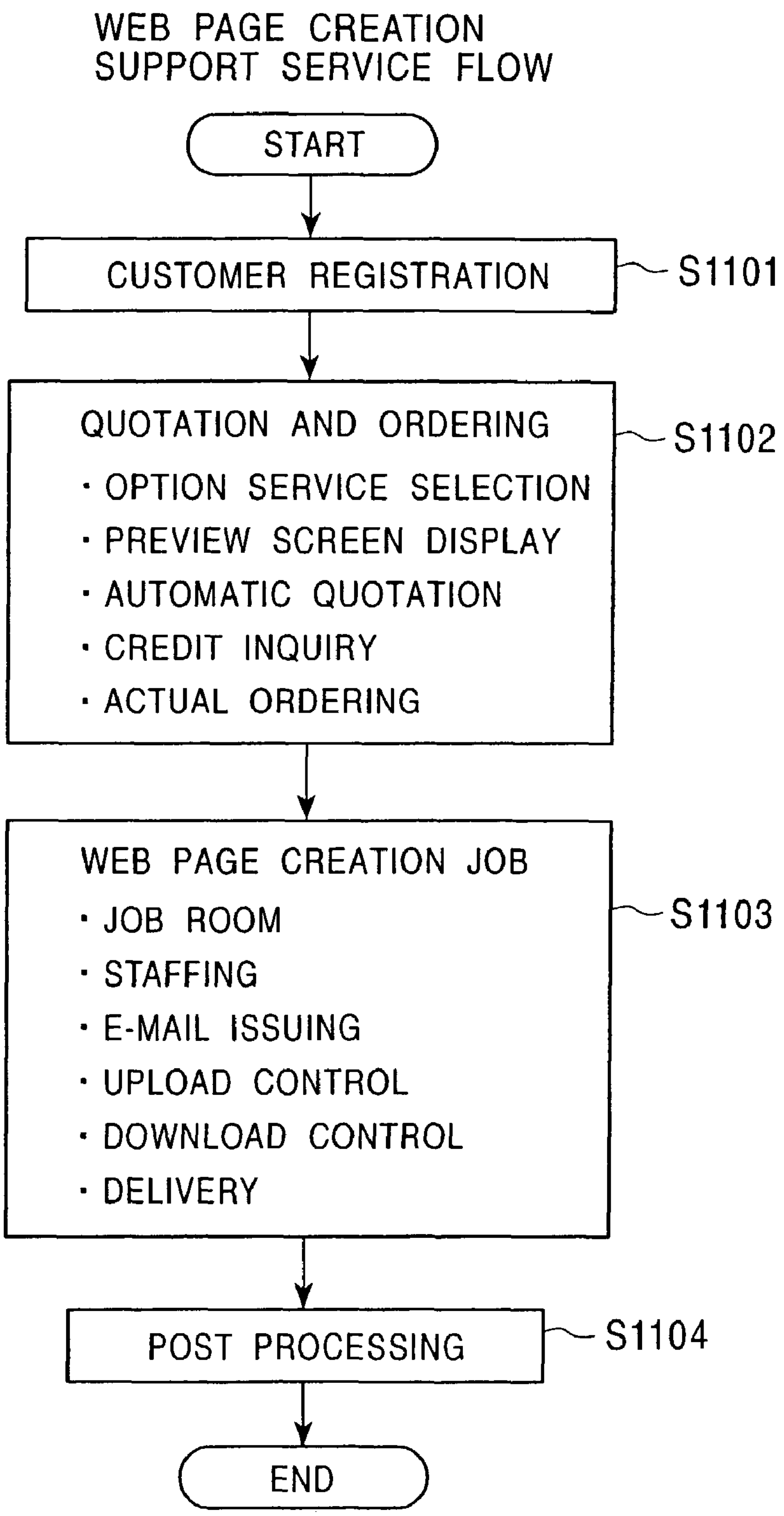
FIG. 13 is a flowchart illustrating the flow of the Web page creation support service processing in a Web page creation support system according to an embodiment of the present invention.

Now, with reference to FIG. 13, the description of the general process flow of Web page creation support system according to the present invention will be given.

First, in order for a client accessing the site operated by the present system to use the Web page creation support service using the present system, the client needs to have completed customer registration, and have been authenticated as a customer terminal unit 300 (S1101). A client can use the quotation service of the desired Web pages while referencing a preview screen by having customer registration as a customer terminal unit 300 (S1102).

In this quotation and ordering flow (S1102), the distinguished processing, as described below, are an option service selection flow, a preview screen display flow, an automatic quotation flow, a credit inquiry flow, an actual ordering flow, and so on.

First, the customer terminal unit 300 selects whether or not he/she uses the option services in addition to the Web page creation support service provided by the present system. Next, the customer terminal unit 300 refers to the preview screen by registering predetermined template information, and receives a quotation based on the selected option services and the template information. Further, when the customer terminal unit 300 is satisfied with the quotation, and makes a Web page creation request to the Web page creation support system according to the present embodiment, the temporary order processing is performed first. In this regard, in the present embodiment, the option service selection flow is structured to be performed first, however, it is needless to say that the option service selection flow can be performed at any timing of a series of the quotation ordering flow, for example, in the middle of, or at the end of the quotation ordering flow.

Furthermore, the distinguished point in the present system is that after receiving temporary order and before receiving the actual order of the Web page creation job, the Web page creation support server 100 performs the credit search such as the ability of the customer terminal unit 300, who is the requester, to pay. In such a way, since the Web page creation job is performed after performing the credit inquiry processing, the situation wherein the collection of the Web page creation fails is avoided in advance, thereby making it possible to keep the business stable.

If the credit result is affirmative, the actual order of the Web page creation request from the customer terminal unit 300 is received, and the process proceeds to the Web page creation job (S1103). The Web page creation job (S1103) is started by setting up a job room which controls the progress status. Another distinguished point of the present system is building a virtual control space called the "job room", and controlling the progress status of the Web page creation.

By relaying various information such as Web contents between the customer terminal unit 300 and creator terminal unit 400, through such job room, the Web page creation job can proceed smoothly without needless worry and stress to both the customer terminal unit 300 and creator terminal unit 400.

Also one schedule of the Web page creation job, the schedule can be controlled for every job room so that the schedule is controlled efficiently. Moreover, if the below-described automatic e-mail-issuing system is used, flexible responses can be made to schedule delay and so on.

Further, in the present system, in order for the Web page creation job to proceed smoothly, staffing processing is performed for selecting the creator terminal unit 400 who matches with a order requirement of a customer terminal unit 300 and contracting the Web page creation.

This staffing processing can be executed at various times depending on the system configuration. For example, in the middle of the quotation and ordering flow, by permitting the customer terminal unit 300 to view the group of works composed by the creator terminal unit 400 in the past, the customer terminal unit 300 can select the creator terminal unit 400 to meet his/her preferences. Alternatively, after setting up a job room, by matching (staffing) the ordering requirement from the customer terminal unit 300 and the order receiving condition of the creator terminal unit 400, the Web page creation job can be configured to proceed.

In this regard, for staffing, the creator information database needs to be built in advance. Details of the creator registration flow for building the creator information database will be described.

In such a way, a job room is set up, and after the creator terminal unit 400 who contracts to create the Web page corresponding to the job room is decided, the Web page creation job will proceed. The Web page creation job proceeds by repeating uploading and downloading of the Web page contents. And a series of Web page creation job will complete when delivering a Web page draft which satisfies the customer terminal unit 300.

Afterward, post processing (S1104) such as the closing processing of the job room, invoicing and collection processing of the Web page creation cost to the customer terminal unit 300, payment processing of the Web page creation to the creator terminal unit 400 is performed.

The above is the overview of the Web page creation job. Next, details about each work flow of the Web page creation job will be given.

(2-2) Creator Registration Flow

Figure 14:
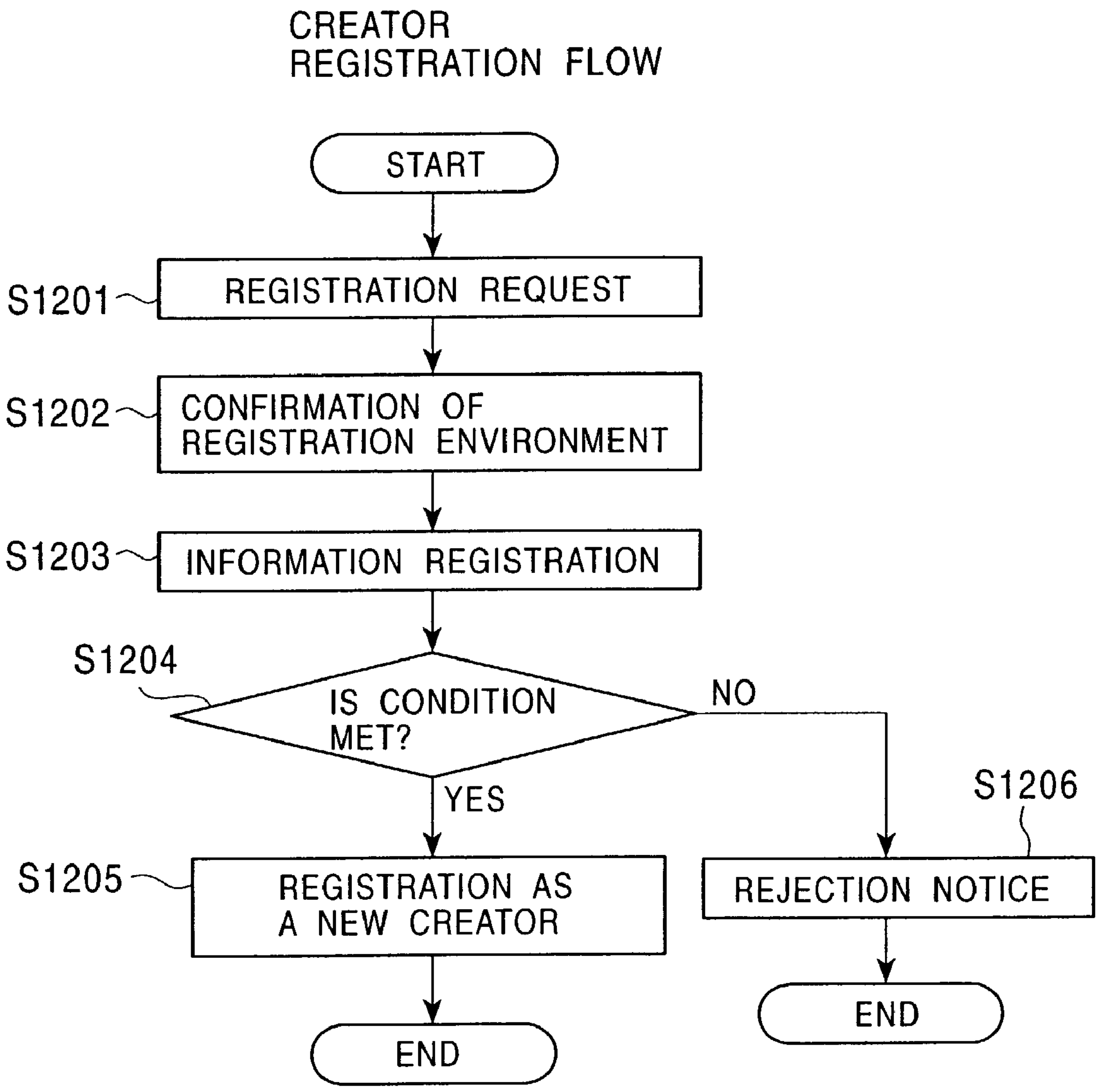
FIG. 14 is a flowchart illustrating the flow of the creator information registration in a Web page creation support system according to an embodiment of the present invention.

Before describing the process flow of the Web page creation service which is the main work flow of the present system, description will be first given, with reference to FIG. 14, of building the creator information database to function the present system.

In order to succeed in the business of the Web page creation service according to the present embodiment, it is essential to have not only enriched functions of the Web page creation support server 100 to set up a site attracting users, but also to ensure enough creator terminal units 400 both in quality and quantity who will actually contract the Web page creation work.

FIG. 14 shows overview of the creator registration flow. As shown in the figure, if any client accessing the Web page creation support server 100 requests to register himself/herself as a creator (S1201), the Web page creation support server 100 confirms the registration environment (S1202) using the Web technology such as CGI (Common Gate Interface).

When the registration environment is arranged, the Web page creation support server 100 permits the registration of the client who has accessed the server. The client enters the registration items illustrated as an example of the creator information database as shown in FIG. 10, and sends the data (S1203).

The Web page creation support server 100 decides whether or not the data sent from a client meets a predetermined requirement, and the client has a skill as a creator terminal unit 400 (S1204). The decision may be made based only on the data sent by the Web page creation support server 100 on a real-time basis, or it may be made by performing a credit inquiry of the client which has accessed the credit server, and deciding based on the credit result.

When the Web page creation support server 100 has authorized an accessing client as a new creator terminal unit 400, the creator terminal unit 400 is registered in the creator information database 180, and from the e-mail issuing part 135 of the project control part 130, the creator ID, password and so on are sent (S1205).

The registered client is authenticated as a creator terminal unit 400, and if the ordering requirements of a customer terminal unit 300 is met, the Web page creation job is requested. If the result of the decision is a rejection, the e-mail issuing part 135 issues the rejection notice to the client who has requested for creator registration (S1205).

(2-3) Customer Registration Flow

Figure 15:
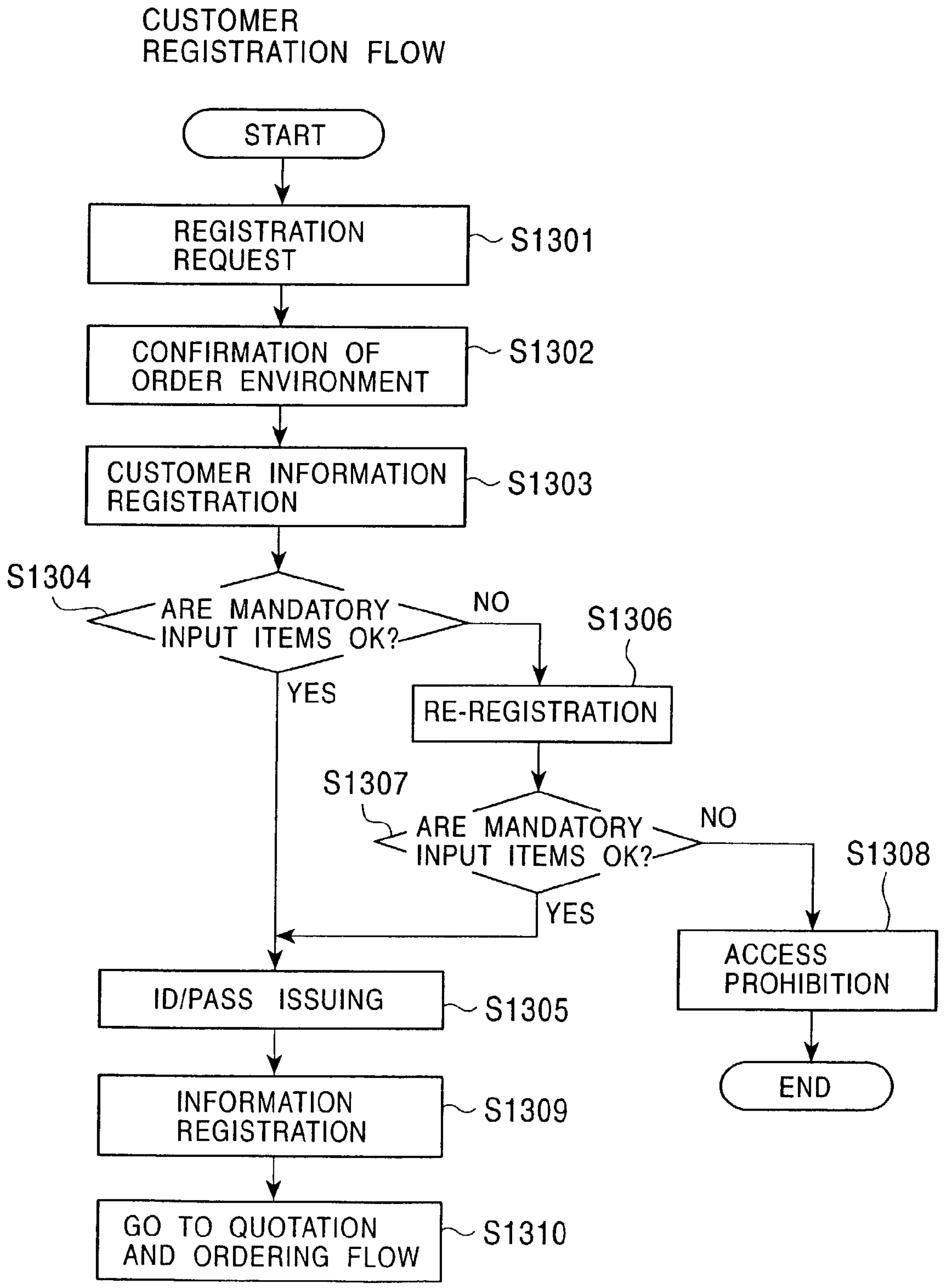
FIG. 15 is a flowchart illustrating the flow of the customer information registration in a Web page creation support system according to an embodiment of the present invention.

Next, with reference to FIG. 15, the customer registration flow will be described. In order for any client who accesses a site operated by the Web page creation support server 100 to receive the services provided with the Web page creation support service such as quotation of a Web page creation, the client needs to be registered in the customer information database as a customer terminal unit 300.

When a customer registration request is made to the Web page creation support server 100 from a client having accessed the server (S1301), the Web page creation support server 100 confirms the ordering environment at first using the CGI technology and so on (S1302). And if the ordering environment is set up, registration of customer information is permitted. The client enters, into the customer information registration screen displayed on the display unit, mandatory items (primary customer information) such as a name, e-mail address and so on, and then sends it to the Web page creation support server 100 (S1303).

When the Web page creation support server 100 confirms entering the mandatory items (S1304), the Web page creation support server 100 registers the customer information in the customer information database 160 (S1309). The registered client is permitted to login to use the services, and as a customer terminal unit 300, the client can receive the services such as displaying preview screens, and free quotation services (S1310). In this regard, the system may be configured such that, from the e-mail issuing part e-mail issuing part 135, the authenticated customer terminal unit 300 is notified by e-mail of the login ID and password to receive displaying preview screens and free quotation service (S1305).

However, when the server does not confirm entering the mandatory items, the client is prompted to enter the mandatory items (S1306). If entering of the mandatory items is complete (S1307), the client is registered as a customer terminal unit 300, but if the mandatory items are not entered, a message is displayed on the client display, the customer is not allowed access to the further services provided (S1308).

In this regard, in the present embodiment, customer registration is a prerequisite for receiving the preview screen display and quotation service. However, it is needless to say that customer registration does not have to be requested at this time, but at any time depending on the system configuration. For example, it is possible to configure the system to request registration of customer information for the first time after displaying the preview screen and providing quotation service at the time of temporary ordering.

(2-4) Quotation and Ordering Flow

Next, with reference to FIGS. 16 and 17, description will be given to the quotation and ordering flow which provides displaying preview screen and free quotation service for the customer terminal unit 300 who has completed customer registration.

(2-4-1) Order Placing Login (S1401)

In order for the customer terminal unit 300 to receive displaying preview screen and free quotation service, it is necessary to login to the service providing page using the ID and password that have been issued beforehand (S1401).

(2-4-2) Option Service Selection (S1402)

When the Web page creation support server 100 has authenticated the login of the customer terminal unit 300, first, selection of option services is performed (S1402). This option service is the flow for separating the customer terminal unit 300 depending on whether a hosting service or an electronic commerce service is used in addition to the Web page creation support service.

A description will be given of the option service selection flow with reference to FIGS. 18 to 25. In this regard, in the present embodiment, for options which can be selected, a hosting service and an electronic commerce service are exemplified, however, it is needless to say that the present invention is not limited to this examples, and can be configured to have other option services for selection.

Figure 18:
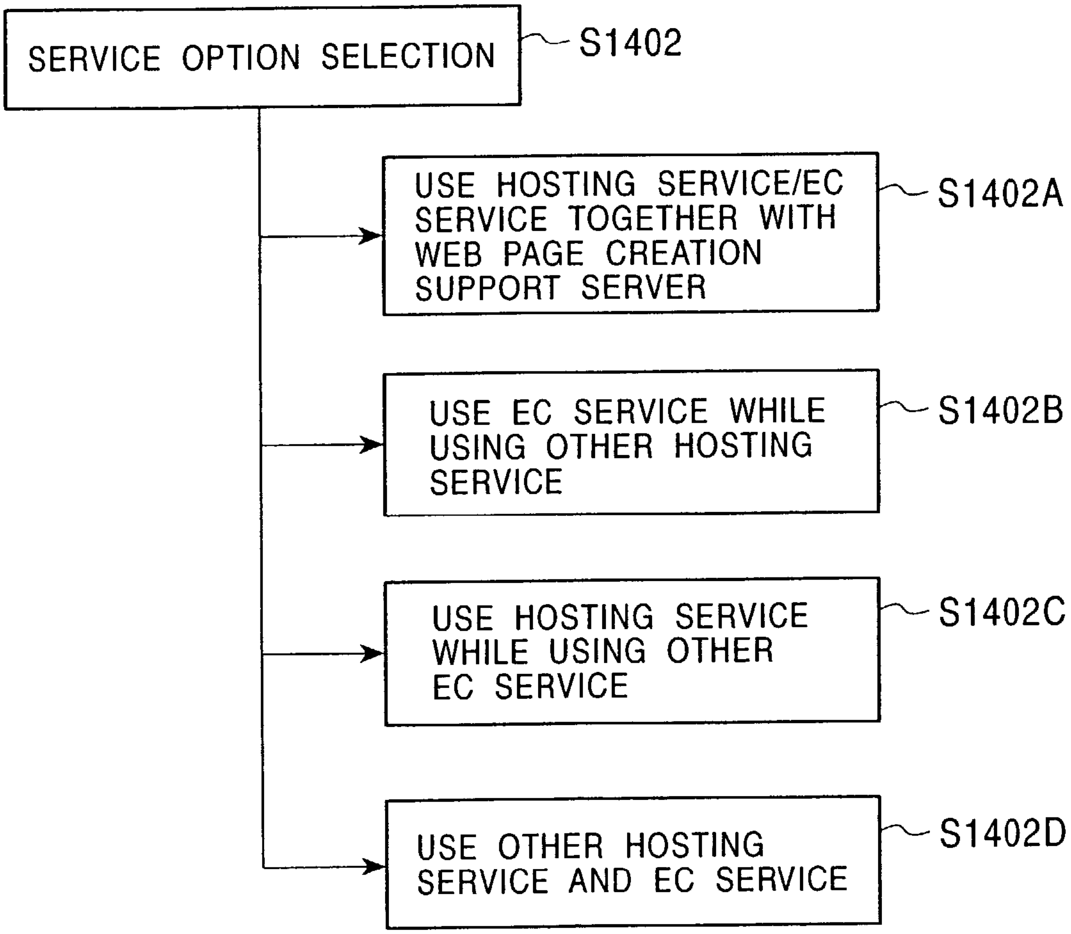
FIG. 18 is a flowchart illustrating the flow of the option service selection in a Web page creation support system according to an embodiment of the present invention.

In the option service in the present invention, as shown in FIG. 18, two options, that is, a hosting service and an electronic commerce service are provided. The customer terminal unit 300 can select the option suited to his/her own environment together with the Web page creation support service according to the present embodiment by selection one of the following: the case of using both the hosting service and the electronic commerce service (S1402A); the case of using another service for a hosting service, but using the electronic commerce service provided by this system (S1402B); the case of the case of using another service for an electronic commerce service, but using the hosting service provided by this system (S1402C), the case of using another service for both a hosting service and an electronic commerce service, but using only the Web page creation support service of the present system (S1404D).

Figure 19:
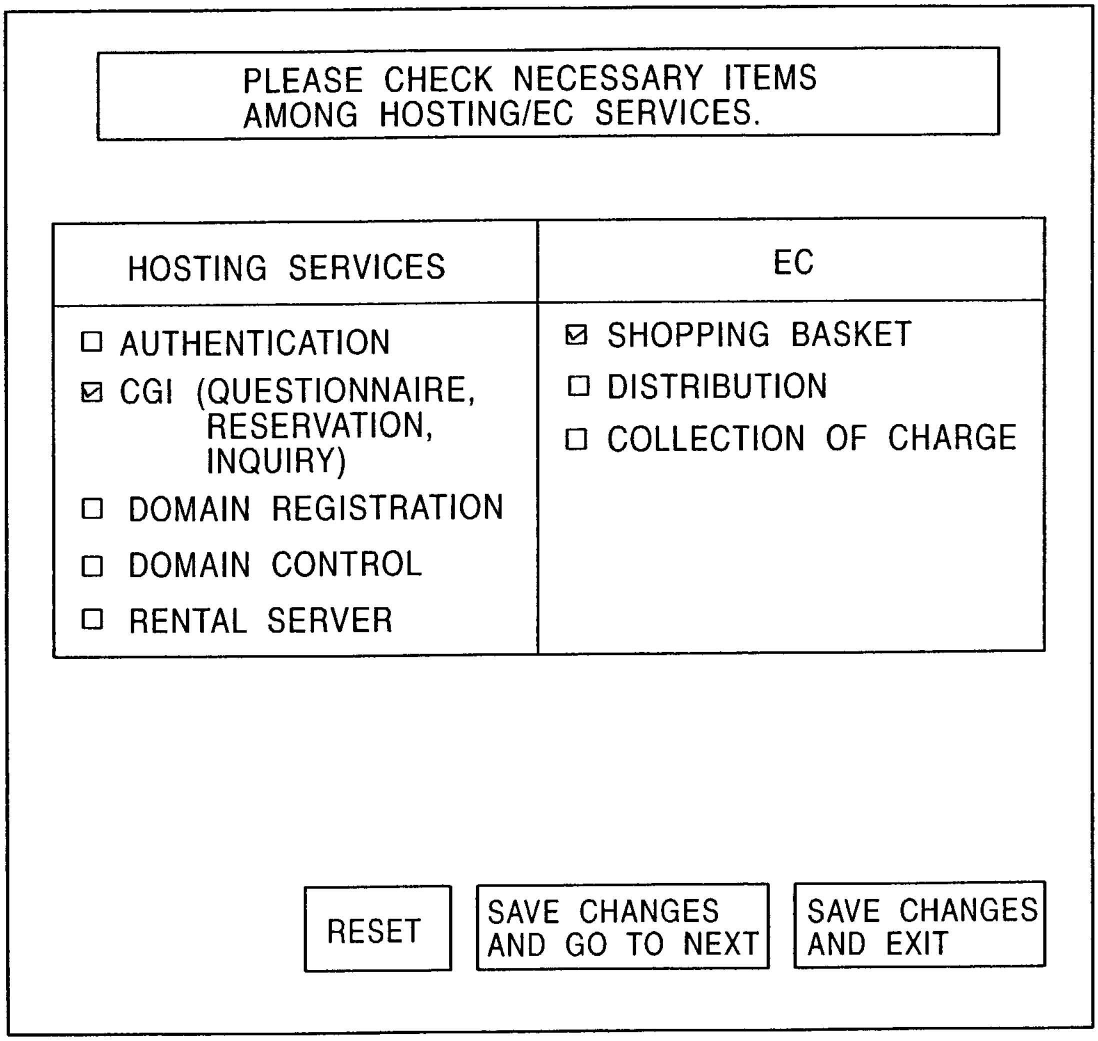
FIG. 19 is an illustration showing the screen structure example of the option service selection in a Web page creation support system according to an embodiment of the present invention.

FIG. 19 shows an example of the option service selection screen of the case where together with the Web page creation support service, the hosting service and the electronic commerce service are used (S1402A). As shown in the figure, for hosting service, besides ordinary server services, authentication, CGI (questionnaire, reservation, and inquiries), domain registration, and domain control are provided. For electronic commerce service, shopping basket (or shopping cart), distribution, and charge collection are provided. The customer terminal unit 300 can select necessary option services for his/her own Web page, confirm by the preview screen, and then place the order.

Figure 20:
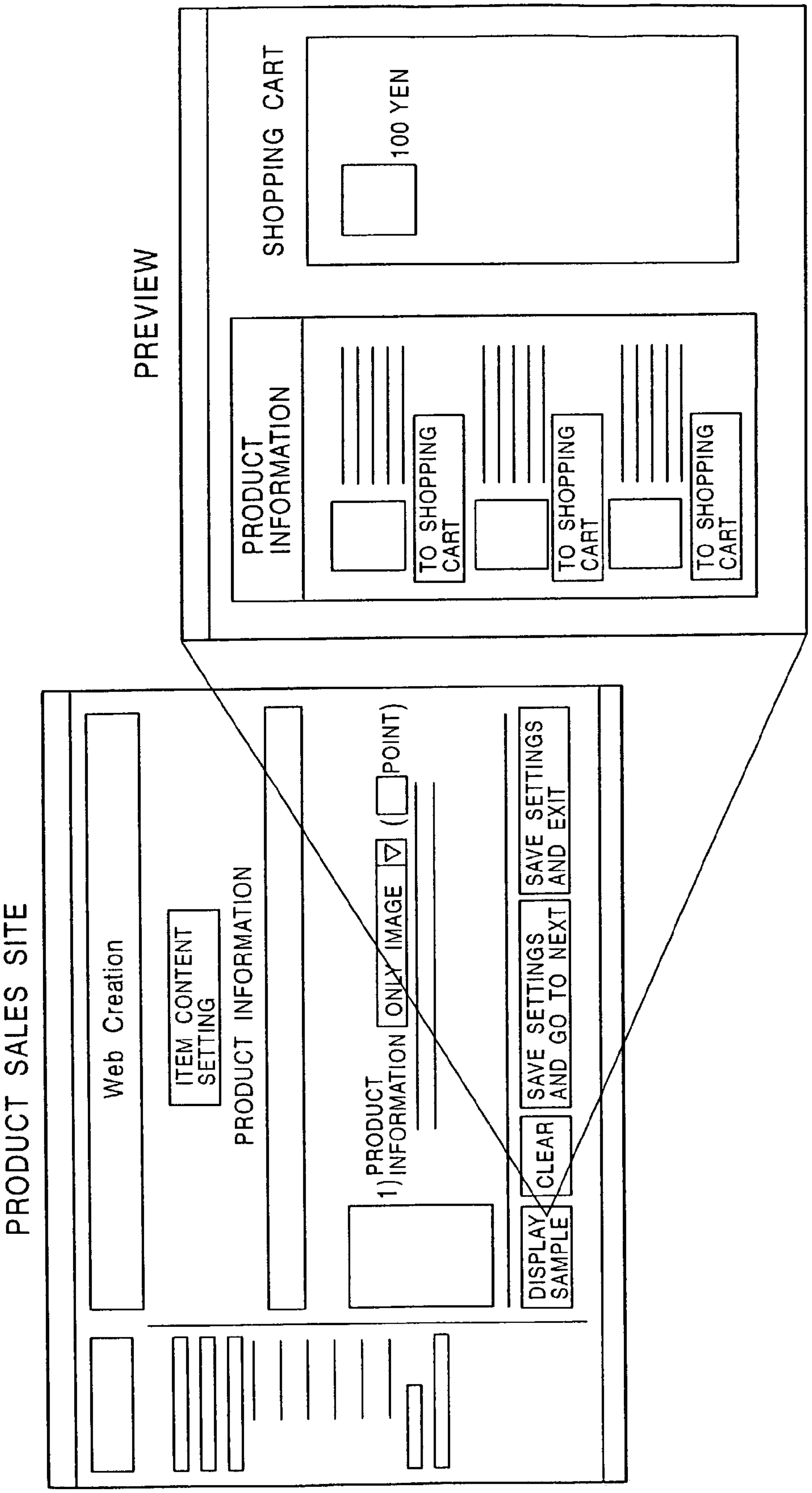
FIG. 20 is an illustration showing the screen structure example of the option service selection in a Web page creation support system according to an embodiment of the present invention.

FIG. 20 shows an example of the case where the customer terminal unit 300 uses the Web page creation support service according to the present invention, and further as an option service, selects a shopping basket service in order to set up a product sales site. As shown in the figure, when selecting a shopping basket service, as a preview screen, a screen on which the product information and shopping basket are linked is displayed.

Figure 21:
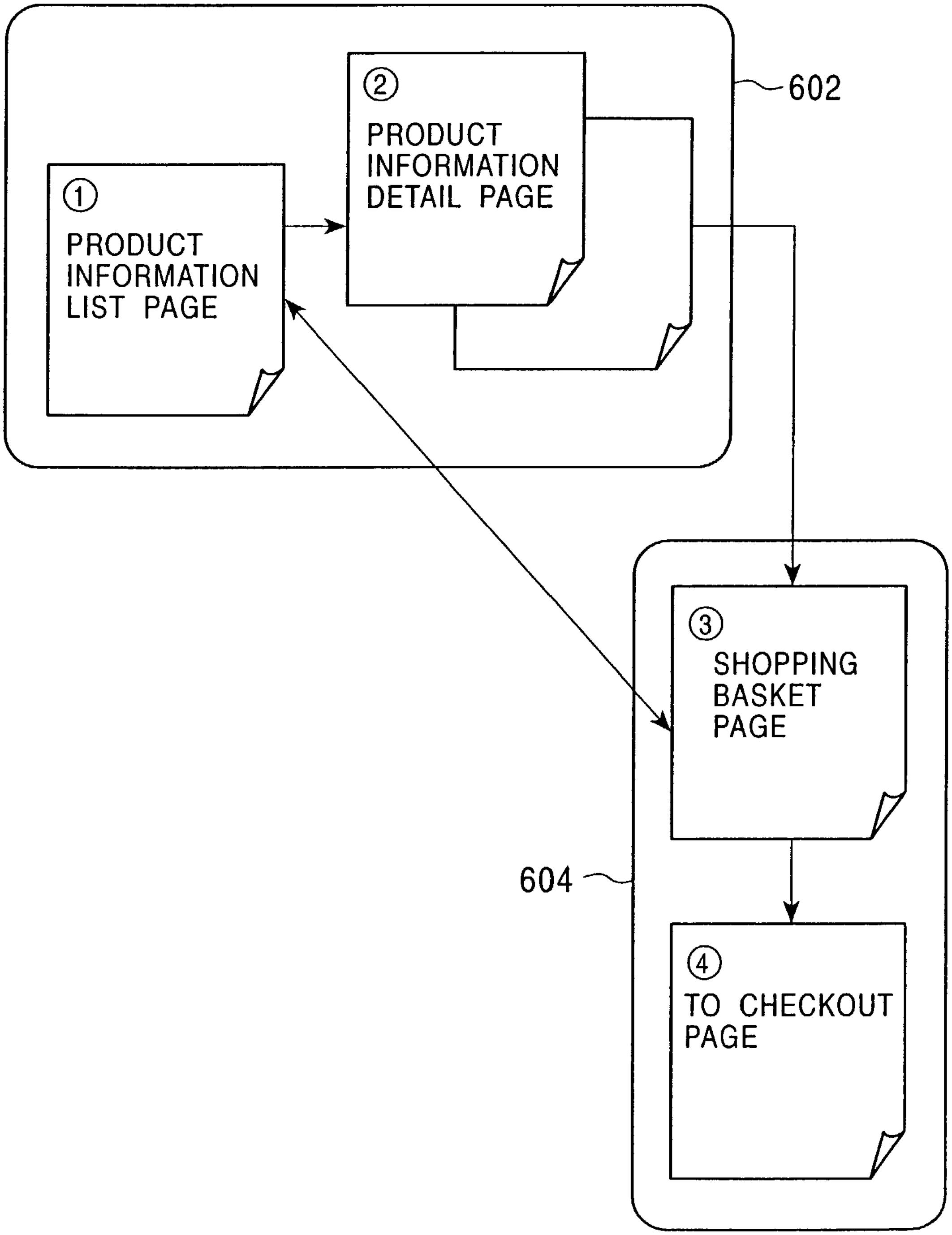
FIG. 21 is an illustration showing the screen structure example of the option service selection in a Web page creation support system according to an embodiment of the present invention.

FIG. 21 further shows the relationship between the product information page and the electronic commerce service when creating an electronic-commerce enabled product information page. As shown in the figure, a group of pages 602 which is created by the Web page creation support service of the present embodiment include a product information list page (1) and a product information detail page (2). At the same time, a group of pages 604 which is created by the option service providing system include a shopping basket page (3) and a checkout page (4). In the example shown in the figure, the product information list page (1) and the product information detail page (2) are configured to be linked with the shopping basket page (3).

Figure 22:
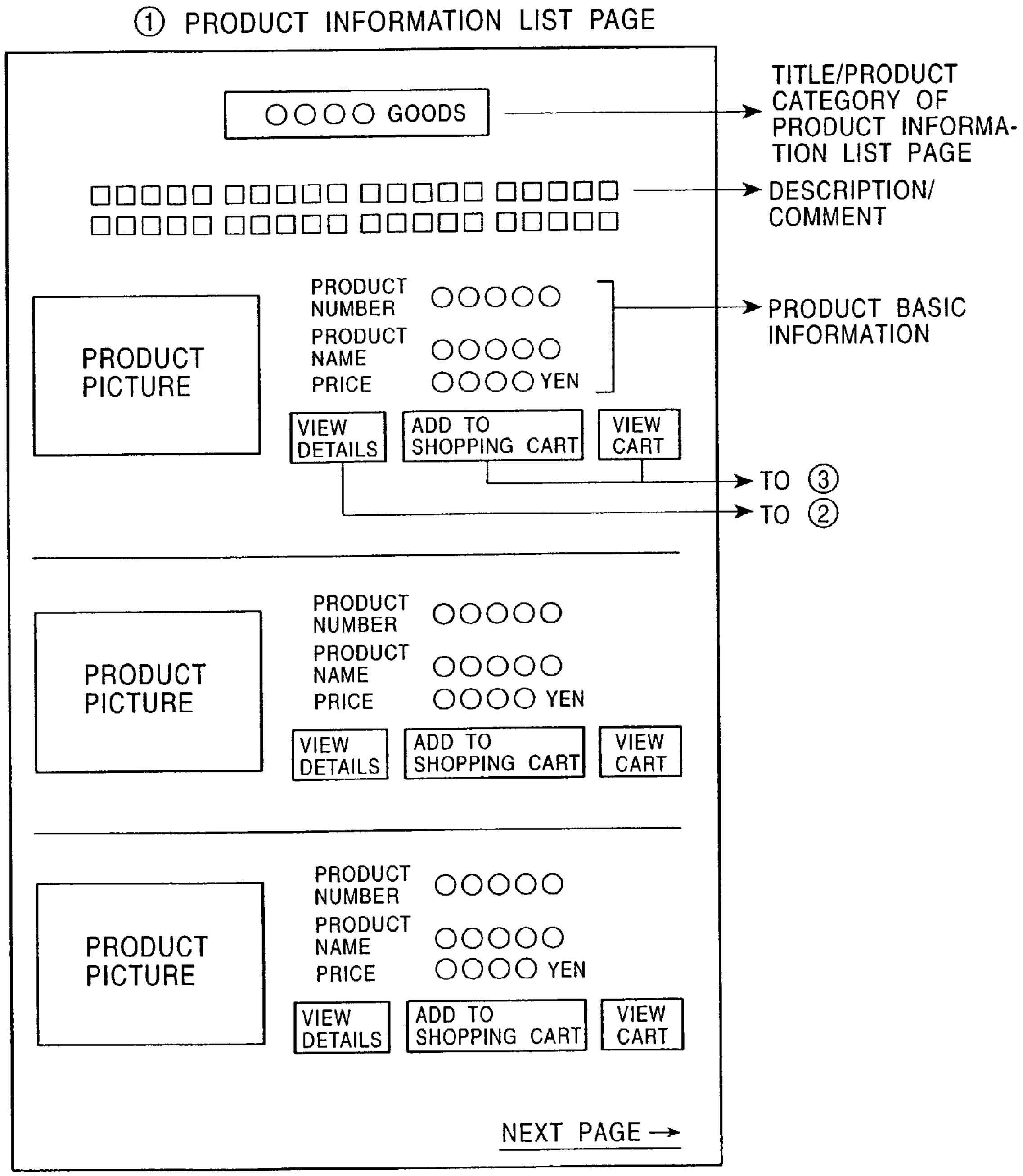
FIG. 22 is an illustration showing the screen structure example of the option service selection in a Web page creation support system according to an embodiment of the present invention.

FIG. 22 shows an example of the product information list page (1). On this page, a list of the products is shown in addition to a title of the product page or a product category, a product description, and a comment. Further, in each product section, a "view details" button which is linked to the product information detail page (2), an "add to shopping cart" button which is linked with the shopping basket page (3), and a "view cart" button are disposed.

Figure 23:
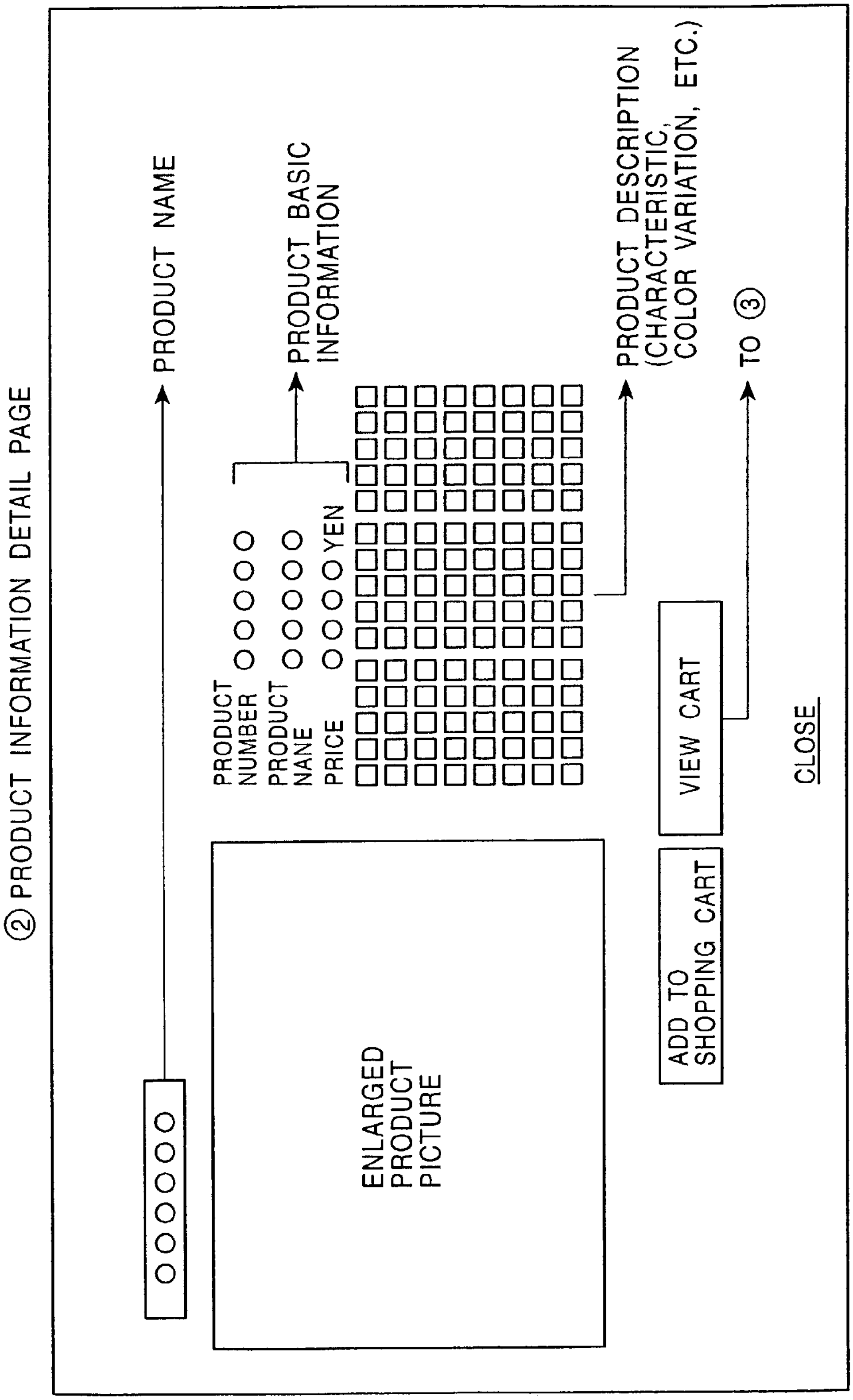
FIG. 23 is an illustration showing the screen structure example of the option service selection in a Web page creation support system according to an embodiment of the present invention.

FIG. 23 shows an example of the product information detail page (2) which is displayed when pressing the "view details" button on the product information list page (1) shown in FIG. 22. On this page, the product name is displayed as a title, and a product description section regarding a product characteristic, a color, and a type are shown in addition to product basic information such as an enlarged picture of the product, a product number, a product name, a price, and so on are shown. Further, on the product information detail page (2), an "add to shopping cart" button which is linked with the shopping basket page (3), and a "view cart" are disposed.

FIG. 24 shows an example of the shopping basket page (3) which is displayed when pressing the "add to shopping cart" button and the "view cart" button in FIG. 21 or 22. As shown in the figure, the page has a structure including for order content, a product number, a product name, a price, a quantity, a sub-total, and etc., and a purchase amount ground total which includes a consumption tax and a shipping charge. Further, on the shopping basket page (3), the "checkout" button liking to the checkout page (4) and the "continue shopping" button linking to the product information list page (1) are individually disposed.

In FIG. 25, an example is shown of the checkout page (4) which is displayed when the "checkout" button is pressed in the screen shown in FIG. 24. On this page, a registration screen of the information regarding a purchaser, a registration screen of the information regarding a contact place, and a selection screen regarding the payment method are displayed. The customer terminal unit 300 can purchase the selected products by registering necessary information. In this regard, the information entered on this page is transmitted by SSL encrypted communication, thus security regarding the information of the input person is ensured. Also, on the checkout page (4), the "next" button which continues the checkout processing and the "return" button which returns to the shopping basket page (3) are disposed.

In the above, with reference to FIGS. 18 to 25, a description has been given of the option service selection flow of the in the Web page creation support system according to the present embodiment. This option service selection flow is not necessary performed after logging in as described above, and it does not matter at what timing the option service selection flow is performed in the ordering and quotation processing flow. Also, for option services which are linked with the main service, that is, the Web page creation support service, it is needless to say that they are not limited to a hosting service and an electronic-commerce service.

(2-4-3) Template Information Registration Flow (S1403)

When the customer terminal unit 300 has completed selection of necessary option services, then the customer terminal unit 300 is required to register the template information is requested (S1403). The template information is the necessary information for the customer terminal unit 300 to display a preview screen so as to grasp a visual image of the desired Web page, and to perform automatic quotation.

As already described, the template information includes: (1) design selection, (2) item selection, and (3) item content selection.

(1) In design selection, a frame image of a Web page is selected. The customer terminal unit 300 can select a general preference on the basis of the information stored in the template master 152 of the template information database 150, the overall image of a Web page, for example, "cool atmosphere", "warm atmosphere", "pastel atmosphere", and "heavy metallic atmosphere".

(2) In item selection, the page items to be placed as the template pages are selected using the selected frame image. The customer terminal unit 300 selects on the basis of the information stored in the template page master 154 of the template information database 150, items to be placed on the Web pages, for example, on the top page, on the company overview page, on the recruiting staff page, and on the product information page.

(3) In item contents selection, items to be placed on the selected template page are selected. The customer terminal unit 300 selects specific item contents selected based on the template page master 154, for example, in the case of a top page, company logo, company name, main image, catchword, and so on.

(2-4-4) Preview Process Flow (S1404)

When the customer terminal unit 300 selects template information in the step S1403, he/she can view a preview screen as necessary (S1404). And by making reference to a preview screen, the customer terminal unit 300 can visualize his/her own Web page. Then, if the preview is not in accordance with his/her preferences, template information can be selected once again.

Figure 26:
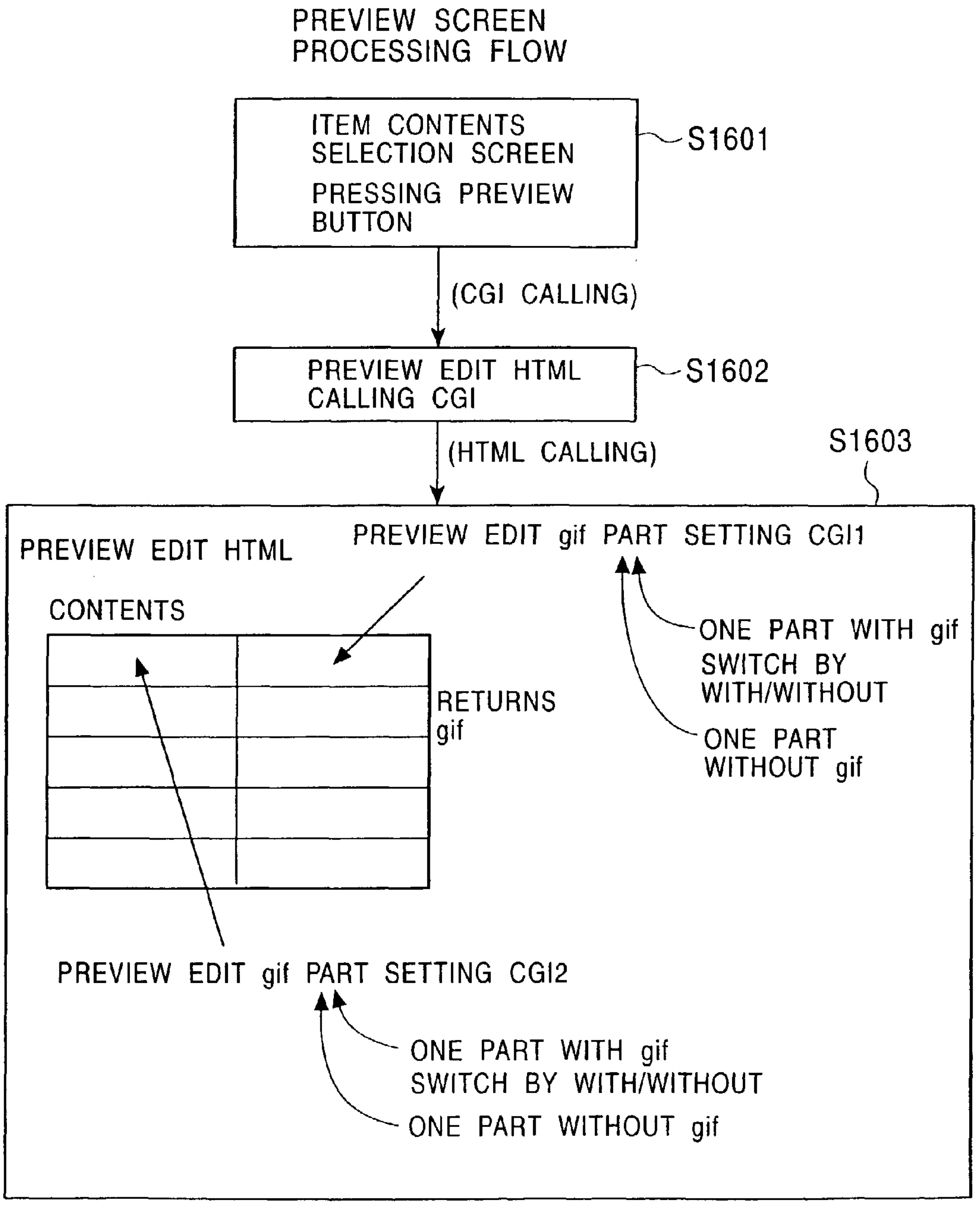
FIG. 26 is a flowchart illustrating the flow of the preview screen processing in a Web page creation support system according to an embodiment of the present invention.

FIG. 26 shows an example of preview screen processing. When the preview button is pressed in the item contents selection screen (S1601), the CGI for calling a preview editing HTML is called (S1602). The preview editing HTML can read an image file in a predetermined format, for example, the gif format, and create a preview screen (S1603) to be displayed on the display of the customer terminal unit 300.

Figure 16:
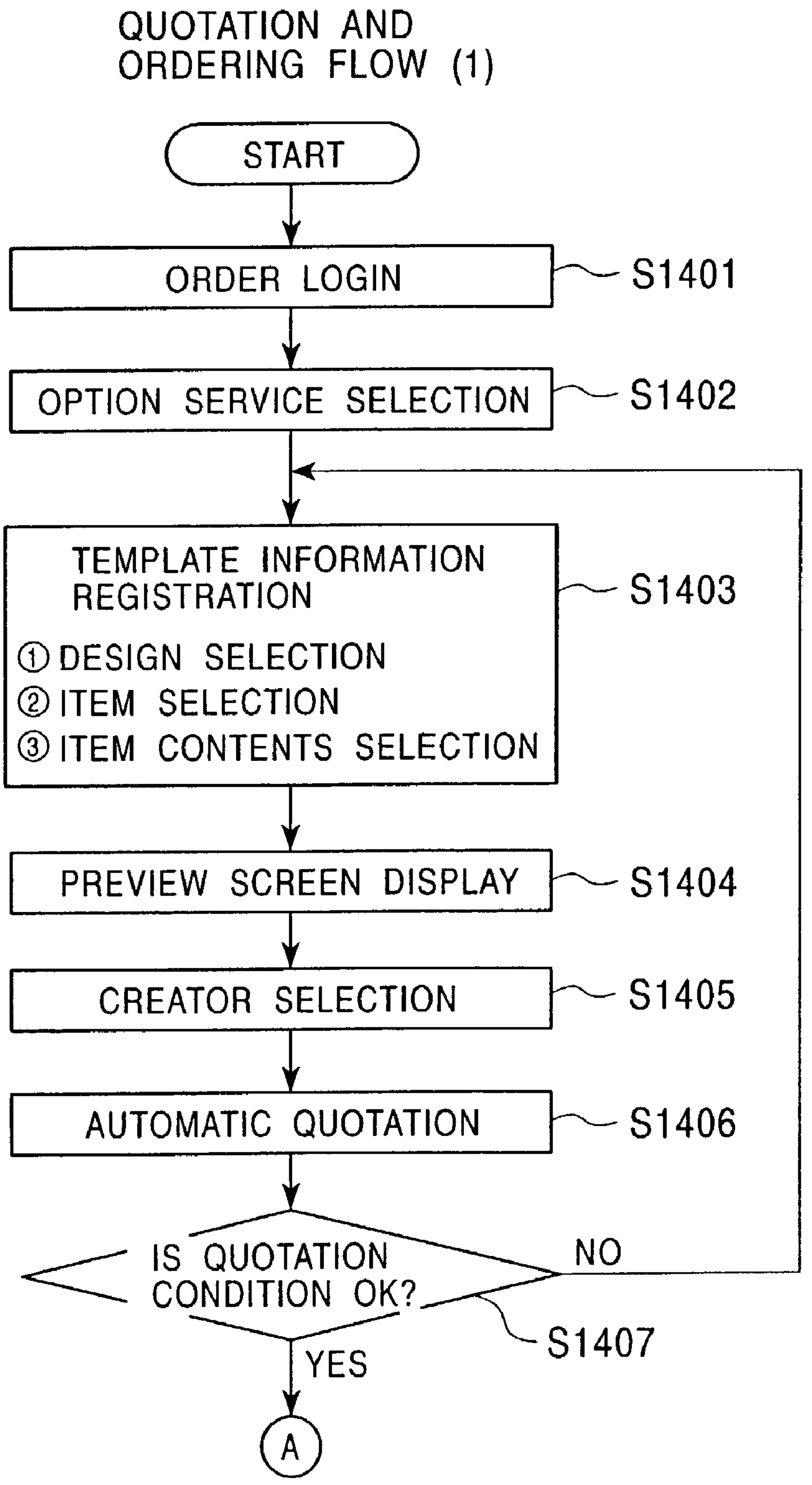
FIG. 16 is a flowchart illustrating the flow of the quotation and ordering processing in a Web page creation support system according to an embodiment of the present invention.

FIGS. 27 to 30 show concrete examples of the preview images which are displayed by the preview screen display processing (S1404) as shown in FIG. 16.

Figure 27:
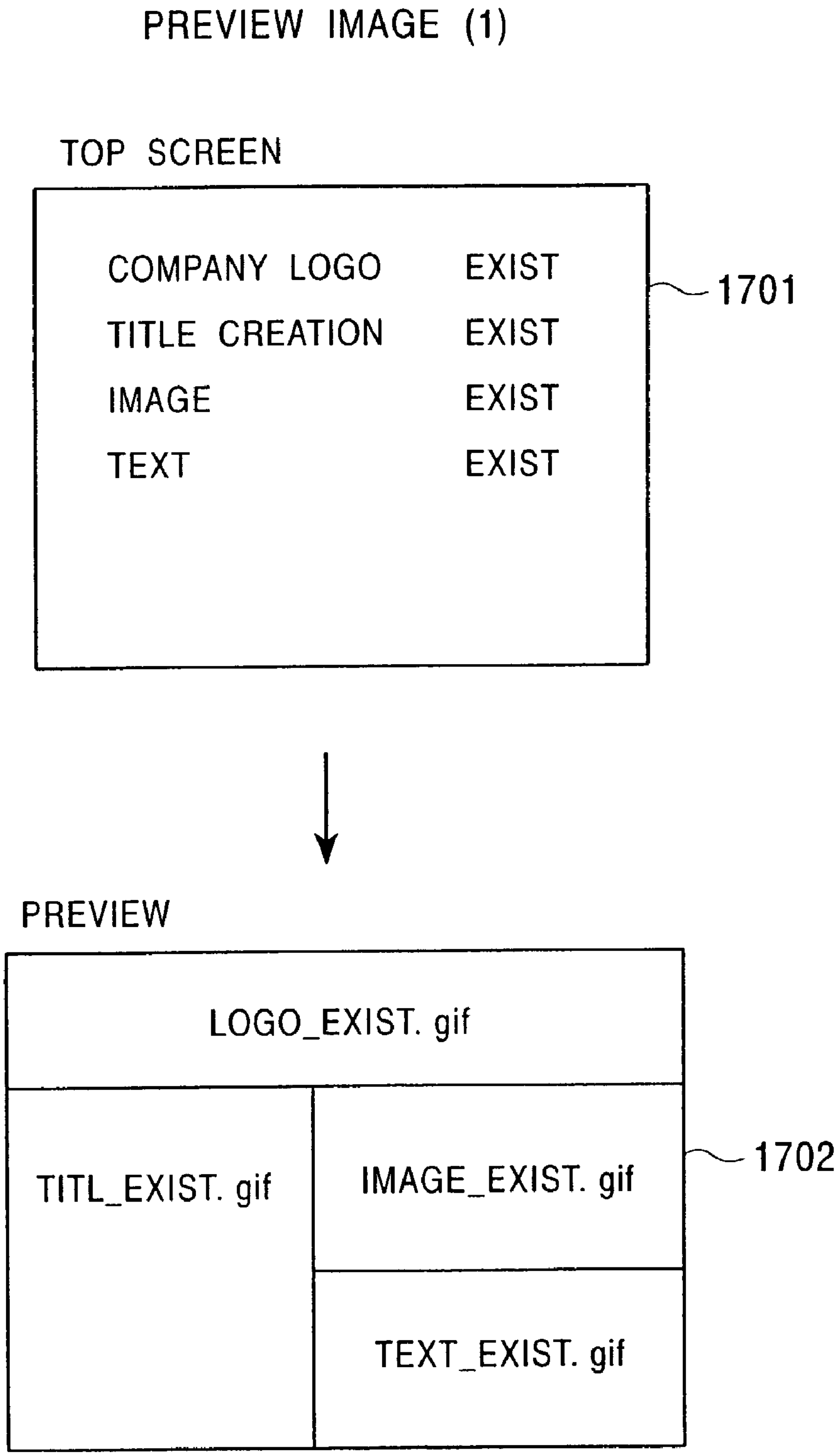
FIG. 27 is an illustration showing a preview image by the preview screen processing in a Web page creation support system according to an embodiment of the present invention.

FIG. 27 is a composition example of a preview screen of a top screen. When the customer terminal unit 300 selects, in order for item contents to be displayed on the top screen, (1) company logo, (2) title (company name), (3) image (company image), and (4) text (catchword) (1701), the preview screen shown in the figure is displayed on the display of the customer terminal unit 300 (1702).

Figure 28:
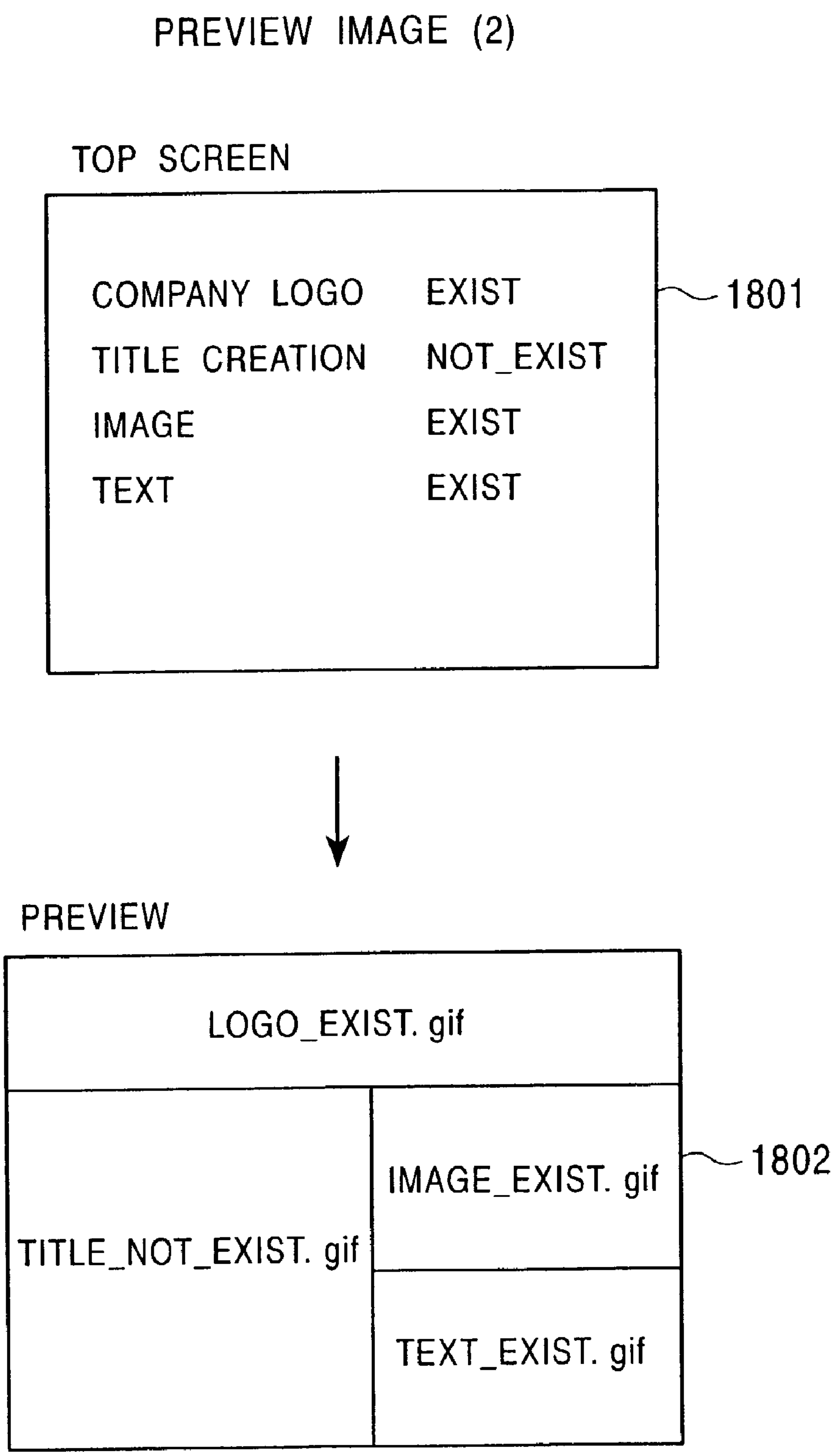
FIG. 28 is an illustration showing a preview image by the preview screen processing in a Web page creation support system according to an embodiment of the present invention.

FIG. 28 is another composition example of a preview screen of a top screen. When the customer terminal unit 300 selects, for item contents to be displayed on the top screen, (1) company logo, (2) image (company image), and (3) text (catchword) (1801), the preview screen without a title is displayed on the display of the customer terminal unit 300 (1802).

Figure 29:
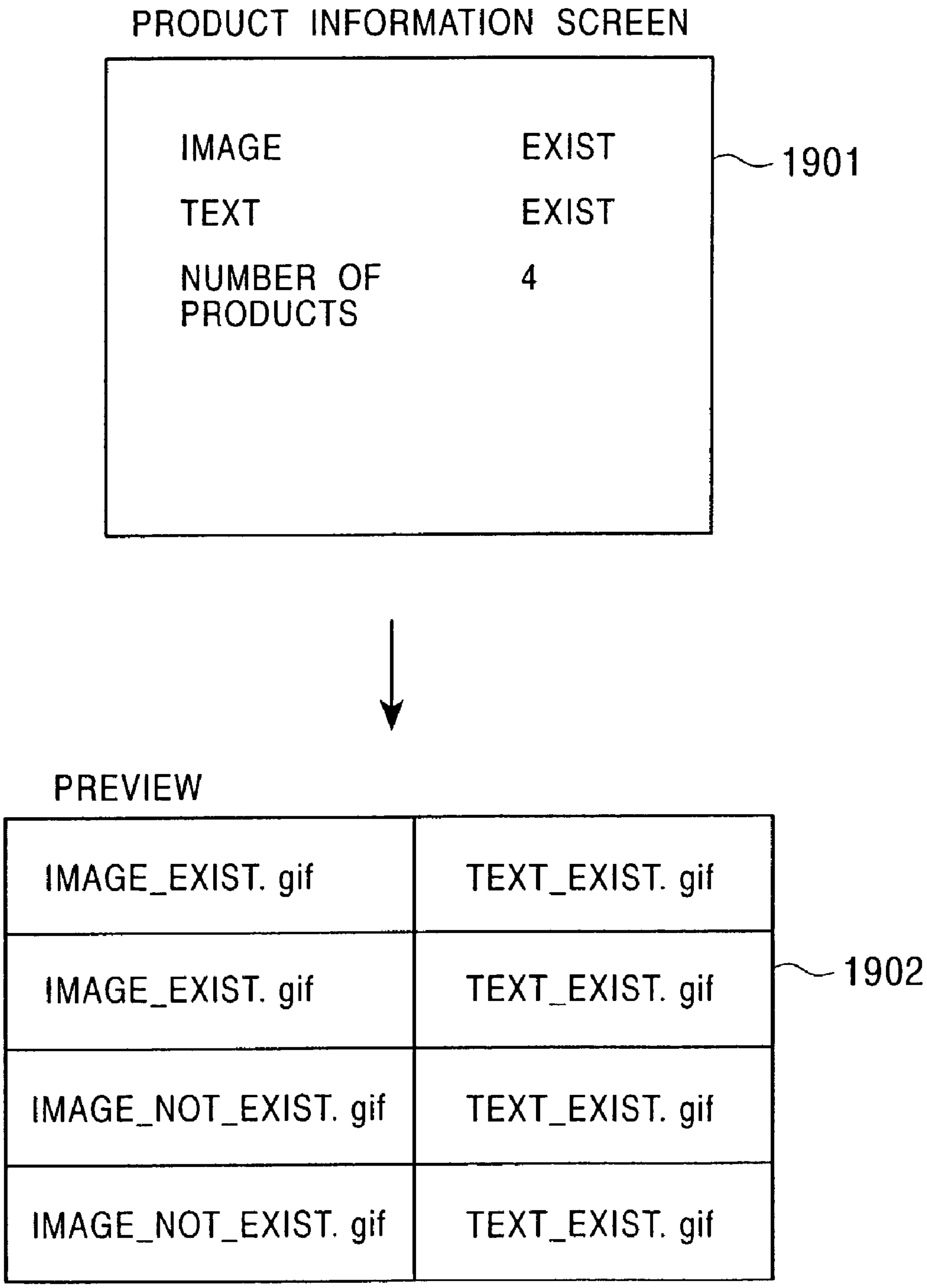
FIG. 29 is an illustration showing a preview image by the preview screen processing in a Web page creation support system according to an embodiment of the present invention.

FIG. 29 is a composition example of a preview screen of a product information screen. When the customer terminal unit 300 selects, for item contents to be displayed on the product information screen, (1) image, and (2) text, and specifies four for the number of pieces of product information (1901), the preview screen of four product images with text is displayed on the display of the customer terminal unit 300 (1902).

FIG. 30 is a composition example of a preview screen of a product information screen. When the customer terminal unit 300 selects, for item contents to be displayed on the product information screen, (1) image, and (2) text, and specifies two for the number of pieces of product information (2001), the preview screen of four product images with text is displayed on the display of the customer terminal unit 300 (2001).

In this regard, a unit image constituting the preview screen preferably includes a plurality of image files. By this arrangement, it is possible to prevent a malicious customer terminal unit 300 having malicious intent from downloading image files, and from pirating and diverting image files. Also, these image files may be the image files selected in accordance with the template information using the image files created previously, or they may be the image files such that, before sending from the Web page creation support server 100, a preview screen is created in accordance with the template information, and then the preview screen is divided into the image screens.

(2-4-5) Creator Selection Flow (S1405)

With reference to FIG. 16 again, depending on the system design, it is possible for the customer terminal unit 300 to select a creator terminal unit 400 (S1405) after making reference to a preview screen in the step S1404. For example, the Web page creation support server 100 may suggest creator terminal units 400 in accordance with a Web image selected by the customer terminal unit 300, and the customer terminal unit 300 makes reference to the work histories of the creator terminal units 400 to select a creator terminal unit 400 to whom the Web page creation job is requested. Naturally, it is needless to say that the system can be configured to omit the creator selection processing (S1405).

(2-4-6) Automatic Quotation Flow (S1406)

The customer terminal unit 300 can use the automatic quotation function after template information has been registered in the step S1403. When the customer terminal unit 300 selects automatic quotation, the Web page creation support server 100 can make reference to the template information database 150, and automatically quote the cost of creating a Web page based on the template information selected by the customer terminal unit 300, and display it on the display of the customer terminal unit 300. If a creator terminal unit 400 is selected in the step 1405, the unit price of the selected creator terminal unit 400 is referred to for automatic quotation.

If the customer terminal unit 300 is satisfied with the quotation amount displayed in step S1406, the system proceeds to the ordering processing. However, if the customer terminal unit 300 is not satisfied with the quotation computed by the automatic quotation in step S1407, the customer terminal unit 300 can return to step S1403, and select the template information once again.

(2-4-7) Temporary Ordering Flow (S1501 to S1503)

Figure 17:
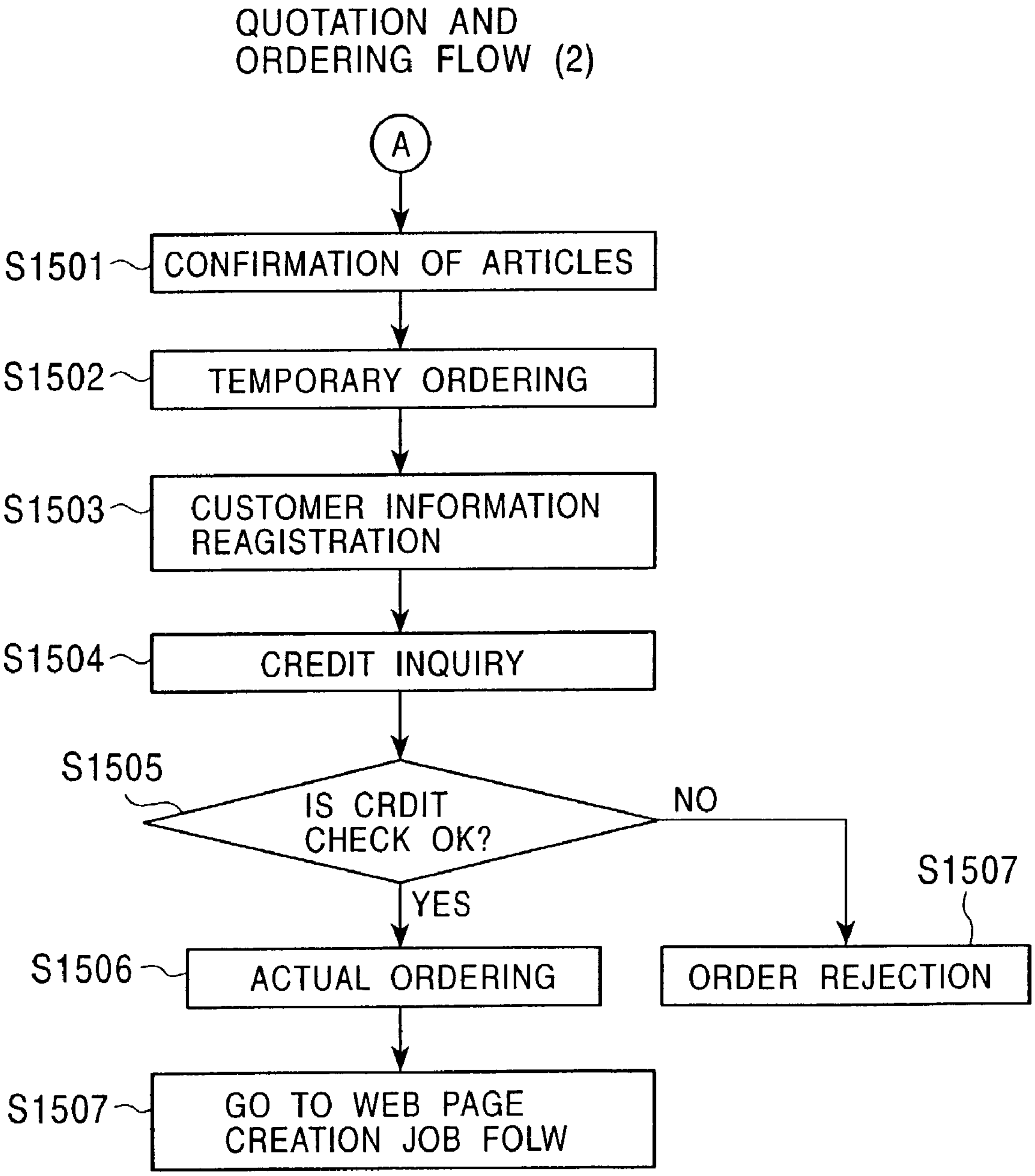
FIG. 17 is a flowchart illustrating the flow of the quotation and ordering processing in a Web page creation support system according to an embodiment of the present invention.

When the customer terminal unit 300 makes a home page creation request to the Web page creation support server 100 after referencing the preview screen and the result of automatic quotation, the system proceeds to step S1501 as shown in FIG. 17. Here, the customer terminal unit 300 is presented with the articles, such as notes and agreements, needed for requesting Web page creation, and if the customer terminal unit 300 agrees to the articles, the system proceeds to the temporary order processing (S1502).

The temporary order processing is the processing for temporarily receiving a Web page creation request from the customer terminal unit 300, and for setting a time lag in order to determine whether or not to actually receive the order of the creation request. After temporary ordering, more detailed information (secondary customer information) of the customer terminal unit 300 is requested for registration (S1503). This secondary customer information is necessary in the credit inquiry processing performed in the next step S1504.

(2-4-8) Credit Inquiry Flow (S1504)

The Web page creation support server 100 makes a credit inquiry of the relevant customer terminal unit 300 to the credit server 500 (S1504) based on the secondary customer information registered in step S1503.

Thus, with the present system, credit search regarding the payment ability of the customer terminal unit 300 is performed before placing an actual order of the Web page creation job, thereby making it possible to avoid a situation where payment for Web page creation cannot be collected.

(2-4-9) Actual Ordering Flow (S1506)

If the result of the credit inquiry is affirmative in the step S1505, the system proceeds to actual ordering (S1506). If the result of the credit inquiry is negative, order rejection processing is performed (S1507). In the order rejection processing, for example, the system can be configured such that review of whether to receive a request of order from the customer terminal unit 300 or to reject it is performed regardless of credit inquiry result, and if the result is negative again, notification of the order rejection is sent to the customer terminal unit 300 by email.

After completing actual ordering in this way, the system proceeds to the job control flow (S1507). Next, with reference to FIG. 31, detailed description is given to the Web page creation job flow.

(2-5) Web Page Creation Job Flow

As already described, a Web page creation job which is ordered is processed for every ordering unit as a project after an actual ordering of the customer terminal unit 300. Additionally, the distinguished point of the present system is that when a project is started (S2101), a job room for each project is set up (S2102).

Figure 31:
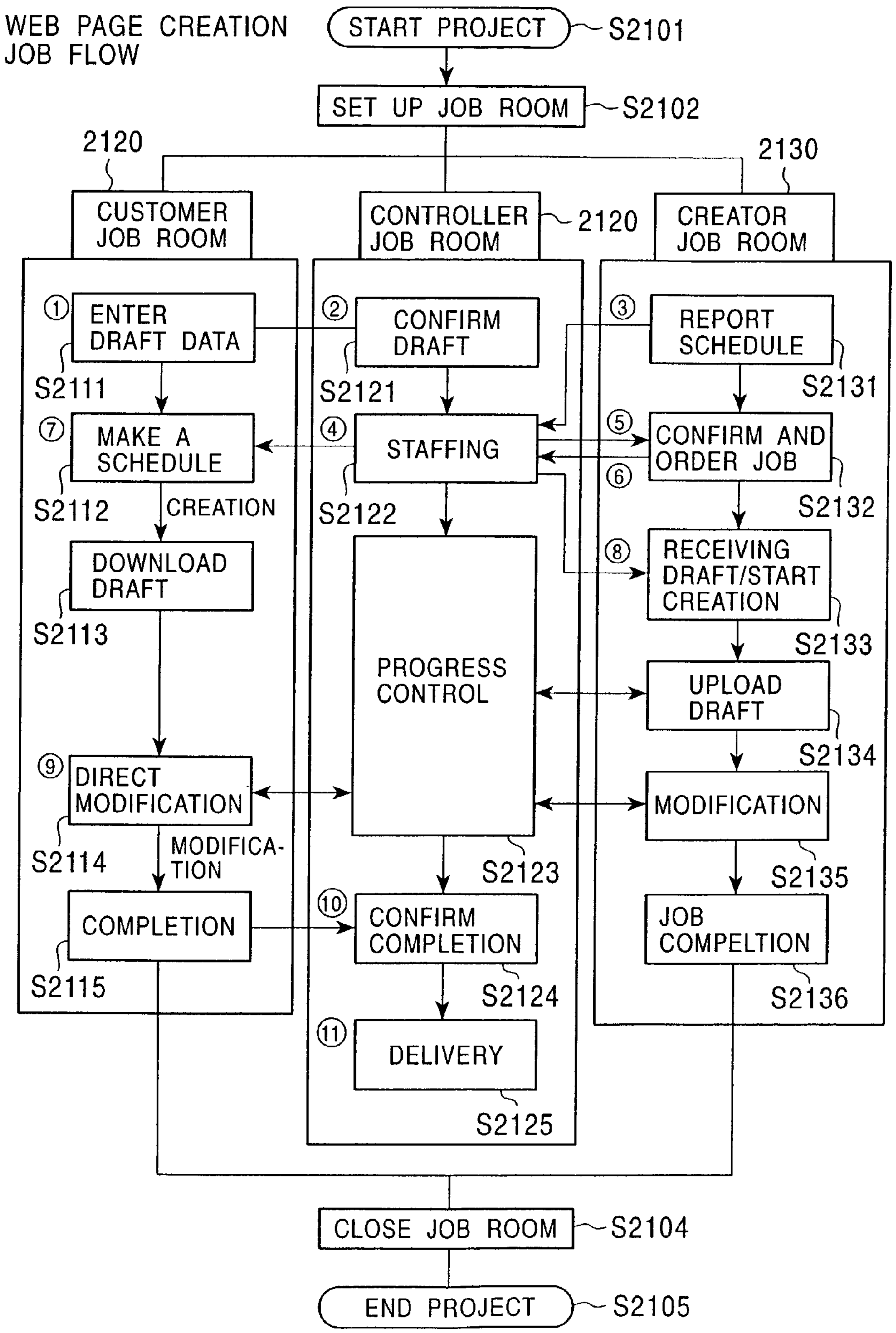
FIG. 31 is a flowchart illustrating the flow of the Web page creation job in a Web page creation support system according to an embodiment of the present invention.

A job room is a virtual control space in which the progress status of a Web page creation job is controlled for every ordering unit. In an embodiment as shown in FIG. 31, a job room of one project is organized to be recognized as a different control space depending on a entity which relates to a Web page creation job.

Specifically, for an entity which orders a Web page creation job, that is, a customer terminal unit 300, a job room is recognized a customer job room 2110. For a Web page creation support server 100 who controls a Web page creation job, a job room is recognized a controller job room 2120. Also, for an actual operator of a Web page creation job, a creator terminal unit 400, a job room is recognized a creator job room 2130.

Since these job rooms 2110, 2120, and 2130 are virtual control spaces having the same project as a corresponding object, it is possible for each entity to recognize them as different jobs, or to recognize them as the same room.

Next, an outline of a Web page creation job flow will be described by tracking time series the information exchanges among three rooms; a customer job room 2110, a controller job room 2120, and a creator job room 2130.

First, the customer terminal unit 300 uploads data of Web contents to be placed on a Web page to a customer job room 2110 (receiving a draft). Data uploaded from the customer terminal unit 300 is, for example, in the case of a top page as shown in FIG. 27, files of company logo, company name (title), company picture image, and catchword.

Uploaded data is confirmed for draft receipt in the controller job room 2120 (S2121).

Apart from the progress of a Web page creation job, the creator terminal unit 400 makes a report of his/her schedule such as his/her own loading status, and updates its records. Such a schedule of the creator terminal unit 400 is sent appropriately from a creator job room 2130 to a controller job room 2120. The Web page creation support server 100 performs the staffing processing (S2122) after confirming receipt of draft from the customer terminal unit 300 based on schedule reporting from the creator terminal unit 400.

As already described, the staffing processing (S2121) is an operation to select the best suited creator terminal unit 400 for an ordered Web page creation, and to assign the Web page creation job to the selected creator terminal unit 400.

Figure 32:
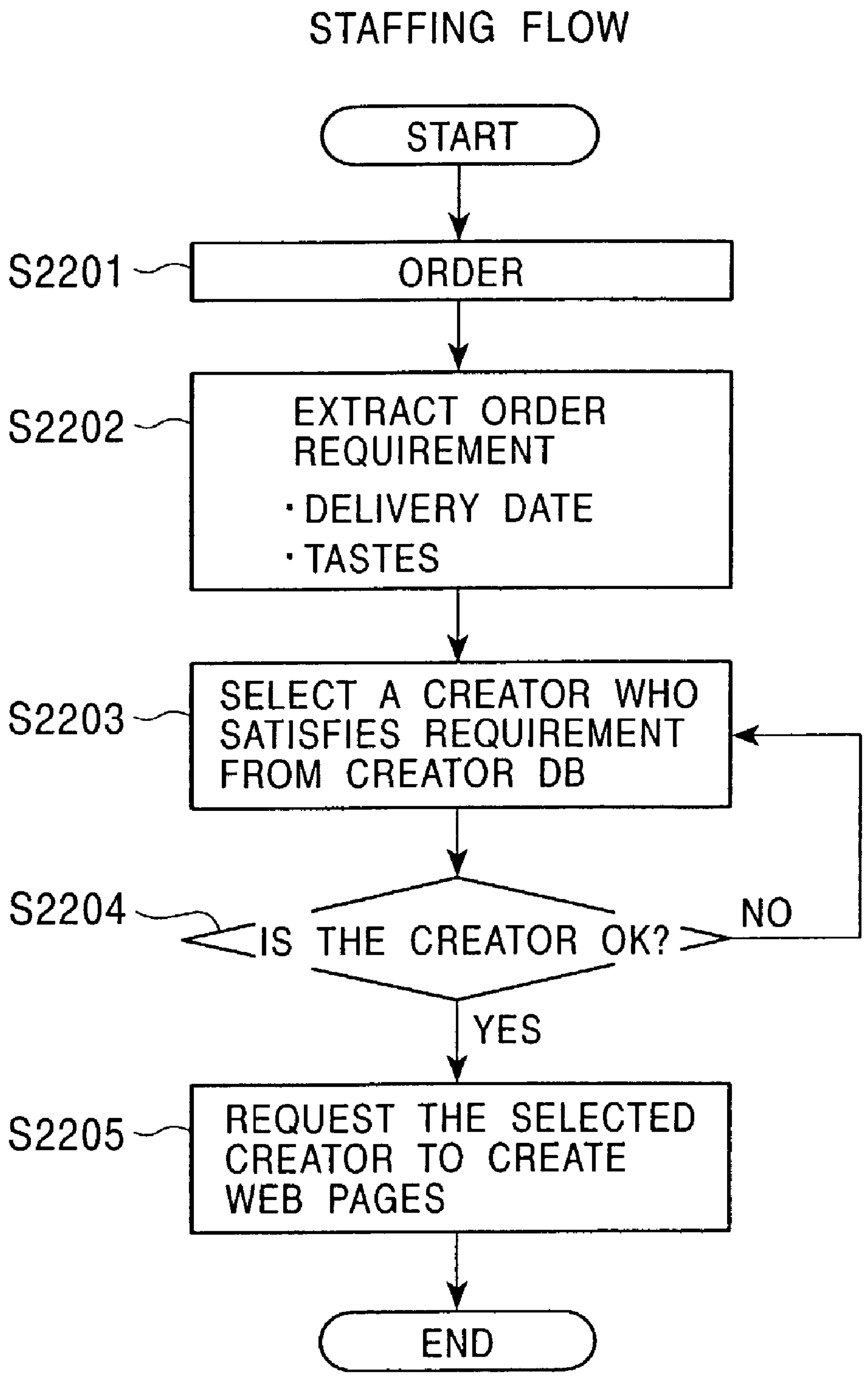
FIG. 32 is a flowchart illustrating the flow of the staffing processing in a Web page creation support system according to an embodiment of the present invention.

Here, with reference to FIG. 32, a staffing flow in a controller job room 2120 will be described.

First, when a customer terminal unit 300 make a Web page creation order (S2201), an order requirement is extracted (S2202). The order requirement extracted here includes a delivery date and the preferences of the customer terminal unit 300. The preferences of the customer terminal unit 300 can be ascertained with reference to, for example, a Web page image selected by the customer terminal unit 300 in the design selection of the template information, for instance, the information that cool design has been selected.

Next, a creator terminal unit 400 in accordance with the ordering requirement is selected from the creator information database. For example, if the customer terminal unit 300 wants a "cool atmosphere" Web page to be created within two months, a creator terminal unit 400 is selected from the creator terminal units 400 which are good at creating "cool atmosphere" Web pages and which can complete the operation within two months.

Then, a decision is made regarding whether or not Web page creation is requested of the selected creator terminal unit 400 (S2204). The judgement at this step is made either by the Web page creation support server or the customer terminal unit 300 can make the final judgement. And if it is judged OK to request the Web page creation to the creator terminal unit 400, a Web page creation request is actually made to the creator terminal unit 400.

Now, with reference to FIG. 21, the creator terminal unit 400 who staffs the controller job room 2120 confirms the job content and its schedule, and receives the order if it is possible to accept the job (S2132).

And if the creator terminal unit 400 receives the order, a rough schedule for the Web page creation job through completion can be made, thus, the schedule is reported to the customer terminal unit 300 via the customer job room 2110 (S2112).

After confirming receipt of the order, in the controller job room 2120, an e-mail and the like are sent to the creator terminal unit 400 to prompt him/her to upload information of the Web contents to the customer terminal unit 300, and to download it. By receiving the report, the creator terminal unit 400 starts the Web page creation job (S2133).

The progress status of the Web page creation job which has been started in such a way is controlled by the Web page creation support server 100 via the controller job room 2120 (s2123). And in case of the creator terminal unit 400's job being delayed, he/she is urged by e-mail and so on.

When the creator terminal unit 400 completes a web page draft, he/she uploads the draft to the controller job room via the controller job room 2120 (S2134). The Web page creation support server 100 notifies the customer terminal unit 300 of the completion of uploading the draft by e-mail and the like, and urges confirmation of the Web page draft which has been uploaded.

The customer terminal unit 300 accesses a customer job room 2110, and downloads the Web page draft delivered from the creator terminal unit 400 or confirms it on the Web (S2113). And after confirming the contents of a Web page draft, the customer directs the creator terminal unit 400 to modify it if necessary via a controller job room 2120 (S2114).

The creator terminal unit 400 performs modification until a predetermined delivery date following modification direction sent from the controller job room 2120, and uploads the modification result to the Web page creation support server 100 via the creator job room 2130 (S2135).

A series of operations; uploading a Web page draft (S2134), downloading a Web page draft (S2113), modification direction (S2134), modification (S2135) are repeated as many times as necessary, and if the customer terminal unit 300 determines that no more repetition is necessary, the customer terminal unit 300 reports confirming the completion of the Web pages to the customer job room 2110 (S2115).

The creator terminal unit 400 is notified of the completion via the creator job room 2130, the creator terminal unit 400 closes the Web page creation job of the relevant project (S2136).

Also, in the controller job room 2120, closing the Web page creation job of the relevant project is confirmed (S2125), the status is changed to the delivery processing (S2125).

The delivery processing can be performed by prompting the customer terminal unit 300 via the customer job room 2110 to download Web page files. In this case, the customer terminal unit 300 performs deploying Web pages on a Web server. On the other hand, the Web page creation support server 100 can perform the delivery operation of Web pages to the Web server specified by the customer terminal unit 300 by an optional request from the customer terminal unit 300.

When a series of Web page creation job is completed in such in this manner, the job room is closed and the project is completed (S2105). In this regard, in the above-described embodiment, a system configuration is shown in which the job room relating to the relevant job is closed when the Web page creation job is completed at the same time. However, the present system is not limited to this example, but can be applied to the case where the job room continues to exist after closing the project to cope with the situation where the customer terminal unit 300 updates the created Web pages.

(2-6) E-Mail Issuing Flow

As the last description of the Web page creation support system according to the present invention, an e-mail issuing flow which is performed by the e-mail issuing part of the Web page creation support server 100 will be described with reference to FIG. 33.

Figure 33:
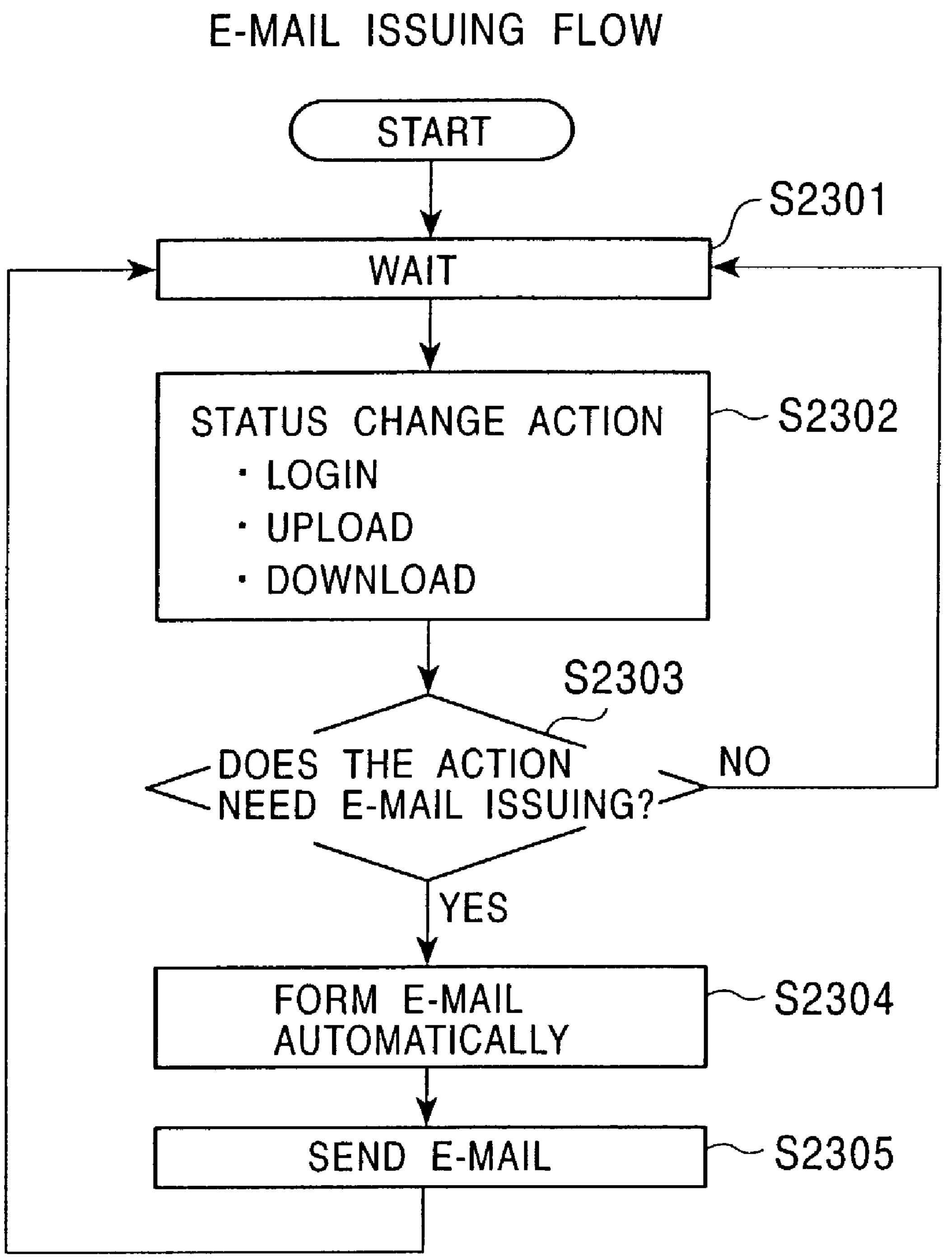
FIG. 33 is a flowchart illustrating the flow of the electronic mail issuing processing in a Web page creation support system according to an embodiment of the present invention.

As shown in FIG. 33, an e-mail issuing part is usually in a waiting state (S2301). However, when a status change action occurs in a system (S2302), it is determined whether or not an e-mail regarding the action is required (S2303). If the action requires issuing an e-mail, an e-mail is generated automatically (S2304), and the e-mail is sent to a specified address (S2305). However, if it is determined that an e-mail regarding the action was not required in the step S2304, the system returns to the waiting state, and waits for the next action.

Here, as status change actions, various actions are assumed depending on the system configuration. For example, as actions from the customer terminal unit 300, if enumerated in time series, there are registration action of customer information, login action, registration action of template information, requirement action of preview screen display, requirement action of quotation display, temporary ordering action, registration action of credit information, actual ordering action, upload action of information of Web content, direct modification action, final confirmation action of draft, and so on.

As the actions form the Web page creation support server 100, there are request and confirmation action of customer information registration, issuing ID/PW action, temporary order receiving action, credit inquiry action, actual order receiving action, issuing job room account action, upload confirmation action, staffing action, directing download action, delivery action, and so on.

Also, as the actions form the creator terminal unit 400, creator information registration action, schedule reporting action, operation contents confirmation action, order receiving action, draft upload action, and so on.

Issuing an e-mail is not necessary for all of these actions, but in the case where smooth operation of a Web page creation job is facilitated by issuing an e-mail, emails are issued automatically and appropriately.

(2-7) Update Processing Flow

In the above, a description has been given of the new creation flow of an Web page in the Web page creation support system according to the present embodiment, however, the present system can also be applied to the case where a delivered Web page is updated.

Before describing a Web page update processing specifically, a description will be given of some of the cases where Web page update is necessary taking examples of update of the product information pages. For example, there is the case where at the first stage of new creation, 50 pieces of product information containing only text data have been listed on the product information page, and then image data need to be added to all of the products. In another case, at the first stage of new creation, 50 pieces of product information containing only text data have been listed on the product information page, and then image data needs to be added to each of 10 pieces of these products. The other 40 pieces of the products are kept unchanged, but still 30 pieces of products need to be added. Furthermore, five pieces of the products contain "text+image", the other 25 pieces contain only text data. In still another case, only the sequences of the products on the list need to be changed. As described above, there are various cases when Web pages need to be changed, however, by using the template information in the Web page creation support system according to the present embodiment, it is possible to flexibly satisfy the various needs of the customer terminal unit 300.

Figure 34:
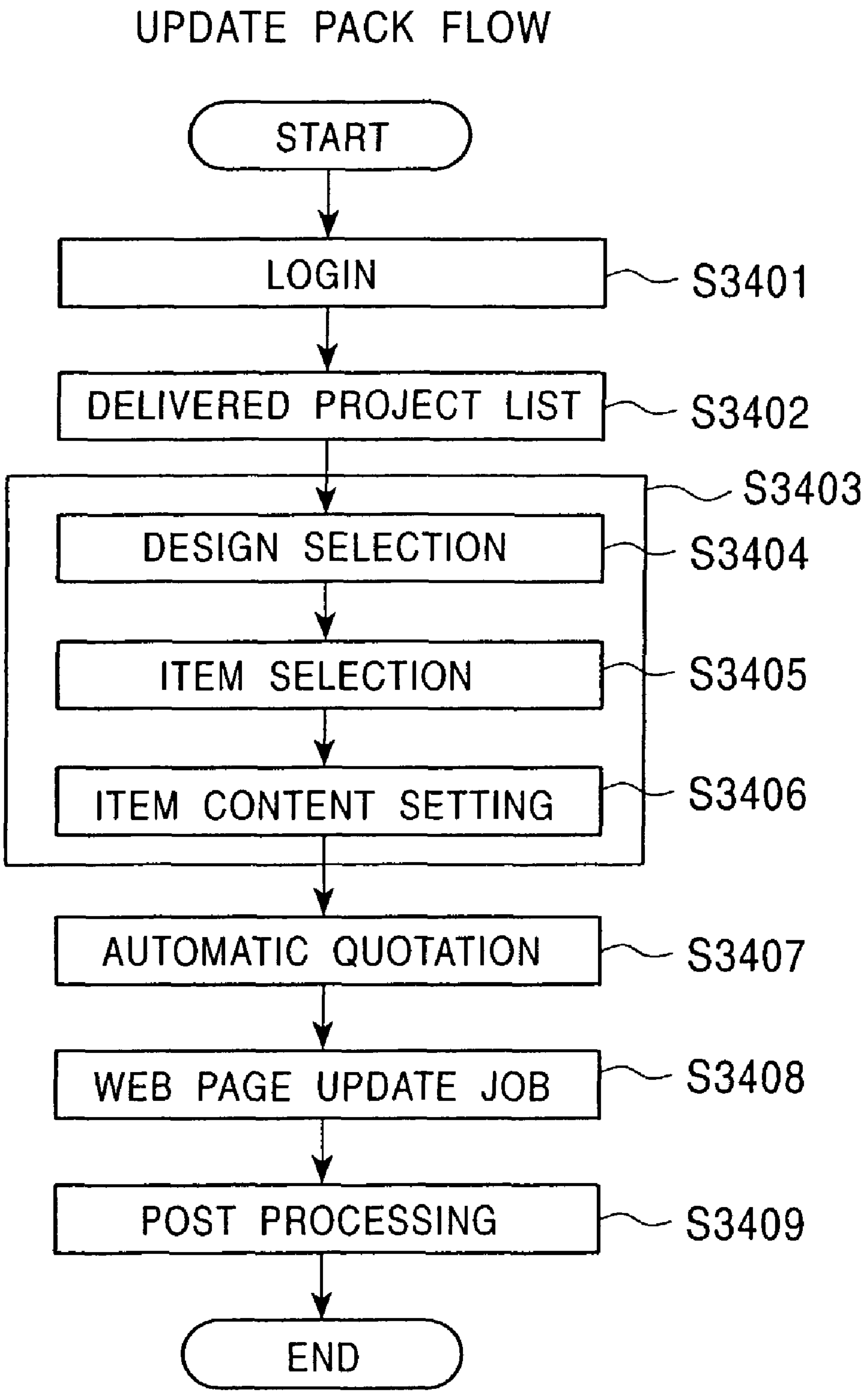
FIG. 34 is a flowchart illustrating the flow of the update processing in a Web page creation support system according to an embodiment of the present invention.

Next, with reference to FIG. 34, a description will be given of the update processing flow according to the present embodiment. In this regard, such processing as template information selection processing and automatic quotation processing, Web page update processing and so on, which is performed in the update processing flow, is similar to the case of the Web page new creation, so that the detailed description will be omitted of the duplicated portions.

First, when Web page update processing is selected on the top screen, authentication of the customer terminal unit 300 is demanded. Usually, when the Web page to be updated is newly created, the customer terminal unit 300 has performed user registration or customer registration. Thus by entering the registered user name and password, the customer terminal unit 300 can login to the update processing flow in the present system (S3401).

After logging in, among the delivered projects, the customer terminal unit 300 refers to the Web page creation project in which the content thereof is to be updated. Here, according to the present system, creation of a Web page is based on the template information. Accordingly, by referring to the project of the Web page to be updated, it is possible to easily refer to the template information which is related to the Web page to be updated, thus the update (change, addition, deletion) work of the template information can be simplified drastically.

In this manner, after referring to the project of the Web page to be updated, the customer terminal unit 300 performs change, addition, or deletion in accordance with the update intention of the template information (S3403). Here, as described previously, since the template information consists of design, item, and item content, design selection (S3404), item selection (S3405), and item content setting (S3406) are performed in sequence, and the customer terminal unit 300 can grasp the outline of the update.

Then, in the same manner as new creation, after referring to the preview screen based on the selected template information, automatic quotation is performed as necessary (S3407). If the customer terminal unit 300 is satisfied with the quotation content, he/she places the order of the Web page update. For ordering, it is also possible to be configured to proceed from the temporary order processing, the credit processing, and the actual order processing in the same manner as in new creation. Also, since the credit processing of the customer terminal unit 300 is completed in the case of update, the system can be configured to proceed to the actual order processing by omitting the temporary order processing and credit processing.

In any case, when receiving the Web page update request, the Web page creation support server 100 sets up a new job room, and starts the Web page update job (S3408). For the structure of the update job room and the processing flow thereof, the description is almost similar to the description of the job flow of the Web page new creation with reference to FIG. 31, so that the detailed description will be omitted here.

When the Web page update processing has been completed in such a manner, and the Web page with the updated content has been delivered, the post processing such as the charge collection is performed (S3409). In this manner, a series of the Web page update processing is complete.

Figure 35:
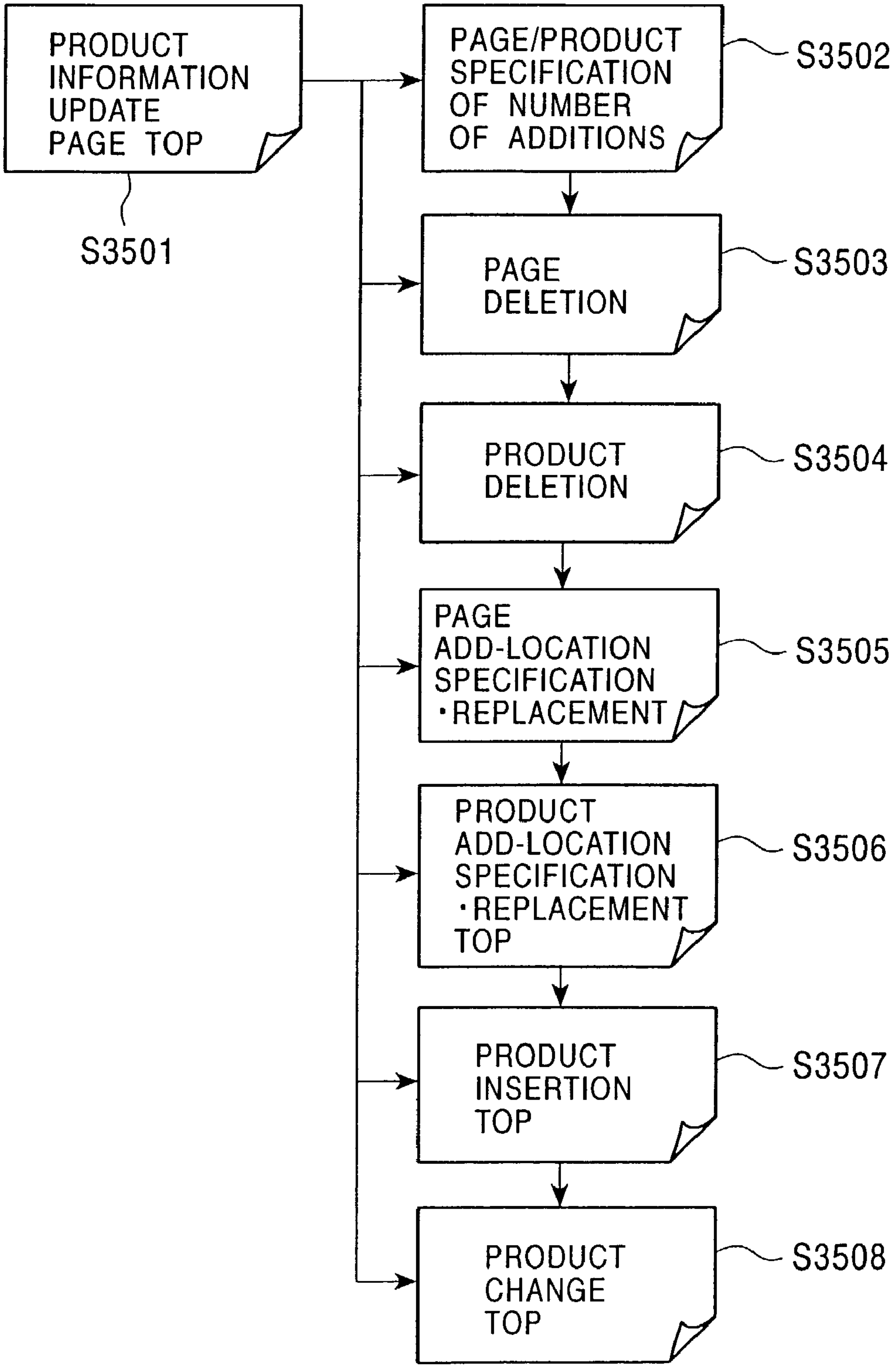
FIG. 35 is an illustration showing the screen structure example of the update processing in a Web page creation support system according to an embodiment of the present invention.

Next, with reference to FIG. 35, by taking an example of the update processing of the product information page, a brief description will be given of the page structure of a series of Web page update processing.

Figure 36:
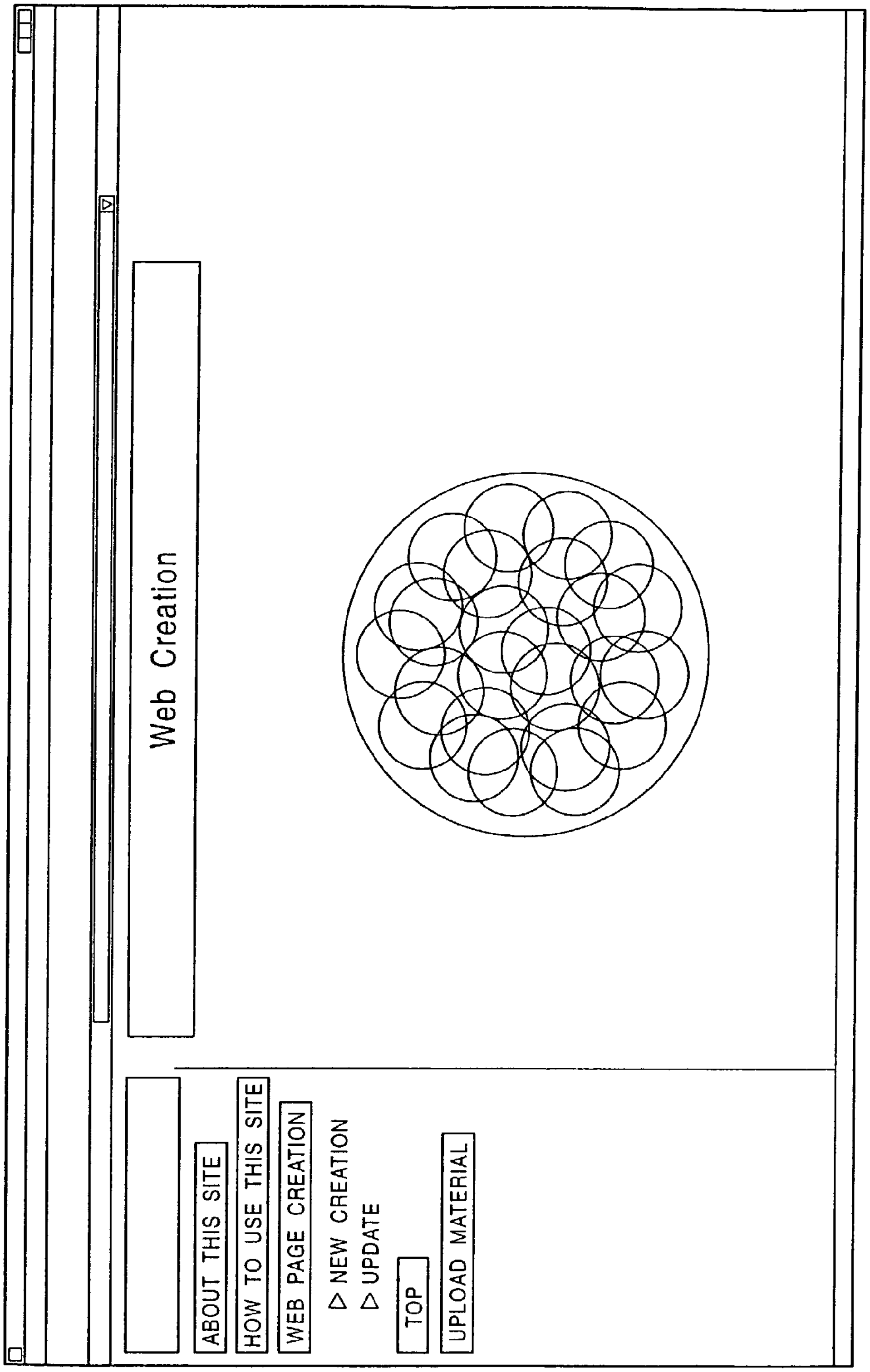
FIG. 36 is an illustration showing a browser display screen of the site providing a Web page creation support service according to an embodiment of the present invention.

As described later, as shown in FIG. 36, when the "update" button is selected and pressed on the general top page of the Web page creation support system, the processing goes to the update processing page, and a certain project is selected from the delivered project list, the processing goes to the top page of the product information update page shown in FIG. 35. This product information update page top page (S3501) consists of a page/product number of addition specification page (S3502), a page deletion page (S3503), product deletion page (S3504), a page addition place specification/replacement page (S3505), a product addition place specification/replacement top page (S3506), and a product insertion top page (S3507). Thus, the pages are formed such that the various processing regarding the update (addition, change, deletion) of the product information page can be performed along with the template information. Each of these pages can be selected in parallel, and the pages are also formed such that selection can be performed in the sequence: the page/product number of addition specification page (S3501); the page deletion page (S3503); the product deletion page (S3504); the page addition place specification/replacement page (S3505); the product addition place specification/replacement top page (S3506); and the product insertion top page (S3507).

The page/product number of addition specification page (S3501) is the page for adding a product information page, and adding the number of products. The page deletion page (S3503) is the page for performing the deletion processing of the unnecessary product information pages. Similarly, the product deletion page (S3504) is the page for performing deletion of the unnecessary products. The page addition place specification/replacement page (S3505) is the page for adding a new page and for performing replacement of the places. The product addition place specification/replacement top page (S3506) is the page for specifying the product addition place and replacing the products. The product insertion top page (S3507) is the page for inserting a new product. A product insertion top page (S3508) is the page for changing products. In this regard, embodiments of these product information update processing flow will be described later in connection with FIGS. 88 to 96.

(3) Embodiments

Next, in order to get better understanding of the web page creation support system according to the present embodiment, with reference to the accompanying drawings, description will be given to screen format examples of the Web site to which the Web page creation support system according to the present invention is implemented.

In this regard, in the following drawings, as a Web page browsing software (browser), Netscape Navigator provided from Netscape is used. However, the present invention is not limited to this example, but can be used with other browser software, for example, Internet Explorer provided by Microsoft.

(3-1) Top Page and its Related Pages

FIG. 36 shows a "TOP" page which is the top page of a Web site. On the "TOP" page, links are formed to the pages; an "About this site" page which gives a description of the site, a "How to use this site" page which shows how to use the site, a "Web page creation" page on which a new Web page is created in accordance with template information and a delivered Web page is updated, and an "Upload material" page which is related to a job room. In this regard, under "Web page creation", the "New creation" button and the "Update" button are disposed. By pressing each of the buttons, the processing is configured to move either to a new creation processing flow screen or an update processing flow screen.

Figure 37:
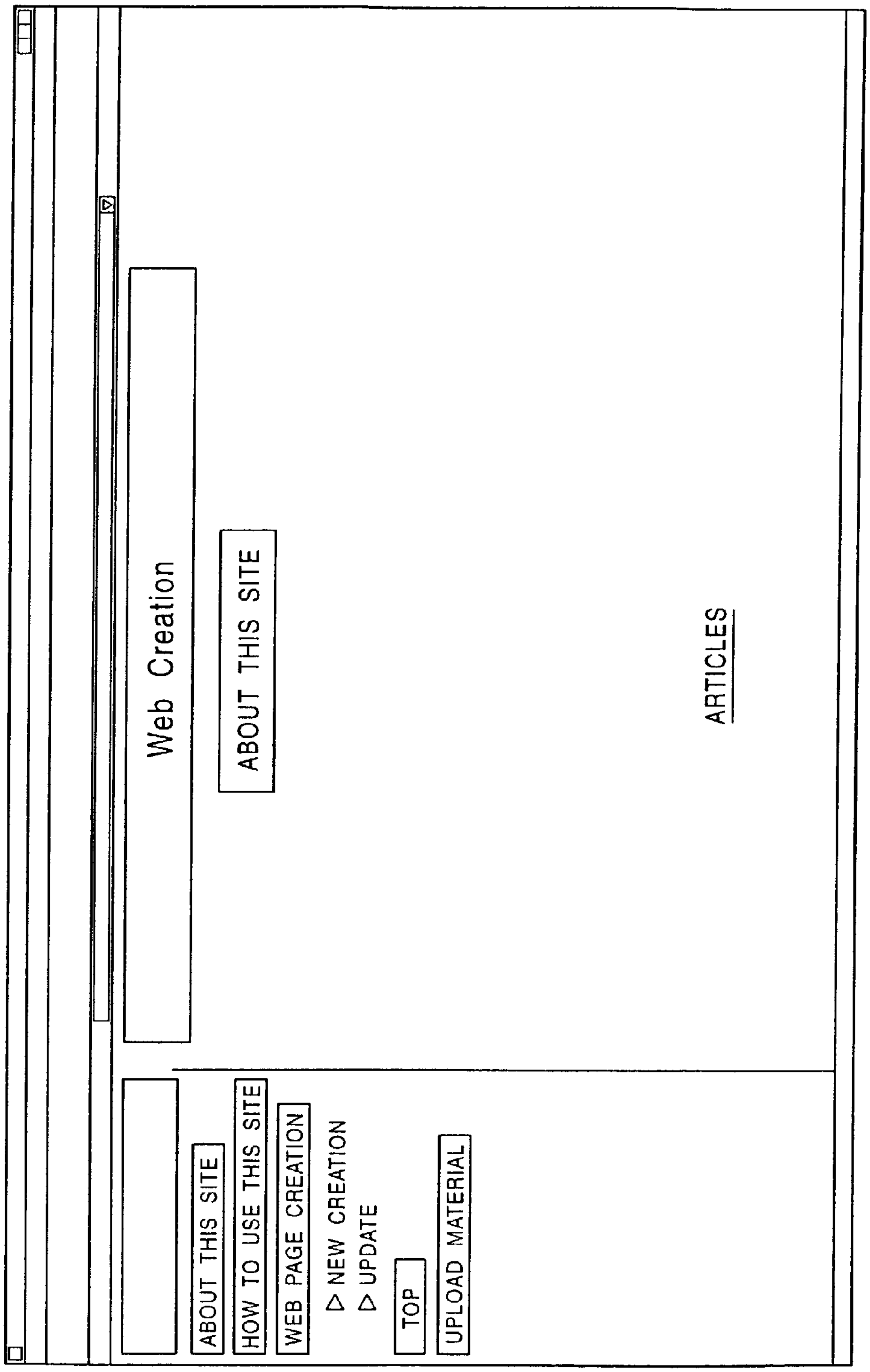
FIG. 37 is an illustration showing a browser display screen of the site providing a Web page creation support service according to an embodiment of the present invention.

FIG. 37 shows a display example of an "About this site" page. Although details are not shown in the figure, on this page, the description is given about the contents of the Web page creation service and so on. Also, This page contains the link to "Article" page which describes notes about using this site in addition to the links to "How to use this site" page, "Web page creation" page which includes the "New creation" button and the "Update" button, "TOP" page, and "Upload material" page. Further, although not shown, it is possible to form this page to contain links to "Staffing entry" page which registers creator information, "Registration" page which registers customer information.

Figure 38:
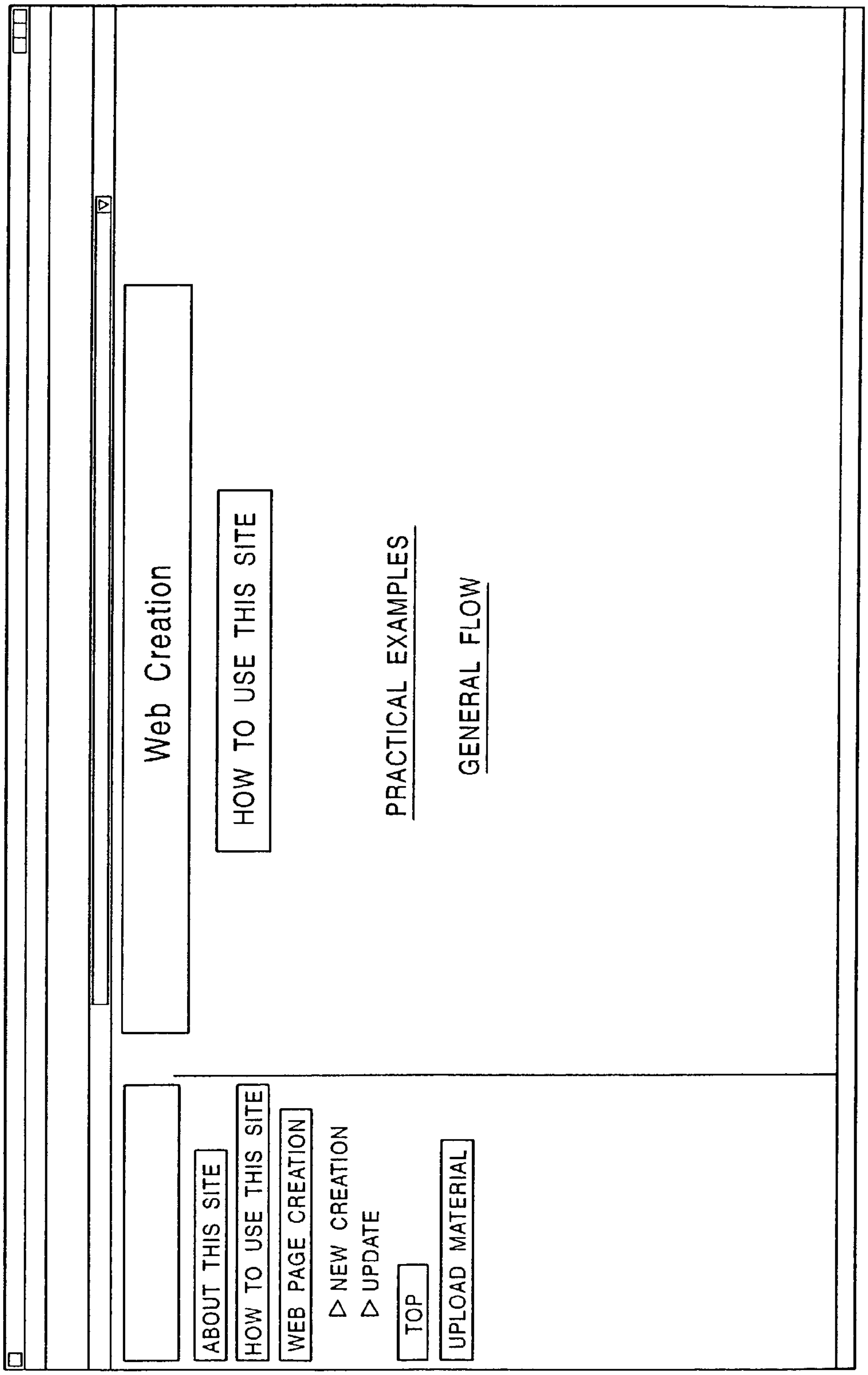
FIG. 38 is an illustration showing a browser display screen of the site providing a Web page creation support service according to an embodiment of the present invention.

FIG. 38 shows a display example of "About this site" page. On this page, the steps for actually create a Web page are described using the Web page creation support system according to the present embodiment. Therefore, on this page, the links are formed to an "Practical examples" page which shows application cases of the Web page creation support service, a "General flow" page which introduces visually the steps to create a Web page using the Web page creation support system in addition to the links to "How to use this site" page, "Web page creation" page which includes the "New creation" button and the "Update" button, "TOP" page, and "Upload material" page.

Figure 39:
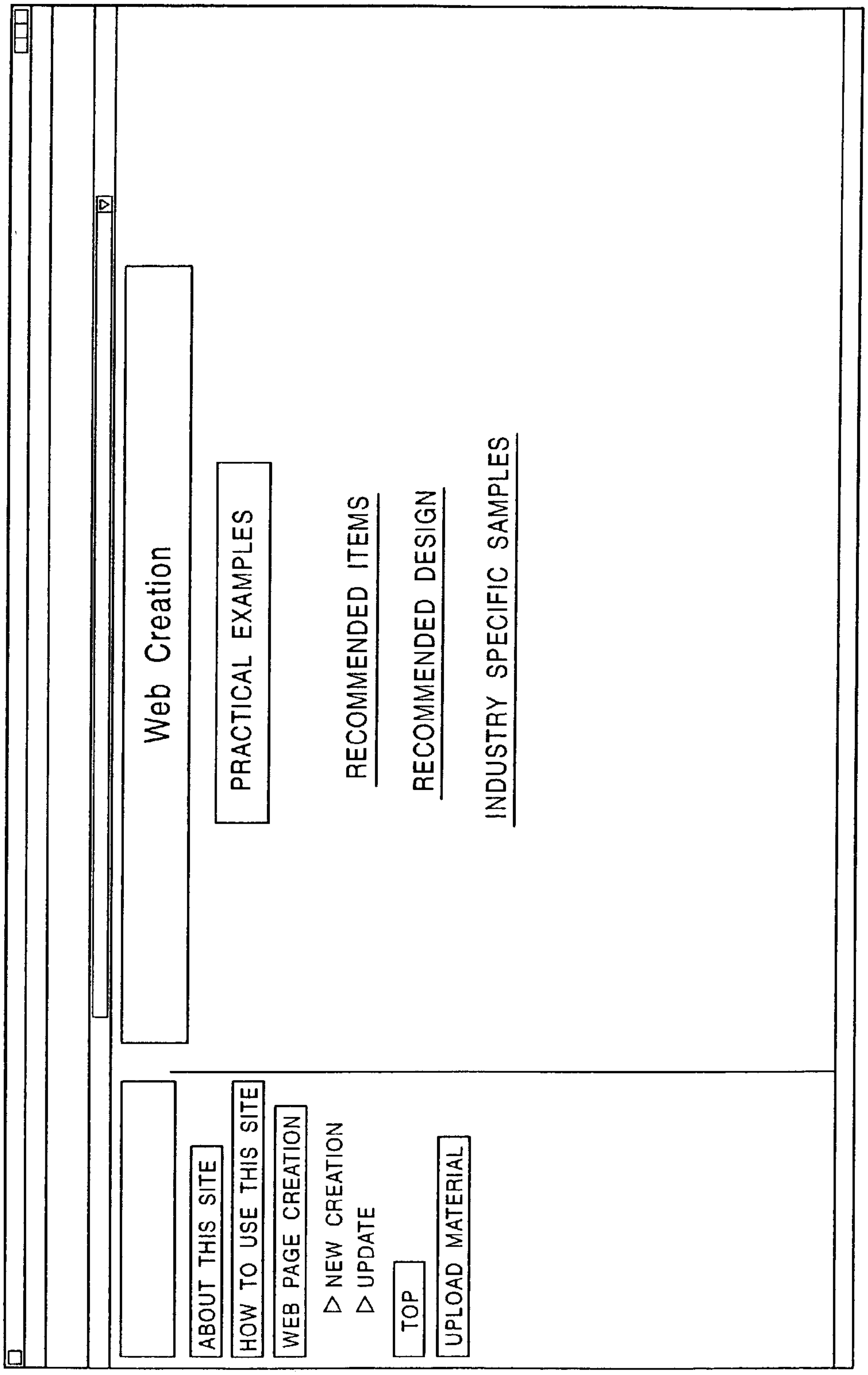
FIG. 39 is an illustration showing a browser display screen of the site providing a Web page creation support service according to an embodiment of the present invention.

FIG. 39 shows a display example of an "Practical examples" page. On this page, the links are formed to a "Recommended items" page, a "Recommended design" page, a "Business-type-specific samples" page, and so on, thus, users can reference Web page samples which are formed using this system before proceeding to a specific quotation and ordering processing. Also, the "Practical examples" page can be linked to each creator page, and can be configured to be a page selected by the customer in accordance with his/her own taste.

(3-2) Creator Information Registration Page

FIGS. 40 to 43 show "Staff entry" page as an example of a creator information registration page for a client to register a creator to the present system.

Figure 41:
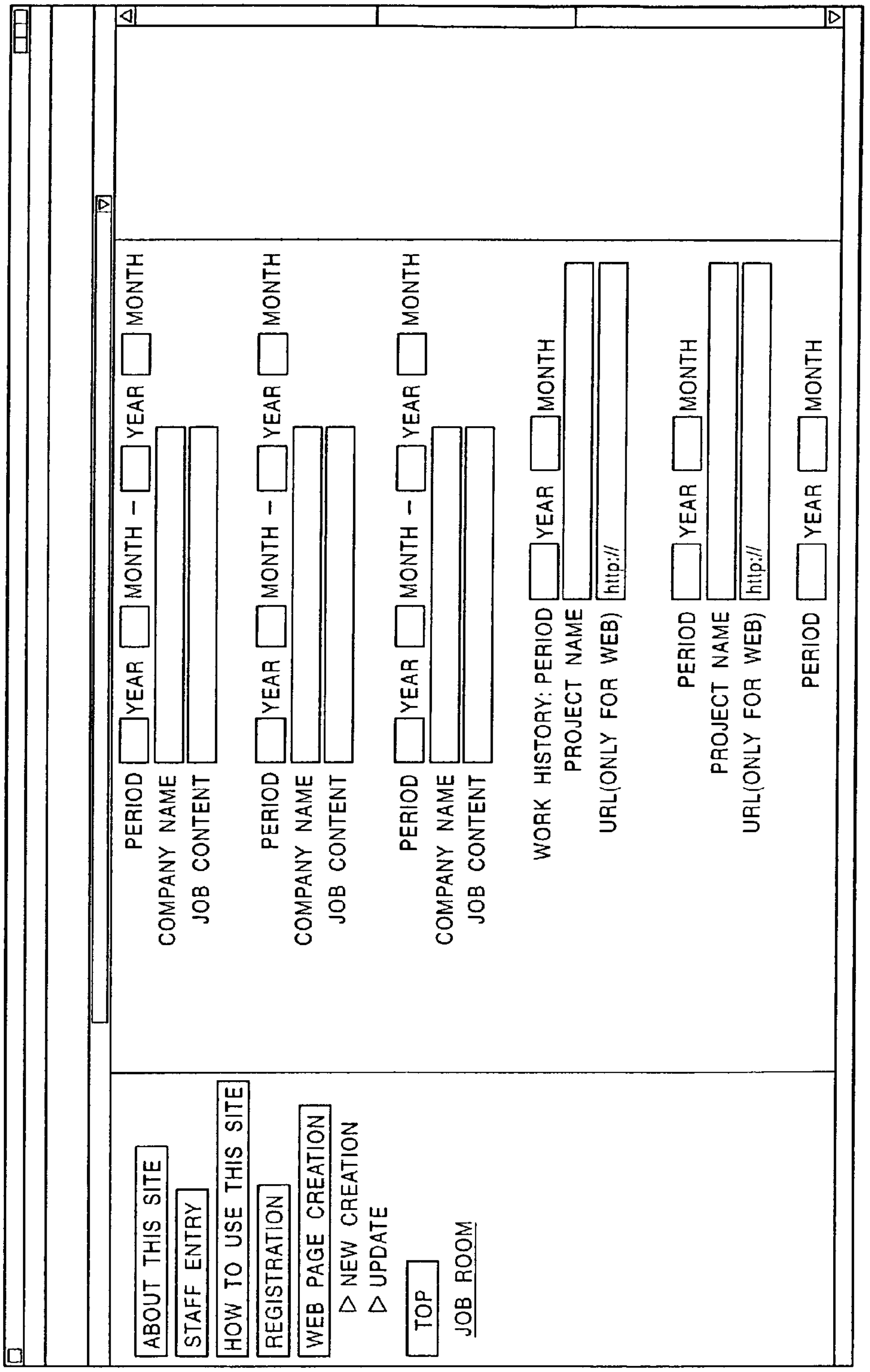
FIG. 41 is an illustration showing a browser display screen of the site providing a Web page creation support service according to an embodiment of the present invention.
Figure 42:
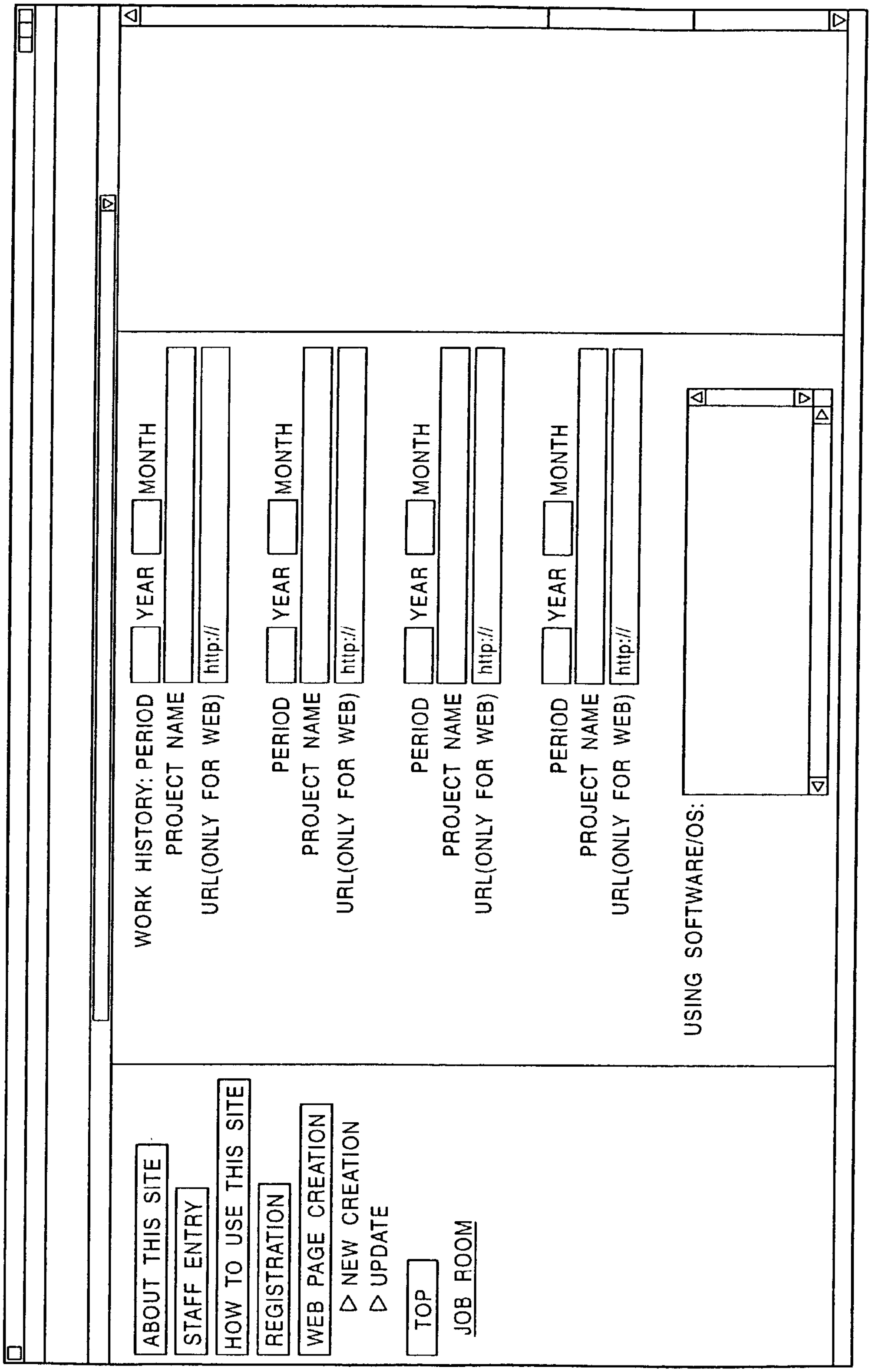
FIG. 42 is an illustration showing a browser display screen of the site providing a Web page creation support service according to an embodiment of the present invention.
Figure 43:
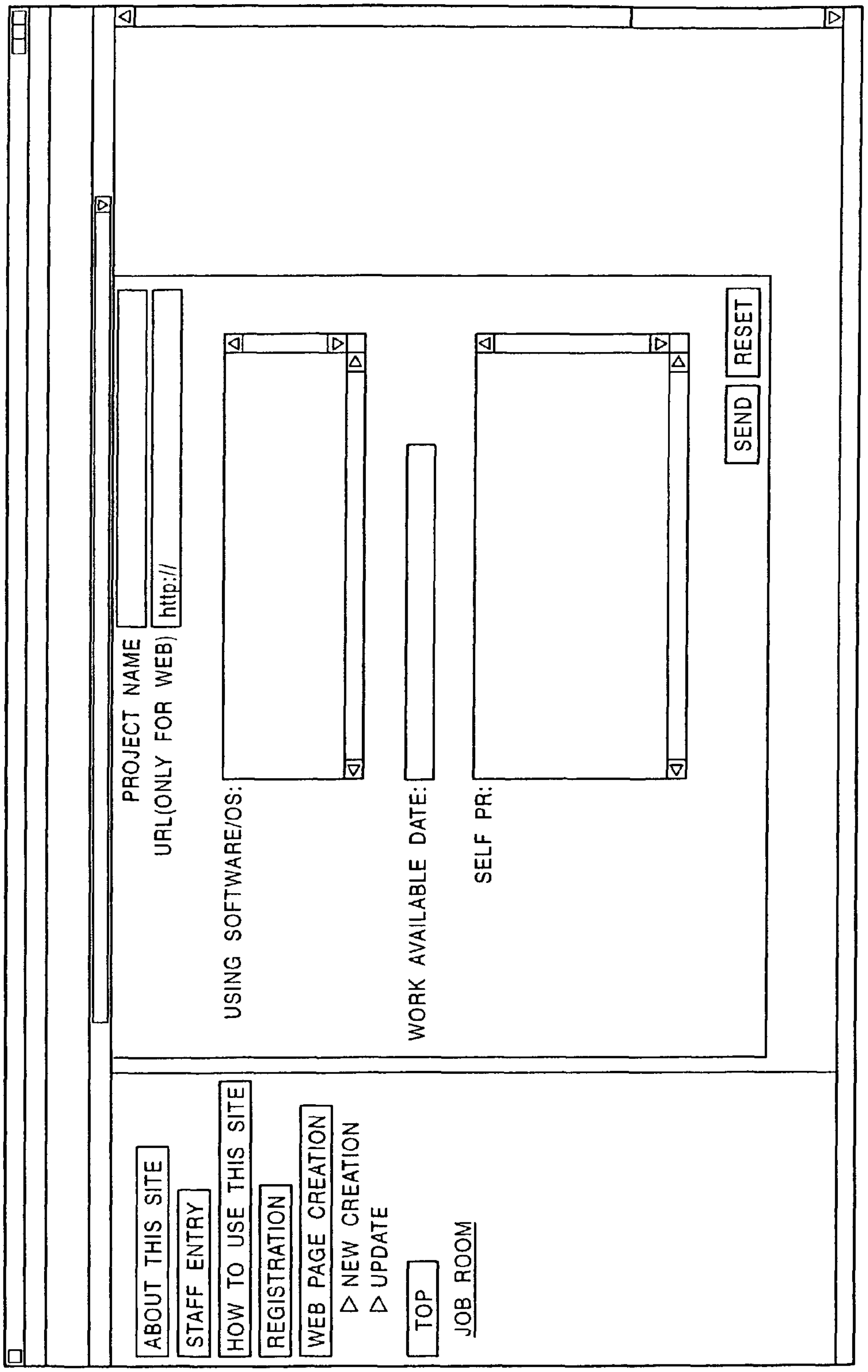
FIG. 43 is an illustration showing a browser display screen of the site providing a Web page creation support service according to an embodiment of the present invention.

In order for a client who has accessed the Web page creation support site to be registered as a creator who executes a Web page creation job, he/she needs to register creator information on "Staff entry" page as shown in FIGS. 40 to 43. For creator information, career information such as job history and work history are registered to give an idea of the creator career and skill as shown in FIG. 41 in addition to contact information such as a name and e-mail address as shown in FIG. 40, and schedule information. Moreover, in order to perform the Web page creation job smoothly, information as shown in FIG. 42 such as software in use, OS and so on is registered. By pressing the "Send" button in the screen shown in FIG. 43, the contents entered here are sent to the creator information database 180 of the Web page creation support server 100 and managed.

The Web page creation support server 100 can perform staffing the creator among the creators who are managed in the creator information database 180 in accordance with the customer's preferences when the customer makes a Web page creation request. Also, the customer himself/herself can refer to the work histories of the creators who are registered in the creator information database 180, and can select the creator in accordance with his/her taste to make a Web page creation request.

(3-3) Customer Information Registration Page

FIGS. 44 to 49 show "Registration" page and the related pages; "Registration Confirmation" page and "Registration Completion" page as an example of a customer information registration page for performing customer registration in order for a client to formally use the system.

In order for a client who has accessed the Web page creation support site to receive the Web page creation service, the client needs to register customer information in the "Registration" page as shown in FIGS. 44 to 46. Customer information includes optional registration items such as address and working place as shown in FIGS. 45 and 46 in addition to the mandatory registration items (primary customer information) such as a name and e-mail address as shown in FIG. 44.

Figure 49:
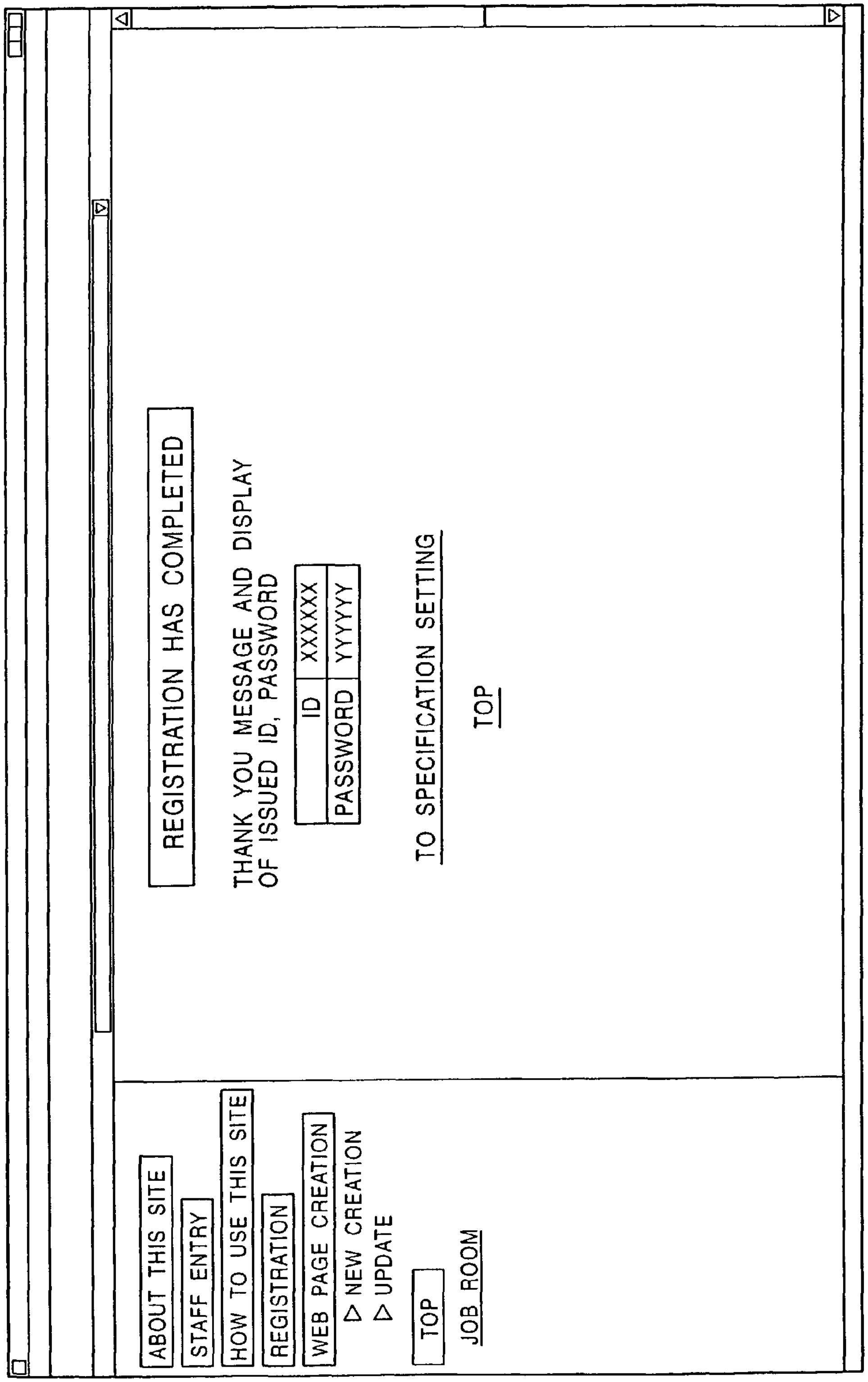
FIG. 49 is an illustration showing a browser display screen of the site providing a Web page creation support service according to an embodiment of the present invention.

When a client enters at least the mandatory registration items, and presses the confirmation button in the screen shown in FIG. 46, "Registration confirmation" page is displayed as shown in FIGS. 47 and 48. When the client confirms the contents and then press the "Register with the above contents" button in the screen shown in FIG. 48, the registration contents is sent to the Web page creation server, and "Registration completion" page is displayed as shown in FIG. 49. In this "Registration completion" page, ID and password are displayed in order to view a preview screen described below and to use an automatic quotation service. In this regard, ID and password can not only be displayed on the screen shown in FIG. 49, but also notified afterward to the e-mail address which is registered as customer information.

(3-4) Web Page New Creation Ordering Processing Related Pages

Next, ordering processing related pages of the Web page creation support system according to the present embodiment will be described with reference to FIGS. 50 to 66.

Figure 50:
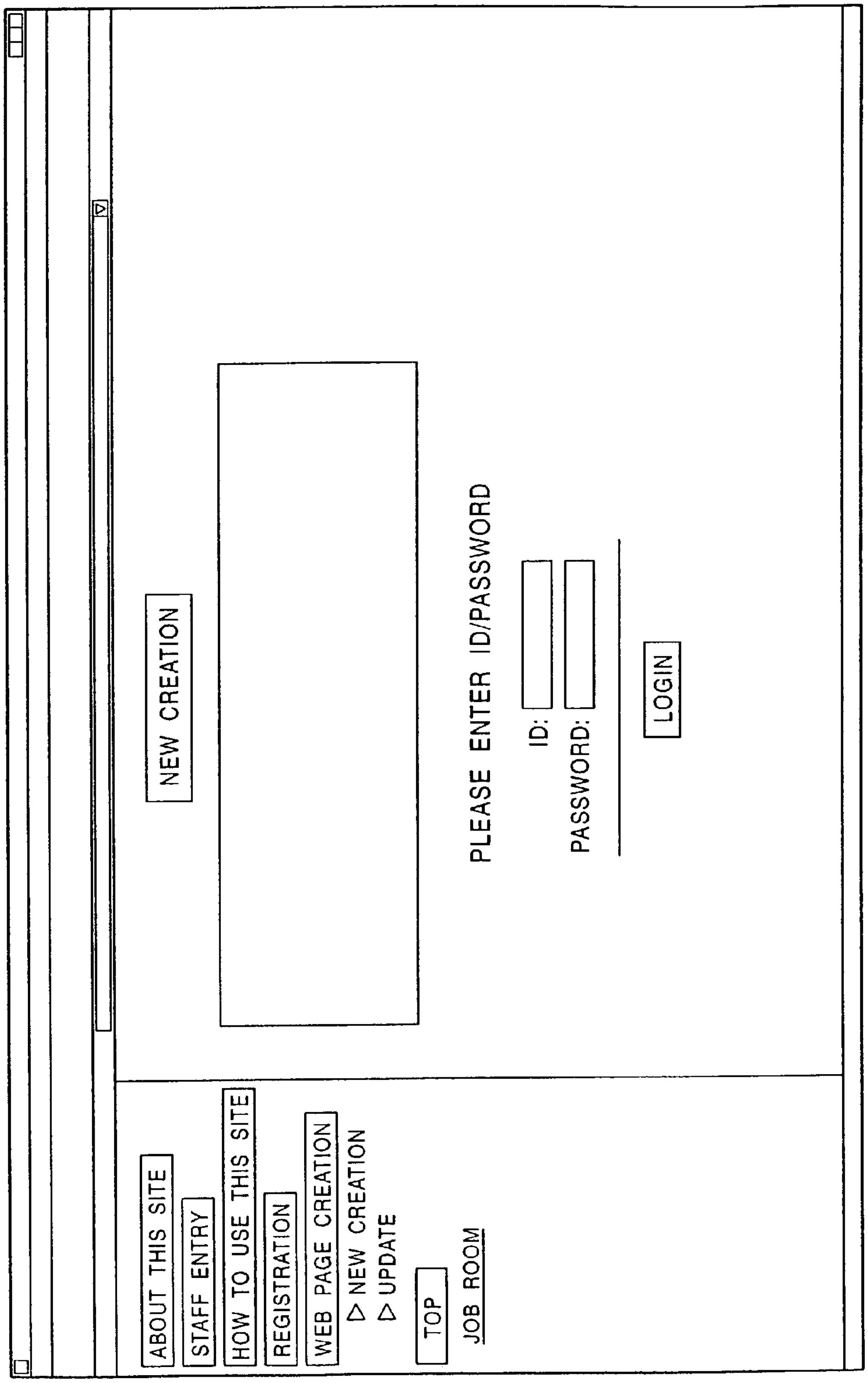
FIG. 50 is an illustration showing a browser display screen of the site providing a Web page creation support service according to an embodiment of the present invention.

FIG. 50 shows an example of "New creation" page which is the page to be authenticated to login to the ordering processing page of the Web page creation support system according to the present embodiment. The customer terminal unit 300 logs in to the "New creation" page and then enters template information, thereby, displaying a preview screen and automatic quotation are performed based on this template information.

As already described, in order to display preview screen and to receive automatic quotation service based on the Web page creation support system according to the present embodiment, the customer needs to perform customer registration and receive issued ID and password. In "New creation" screen as shown in FIG. 50, the customer terminal unit 300 enters ID and password which are given by customer registration, thus the customer can login the subsequent page for template information entering.

As already described, after logging in, the customer terminal unit 300 determines the taste of a Web page frame as template information: (1) design selection and page items to be displayed on a Web page are determined, (2) item selection, and (3) item contents selection for determining the contents to be placed on the page items on a Web page. (3) The item contents selection is performed in sequence in accordance with the screens.

Figure 51:
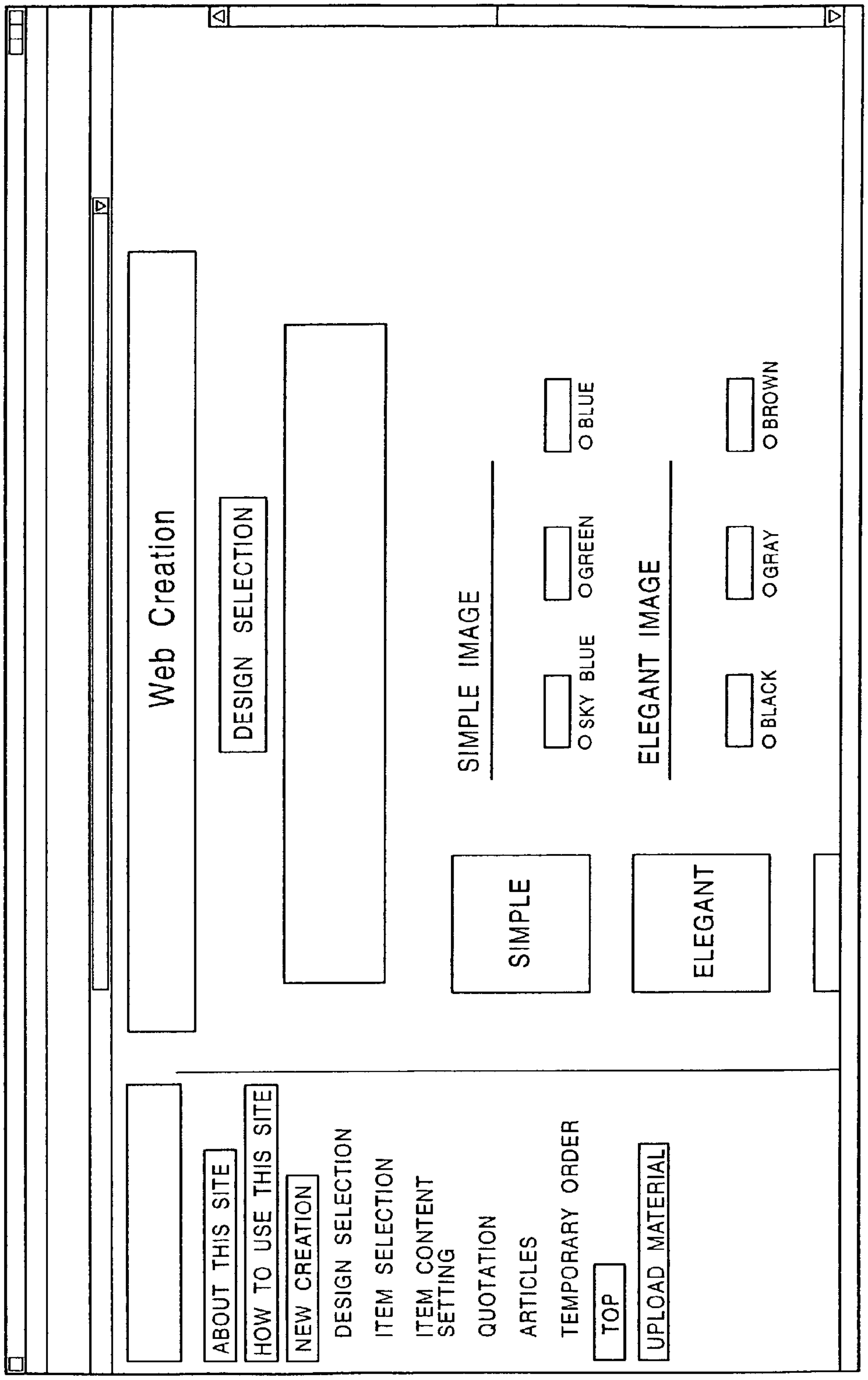
FIG. 51 is an illustration showing a browser display screen of the site providing a Web page creation support service according to an embodiment of the present invention.
Figure 52:
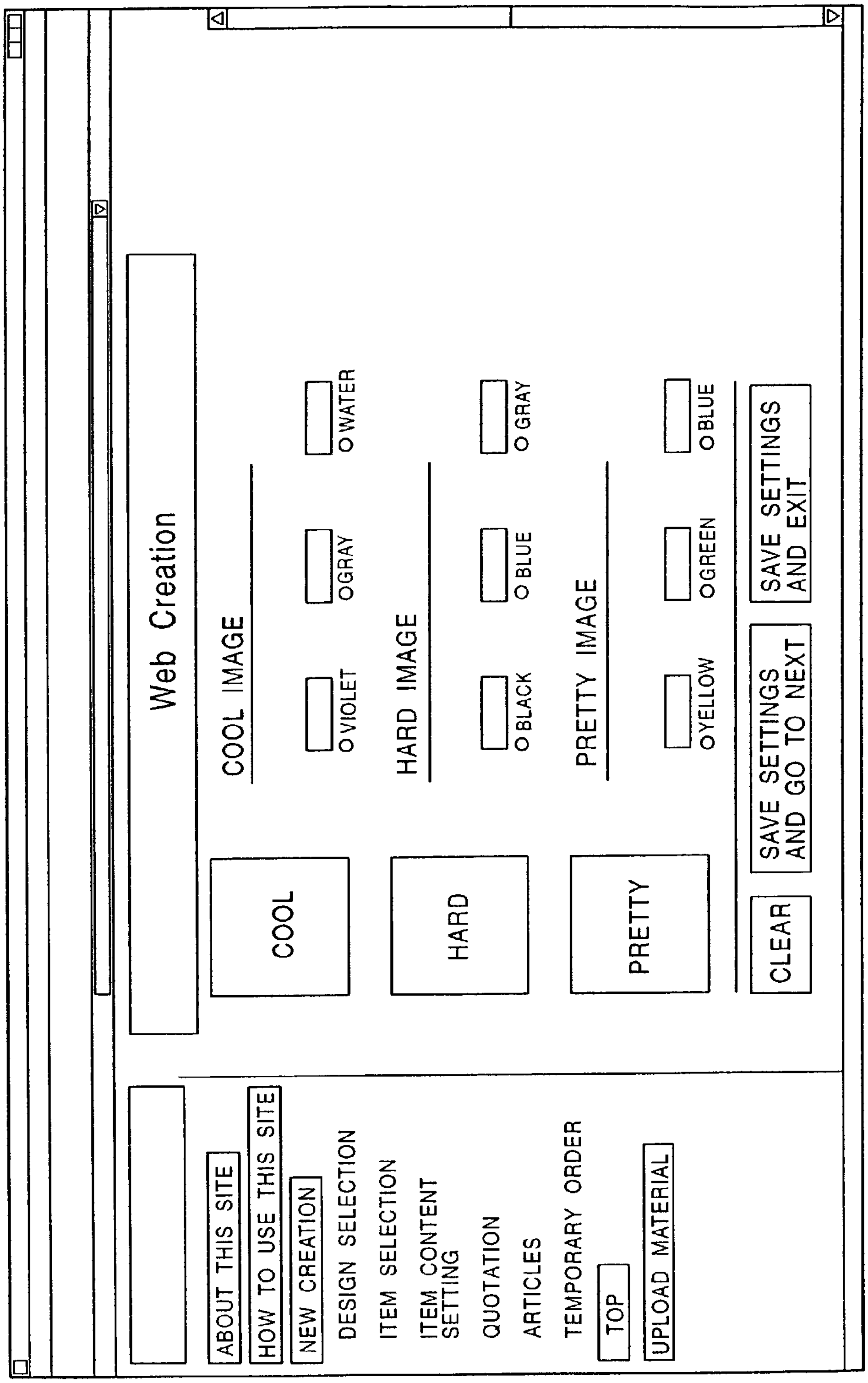
FIG. 52 is an illustration showing a browser display screen of the site providing a Web page creation support service according to an embodiment of the present invention.

FIGS. 51 and 52 show an example of "Design selection" page which performs design selection among the above-described template information set-up. The types of design which can be selected are predetermined at the Web page creation support server side, and in the illustrated example, "simple image", "elegant image", "cool image", "hard image", "pretty image" and so on are shown together with their thumbnails. Also, for color tone, in the illustrated example, for example, in the case of "simple image", the screen is generated to give selection of color tone from three types of colors; sky blue, green, and blue. In the case of the "elegant image", the screen is generated to give selection of color tone from three types of colors; black, gray, and green. In the case of the "cool image", the screen is generated to give selection of color tone from three types of colors; "violet", "gray", and "water". In the case of the "hard image", the screen is generated to give selection of color tone from three types of colors; "black", "blue", and "gray". In the case of the "pretty image", the screen is generated to give selection of color tone from three types of colors; "yellow", "green", and "blue".

Figure 53:
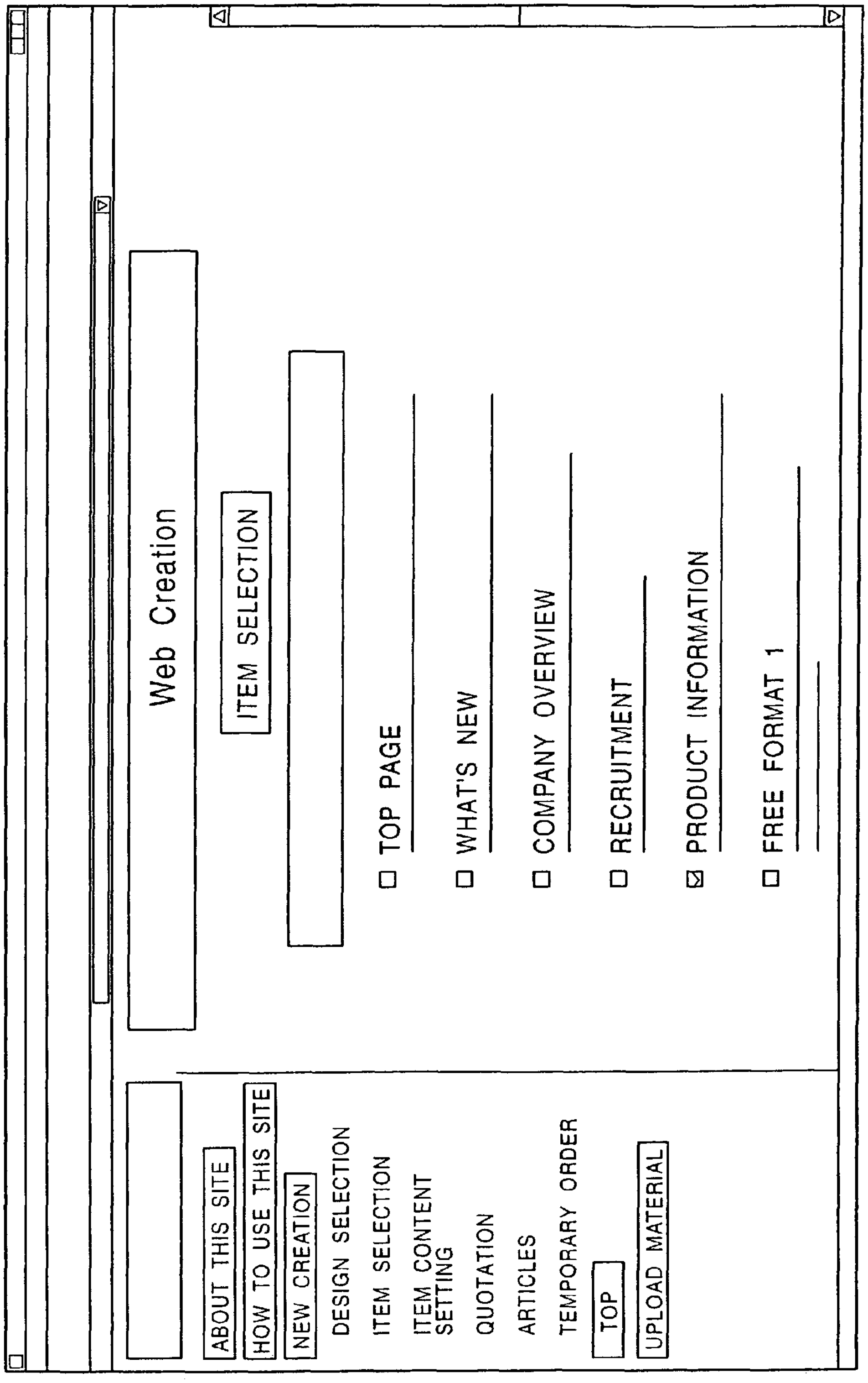
FIG. 53 is an illustration showing a browser display screen of the site providing a Web page creation support service according to an embodiment of the present invention.
Figure 54:
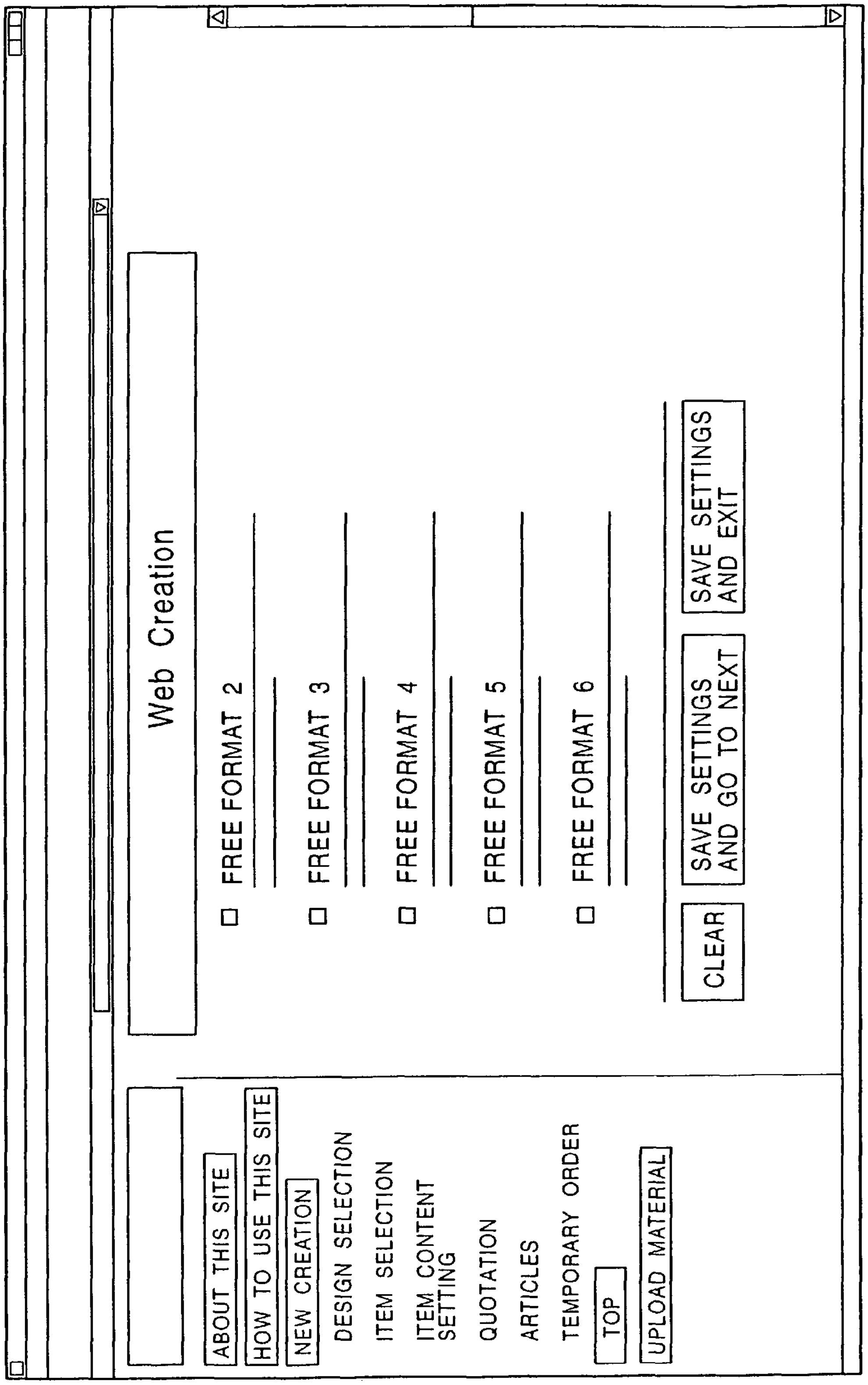
FIG. 54 is an illustration showing a browser display screen of the site providing a Web page creation support service according to an embodiment of the present invention.

FIGS. 53 and 54 shows an example of "Item selection" page which selects Web page items among the template information setting. In an example shown in FIGS. 53 and 54, the page items which can be selected are "Top" page item, "What's New" page item, "Company overview" page item, "Recruiting staff" page item, "Product information" page item, several "Free format" page item, but the present system is not limited to these examples and it is needless to say that the template information which is necessary for a Web page creation is freely set up.

The customer terminal unit 300 can select, in the screen shown in FIGS. 53 and 54, the pages to be displayed as his/her own Web pages. In this regard, "Top" page is the first page to be displayed to any client when he/she accesses Web page, and it is a mandatory page item, thus, it is formed such that the customer terminal unit 300 cannot determine whether to contain it or not.

Figure 55:
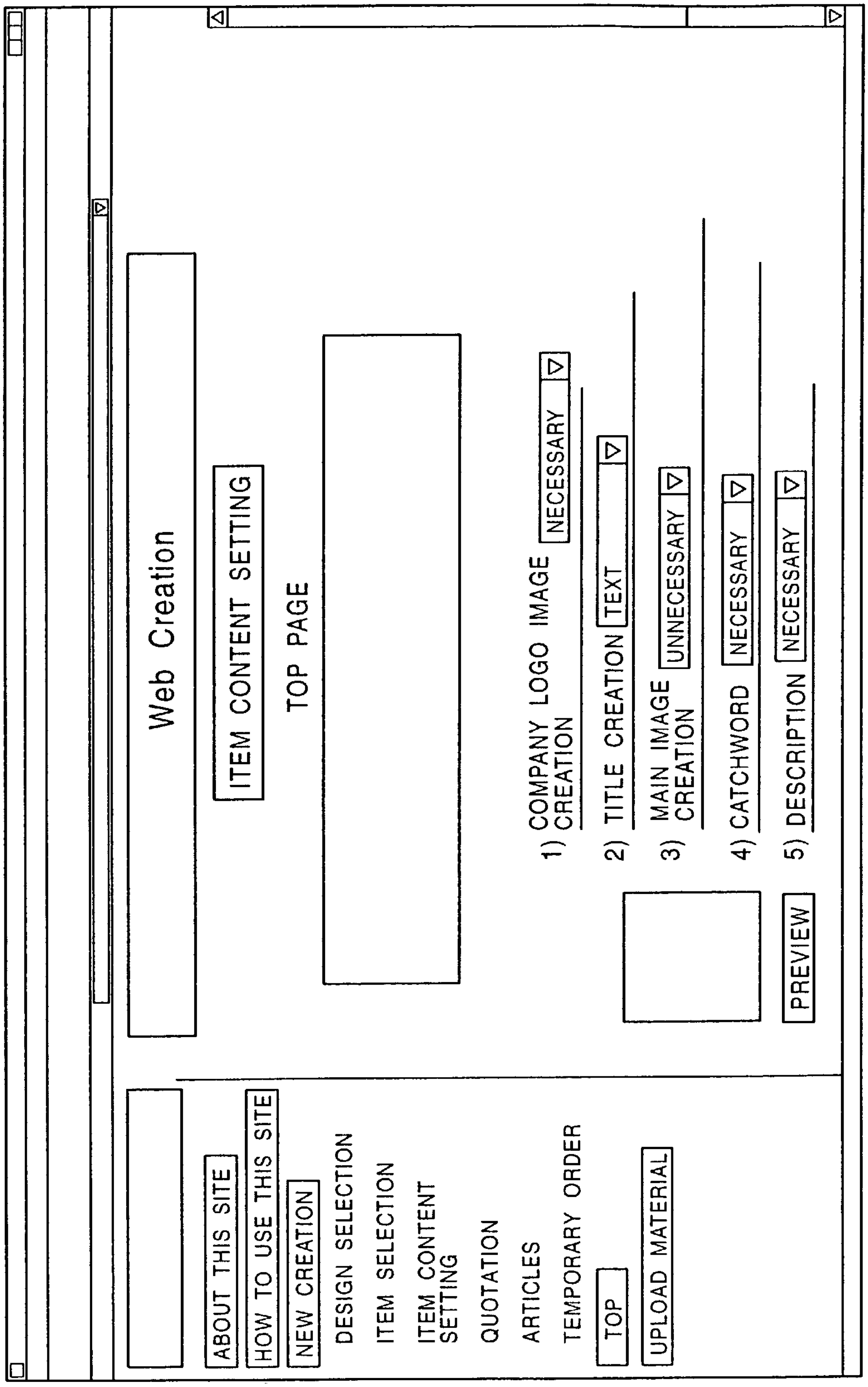
FIG. 55 is an illustration showing a browser display screen of the site providing a Web page creation support service according to an embodiment of the present invention.
Figure 56:
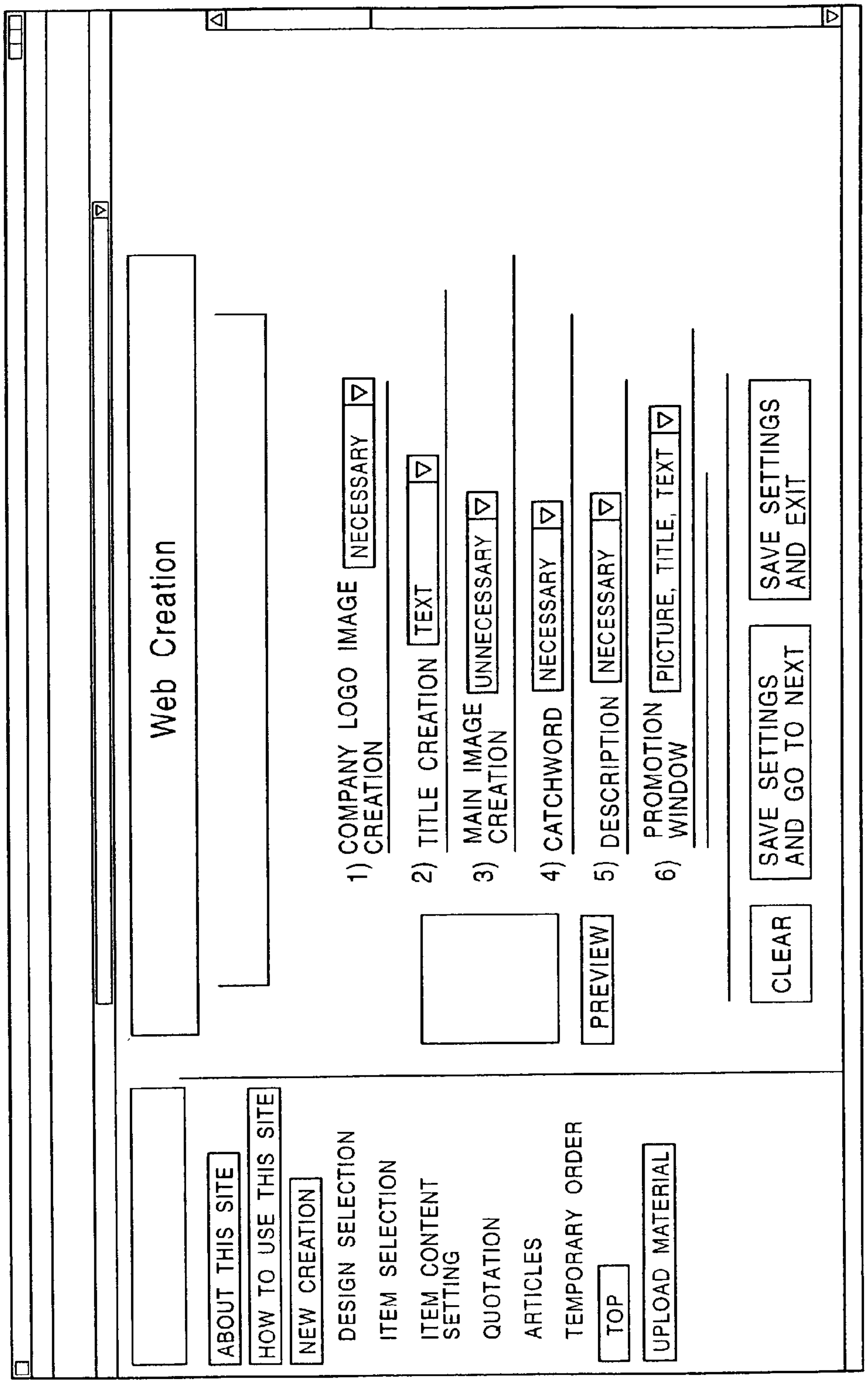
FIG. 56 is an illustration showing a browser display screen of the site providing a Web page creation support service according to an embodiment of the present invention.
Figure 57:
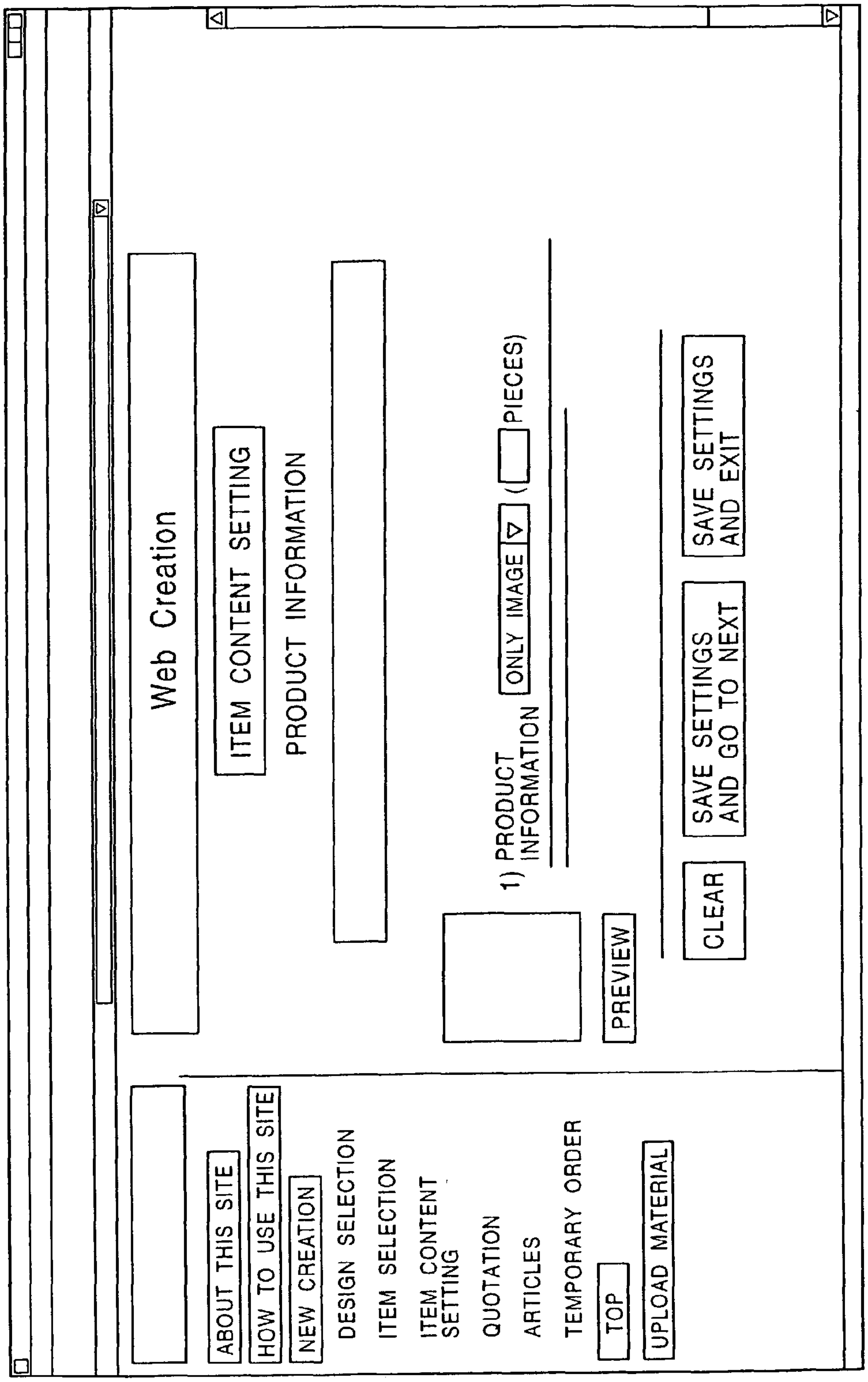
FIG. 57 is an illustration showing a browser display screen of the site providing a Web page creation support service according to an embodiment of the present invention.

FIGS. 55 to 57 shows an example of "Item contents setting" page on which the customer terminal unit 300 selects the item contents to be displayed specifically on the page item selected as Web pages by the customer.

First, "Item contents setting" pages shown in FIGS. 55 and 56 are about "Top" page. The pages are formed to select freely the following pages to be contained on the top page, for example: (1) creation of company logo image; (2) creation of title (for example, company name, etc.); (3) creation of a main image (for example, the image or photograph of the company); (4) catchword (for example, a catchword for appealing the company); (5) description (placing an overview description of a company); (6) promotion window (placing products and services to appeal using photo, title, text and so on).

Also, on each page for setting the template information, the "Preview" button is prepared. When "Item contents setting" is performed, registration of template information is completed in any case. At this moment, the customer terminal unit 300 can press "Preview" screen, and follow the preview screen processing flow as shown in FIG. 26 to view the preview screen about "Top" page as shown in FIGS. 27 and 28, thus, grasp the overall image of the web pages to be requested.

"Item contents setting" page as shown in FIG. 57 is about "Product information". Here, the screen is formed such that the customer terminal unit 300 can select in what style the product information is displayed, for example, whether either only image or text is displayed, or both of them are displayed, and in addition, determine how much product information is displayed.

Also in this screen, the customer terminal unit 300 can press the "Preview" button, and follow the preview screen processing flow as shown in FIG. 26 to view the preview screen about "Top" page as shown in FIGS. 29 and 30, thus, grasp the overall image of the Web pages to be requested.

Figure 58:
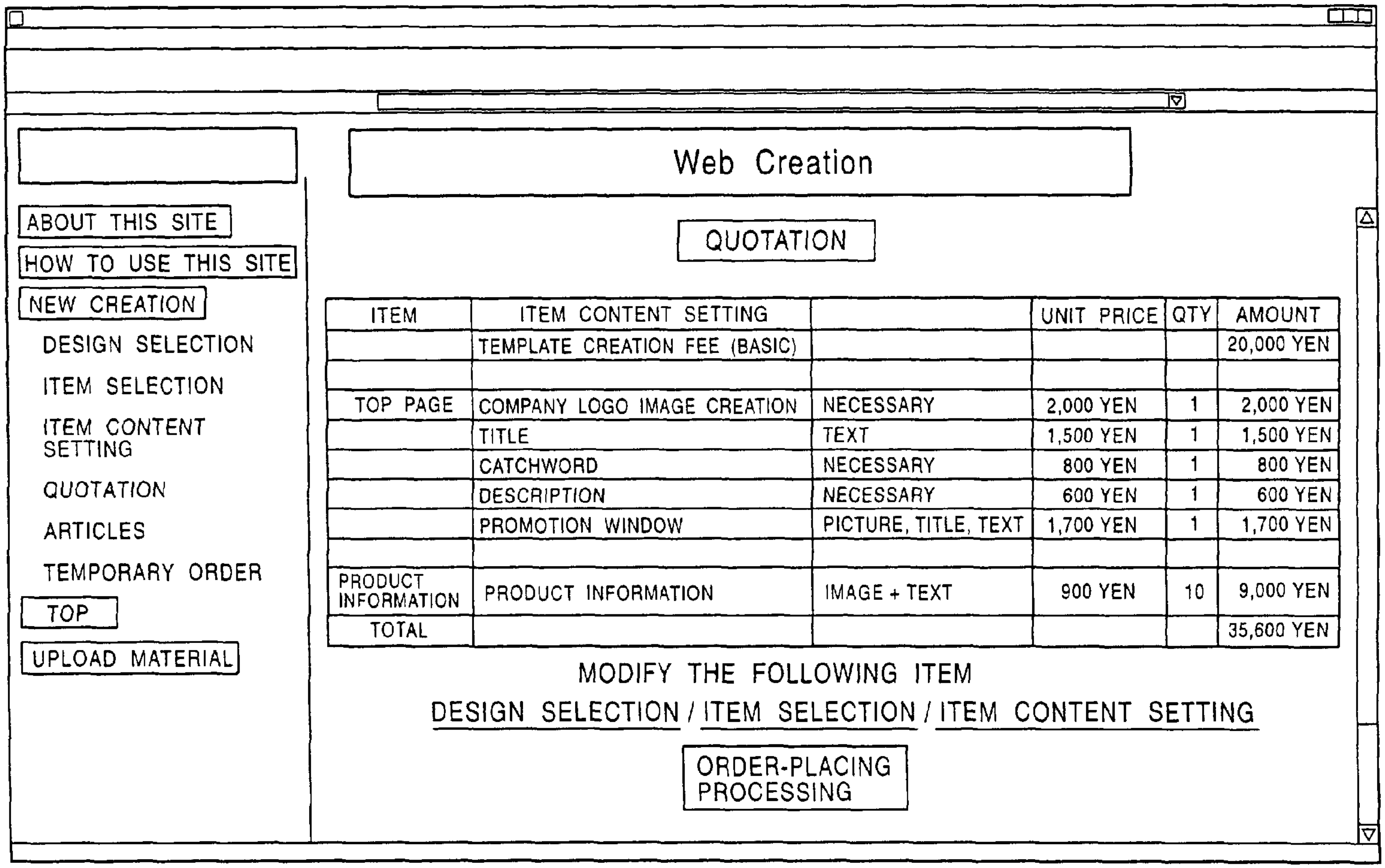
FIG. 58 is an illustration showing a browser display screen of the site providing a Web page creation support service according to an embodiment of the present invention.

As described above, when template information is registered in the Web page creation support server, the cost necessary for creating Web pages in accordance with the registered template information is displayed as "Quotation" page as shown in FIG. 58 almost in real time. If the customer terminal unit 300 does not satisfy the quotation amount, the customer can go back to "Design selection" page, "Item selection" page, and "Item contents setting" page, and modify the registered contents, an then view the new quotation corresponding to the modified contents in real time.

When the customer has accepted the displayed quotation amount, the customer presses "Go to placing order" button in the screen shown in FIG. 58 to cause the system to move to the ordering information input screen shown in FIG. 59 in order to proceed to the ordering which is characteristic in the Web page creation support system according to the present embodiment.

Here, according to the present embodiment of the Web page creation support system, before the Web page creation support server 100 receives order of the Web page creation job from the customer terminal unit 300, some requirements are shown to the customer terminal unit 300 to perform order placing processing.

One of the ordering processing is entering detailed information about the customer terminal unit 300 which is requested by "Ordering information input" pages shown in FIGS. 59 to 61. Here, registration of more detailed information (secondary customer information) is requested in addition to the customer information which is requested when using preview screen and automatic quotation service of the Web page creation system. Information requested here is the information necessary for the credit inquiry described below, thus, if the customer terminal unit 300 is an individual client, the information includes personal information, such as an address, credit card number, etc., and if the customer terminal unit 300 is a business enterprise, the information includes the capital amount of the enterprise, location of the main office, correspondent bank, and so on.

Figure 62:
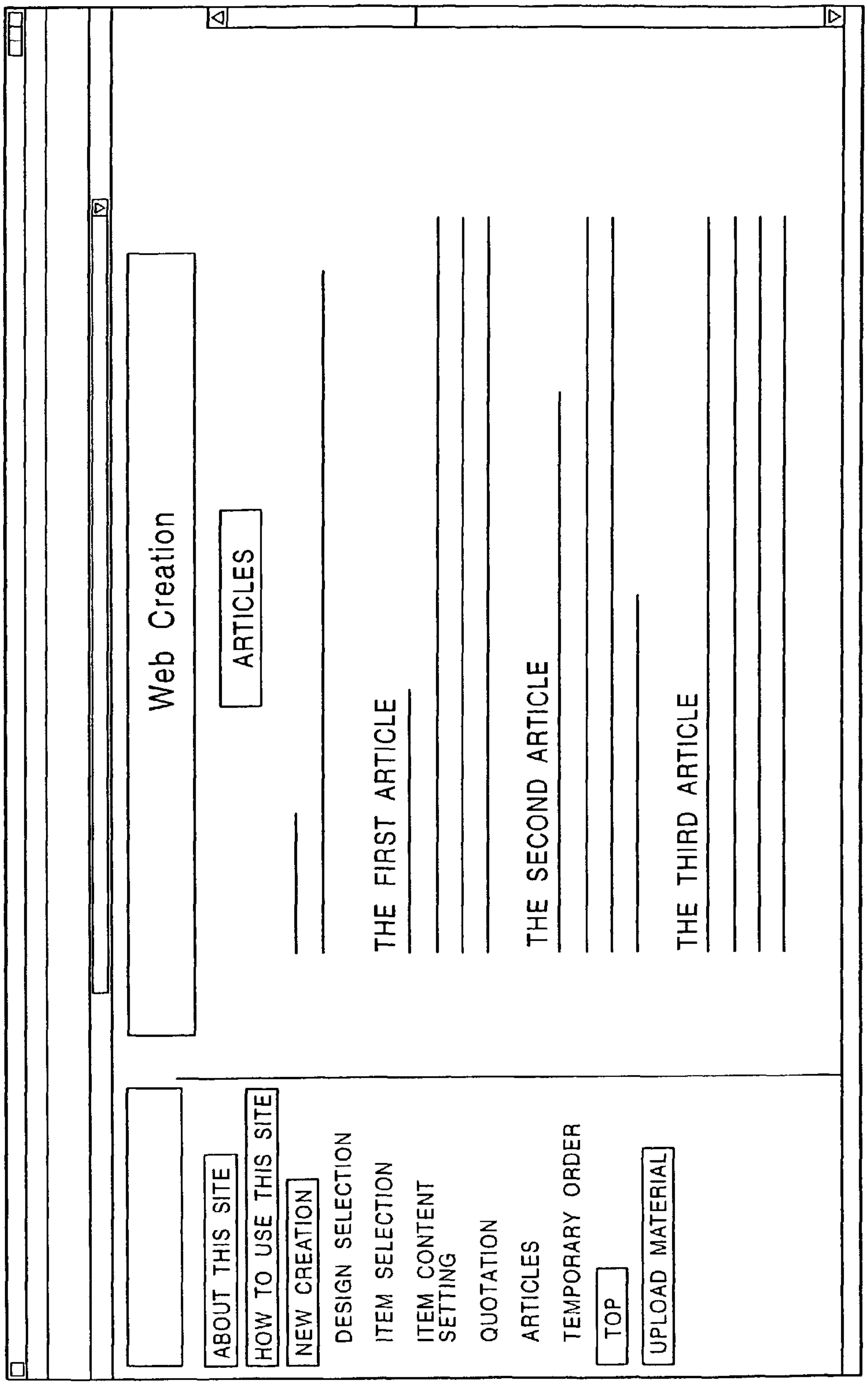
FIG. 62 is an illustration showing a browser display screen of the site providing a Web page creation support service according to an embodiment of the present invention.

When predetermined items are entered in "Ordering information input" pages in this manner, the customer terminal unit 300 is requested, as the next requirement, to accept to the agreement which is shown on the "article" page as shown in FIG. 62. On this "article", in general, the copyright and disclaimer of the Web page creation support site must be confirmed. When the customer terminal unit 300 presses the "Agree to the above articles" button on the "article" page, the system displays "Quotation" page as shown in FIGS. 63 to 65.

Figure 63:
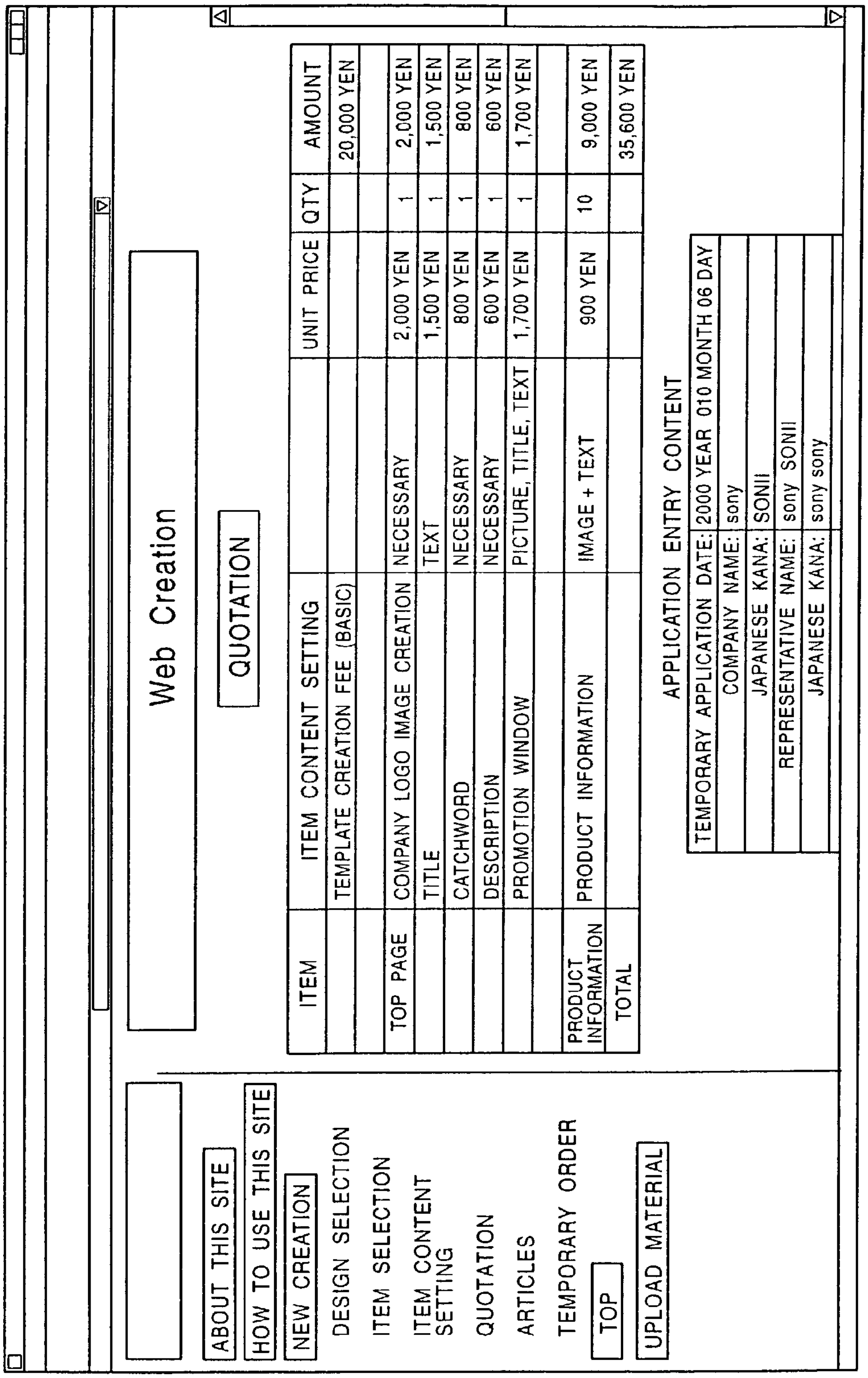
FIG. 63 is an illustration showing a browser display screen of the site providing a Web page creation support service according to an embodiment of the present invention.
Figure 66:
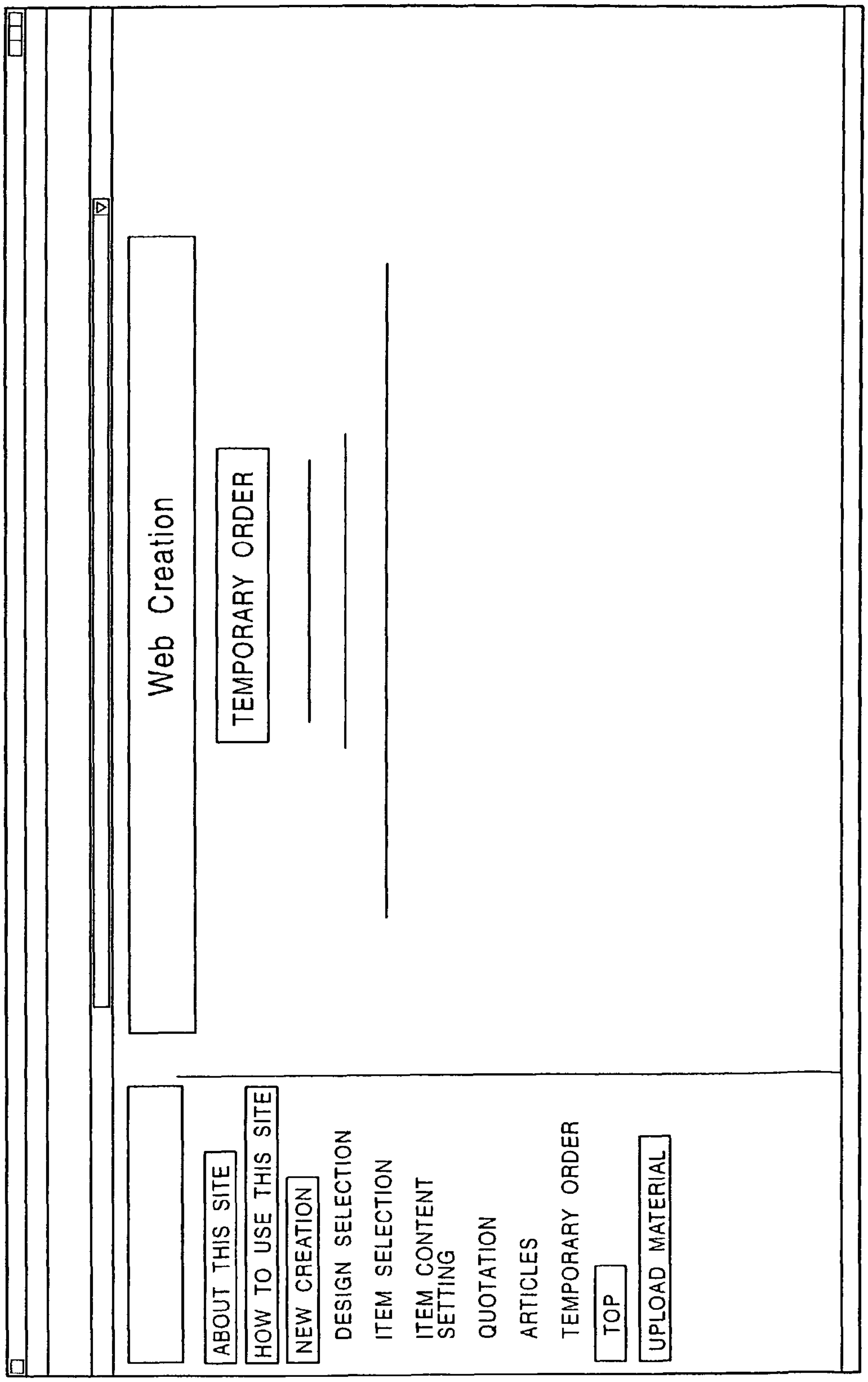
FIG. 66 is an illustration showing a browser display screen of the site providing a Web page creation support service according to an embodiment of the present invention.

In "Quotation" page as shown in FIGS. 63 to 65, the customer information entered in "Ordering information input" page is displayed as "Application description contents" in addition to the quotation contents shown in FIG. 58 of the Web page creation cost shown in the "Quotation" page shown in FIGS. 59 to 61. When the customer terminal unit 300 confirms the quotation amount and customer information, and then presses the "Send with the following contents" button in the screen shown in FIG. 65, the contents is sent to the credit processing part 120 of the Web page creation support server 100, and credit inquiry is performed based on the registered contents. Also, on the display of the customer terminal unit 300, "Temporary order" page is displayed as shown in FIG. 66.

(3-5) Credit Inquiry Page

FIG. 67 shows an example of "Status control" page which performs project status control including credit inquiry in the Web page creation support server 100. The screen comprises three frames.

The upper frame shows a list of projects of the customer which is in the process of credit inquiry. Since a credit inquiry would not been performed yet, the status column shows "In credit inquiring". To perform credit inquiry, the customer presses the "Credit" button to go to the credit inquiry processing.

The middle frame shows a list of projects of the customer which has completed the process of credit inquiry. The result of the credit inquiry is displayed in the stop-section column. For the project of the customer whose result of credit inquiry is affirmative, the column is displayed as "OK". For the project of the customer whose result of credit inquiry is negative, the column is displayed as "Credit X". For the project of the customer whose result of credit inquiry is suspended, the column is displayed as "Suspended". In this regard, the "status" columns are all "No draft entered", but this status will be changed as the project proceeds.

In addition, the lower frame shows a list of projects in which the Web page creation job is completed and delivery of the Web page draft is completed. Therefore, the status column is displayed as "Delivery completed".

FIGS. 68 and 69 show the screen when "Credit" button is pressed in the upper frame of the "Status control" shown in FIG. 67. Here, the customer information entered in the "ordering information input" page shown in FIGS. 59 to 61 is displayed in a tabular format. Since credit inquiry is not completed, the status line is displayed as "In credit inquiry" in the lower part of the screen in FIG. 69. When the "Issuing job contact memo" is pressed on this screen, a credit inquiry screen to the credit server is displayed.

Figure 71:
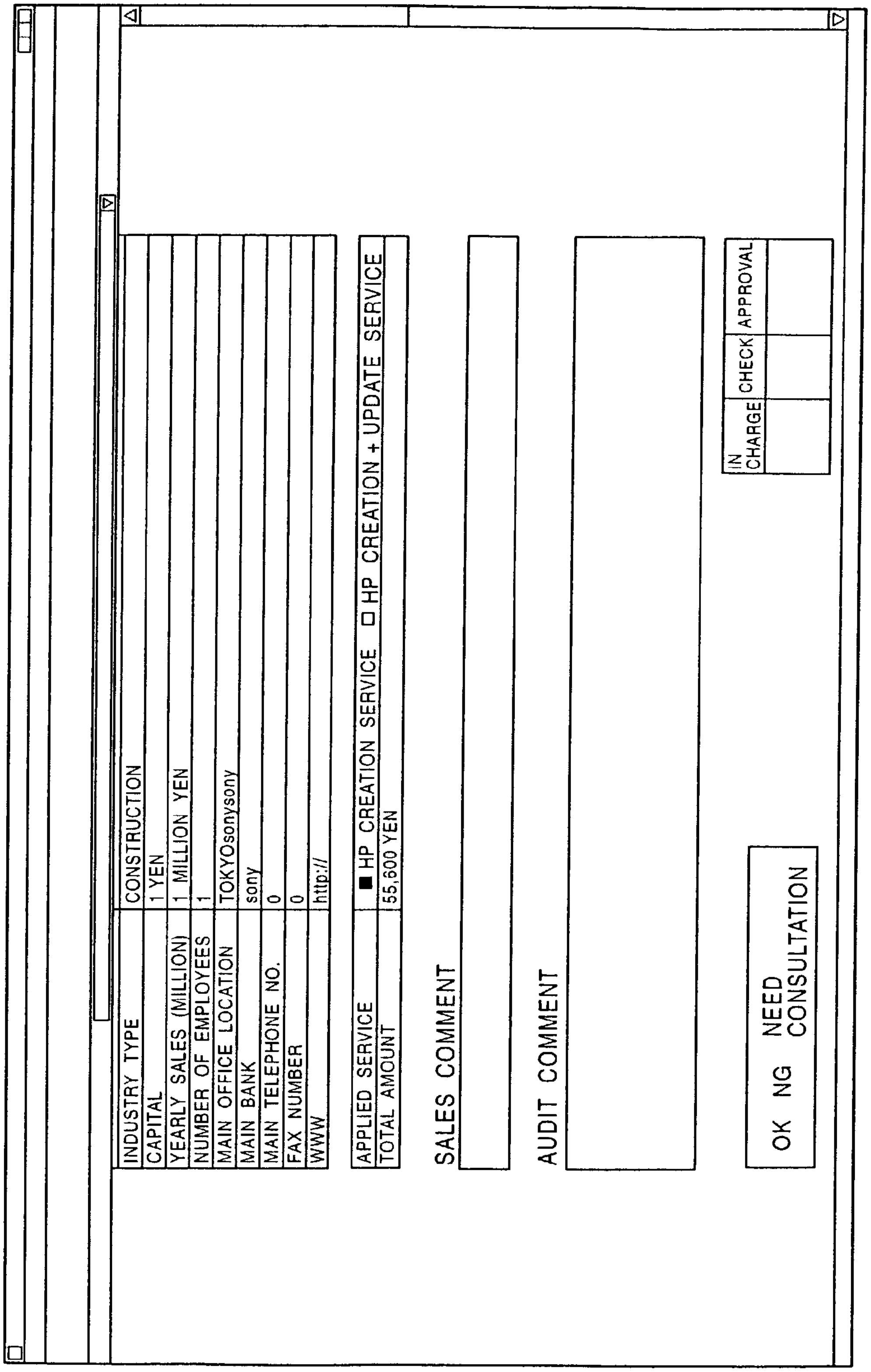
FIG. 71 is an illustration showing a browser display screen of the site providing a Web page creation support service according to an embodiment of the present invention.

FIGS. 70 and 71 show an "Job contact memo" page. The customer information on the "Job contact memo" page is sent to the credit server, and credit inquiry is performed on the credit server. The credit result is sent back to the Web page creation support server 100 as "OK", "NG", and "Needs talk". In this regard, FIGS. 70 and 71 show the job contact memo displayed in a format which can be printed out and saved, but can be generally in a tabular format.

(3-6) Web Page Creation Project Control Page

Next, description will be given to the progress control of Web page creation job which is performed via job room with reference to FIGS. 72 to 76.

Figure 72:
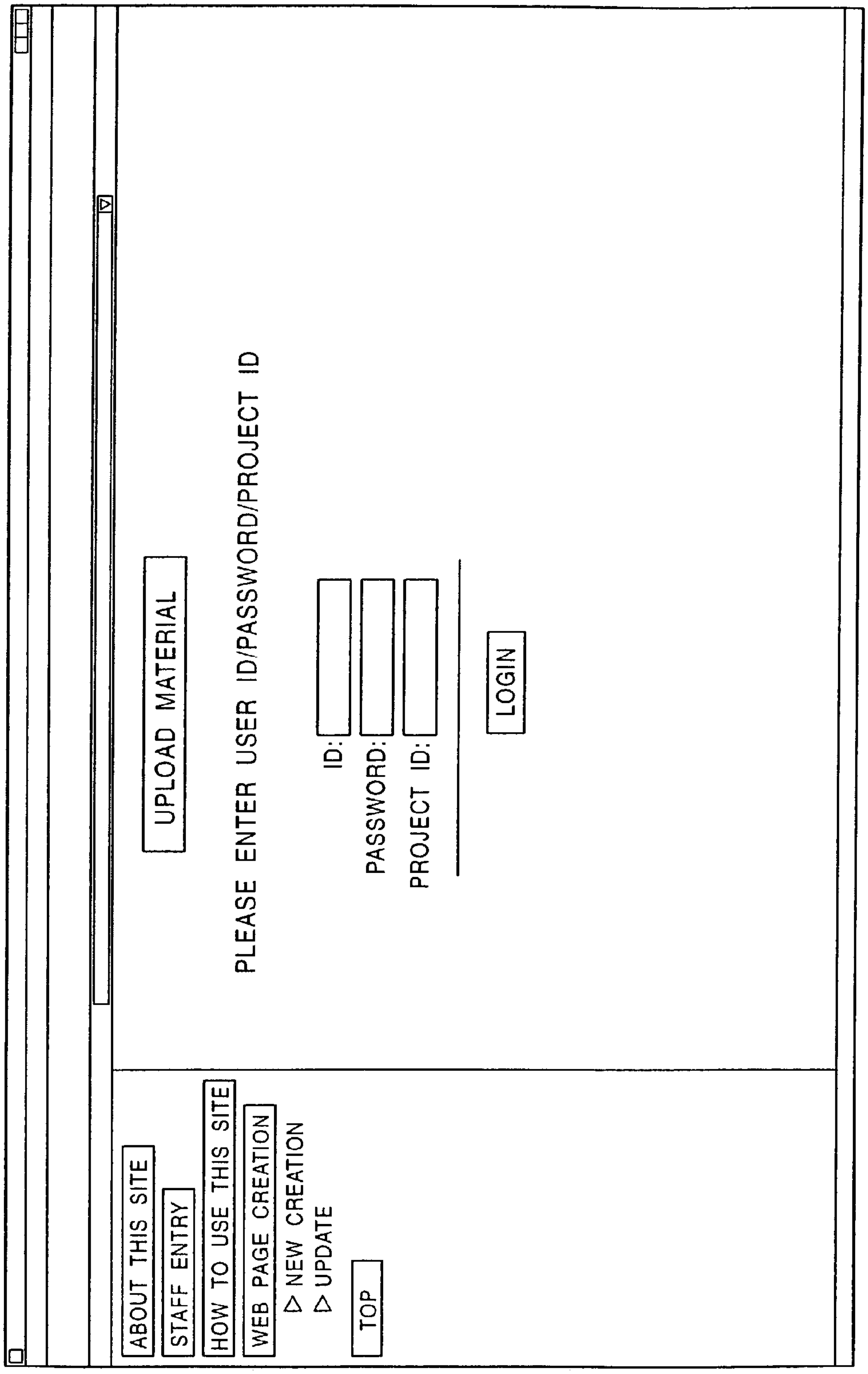
FIG. 72 is an illustration showing a browser display screen of the site providing a Web page creation support service according to an embodiment of the present invention.

FIG. 72 shows an entrance/exit screen of the job room to be set up for every ordering unit as "Material upload". The customer terminal unit 300 can enter into the job room by entering ID, password, and, in addition, project ID assigned from the actual ordering in the screen shown in FIG. 72.

Figure 73:
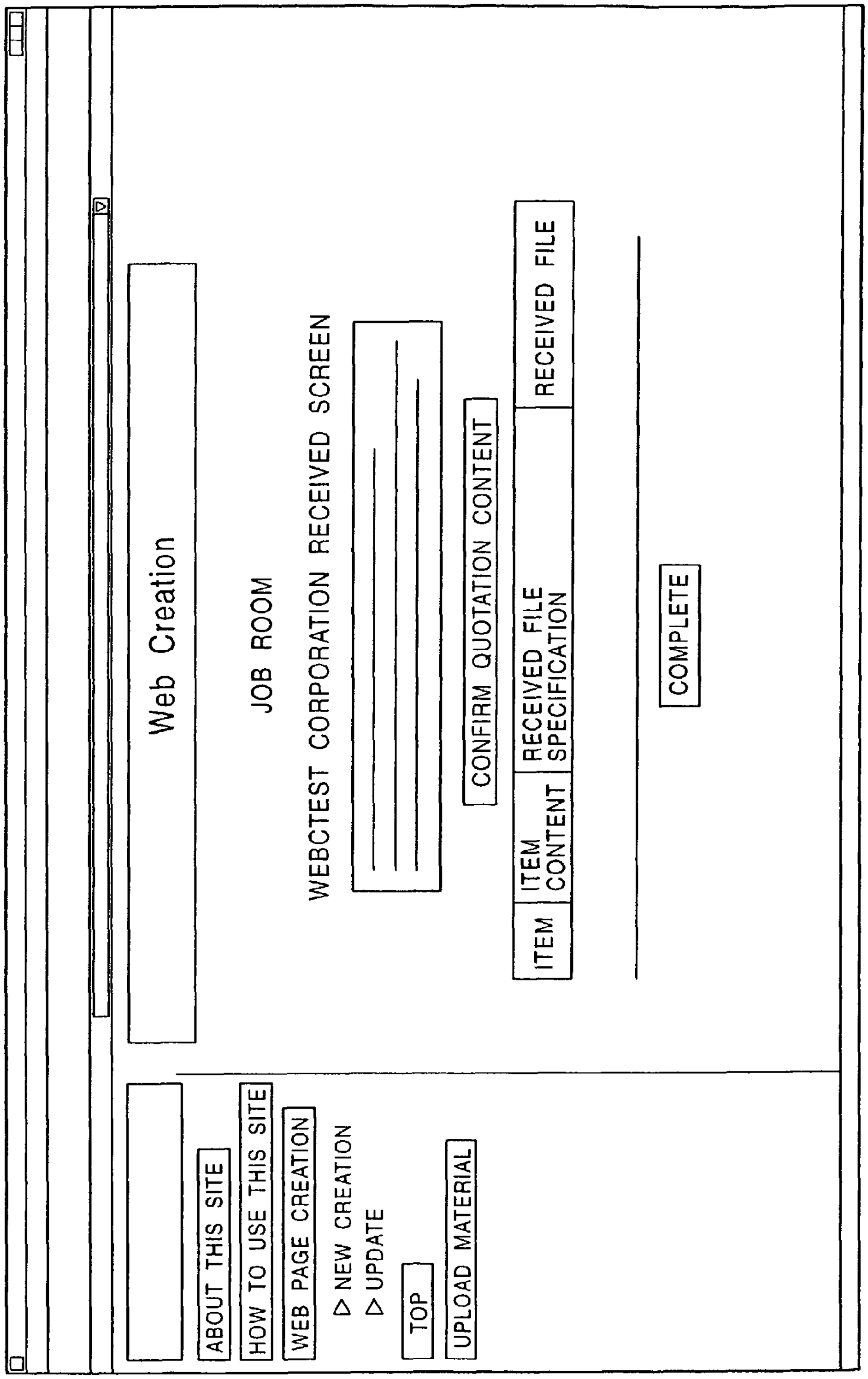
FIG. 73 is an illustration showing a browser display screen of the site providing a Web page creation support service according to an embodiment of the present invention.

FIG. 73 shows a final confirmation screen of quotation. If template information is changed after the Web creation job has been started, operations are started all over again, thus, the customer terminal unit 300 is notified and asked for agreement in this screen that no further change of the template can be allowed. Of course, if a change is allowed freely after the start of the project, the page shown in FIG. 73 can be omitted.

FIGS. 74 to 76 show job control screens displayed to the controllers of the Web page creation support server 100. The tables shown in FIGS. 74 to 76 are display examples of a controller job room which is a virtual control screen of the Web page creation support server 100.

FIG. 74 shows all the projects which are currently in progress together with their statuses. On the other hand, FIG. 75 shows only the projects of which drafts are have not entered. The controller can grasp the progress status of each project via the controller job room, and, for example, if Web contents is not entered by a deadline, the controller can urge the customer to enter the draft.

FIG. 76 shows a structure of a controller job room. By this screen, the state of receiving a draft and schedule can be grasped at one glance. In addition, information about the creator who actually performs Web page creation is also displayed. Information about the customer who requests the project can be displayed in a tabular format by pressing the "Company information" button shown at the upper left corner of the screen.

(3-7) Web Page Update Processing Related Page

In the above, a description has been given of the case where the customer terminal unit 300 requests a Web page new creation on the network in the Web page creation support system according to the present embodiment, however, the Web page creation support system according to the present embodiment can also be applied to the case where the content of the Web page is to be changed, added, or deleted after a finished Web page has been delivered. Next, with reference to FIGS. 77 to 96, a description will be given of the structure example and display examples of the pages which are related to the Web page update processing.

Figure 77:
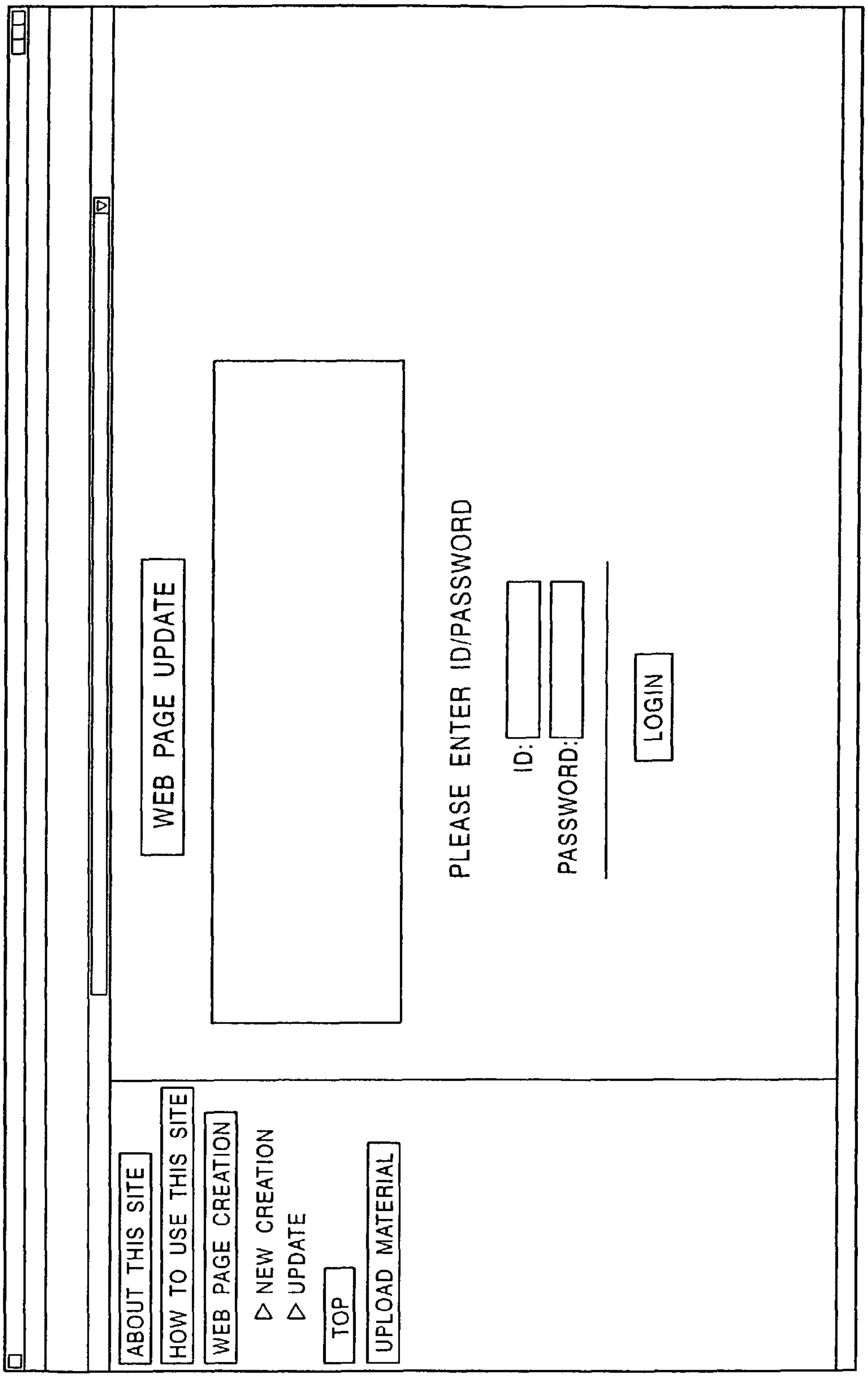
FIG. 77 is an illustration showing a browser display screen of the site providing a Web page creation support service according to an embodiment of the present invention.

When the customer terminal unit 300 who intends to update Web pages accesses the site provided by the Web page creation support server, and presses the "update" button among the "Web page creation" item on the general top page shown in FIG. 36, the processing goes to the authentication screen shown in FIG. 77. Here, the customer terminal unit 300 enters the ID and the password given at customer registration which is performed at the Web page new creation, presses the "login" button, and receives authentication from the Web page creation support server 100 whether or not the regular user.

Figure 78:
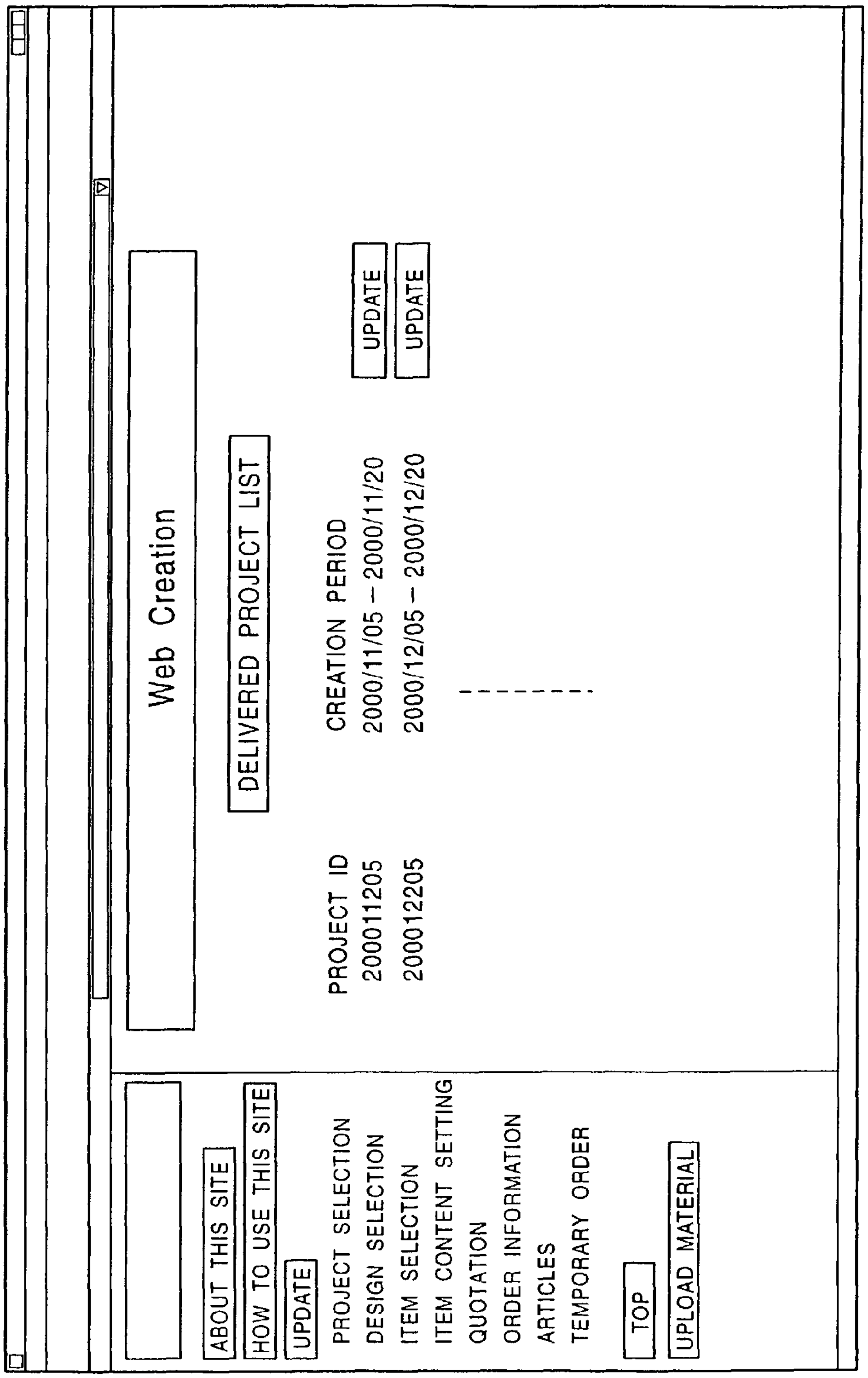
FIG. 78 is an illustration showing a browser display screen of the site providing a Web page creation support service according to an embodiment of the present invention.

When the Web page creation support server 100 has authenticated the customer terminal unit 300 who has accessed as a regular user, the login screen shown in FIG. 77 moves to the delivered project list screen shown in FIG. 78. On this project list screen, the delivered projects regarding the same customer terminal unit 300 are displayed together with the creation time period. When the customer terminal unit 300 selects the project to be updated from the displayed list and presses the "update" button, the processing goes to the item selection screen shown in FIG. 79.

Figure 79:
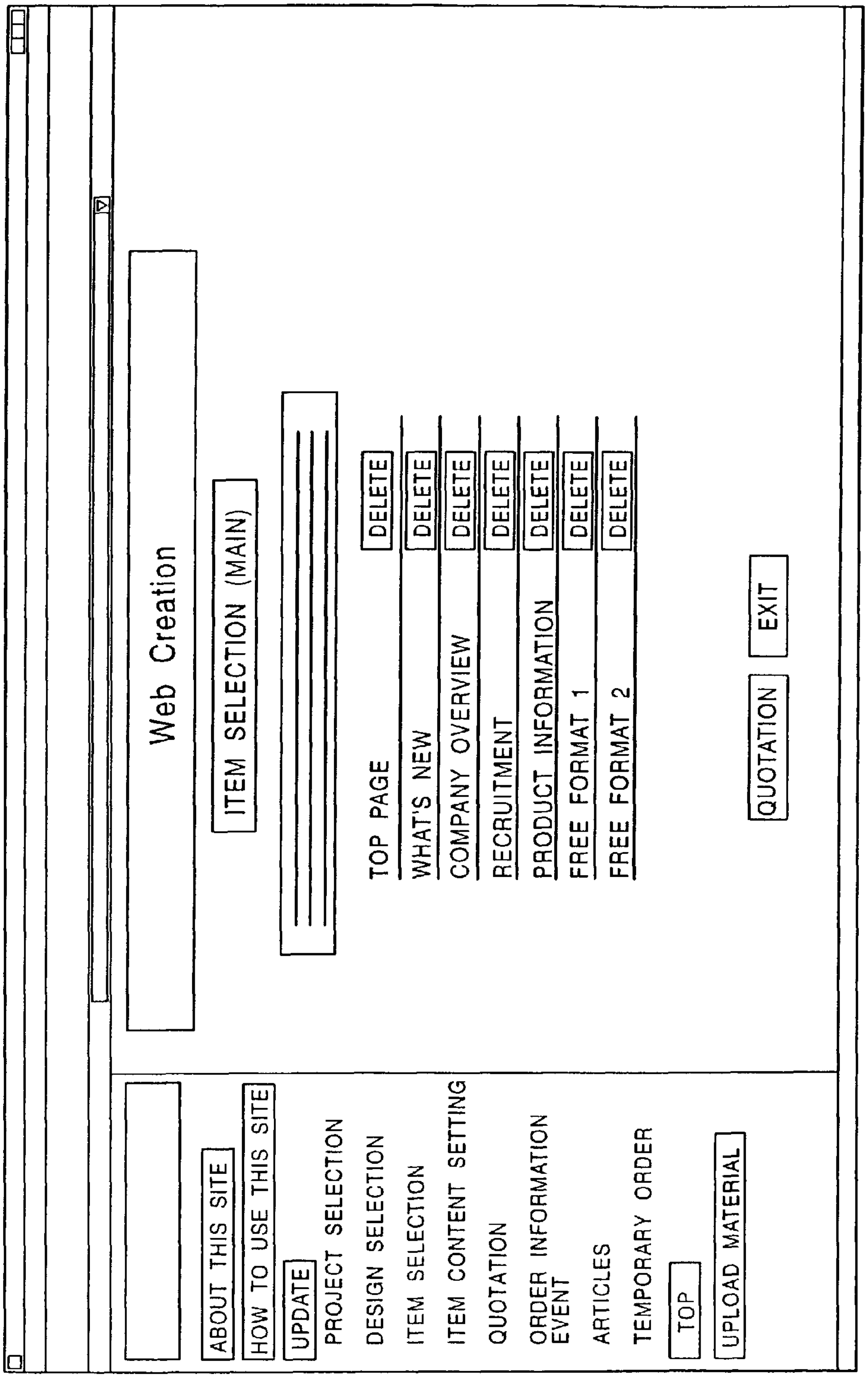
FIG. 79 is an illustration showing a browser display screen of the site providing a Web page creation support service according to an embodiment of the present invention.

On the item selection screen shown in FIG. 79, the pages which can be updated in the Web page creation support system according to the present embodiment are displayed. The example in the figure is an example of the Web page creation support system aimed at companies. On this selection screen, it is possible to select a "top" page which is displayed at first when accessing the home page, a "What's New" page which displays the latest update information of the home page, a "company overview" page which displays the overview of the company and the company policy, a "recruitment" page which displays the recruitment information, a "product information" page which displays the information about the products and services provided by the company, and a "fee format" page which can display introduction of new products and IR information.

These items are basically optional setting items, however, only the "top page" is formed as a mandatory item. Also, a plurality of pages can be set up for the "free format" page. The customer terminal unit 300 can select, on the item selection screen, pages to be newly added and the pages to be changed.

In this regard, the system is configured such that when item selection screen shown in FIG. 79 is displayed, a previous setting content screen pops up at the same time. The previous setting content shown in FIG. 80 is constantly displayed from the design selection to the quotation processing in the update processing according to the present embodiment. The customer can enter modification and addition while comparing with the previous setting content on the window shown in FIG. 80.

In the example shown in the figure, in the previous setting content, "cool/blue" is selected for the design selection, for the item selection, "top page", "What's New", "company overview", "product information", "free format 1" are selected. The customer terminal unit 300 can perform the most suitable update processing with reference to these contents.

Figure 81:
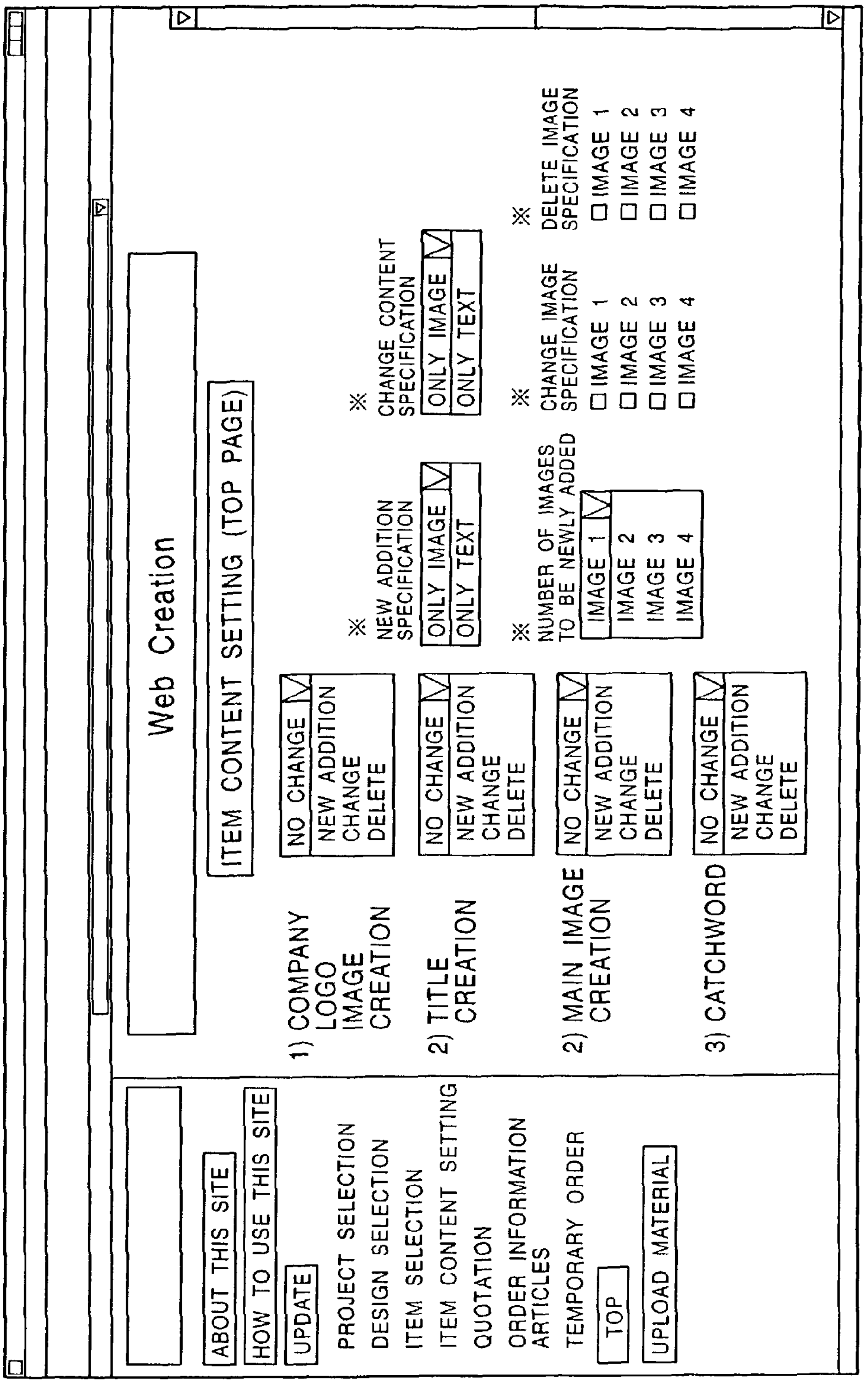
FIG. 81 is an illustration showing a browser display screen of the site providing a Web page creation support service according to an embodiment of the present invention.
Figure 82:
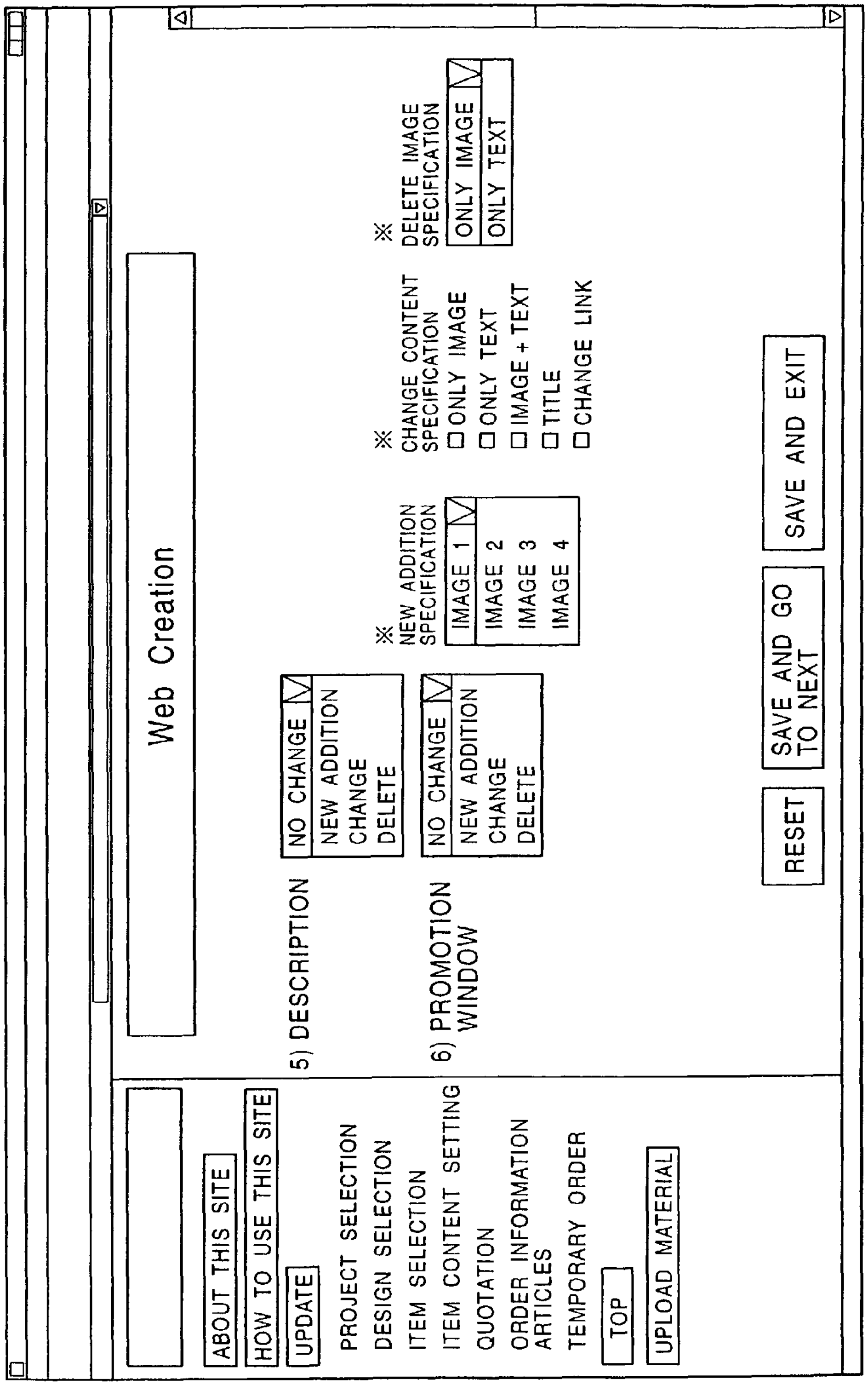
FIG. 82 is an illustration showing a browser display screen of the site providing a Web page creation support service according to an embodiment of the present invention.

In FIGS. 81 and 82, an example is shown of the item content setting regarding the top page. As shown in the figures, for each setting item, four options are basically prepared, that is, "no change", "new addition", "change", and "delete". Also, for the selection items which can be changed, "company logo image creation", "title creation", "main image creation", "catchword", "description", and "promotion window" are prepared. Also, for a specific selection item, display options are different depending on the project status. For example, "new addition specification" and "change content specification" of "title creation", "only image" and "only text" are displayed as options. Also, for "main image creation", "number of images to be newly added" is displayed as an option, and further for specification of change image and delete image, the screen is formed such that an image number can be selected by checking the number. Further, for the "new addition specification" of "promotion window", "only image", "only text", and "image+text" are displayed as options. Also, for "change content specification" of "promotion window", the screen is formed such that "only image", "only text", "image+text", "title", and "change link" can be selected by checking each of the items. Furthermore, for "delete image specification" of "promotion window", the screen is formed such that "only image" and "only text" can be displayed.

In this manner, regarding item content setting, for each selection item, items which can be selected are displayed minutely depending on the project status, thus the customer terminal unit 300 can process the change processing easily and without making mistakes only by selecting the items which need to be changed from the displayed items.

Figure 83:
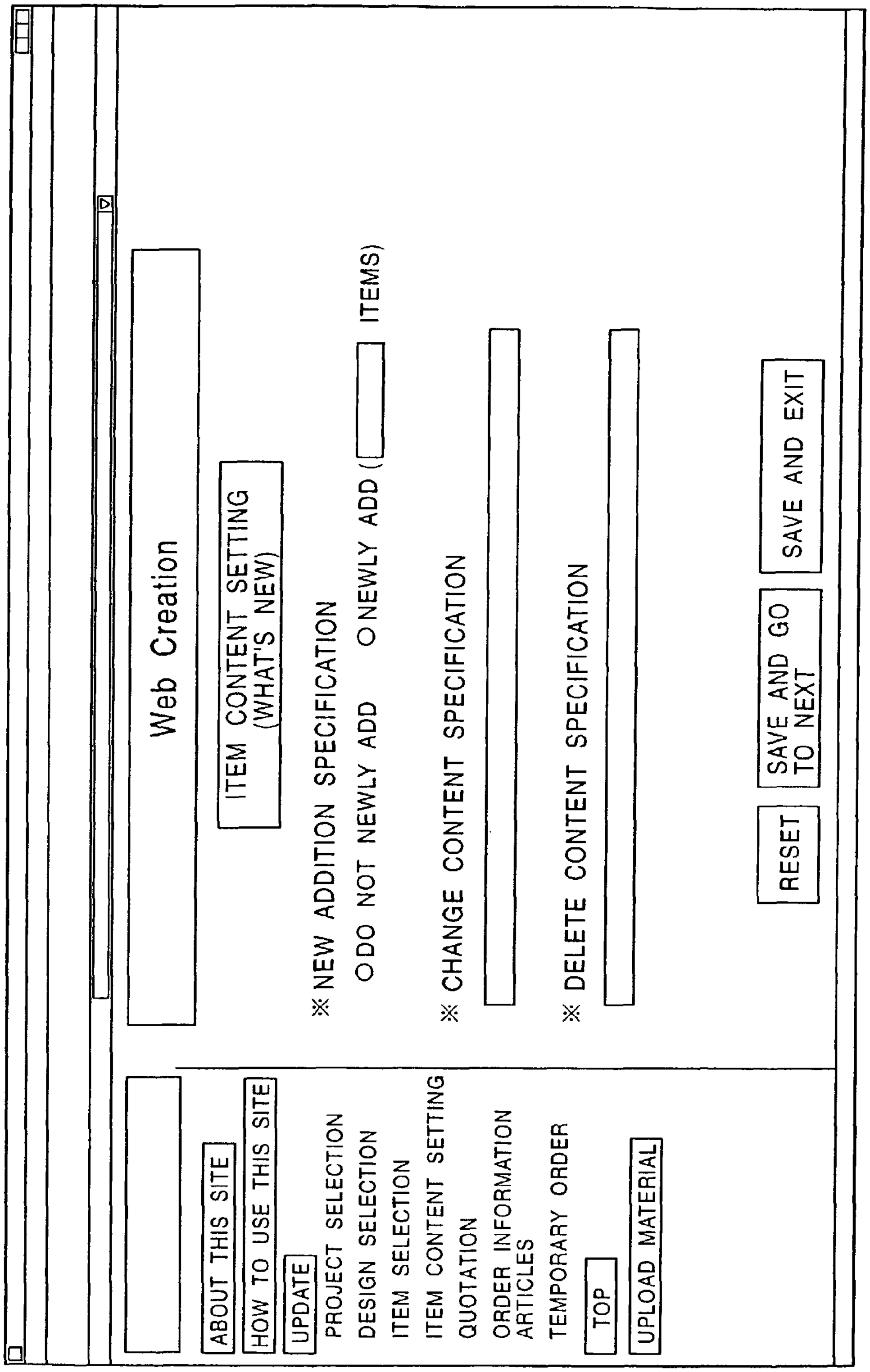
FIG. 83 is an illustration showing a browser display screen of the site providing a Web page creation support service according to an embodiment of the present invention.

In FIG. 83, an example is shown of the item content setting regarding a "What's New" page. The screen is formed by a "new addition specification" item, a "change content specification" item, and a "delete content specification" item. The "new addition specification" item is formed such that the customer can alternatively select "newly add" or "do not newly add". A "change content specification" item and "delete content specification" item are formed such that the customer specifies the number of the items which indicates one or more than one items.

Figure 84:
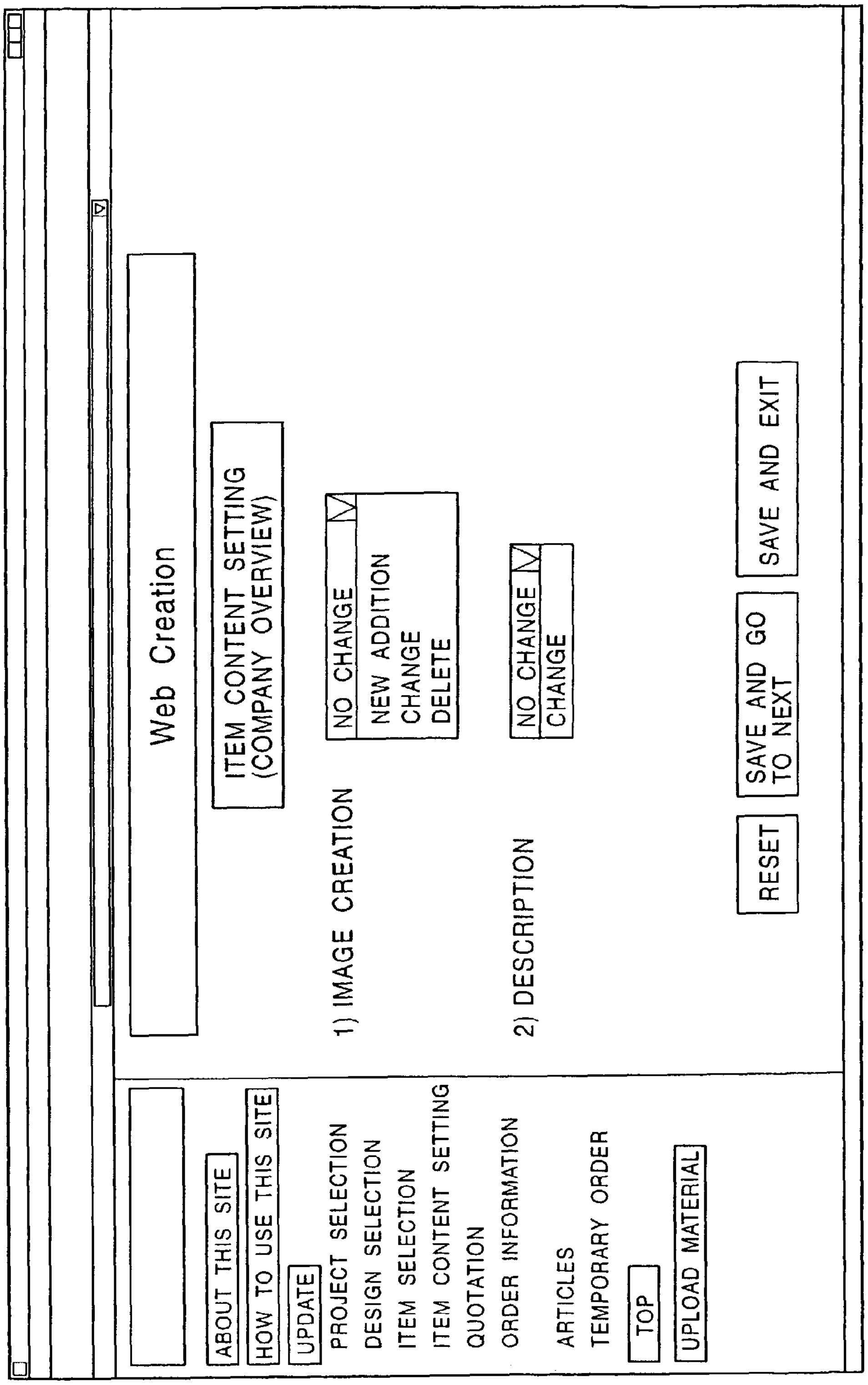
FIG. 84 is an illustration showing a browser display screen of the site providing a Web page creation support service according to an embodiment of the present invention.

In FIG. 84, an example is shown of the item content setting regarding a "company overview" page. The screen is formed, as shown in the figure, by an "image creation" item and "description" item. For the "image creation" item, four options, that are, "no change", "new addition", "change", and "delete" are prepared. The "description" item is formed to perform an alternative selection: "no change" or "change".

Figure 85:
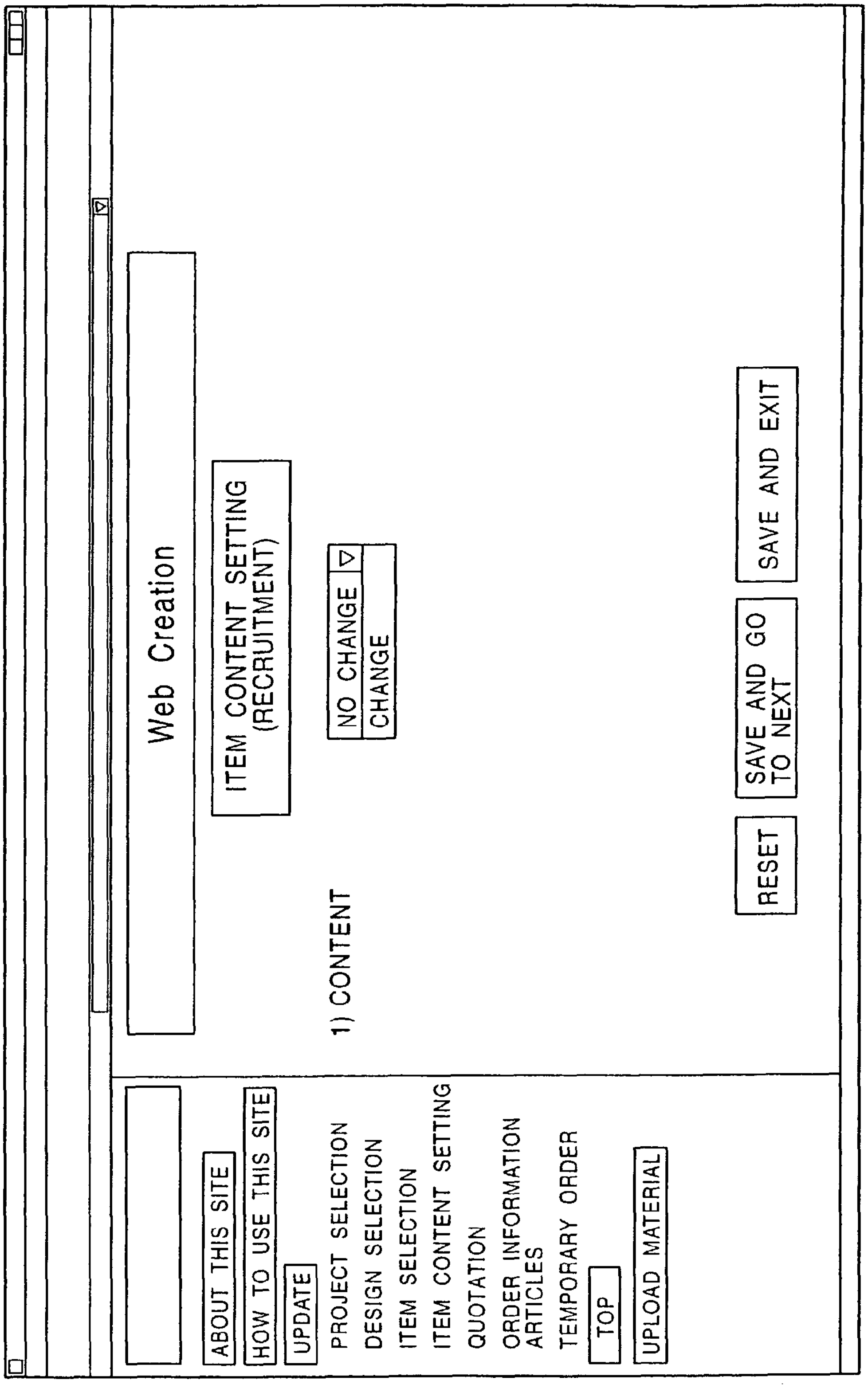
FIG. 85 is an illustration showing a browser display screen of the site providing a Web page creation support service according to an embodiment of the present invention.

In FIG. 85, an example is shown of the item content setting regarding a "recruitment" page. As shown in the figure, the screen is formed by a "content" item, and is formed for performing an alternative selection: "no change" or "change".

Figure 86:
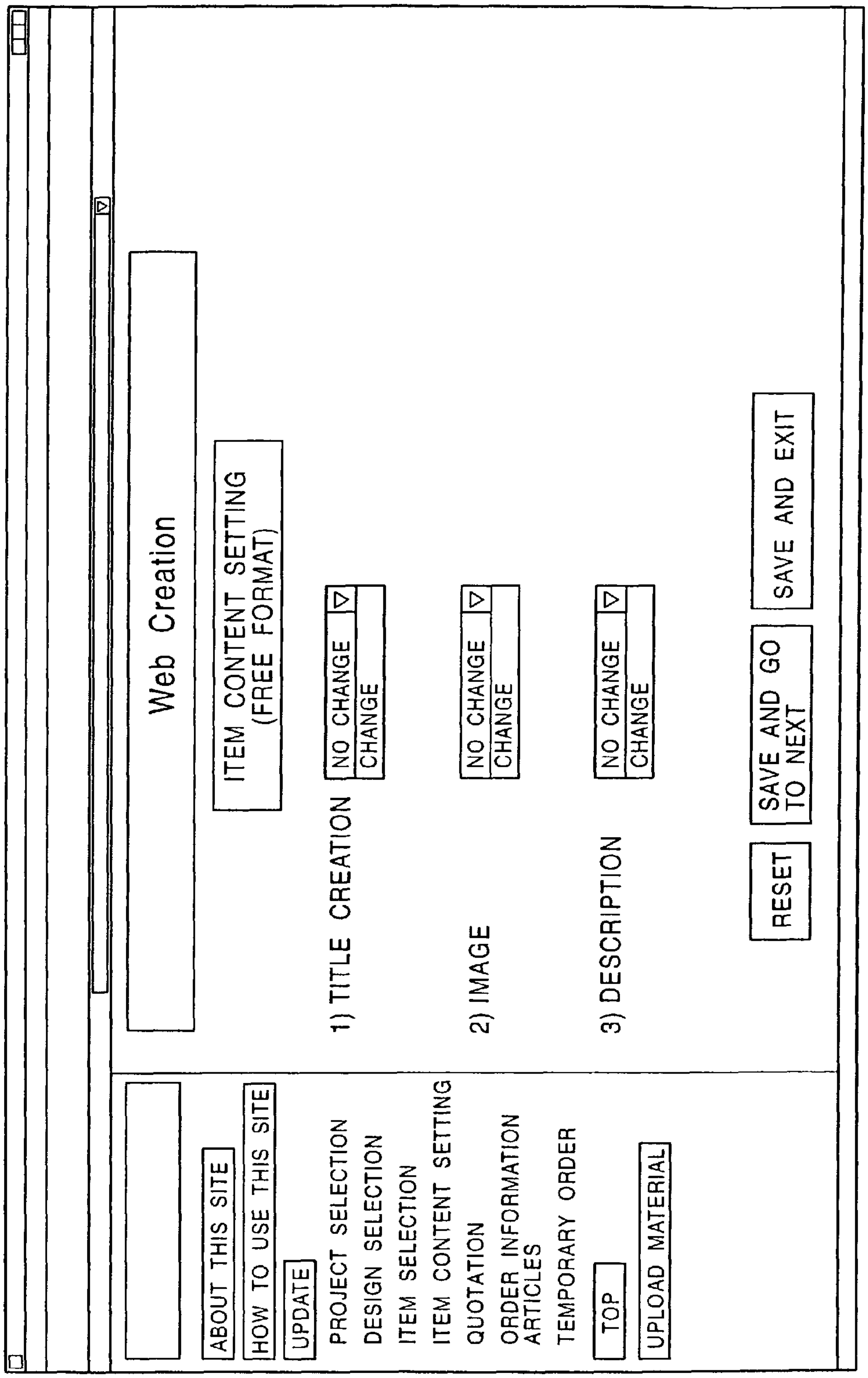
FIG. 86 is an illustration showing a browser display screen of the site providing a Web page creation support service according to an embodiment of the present invention.

In FIG. 86, an example is shown of the item content setting regarding a "free format" page. The screen is formed by a "title creation" item, an "image" item and a "description" item. Each item is formed for performing an alternative selection: "no change" or "change".

Here, when describing the product information page in detail, as shown in FIGS. 87 to 95, update of the product information is performed on the product information item selection screen and item content setting screen.

Figure 87:
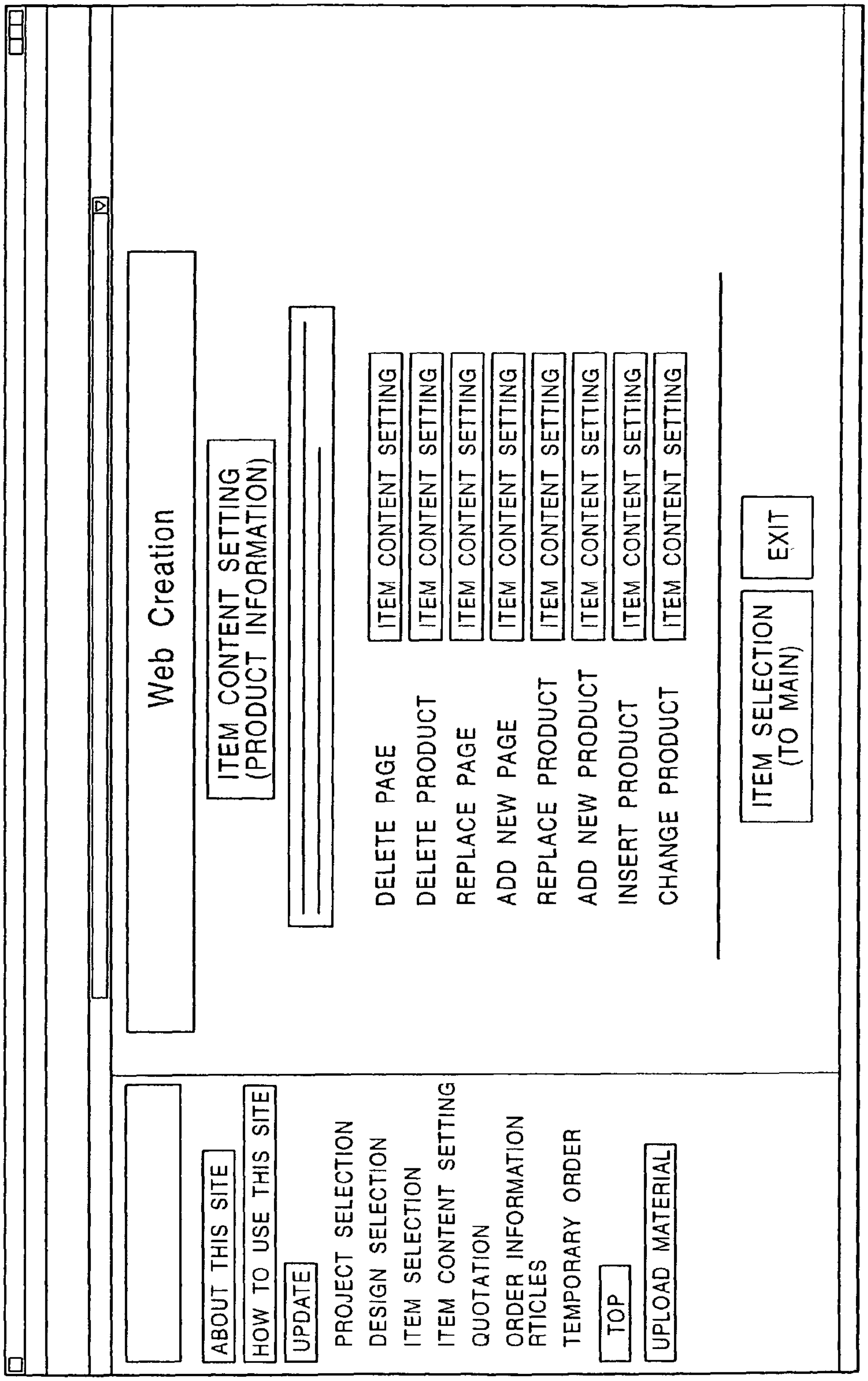
FIG. 87 is an illustration showing a browser display screen of the site providing a Web page creation support service according to an embodiment of the present invention.

In FIG. 87, an example is shown of the item selection screen of the product information. As shown in the figure, in this screen, the customer can select each of the items: "delete page", "delete product", "replace page", "add new page", "replace product", "add new product", "insert product", and "change product".

Figure 88:
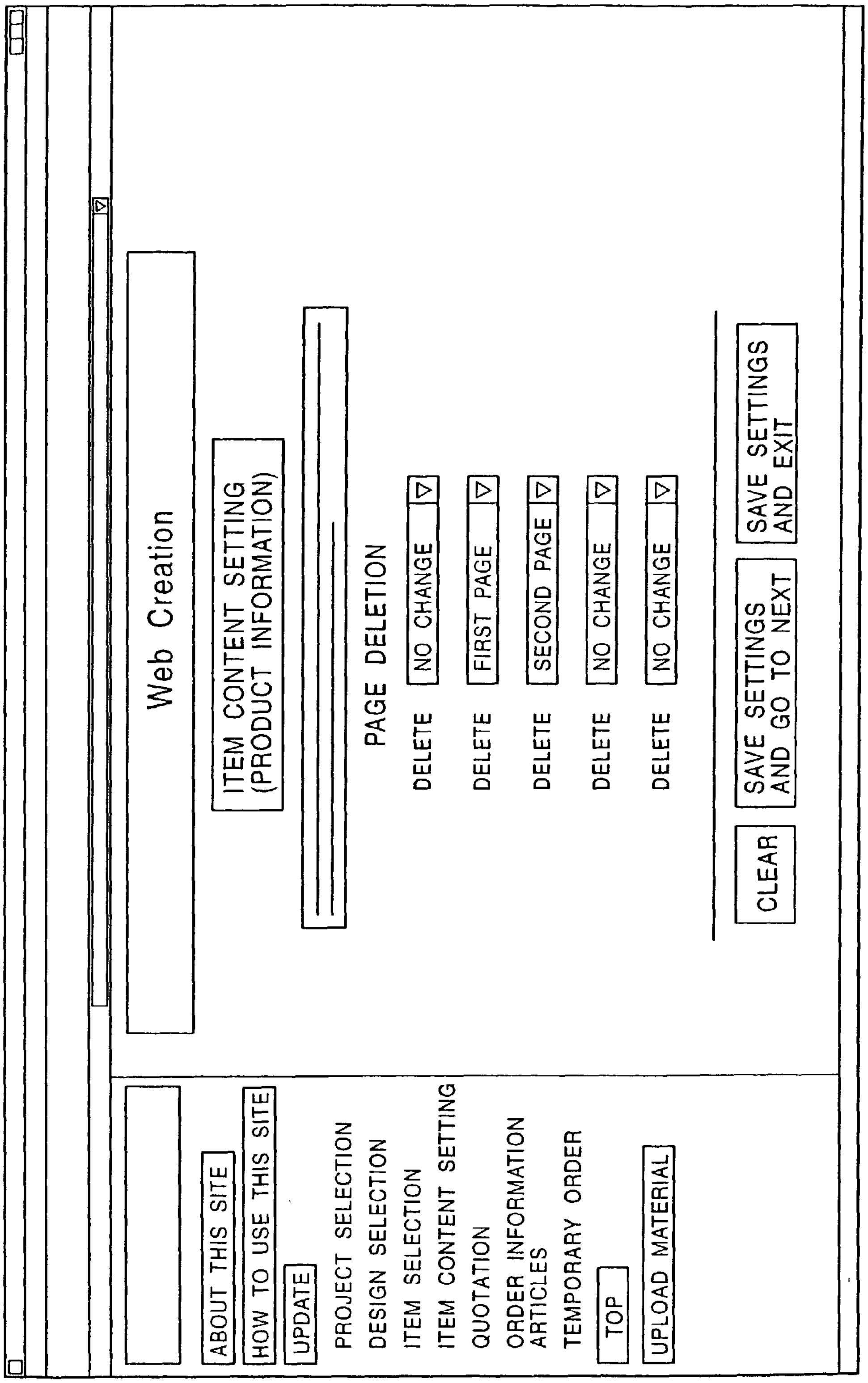
FIG. 88 is an illustration showing a browser display screen of the site providing a Web page creation support service according to an embodiment of the present invention.

In FIG. 88, an example is shown of the item content setting screen of the "product page deletion". As shown in the figure, on this screen, the customer specifies the product page to be deleted, and can change the template information regarding product page deletion.

Figure 89:
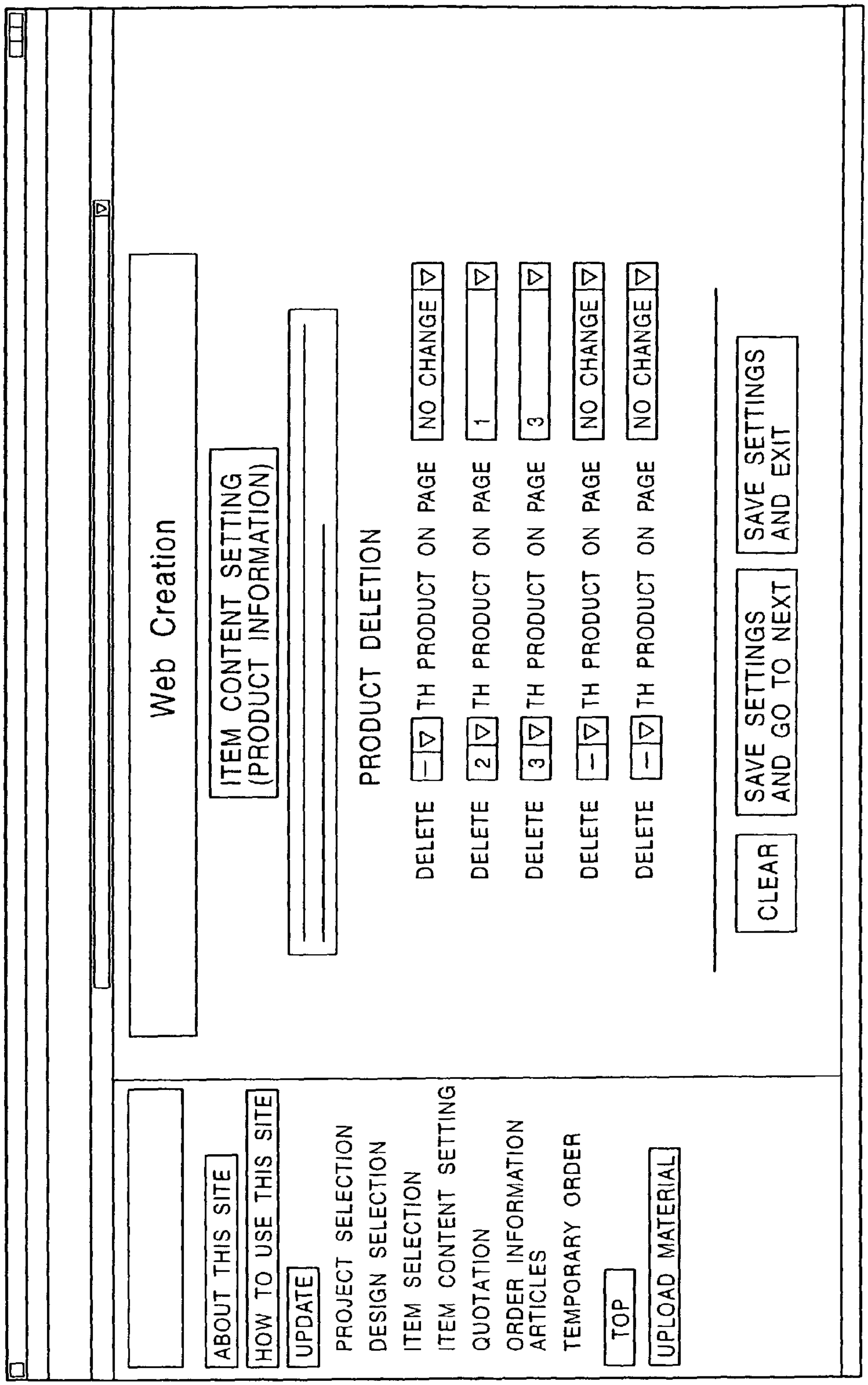
FIG. 89 is an illustration showing a browser display screen of the site providing a Web page creation support service according to an embodiment of the present invention.

In FIG. 89, an example is shown of the item content setting screen of the "product deletion". As shown in the figure, on this screen, the customer specifies the page on which the product is listed and the sequence number of the product, and can change the template information regarding product deletion.

Figure 90:
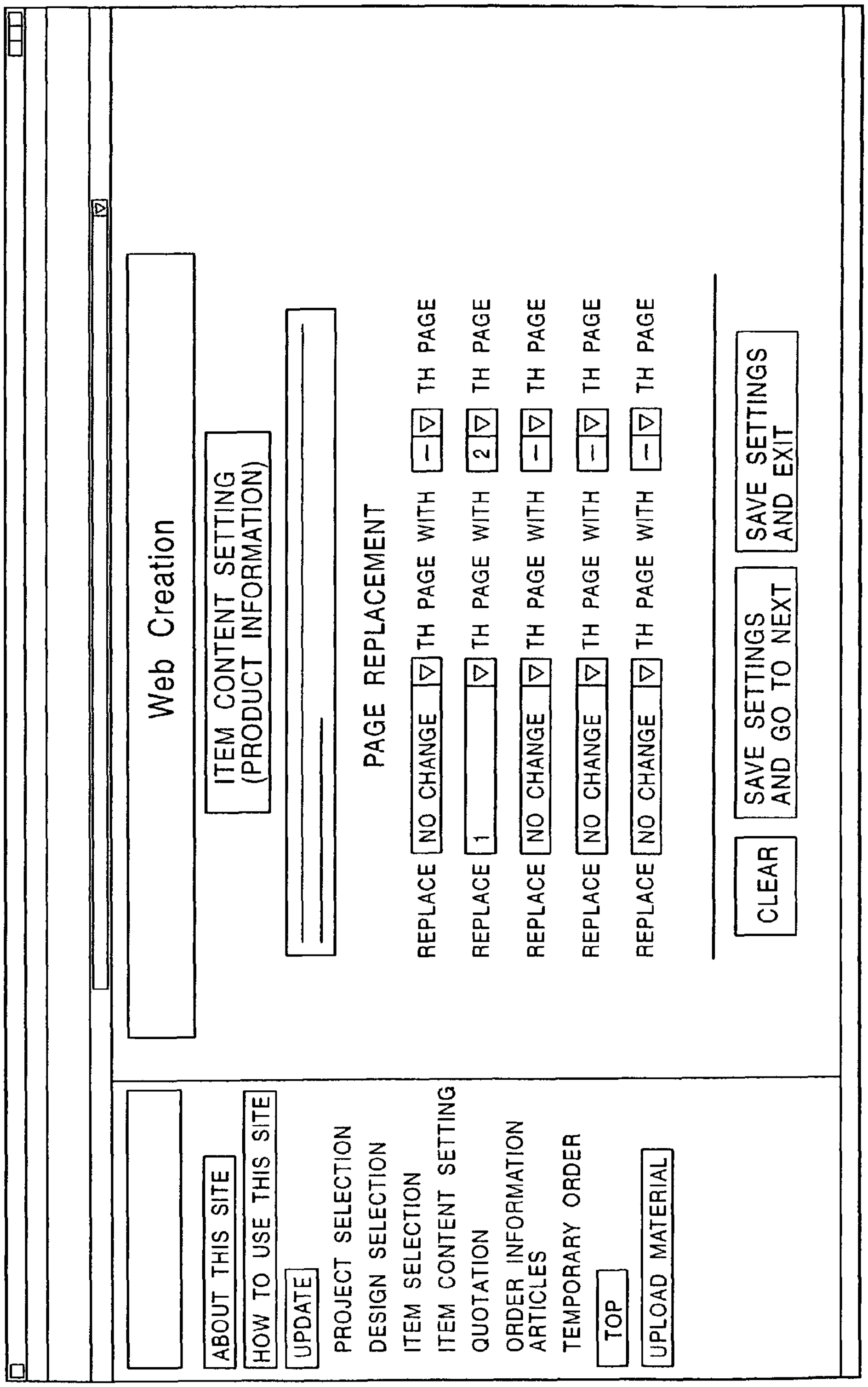
FIG. 90 is an illustration showing a browser display screen of the site providing a Web page creation support service according to an embodiment of the present invention.

In FIG. 90, an example is shown of the item content setting screen of the "page replacement". As shown in the figure, on this screen, the customer specifies the page of the replacement source and the page of the replacement destination, and can change the template information regarding page replacement.

Figure 91:
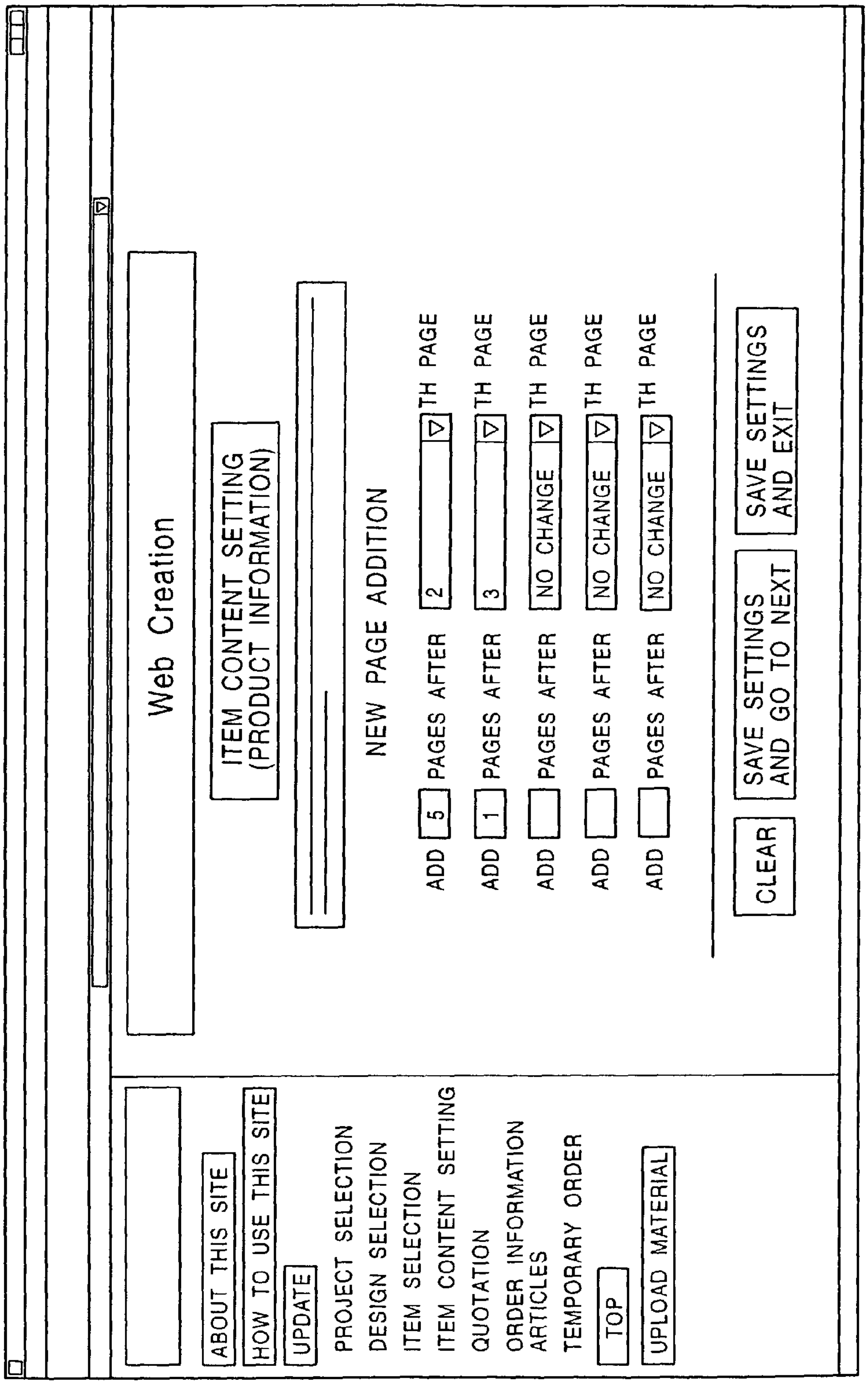
FIG. 91 is an illustration showing a browser display screen of the site providing a Web page creation support service according to an embodiment of the present invention.

In FIG. 91, an example is shown of the item content setting screen of the "product page new addition". As shown in the figure, on this screen, the customer specifies how many pages are to be added after a certain page, and can change the template information regarding product page new addition.

Figure 92:
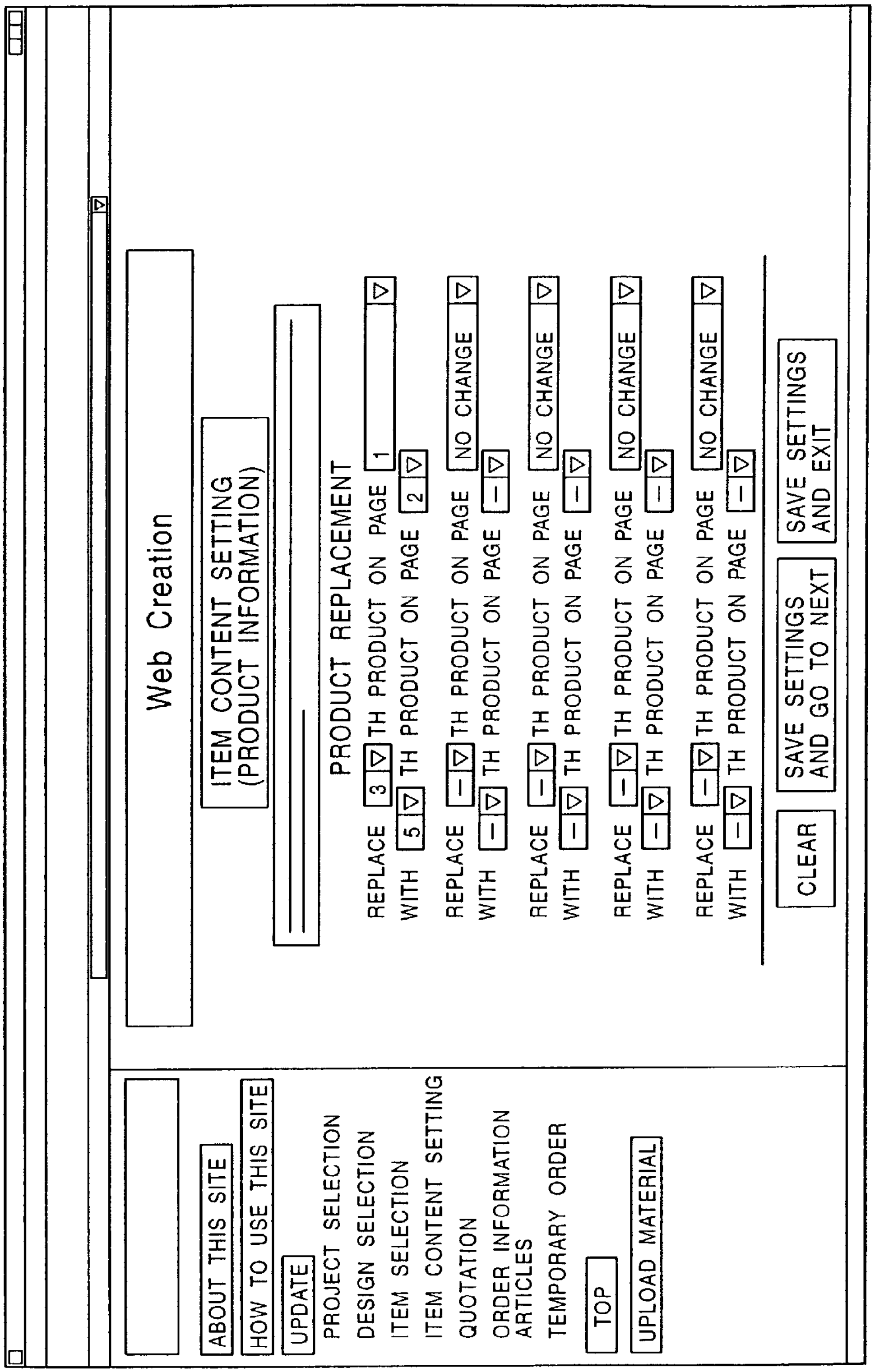
FIG. 92 is an illustration showing a browser display screen of the site providing a Web page creation support service according to an embodiment of the present invention.

In FIG. 92, an example is shown of the item content setting screen of the "product page new addition". As shown in the figure, on this screen, the customer specifies the replacement source product and the replacement destination product, and can change the template information regarding product replacement.

Figure 93:
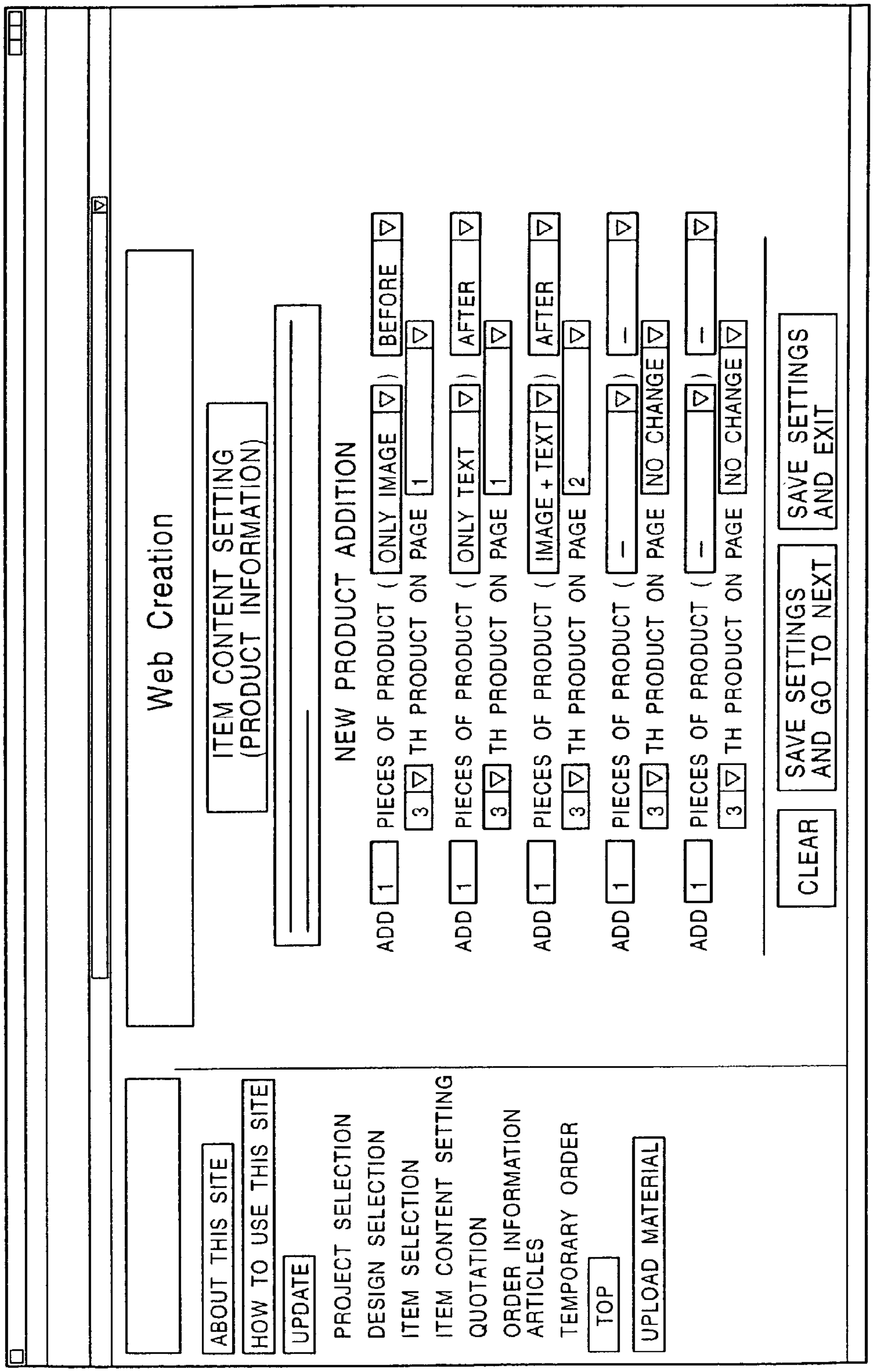
FIG. 93 is an illustration showing a browser display screen of the site providing a Web page creation support service according to an embodiment of the present invention.

In FIG. 93, an example is shown of the item content setting screen of the "product addition". As shown in the figure, on this screen, the customer specifies on what page, before/after which product, how (only image, only text, or image+text), and what product is to be added, and can change the template information regarding product addition.

Figure 94:
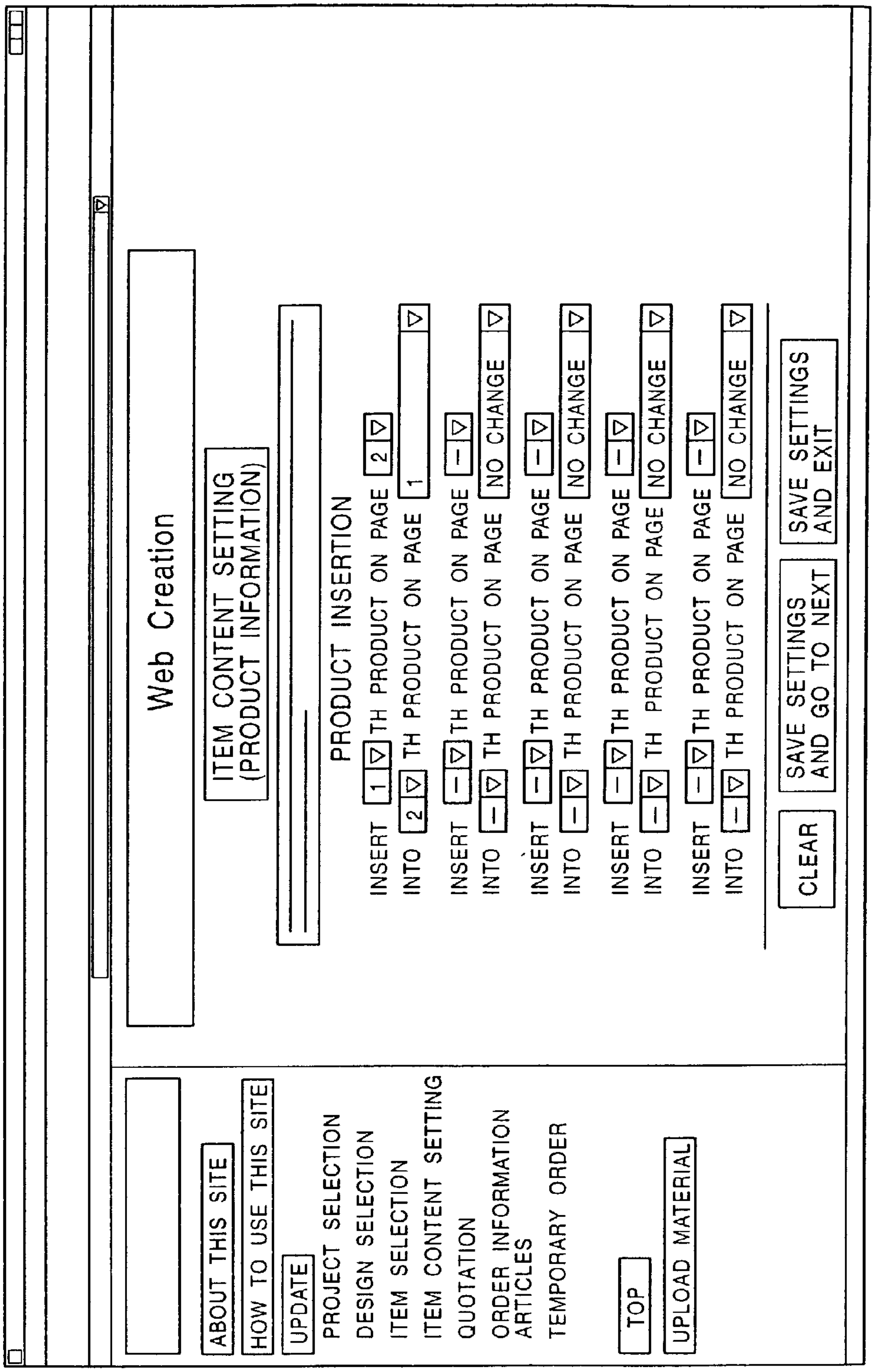
FIG. 94 is an illustration showing a browser display screen of the site providing a Web page creation support service according to an embodiment of the present invention.

In FIG. 94, an example is shown of the item content setting screen of the "product insertion". As shown in the figure, on this screen, the customer specifies at what sequence number, on what page, the product of a certain sequence number on a certain page is to be inserted, and can change the template information regarding product insertion.

Figure 95:
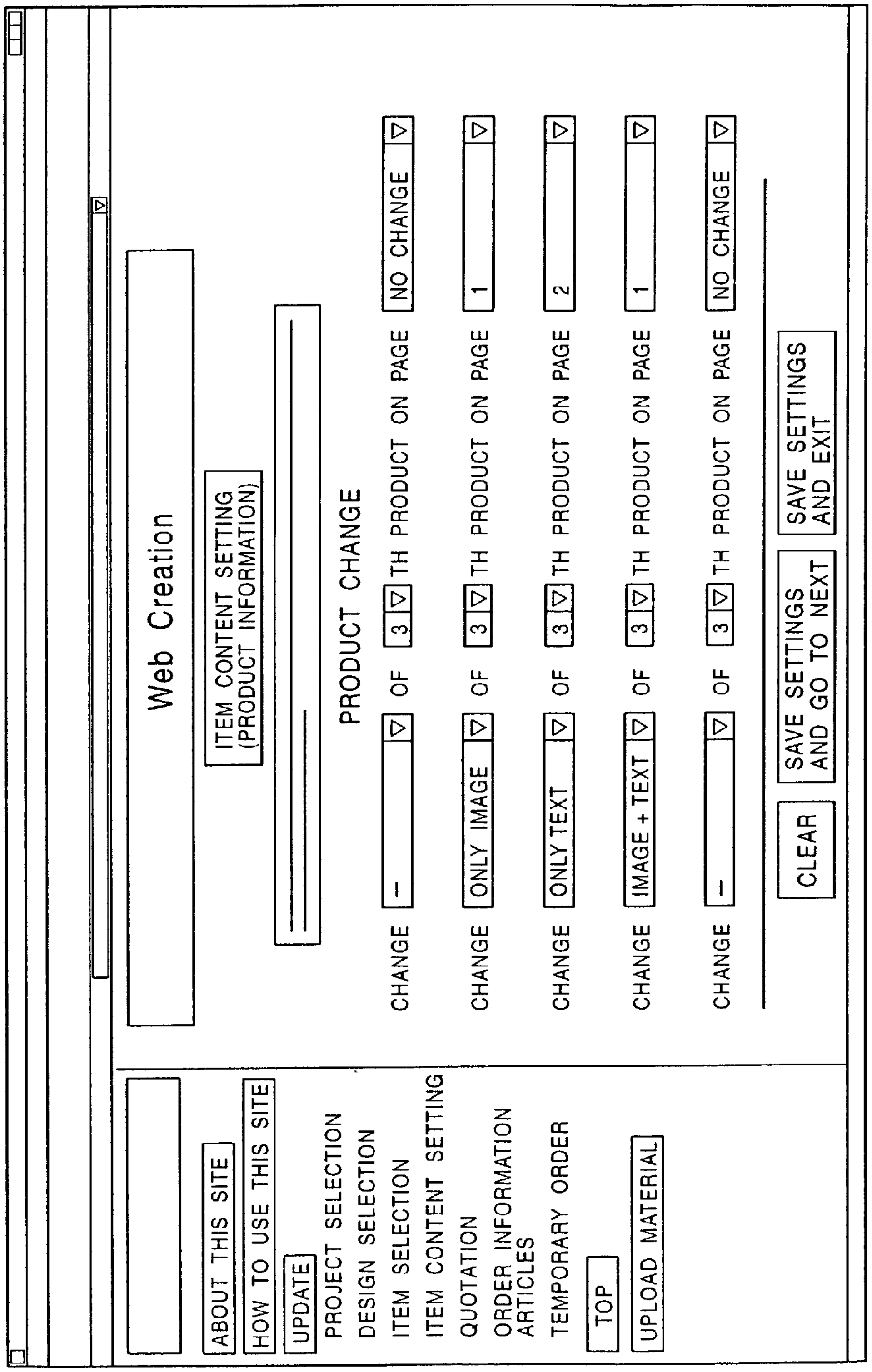
FIG. 95 is an illustration showing a browser display screen of the site providing a Web page creation support service according to an embodiment of the present invention.

In FIG. 95, an example is shown of the item content setting screen of the "product change". As shown in the figure, on this screen, the customer specifies on what page, the product with what sequence number, and how (only image, only text, or image+text), the product is to be changed, and the customer can change the template information regarding product change.

In FIG. 96, an example is shown of the "automatic quotation" processing screen which is performed after the above-described item content setting is complete. As shown in the figure, for each item, an item content setting, details thereof, a unit price, a quantity, and an amount are displayed, and a quotation is displayed in a tabular format in which totals thereof are displayed. If the customer is satisfied with the displayed quotation, he/she performs order-placing processing. If not satisfied, he/she can perform item content setting once again.

For the subsequent processing after the order processing in the update flow of the Web page creation support system according to the present embodiment, an order-placing information entry is performed, article confirmation is performed, credit processing is performed after temporary order-placing, actual order-placing is performed, and the job room is set up in order to perform the Web page update processing. At each of these stages, the processing is performed in almost same manner as in the case of the Web page new creation processing, so that the detailed description will be omitted.

As described above, the Web page creation support system according to the present embodiment enables a client who wants to create the Web pages to create and update Web pages with his/her preferences without any stress by using the template information.

The display examples by a browser of the site are shown which form the Web page creation support system according to the present embodiment. However, the present invention is not limited to these examples, but can be configures in various formats in accordance with the site operator.

Although a preferred form of the Web page creation support system according to the present embodiment has been described with reference to the accompanying drawings, the present invention is not limited to this example. It is obvious to those skilled in the art that various changes or modifications may be made within the scope of the technical idea described in the appended claims. Therefore, it will be understood that all such modifications naturally fall within the scope of the technical idea of the present invention.

INDUSTRIAL APPLICABILITY

According to the present invention, Web pages can be updated with reference to template information, thus update of Web pages on a network can be easily carried out.

The invention claimed is:

1. A Web page creation support system having a customer terminal unit and a Web page creation support unit which can be accessed from the customer terminal unit and which can access a creator terminal unit, the Web page creation support unit comprising:

storage means for storing template information of a Web page and sample image information corresponding to the template information;

sending means for sending the template information and the sample image information, which is selected at the customer terminal unit, to the customer terminal unit;

selecting means for selecting a creator terminal unit who matches an order-placing condition of Web page creation from the customer terminal unit, wherein the order-placing condition includes a delivery date and a Web page image selected by the customer terminal unit; and job room means for creating a job room;

for scheduling uploading of Web page information from the creator terminal unit;

for automatically notifying the creator terminal unit to deliver the Web page information within a scheduled timeframe;

for checking the uploading status of the creator terminal unit; and for notifying the customer terminal unit of the uploading status of the Web page creation job;

the customer terminal unit comprising:

receiving means for receiving the sample image information corresponding to the selected desired template information from the Web page creation support unit; and display means for displaying a preview screen based on the sample image information.

2. A Web page creation support unit which can be accessed from a customer terminal unit and which can access a creator terminal unit, comprising:

storage means for storing template information of a Web page and sample image information corresponding to the template information;

sending means for sending the template information and the sample image information, which is selected at the customer terminal unit, to the customer terminal unit, and selecting means for selecting a creator terminal unit who matches an order-placing condition of Web page creation from the customer terminal unit, wherein the order-placing condition includes a delivery date and a Web page image selected by the customer terminal unit;

job room means for creating a job room;

for scheduling uploading of Web page information from the creator terminal unit;

for automatically notifying the creator terminal unit to deliver the Web page information within a scheduled timeframe;

for checking the uploading status of the creator terminal unit; and for notifying the customer terminal unit of the uploading status of the Web page creation job;

wherein the template information includes information which forms a preview screen to be displayed on the customer terminal unit using the sample image information corresponding to the template information.

3. A Web page creation support unit according to claim 2, further comprising a customer information control part, wherein the customer information control part includes:

registering means for registering the customer information received from the customer terminal unit; and permitting means for prohibiting display of the template information selection screen at the customer terminal unit until the customer information is registered.

4. A Web page creation support unit according to claim 2, wherein the template information includes Web page design information, item information to be displayed on the Web page, and item content information contained in the item information.

5. A Web page creation support unit according to claim 2, further comprising quotation means for performing quotation processing of a Web page creation cost in accordance with the template information selected at the customer terminal unit.

6. A Web page creation support unit according to claim 2, wherein the preview screen comprises a plurality of image files.

7. A Web page creation support unit according to claim 2, further comprising means for displaying a prompt for order-placing processing at the customer terminal unit at the same time with or after display of the preview screen at the customer terminal unit.

8. A computer-readable storage medium storing computer-executable program instructions which, when executed by a processor, perform a method for supporting Web page creation by a Web page creation support unit, the method comprising storing template information of a Web page and sample image information corresponding to the template information, selecting a creator terminal unit who matches an order-placing condition of Web page creation from the customer terminal unit, wherein the order-placing condition includes a delivery date and a Web page image selected by the customer terminal unit;

sending the template information and the sample image information, which correspond to the selection by the customer terminal unit, to the customer terminal unit, and creating a job room, wherein the template information includes information which forms a preview screen to be displayed on the customer terminal unit using the sample image information corresponding to the template information, wherein the processor causes the job room to:

schedule uploading of Web page information from the creator terminal unit;

automatically notify the creator terminal unit to deliver the Web page information within a scheduled timeframe;

check the uploading status of the creator terminal unit; and notify the customer terminal unit of the uploading status of the Web page creation job.

9. The computer-readable storage medium according to claim 8, wherein the Web page creation support unit comprises a customer information control part, the customer information control part is caused to function as registering means for registering the requested customer information, and permitting means for prohibiting display of the template information selection screen at the customer terminal unit until the customer information is registered.

10. The computer-readable storage medium according to claim 9, wherein the Web page creation support unit is caused to function as quotation means for performing quotation processing of a Web page creation cost in accordance with the template information selected at the customer terminal unit.

11. A Web page creation support method in a Web page creation support unit which can be accessed from a customer terminal unit and which can access a creator terminal unit, the method comprising:

storing template information of a Web page and sample image information corresponding to the template information;

sending the template information and the sample image information corresponding to the selection of the customer terminal unit to the customer terminal unit, selecting a creator terminal unit who matches an order-placing condition of Web page creation from the customer terminal unit, wherein the order-placing condition includes a delivery date and a Web page image selected by the customer terminal unit;

scheduling uploading of Web page information from the creator terminal unit;

automatically notifying the creator terminal unit to deliver the Web page information within a scheduled timeframe;

checking the uploading status of the creator terminal unit; and notifying the customer terminal unit of the uploading status of the Web page creation job, wherein the template information includes information which forms a preview screen to be displayed on the customer terminal unit using the sample image information corresponding to the template information.

12. A Web page creation support method according to claim 11, wherein the Web page creation support unit further comprises a customer information control part, the method further comprising:

registering the customer information received from the customer terminal unit in the customer information control part; and prohibiting display of the template information selection screen at the customer terminal unit until the customer information is registered.

13. A Web page creation support method according to claim 11, further comprising quotation processing of a Web page creation cost in accordance with the template information selected at the customer terminal unit.

14. A Web page creation support system having a customer terminal unit and a Web page creation support unit which can be accessed from the customer terminal unit, and which can access a creator terminal unit, the Web page creation support unit comprising:

storage means for storing template information of a Web page and Web page image information corresponding to selected template information;

quotation means for performing quotation processing of a Web page creation cost in accordance with the template information selected at the customer terminal unit;

sending means for sending the quotation information, which is generated by the quotation means, to the customer terminal unit, and selecting means for selecting a creator terminal unit who matches an order-placing condition of Web page creation from the customer terminal unit, wherein the order-placing condition includes a delivery date and a Web page image selected by the customer terminal unit;

job room means for creating a job room;

for scheduling uploading of Web page information from the creator terminal unit;

for automatically notifying the creator terminal unit to deliver the Web page information within a scheduled timeframe;

for checking the uploading status of the creator terminal unit; and for notifying the customer terminal unit of the uploading status of the Web page creation job;

the customer terminal unit comprising:

selection means for selecting desired template information from template information selection screen for prompting selection of the template information which is stored in the Web page creation support unit;

receiving means for receiving the quotation information from the Web page creation support unit; and display means for displaying the received quotation information.

15. A Web page creation support unit which can be accessed from a customer terminal unit and which can access a creator terminal unit, comprising:

storage means for storing template information of a Web page and Web page image information corresponding to selected template information;

quotation means for performing quotation processing of a Web page creation cost in accordance with the template information selected by the customer terminal unit;

sending means for sending the quotation information, which is generated by the quotation means, to the customer terminal unit; and selecting means for selecting a creator terminal unit who matches an order-placing condition of Web page creation from the customer terminal unit, wherein the order-placing condition includes a delivery date and a Web page image selected by the customer terminal unit;

job room means for creating a job room;

for scheduling uploading of Web page information from the creator terminal unit;

for automatically notifying the creator terminal unit to deliver the Web page information within a scheduled timeframe;

for checking the uploading status of the creator terminal unit; and for notifying the customer terminal unit of the uploading status of the Web page creation job.

16. A Web page creation support unit according to claim 15, further comprising a customer information control part, wherein the customer information control part includes:

registering means for registering the customer information received from the customer terminal unit; and permitting means for prohibiting display of the quotation information at the customer terminal unit until the customer information is registered.

17. A Web page creation support unit according to claim 15, wherein the template information includes Web page design information, item information to be displayed on the Web page, and item content information contained in the item information.

18. A Web page creation support unit according to claim 15, further comprising means for displaying a prompt for order-placing processing at the customer terminal unit at the same time with or after display of the quotation information at the customer terminal unit.

19. A computer-readable storage medium storing computer-executable program instructions which, when executed by a processor, perform a method for supporting Web page creation by a Web page creation support unit, the method comprising:

storing template information of a Web page and Web page image information corresponding to template information selected by the customer terminal unit;

performing quotation processing of a Web page creation cost in accordance with the template information selected by the customer terminal unit;

sending the quotation information, which is generated by the quotation means, to the customer terminal unit; and selecting a creator terminal unit who matches an order-placing condition of Web page creation from the customer terminal unit, wherein the order-placing condition includes a delivery date and a Web page image selected by the customer terminal unit;

creating a job room;

wherein the processor causes the job room to:

schedule uploading of Web page information from the creator terminal unit;

automatically notify the creator terminal unit to deliver the Web page information within a scheduled timeframe;

check the uploading status of the creator terminal unit; and notify the customer terminal unit of the uploading status of the Web page creation job.

20. The computer-readable storage medium according to claim 19, further comprising display means for prompting order-placing processing on the customer terminal unit at the same time with or after display of the quotation information at the customer terminal unit.

21. A Web page creation support method in a Web page creation support unit which can be accessed from a customer terminal unit and which can access a creator terminal unit, the method comprising:

storing template information of a Web page and Web page image information corresponding to template information selected by the customer terminal unit;

performing quotation processing of a Web page creation cost in accordance with the template information selected by the customer terminal unit;

sending the quotation information, which is generated by the quotation processing, to the customer terminal unit;

selecting a creator terminal unit who matches an order-placing condition of Web page creation from the customer terminal unit, wherein the order-placing condition includes a delivery date and a Web page image selected by the customer terminal unit;

scheduling uploading of Web page information from the creator terminal unit;

automatically notifying the creator terminal unit to deliver the Web page information within a scheduled timeframe;

checking the uploading status of the creator terminal unit; and notifying the customer terminal unit of the uploading status of the Web page creation job.

22. A Web page creation support method according to claim 21, further comprising prompting order-placing processing on the customer terminal unit at the same time with or after displaying the quotation information at the customer terminal unit.

23. A Web page creation support system having a customer terminal unit, a creator terminal unit, and a Web page creation support unit which can be accessed from the customer terminal unit and the creator terminal unit, the Web page creation support unit comprising:

storage means for storing information about the creator, template information of a Web page, and Web page image information corresponding to selected template information;

staffing means for selecting a creator who matches an order-placing condition of Web page creation from the customer terminal unit, wherein the order-placing condition includes a delivery date and a Web page image selected by the customer terminal unit; and job room means for creating a job room;

for scheduling uploading of Web page information from the creator terminal unit;

for automatically notifying the creator terminal unit to deliver the Web page information within a scheduled timeframe;

for checking the uploading status of the creator terminal unit; and for notifying the customer terminal unit of the uploading status of the Web page creation job.

24. A Web page creation support unit which can be accessed from a customer terminal unit and a creator terminal unit, comprising:

storage means for storing information about the creator, template information of a Web page, and Web page image information corresponding to selected template information;

staffing means for selecting a creator who matches an order-placing condition for Web page creation from the customer terminal unit, wherein the order-placing condition includes a delivery date and a Web page image selected by the customer terminal unit; and job room means for creating a job room, for scheduling uploading of Web page information from the creator terminal unit;

for automatically notifying the creator terminal unit to deliver the Web page information within a scheduled timeframe;

for checking the uploading status of the creator terminal unit; and for notifying the customer terminal unit of the uploading status of the Web page creation job.

25. A Web page creation support unit according to claim 24, further comprising registering means for registering the creator information which is sent from the creator terminal unit.

26. A Web page creation support unit according to claim 24, wherein the staffing means further comprising:

allowing the customer terminal unit to select a creator who performs the Web page creation from a plurality of the selected creators.

27. A computer-readable storage medium storing computer-executable program instructions which, when executed by a processor, perform a method for supporting Web page creation by a Web page creation support unit, the method comprising:

storing information about the creator, template information of a Web page, and Web page image information corresponding to selected template information;

selecting a creator who matches an order-placing condition of Web page creation from the customer terminal unit, wherein the order-placing condition includes a delivery date and a Web page image selected by the customer terminal unit; and creating a job room, wherein the processor causes the job room to:

schedule uploading of Web page information from the creator terminal unit;

automatically notify the creator terminal unit to deliver the Web page information within a scheduled timeframe;

check the uploading status of the creator terminal unit; and notify the customer terminal unit of the uploading status of the Web page creation job.

28. A Web page creation support method in a Web page creation support unit which can be accessed from a customer terminal unit and a creator terminal unit, the method comprising:

registering information about the creator, template information of a Web page, and Web page image information corresponding to selected template information;

selecting a creator who matches an order-placing condition for Web page creation from the customer terminal unit, wherein the order-placing condition includes a delivery date and a Web page image selected by the customer terminal unit;

scheduling uploading of Web page information from the creator terminal unit, automatically notifying the creator terminal unit to deliver the Web page information within a scheduled timeframe;

checking the uploading status of the creator terminal unit; and notifying the customer terminal unit of the uploading status of the Web page creation job.

29. A Web page creation support method in a Web page creation support unit which can be accessed from the customer terminal unit and the creator terminal unit, the method comprising:

storing information about the creator terminal unit, template information of a Web page, and Web page image information corresponding to selected template information;

order-receiving a Web page creation request from the customer terminal unit, wherein the order includes a delivery date and a Web page image selected by the customer terminal unit;

selecting a creator terminal unit who matches an order-placing condition of Web page creation from the customer terminal unit; and establishing a job control part which controls the progress status of a Web page creation job in response to the order from the customer terminal unit, and the job control part controls the progress status of each Web page creation job in the customer terminal unit, the creator terminal unit, and the Web page creation support unit, scheduling uploading of Web page information from the creator terminal unit, automatically notifying the creator terminal unit to deliver the Web page information within a scheduled timeframe;

checking the uploading status of the creator terminal unit; and notifying the customer terminal unit of the uploading status of the Web page creation job.

30. A Web page creation support unit which can be accessed from the customer terminal unit and the creator terminal unit, comprising:

storage means for storing information about the creator terminal unit, template information of a Web page, and Web page image information corresponding to selected template information;

selecting means for selecting a creator terminal unit who matches an order-placing condition of Web page creation from the customer terminal unit, wherein the order-placing condition includes a delivery date and a Web page image selected by the customer terminal unit;

job control means, for controlling the progress status of each Web page creation job in the customer terminal unit, the creator terminal unit, and the Web page creation support unit;

for scheduling uploading of Web page information from the creator terminal unit;

for automatically notifying the creator terminal unit to deliver the Web page information within a scheduled timeframe;

for checking the uploading status of the creator terminal unit; and for notifying the customer terminal unit of the uploading status of the Web page creation job; and informing means for informing the customer terminal unit and/or the creator terminal unit of the message in accordance with the status change of the Web page creation job.

31. A computer-readable storage medium storing computer-executable program instructions which, when executed by a processor, perform a method for supporting Web page creation by a Web page creation support unit, the method comprising:

storing information about the creator terminal unit, template information of a Web page, and Web page image information corresponding to selected template information;

selecting a creator terminal unit who matches an order-placing condition of Web page creation from the customer terminal unit, wherein the order-placing condition includes a delivery date and a Web page image selected by the customer terminal unit;

controlling the progress status of each Web page creation job in the customer terminal unit, the creator terminal unit, and the Web page creation support unit; and informing the customer terminal unit and/or the creator terminal unit of the message in accordance with the status change of the Web page creation job, wherein the processor causes the job control means to:

schedule uploading of Web page information from the creator terminal unit;

automatically notify the creator terminal unit to deliver the Web page information within a scheduled timeframe;

check the uploading status of the creator terminal unit; and notify the customer terminal unit of the uploading status of the Web page creation job.

32. A Web page creation support method in a Web page creation support unit which can be accessed from a customer terminal unit and a creator terminal unit, the method comprising:

storing information about the creator terminal unit, template information of a Web page, and Web page image information corresponding to selected template information;

selecting a creator terminal unit who matches an order-placing condition of Web page creation from the customer terminal unit, wherein the order-placing condition includes a delivery date and a Web page image selected by the customer terminal unit;

controlling the progress status of each Web page creation job in the customer terminal unit, the creator terminal unit, and the Web page creation support unit; and informing the customer terminal unit and/or the creator terminal unit of the message in accordance with the status change of the Web page creation job, scheduling uploading of Web page information from the creator terminal unit, automatically notifying the creator terminal unit to deliver the Web page information within a scheduled timeframe;

checking the uploading status of the creator terminal unit; and notifying the customer terminal unit of the uploading status of the Web page creation job.

33. A Web page creation support unit which can be accessed from a customer terminal unit and a creator terminal unit, comprising:

storage means for storing, in connection with template information, Web page information which has been created by an order of the customer terminal unit and Web page image information corresponding to selected template information;

selecting a creator terminal unit who matches an order-placing condition of Web page creation from the customer terminal unit, wherein the order-placing condition includes a delivery date and a Web page image selected by the customer terminal unit;

control means for controlling update of the Web page based on an updated template information on the creator terminal unit by update request from the customer terminal unit; and job room means for creating a job room;

for scheduling uploading of Web page information from the creator terminal unit;

for automatically notifying the creator terminal unit to deliver the Web page information within a scheduled timeframe;

for checking the uploading status of the creator terminal unit; and for notifying the customer terminal unit of the uploading status of the Web page creation job.

34. A Web page creation support unit according to claim 33, wherein the Web page information is controlled corresponding to a job number which is assigned to each previous creation job of the Web page information.

35. A Web page creation support unit which can be accessed from a customer terminal unit and a creator terminal unit, comprising:

storage means for storing template information of a Web page and Web page image information corresponding to selected template information;

selecting means for selecting a creator terminal unit who matches an order-placing condition of Web page creation from the customer terminal unit, wherein the order-placing condition includes a delivery date and a Web page image selected by the customer terminal unit;

control means for controlling Web page creation in accordance with the template information for the creator terminal unit by the order of the customer terminal unit, wherein the Web page is guided to an option providing unit regarding the Web page in response to the request of the customer terminal unit; and job room means for creating a job room;

for scheduling uploading of Web page information from the creator terminal unit;

for automatically notifying the creator terminal unit to deliver the Web page information within a scheduled timeframe;

for checking the uploading status of the creator terminal unit; and for notifying the customer terminal unit of the uploading status of the Web page creation job.

36. A Web page creation support unit according to claim 35, further comprising performing quotation processing of the Web page creation cost and the option service cost before an actual order is received.

* * * * *